US011454600B2

(12) United States Patent
Emanuel

(10) Patent No.: US 11,454,600 B2
(45) Date of Patent: Sep. 27, 2022

(54) THERMAL CONDUCTIVITY SENSOR

(71) Applicant: C-Therm Technologies Ltd., Fredericton (CA)

(72) Inventor: Michael Emanuel, St. Laurent (CA)

(73) Assignee: C-THERM TECHNOLOGIES LTD., New Brunswick (CA)

( * ) Notice: Subject to any disclaimer, the term of this patent is extended or adjusted under 35 U.S.C. 154(b) by 51 days.

(21) Appl. No.: 16/762,443

(22) PCT Filed: Nov. 13, 2018

(86) PCT No.: PCT/CA2018/051429
§ 371 (c)(1),
(2) Date: May 7, 2020

(87) PCT Pub. No.: WO2019/090436
PCT Pub. Date: May 16, 2019

(65) Prior Publication Data
US 2020/0271602 A1 Aug. 27, 2020

Related U.S. Application Data

(60) Provisional application No. 62/584,420, filed on Nov. 10, 2017, provisional application No. 62/584,453, filed on Nov. 10, 2017, provisional application No. 62/584,474, filed on Nov. 10, 2017.

(51) Int. Cl.
*G01N 25/20* (2006.01)
*G01N 25/18* (2006.01)
(52) U.S. Cl.
CPC .................. *G01N 25/18* (2013.01)

(58) Field of Classification Search
USPC ........................................... 374/43, 141, 183
See application file for complete search history.

(56) References Cited

U.S. PATENT DOCUMENTS 6,676,287 B1 * 1/2004 Mathis ................... G01N 25/18
374/1
2009/0107988 A1 * 4/2009 Kaastra ..................... C03C 8/20
219/553
2011/0249701 A1 * 10/2011 Bieberich ............... G01K 13/20
374/163

(Continued)

FOREIGN PATENT DOCUMENTS

| CA | 2011659 | 9/1990 |
| CA | 2317743 | 6/2000 |
| WO | WO2017005536 | 1/2017 |

OTHER PUBLICATIONS

International Search Report for International Application No. PCT/CA2018/051429, dated Feb. 6, 2019, 2 pages.

*Primary Examiner* — Mirellys Jagan
(74) *Attorney, Agent, or Firm* — Stetina Brunda Garred and Brucker

(57) ABSTRACT

A thin film thermal conductivity temperature sensor may have a spiral heating element having very tightly spaced conductors that allow the spiral heating element to act as a solid disc. Further, multiple electrical connections to the spiral heating element can be provided to allow the size of the heating and temperature sensing element to be changed. The sensor can be used in determining thermal characteristics of different material samples to be determined.

20 Claims, 31 Drawing Sheets

(56) References Cited

U.S. PATENT DOCUMENTS

2011/0268148 A1* 11/2011 King .................... G01K 17/006
 374/31
2015/0127294 A1* 5/2015 Lubner .................... A61B 5/01
 702/136
2017/0049612 A1 12/2017 Hussain et al.

* cited by examiner

THERMAL CONDUCTIVITY SENSOR

The present application claims the benefit of U.S. Provisional Application No. 62/584,420 filed on Nov. 10, 2017, U.S. Provisional Application No. 62/584,453 filed on Nov. 10, 2017, and U.S. Provisional Application No. 62/584,474 filed on Nov. 10, 2017, the entire contents of which are incorporated herein by reference.

TECHNICAL FIELD

The current disclosure relates to methods, systems and sensors for measuring thermal conductivity properties of materials, and in particular to a thin-film sensor for measuring thermal conductivity properties.

BACKGROUND

Sensors may allow thermal characteristics, such as conductivity, effusivity and diffusivity, of materials to be determined. Single sided sensors may determine the thermal characteristics using a sensor attached to a single side of the material sample. Single sided sensors may heat a material sample and measure the material's response and determine the thermal characteristics.

In order to measure characteristics of a sample in a transient mode, different sized sensors may be used. For example, in order to determine in-plane and off-plane, also known as cross-plane or through-plane, conductivities of anisotropic materials, a larger sensor may be used that has a heater sized to match the radial size of the material sample in order to heat the sample in 1 dimension and a smaller sensor having a heater less than the radial size of the material sample in order to heat the sample in 3 dimensions. Alternatively, rather than using two different sized sensors on the same sized samples, two different sized samples may be used with a single sized sensor to provide measurements from heating the sample in both 1 dimension and 3 dimensions.

It would be desirable to have a single sensor for use in determining thermal characteristics of different material samples.

BRIEF DESCRIPTION OF THE DRAWINGS

Further features and advantages of the present disclosure will become apparent from the following detailed description, taken in combination with the appended drawings, in which.

DETAILED DESCRIPTION

In accordance with the present disclosure there is provided a sensor for use in determining thermal characteristics of a material sample, the sensor comprising a heating patch layer comprising closely spaced spiral electrical trace with adjacent spiral sections spaced apart by less than 75 μm which when heated act as a circular heat source; and a pair of electrical connections connected to the heating patch capable of supplying current to the heating patch to heat a first size of the heating patch when determining thermal characteristics of the material sample.

In accordance with the present disclosure there is provided a measurement system for determining thermal characteristics of a material sample, the measurement system comprising: a sensor comprising: a heating patch layer comprising closely spaced spiral electrical trace with adjacent spiral sections closely spaced apart by less than 75 μm which when heated act as a circular heat source; and a pair of electrical connections connected to the heating patch capable of supplying current to the heating patch to heat a first size of the heating patch when determining thermal characteristics of the material sample; a processor for executing instructions; and a memory storing instructions, which when executed by the processor configure the measurement system to: heat the material sample by applying a current to heat an area of the heating patch layer through the pair of electrical connections; measure a voltage across the heated area of the heating patch layer; determine an average temperature of the heated area using the measured voltage; and determine thermal characteristics of the material sample using the average temperature.

A thin film sensor is described that allows the sensor to behave substantially like a circular heat source. As described further below, a circular heat source allows various thermal characteristics of materials to be determined. Further, the thin film sensor may also allow different sized heating patches to be used when heating a sample material. The sensor may be used to measure conductivity properties of isotropic and orthotropic materials as well as thin film materials. The sensor has a spiral heating element with closely spaced spiral traces. The close spacing of the spiral traces allows the spiral to act as a solid circular heating source, rather than as separate wires. The spiral heating element may be formed using thin film lithography or other manufacturing techniques. Multiple contacts along the spiral allow different portions of the spiral to be used for heating and temperature sensing.

Figure 1:
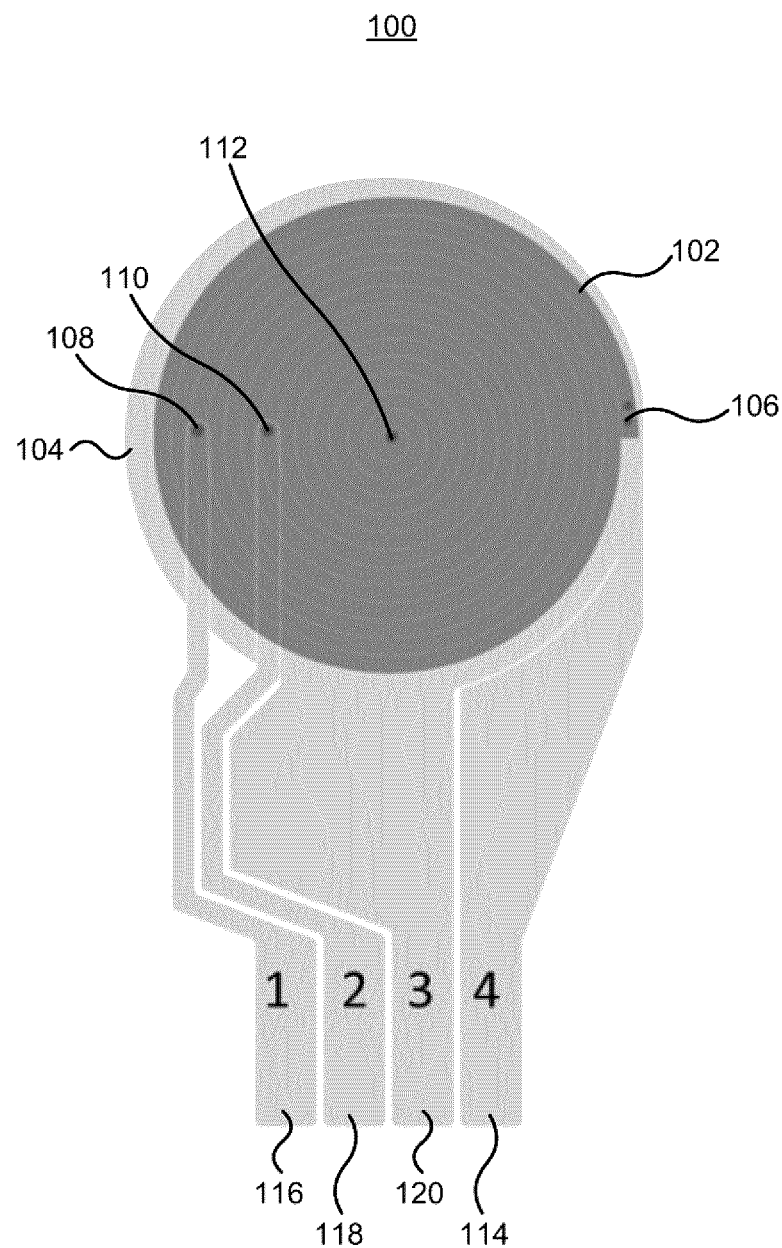
FIG. 1 depicts a thin film sensor.

FIG. 1 depicts a thin film sensor. The sensor 100 comprises a heating patch 102 of an electrically conductive material that changes its resistance according to its temperature. The heating patch 102 is formed as a tightly spaced continuous spiral or serpentine pattern. The spacing between adjacent traces is tight enough that the heating patch 102 has the thermal radiation characteristics of a solid circular heating patch rather than a plurality of adjacent heating elements. The tight spacing between adjacent traces may be for example between 1-100 micrometers. Although the heating patch 102 is formed from heating elements arranged in a spiral or serpentine pattern, the close spacing of adjacent portions of the heating elements cause the heating patch to act as a circular heat source (CHS). The heating patch 102 may be formed on top of an electrical connection layer 104 that provides a number of electrical connections to different locations of the heating patch 102. As depicted, the electrical connection layer 104 may make contact to the heating patch 102 at an outer perimeter 106 of the heating patch 102, at a first point 108 radially inward from the perimeter of the heating patch 102, at a second point 110 radially inward from the perimeter of the heating patch 102 and at a center point 112 of the heating patch 102. By passing electrical current through different connection points, different heating patch sizes may be provided. For example, passing current through the outer perimeter connection point 106 and the center connection point 112 creates a heating patch having a size equal to the entire size of the heating patch. Passing current through the second inward connection point 110 and the center point 112 results in a heating patch having a diameter of the distance between the second inward connection point 110 and the center connection point 112. Each of the connection points 106, 108, 110, 112 may be connected to respective leads 114, 116, 118, 120 that allow the sensor to be connected to a controller.

The sensor 100 may be controlled to act as different sized heaters, each having the heating characteristics of a CHS. Accordingly, the same sensor 100 can be used on a single sample to measure the temperatures resulting from both 1 dimensional heating, for example using the largest size heating patch provided by powering the outer most and center connection points 106 and 112 and then using the smallest size heating patch provided by powering the inner most and center connection points 110, 112.

Figure 2:
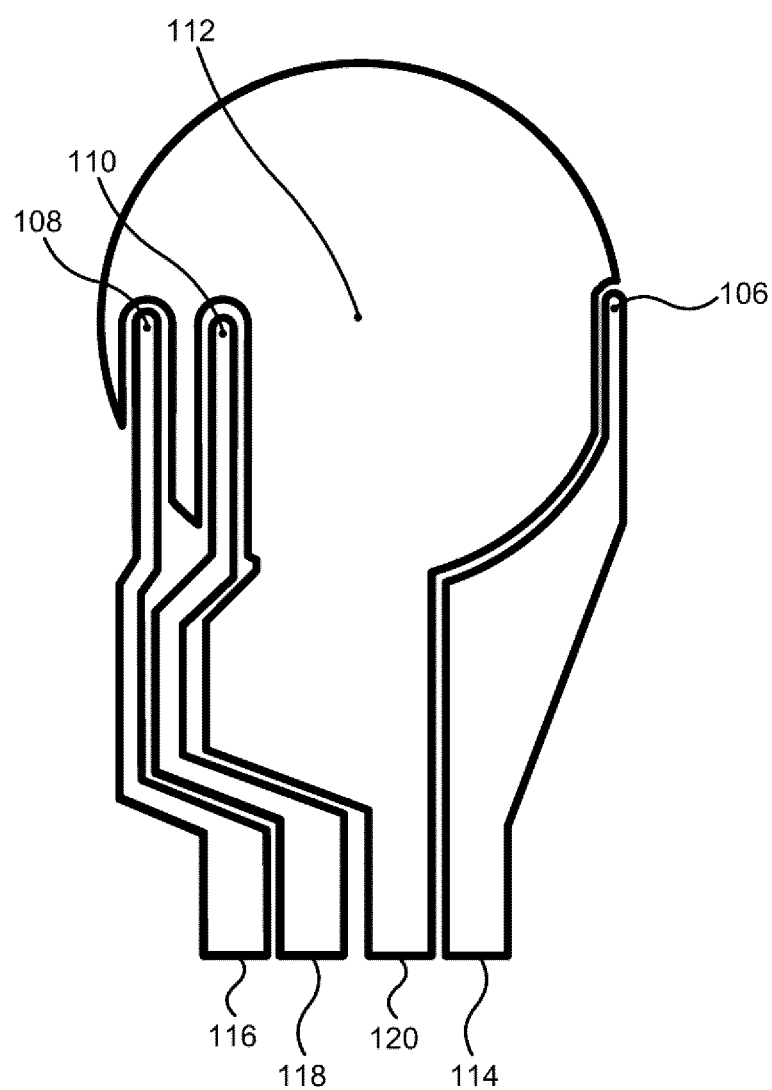
FIG. 2 depicts an electrical connection layer of the thin film sensor.

FIG. 2 depicts the electrical connection layer 104 of the thin film sensor 100. As described above, the electrical connection layer 104 may provide a plurality of electrically isolated sections that can be electrically connected to the heating element at the respective connection points 106, 108, 110, 112. The electrical connections are electrically connected to the respective leads 114, 116, 118, 120.

Figure 3A:
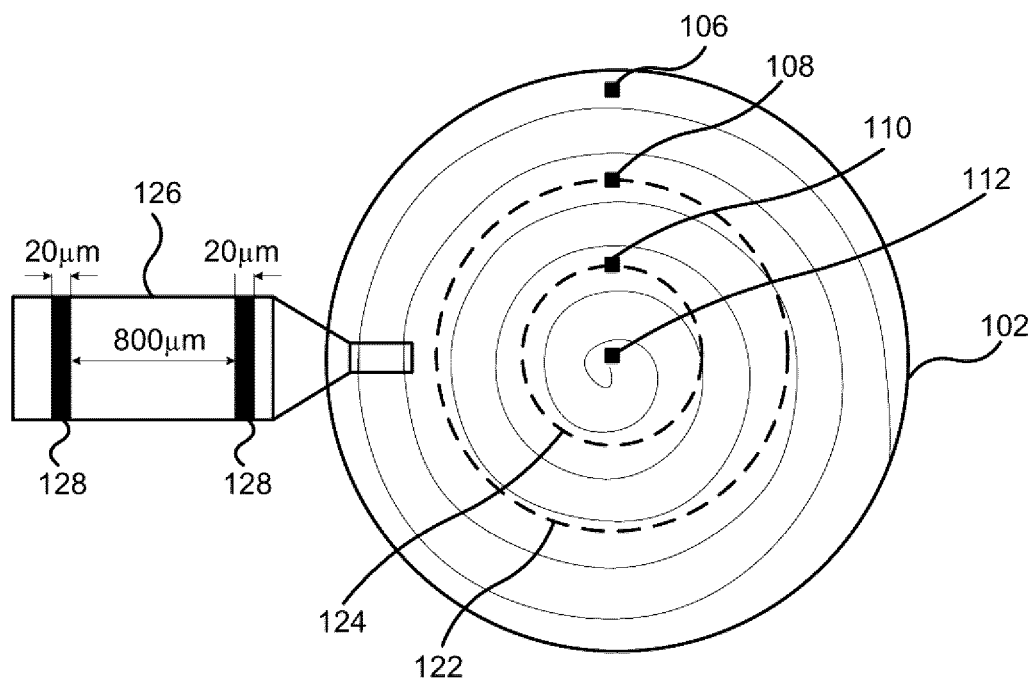
FIGS. 3A and 3B depict heater layers of the thin film sensor.
Figure 3B:
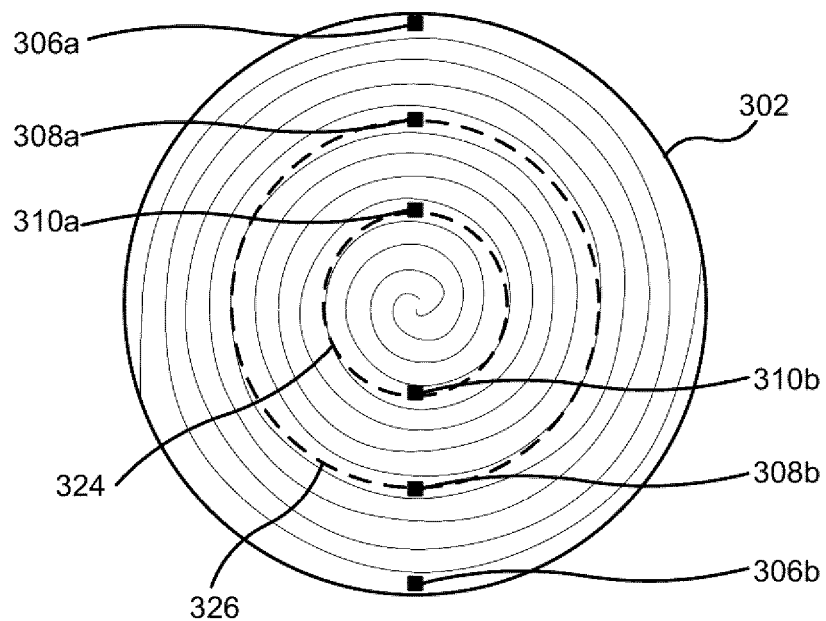

FIGS. 3A and 3B depict different heating patch layers of the thin film sensor. As depicted in FIG. 3A, the heating patch 102 may be formed as a single spiral having one end located at the perimeter of the heating patch, which would be electrically connected to connection point 106 and a second end located at the center of the spiral, which would be electrically connected to connection point 112. Additional electrical connections can be made at different radial locations along the spiral, such as to connection points 108 and 112. By using different connection points, different sized heating patches are provided. For example, using connection points 106 and 112, a circular heating patch that has the same size as the sensor is provided, using connection points 108 and 112 a circular heating patch that has a size depicted by dashed circle 122 is provided, and using connection points 110 and 112 a circular heating patch that has a size depicted by dashed circle 124 is provided.

The heating elements 126 of the spiral are closely spaced to each other in order to provide a sensor that behaves as if it were a solid circular heat source. The heating elements 126 may be relatively thick compared to the spacing 128 between them. For example, the heating elements 126 may be approximately 800 μm and may be spaced apart by approximately 20 μm. The spacing 128 between the heating elements 126 may be spaced apart by a larger or smaller amount, however the heating element spacing 128 should be less than 75 μm. Different spacings may provide acceptable performance depending upon the material being sampled. For example, materials having high thermal conductivity, the larger spacing of 75 μm may be used, while materials having low thermal conductivity the smaller spacing of 20 μm may be used.

As depicted in FIG. 3B, the heating patch 302 may be formed as intertwined spirals connected together at the center. The double spiral heating patch 302 has two connection points 306a, 306b at the perimeter edge and a second at an opposite perimeter edge. Additional connection points 308a, 308b, 310a, 310b may be connected at locations along the respective spirals that are radially inward from the pair of perimeter connections. Heating the sensor using the perimeter connection points 306a, 306b provides the largest heating patch size, which has the same size as the entire heating patch 302. Heating the sensor using the inner points 308a, 308b provides a smaller size of heating patch depicted by the dashed circle 324. Heating the sensor using the inner points 310a, 310b provides a smaller size of heating patch depicted by the dashed circle 326.

The heating patch layers may have different patterns as long as the adjacent portions of heating elements are close enough to each other that the heating patch acts as a CHS.

Figure 4:
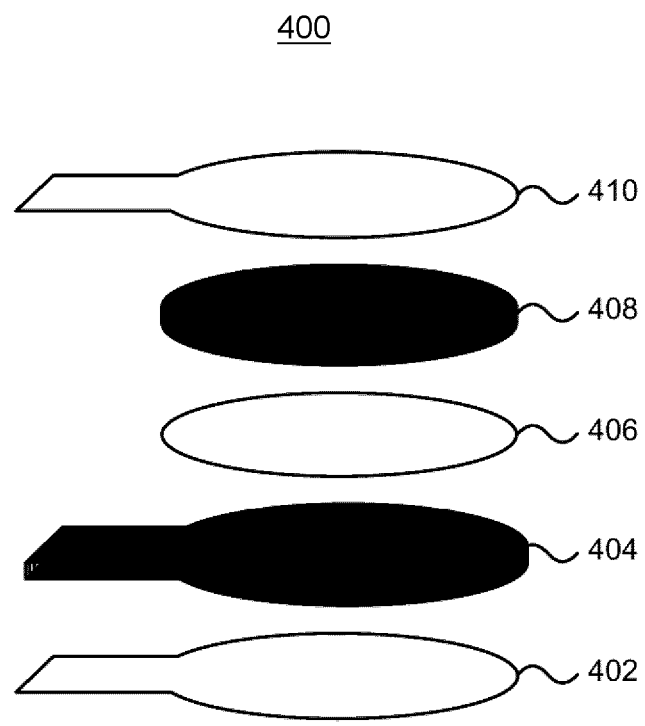
FIG. 4 depicts different layers of a thin film sensor.

FIG. 4 depicts different layers of a thin film sensor. The sensor 100 described above could have the same or similar layer structure of the sensor 400 depicted in FIG. 4. As depicted, the sensor 400 may be formed on a substrate 402 that provides electrical insulation and physical strength to the sensor. An electrical connection layer 404 may be formed on the substrate 402 and a second insulating layer 406 formed on top of the electrical connection layer 404. The second insulating layer 406 may have through holes or vias in the insulator at the connection points in order to allow an electrical connection to be made between the electrical connection layer 404 and a heating patch layer 408. The heating patch layer 408 is formed on top of the second insulating layer 406. A third insulating layer 410 may formed on top of the heating patch layer 408 to encapsulate the sensor. Although a specific order of layers has been described, the order of layers may be changed, for example a heating patch layer may deposited directly on a substrate insulating layer, followed by a second insulting layer with an electrical connection layer deposited on top and then a third insulating encapsulation layer. Although the above has described the sensor as being physically separate from the material being measured, it is possible for the sensor to be formed directly on the material being measured. The sensor substrate may be provided by the material being measured.

The sensor described above provides a single sensor that can be controlled to provide different sized heating structures. Further, since the heating element is made from a material that varies its resistance based on its temperature, it is possible to use the heating element to both heat a sample as well as to measure the average temperature of the sample, or at least the average temperature of the sample where it is in contact with the sensor. The heating element of the sensor described above are closely spaced to each other so that the heating element acts as a single solid circular heating patch. The sensor can be used to determine different thermal characteristics of different samples, including bulk anisotropic, or more particularly orthotropic, materials, slab anisotropic, or more particularly orthotropic, materials as well as thin film materials. Further, the sensor can be used to make double sided measurements where the sensor is sandwiched between samples of the sample material, double sided measurements where the sensor is sandwiched between samples of different materials as well as single sided measurements where the sensor is affixed to a side of a single piece of sample material.

Figure 5:
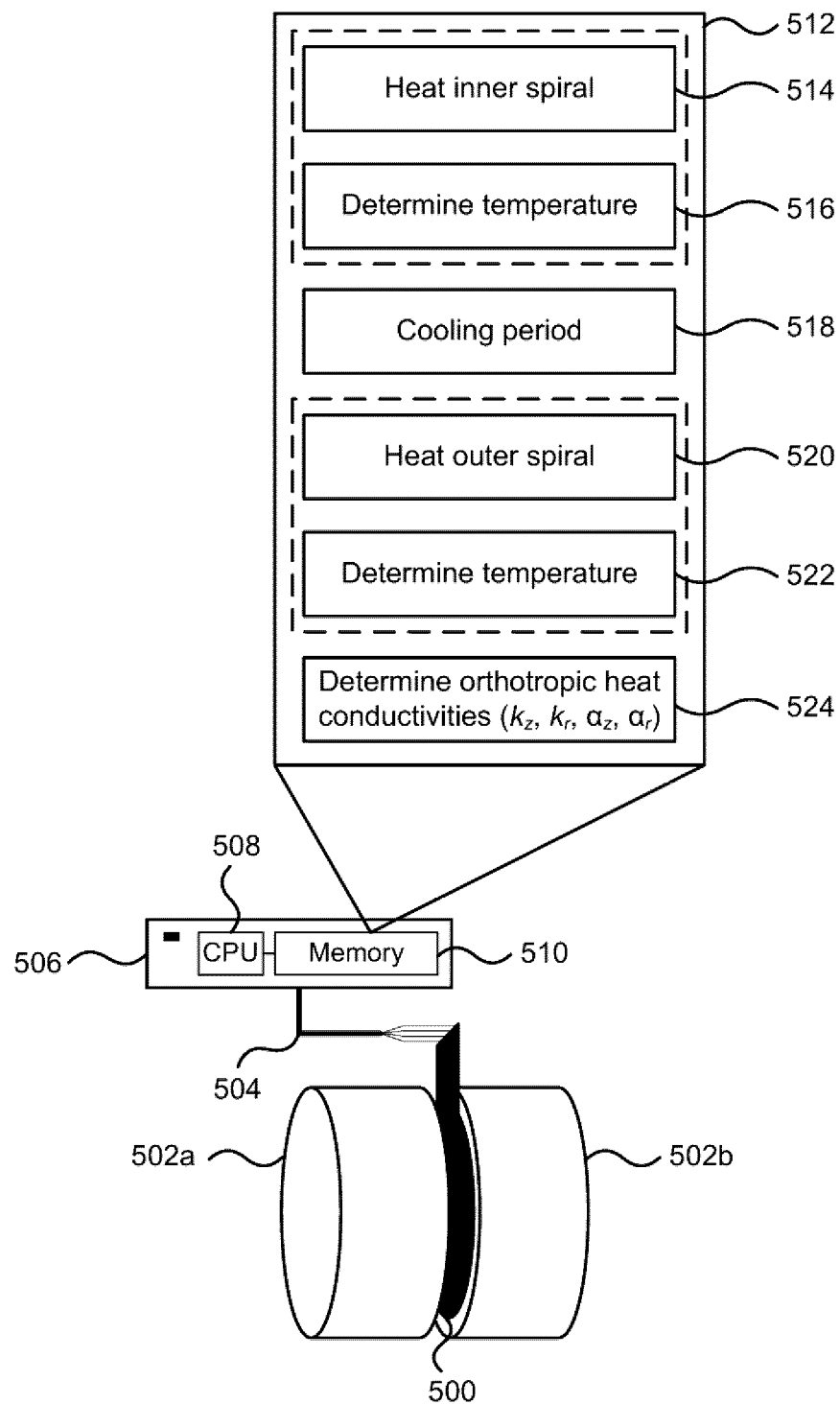
FIG. 5 depicts a measurement system using the thin film sensor to make double-sided measurements.

FIG. 5 depicts a measurement system using a thin film sensor. The system is depicted as using a CHS sensor 500, which acts as if the heat is coming from a heat source that is a solid circular patch. The CHS sensor 500 is able to heat provide different sized heating patches. The CHS sensor 500 could be provided by the sensor 100 described above. The system depicted in FIG. 5 allows thermal conductivity properties of a material sample 502 to be determined. The sample 502 may be an anisotropic material, or more particularly an orthotropic material. In measuring the sample 502 the CHS sensor 500, such as sensor 100 described above, may be affixed between two samples 502a, 502b (referred to collectively as sample 502). The CHS sensor 500 and sample 502 may be sized so that they have a substantially same sized perimeter, with each of the samples 502a, 502b being substantially the same dimensions. The connection leads of the CHS sensor 500 may be connected by wires 504 to a controller 506 that controls operation of the sensor 500. The controller 506 comprises a processor 508 and a memory 510 that stores instructions that can be executed by the processor 508. When executed, the instructions configure the controller to provide measurement functionality 512. The measurement functionality 512 begins with heating the inner spiral (514) of the heating patch of the sensor to provide a small circular heating patch that has a smaller diameter than the sample 502. The controller may be controlling a heating current provided to the CHS sensor 500, for example through an inner connection point located radially inward from the perimeter of the sensor and a center connection point located at the center of the sensor, in order to heat an area smaller than the total sensor size and the sample 502 in 3 dimensions. The heating of the inner spiral is done for a short period of time so that the heat does not reach top or side surfaces of the sample 502. During this heating time, the sensor inner area used for heating is continuously monitored by the controller, by means of measuring the voltage, or equivalently the resistance of the inner spiral using the same electrical connections used for heating the sensor. The resistance is used to determine a temperature measurement (516) using the heating element's temperature coefficient of resistivity (TCR), since the resistance of the heating patch depends upon its temperature. Alternatively, the heated area temperature may be measured by another means, such as a thermocouple. Once inner spiral heating and temperature sensing is completed, the sample 502 is allowed to cool for a cooling period of time (518). Once cooled, the controller heats the entire spiral of the circular heating element (520), or the spiral of the circular heating element having a diameter that matches the sample, to heat the sample until the heat reaches the top surface of the sample. Since the outer perimeter of the heating spiral is substantially the same diameter of the sample, the heating occurs in 1 dimension. During this second heating period, the temperature of the entire sensor area is again determined continuously (522) based on a resistance of the heating element. Once the two temperature measurements are completed, the orthotropic heat conductivities and diffusivities ($k_z$, $k_r$, $\alpha_r$, $\alpha_z$) are determined (524).

When the inner section of the spiral is used as a heater, normally the same area is used for the voltage/resistance measurement, which in practice will provide average temperature of that section of the sensor. Similarly, when the full area of the sensor is used as a heater, the measured voltage/resistance will provide the average temperature of the entire area. During the heating, the temperature at any point on the sensor surface may be different, with the highest temperature towards the center of the sensor and decreasing temperatures towards the perimeter of the sensor.

Figure 6:
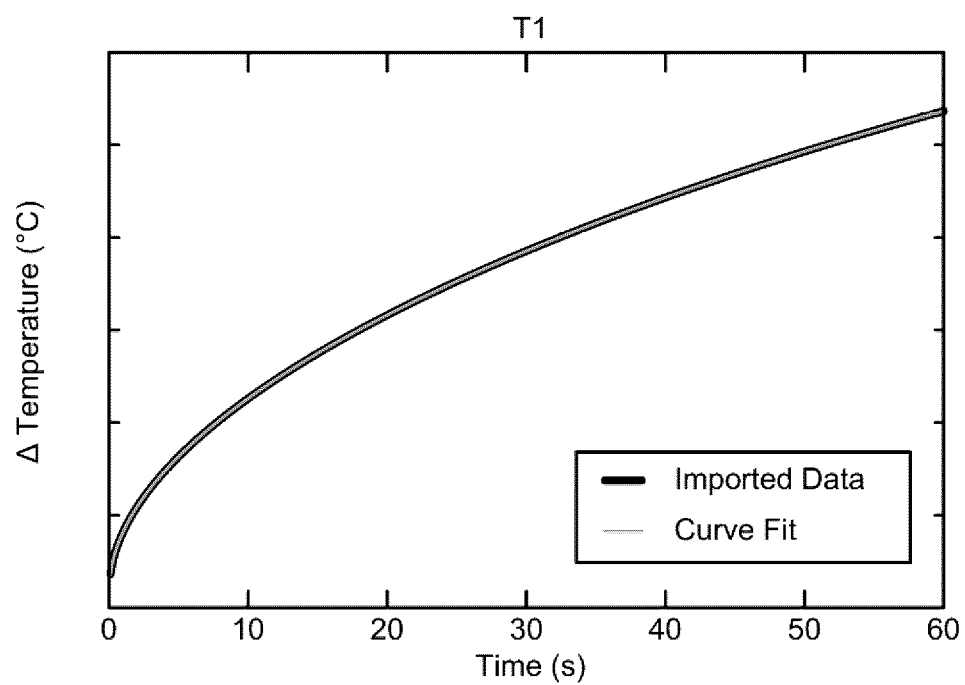
FIG. 6 depicts a temperature-time curve of the temperature measured by the sensor.

FIG. 6 depicts a temperature-time curve of a sensor temperature at different times as the sensor 100 is heating the sample 502. The curve shows $T_1$ output from a Comsol simulation of the sensor overlaid on curve generated from an analytical solution. As can be seen from FIG. 6 the simulation results closely match the analytical solution.

The orthotropic heat conductivities may be determined using different temperature measurements made using a single, variable sized circular sensor as described above. Similar measurements may be made using two different sized sensors with a single sample, or may use a single sized sensor with different sized samples.

Figure 7:
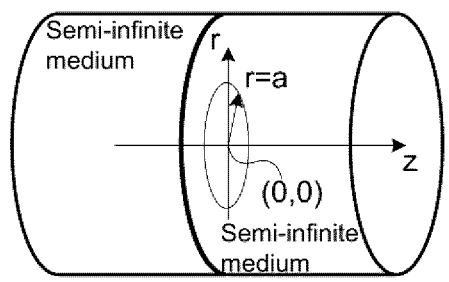
FIG. 7 depicts measurements of a bulk material sample.
Figure 7:
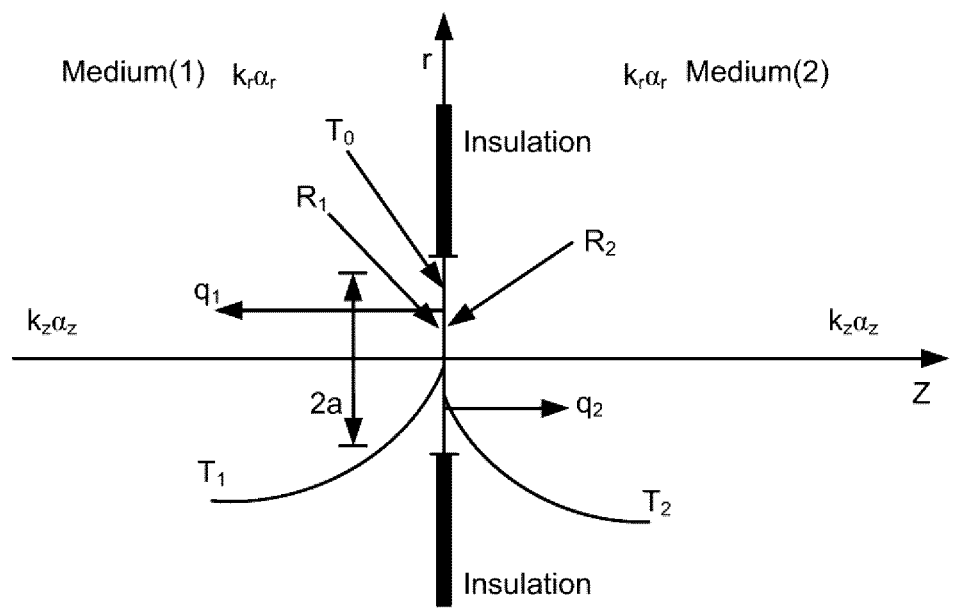

FIG. 7 depicts measurement setup of a material sample. As depicted in FIG. 7, the circular heat source (CHS) sensor has a diameter of 2a, and is pressed between two identical anisotropic (orthotropic) samples, adequately large such that the heat wave does not reach the material boundaries during the measurement. $T_0$ represents the temperature on the CHS surface, $T_1$ in sample 1 and $T_2$ in sample 2. However, if there is no contact resistance so that $R_1=0$ between the CHS and medium 1, then $T_0=T_1$, and so $T_1$ represents the sensor temperature for $z=0$. There is a thermal contact resistance $R_2$ (m²K/W) between the CHS and medium 2. If the samples are orthotropic they will have different thermal properties in different directions, namely $k_r$ and $\alpha_r$ in the radial direction (in-plane), and $k_z$, $\alpha_z$ in the perpendicular direction (axial or off-plane). The CHS is supplied with a total flux q (W/m²). The flux q splits into two parts, $q_1$ towards medium 1 and $q_2$ towards medium 2. The fluxes $q_1$ and $q_2$ and the temperature fields $T_1$ and $T_2$ differ and are all time-dependent because of the asymmetry, i.e. the resistance $R_2$.

The measurement of anisotropic, or more particularly, orthotropic materials, is described further below. The basic equation for a measurement of orthotropic material (anisotropic in off-plane of the sensor) has been derived and is set forth in equation (1). r represents the in-plane distance from the CHS center, z is the off-plane axis, or radial and axial directions, respectively. The CHS radius is 'a'.

$$T(r, z = 0, t) = \frac{aq}{2\sqrt{k_r k_z}} \int_0^\infty \{\text{erf}[\lambda\sqrt{\alpha_r t}]\} J_1(\lambda a) J_0(\lambda r) \frac{d\lambda}{\lambda}; \quad (1)$$

$$z = 0; R_1 = R_2 = 0$$

In equation (1) above, the temperature is determined for different locations along the sensor. Rather than determining the temperature at different positions on the sensor, it is possible to determine the average temperature for the sensor. The calculation of the average temperature is provided by equation (2).

$$T_{Av}(z = 0, t) = \frac{q}{\sqrt{k_r k_z}} \int_0^\infty \{\text{erf}[\lambda\sqrt{\alpha_r t}]\} \left[\frac{J_1(\lambda a)}{\lambda}\right]^2 d\lambda; \quad (2)$$

$$z = 0; R_1 = R_2 = 0$$

The material properties that can be derived in this case are $\alpha_r$ and the product $k_z k_r$. It is not possible to separate between the two conductivities without knowing the volumetric heat capacity ρC.

The case of two identical anisotropic samples with different contact resistances on both sides was also derived. The solution consists in three temperature fields, one on the sensor surface, $T_0$, and one for each sample, $T_1$ and $T_2$, as shown in equations (3), (4) and (5) below.

$$T_0(r, z = 0, t) = \quad (3)$$

$$\frac{aq}{E_z} \int_0^\infty \left\{ \frac{1}{[4 - E_z^2(R_1 + R_2)^2 \alpha_r \lambda^2]} \left[ \frac{2\text{erf}[+\lambda\sqrt{\alpha_r t}]}{\sqrt{\alpha_r}} - \lambda E_z(R_1 + R_2) + \right.\right.$$

$$\left.\left. \lambda E_z(R_1 + R_2) e^{\left[\frac{4t}{E_z^2(R_1+R_2)^2} - \alpha_r \lambda^2 t\right]} \cdot \text{erfc}\left[\frac{2\sqrt{t}}{E_z(R_1 + R_2)}\right] \right] \right\}$$

$$J_1(\lambda a) J_0(\lambda r) \frac{d\lambda}{\lambda} + aq(R_1 + R_2) \int_0^\infty \left\{ \frac{1}{[4 - E_z^2(R_1 + R_2)^2 \alpha_r \lambda^2]} \right.$$

$$\left[2 - E_z(R_1 + R_2)\lambda\sqrt{\alpha_r} \,\text{erf}[+\lambda\sqrt{\alpha_r t}] - \right.$$

$$\left. 2e^{\left[\frac{4t}{E_z^2(R_1+R_2)^2} - \alpha_r \lambda^2 t\right]} \cdot \text{erfc}\left[\frac{2\sqrt{t}}{E_z(R_1 + R_2)}\right] \right] \right\} J_1(\lambda a)$$

$$J_0(\lambda r) d\lambda + \frac{aqR_1 R_2}{(R_1 + R_2)} \int_0^\infty \left\{ \frac{1}{[4 - E_z^2(R_1 + R_2)^2 \alpha_r \lambda^2]} \right.$$

$$\left[2E_z(R_1 + R_2)\lambda\sqrt{\alpha_r} \cdot \text{erf}[+\lambda\sqrt{\alpha_r t}] - \right.$$

$$\left. E_z^2(R_1 + R_2)^2 \alpha_r \lambda^2 + 4e^{\left[\frac{4t}{E_z^2(R_1+R_2)^2} - \alpha_r \lambda^2 t\right]} \cdot \text{erfc} \right.$$

$$\left.\left. \left[\frac{2\sqrt{t}}{E_z(R_1 + R_2)}\right] \right] \right\} J_1(\lambda a) J_0(\lambda r) d\lambda; z = 0$$

$$T_1(r, z, t) = \quad (4)$$

$$\frac{aq}{2E_z} \int_0^\infty \left\{ \frac{e^{-\lambda\sqrt{\alpha_r}|z_1|}}{\sqrt{\alpha_r} \cdot [2 + E_z(R_1 + R_2)\lambda\sqrt{\alpha_r}]} \text{erfc}\left[\frac{|z_1|}{2\sqrt{t}} - \lambda\sqrt{\alpha_r t}\right] - \right.$$

$$\frac{e^{+\lambda\sqrt{\alpha_r}|z_1|}}{\sqrt{\alpha_r} \cdot [2 - E_z(R_1 + R_2)\lambda\sqrt{\alpha_r}]} \text{erfc}\left[\frac{|z_1|}{2\sqrt{t}} + \lambda\sqrt{\alpha_r t}\right] +$$

$$\frac{2\lambda E_z(R_1 + R_2) e^{\left[\frac{2}{E_z(R_1+R_2)}|z_1| + \frac{4t}{E_z^2(R_1+R_2)^2} - \alpha_r \lambda^2 t\right]}}{[4 - E_z^2(R_1 + R_2)^2 \alpha_r \lambda^2]}$$

$$\left. \text{erfc}\left[\frac{|z_1|}{2\sqrt{t}} + \frac{2\sqrt{t}}{E_z(R_1 + R_2)}\right] \right\} J_1(\lambda a) J_0(\lambda r) \frac{d\lambda}{\lambda} +$$

$$\frac{aqR_2}{2} \int_0^\infty \left\{ \frac{e^{-\lambda\sqrt{\alpha_r}|z_1|}}{[2 + E_z(R_1 + R_2)\lambda\sqrt{\alpha_r}]} \text{erfc}\left[\frac{|z_1|}{2\sqrt{t}} - \lambda\sqrt{\alpha_r t}\right] + \right.$$

$$\frac{e^{+\lambda\sqrt{\alpha_r}|z_1|}}{[2 - E_z(R_1 + R_2)\lambda\sqrt{\alpha_r}]} \text{erfc}\left[\frac{|z_1|}{2\sqrt{t}} + \lambda\sqrt{\alpha_r t}\right] -$$

$$\frac{4 \cdot e^{\left[\frac{2}{E_z(R_1+R_2)}|z_1| + \frac{4t}{E_z^2(R_1+R_2)^2} - \alpha_r \lambda^2 t\right]}}{[4 - E_z^2(R_1 + R_2)^2 \alpha_r \lambda^2]}$$

$$\left. \text{erfc}\left[\frac{|z_1|}{2\sqrt{t}} + \frac{2\sqrt{t}}{E_z(R_1 + R_2)}\right] \right\} J_1(\lambda a) J_0(\lambda r) d\lambda; z < 0$$

-continued $$T_2(r, z, t) = \frac{aq}{2E_z} \int_0^\infty \left\{ \frac{e^{-\lambda\sqrt{\alpha_r}\, z_1}}{\sqrt{\alpha_r} \cdot [2 + E_z(R_1+R_2)\lambda\sqrt{\alpha_r}]} \mathrm{erfc}\left[\frac{z_1}{2\sqrt{t}} - \lambda\sqrt{\alpha_r t}\right] - \right. \tag{5}$$

$$\frac{e^{+\lambda\sqrt{\alpha_r}\, z_1}}{\sqrt{\alpha_r} \cdot [2 - E_z(R_1+R_2)\lambda\sqrt{\alpha_r}]} \mathrm{erfc}\left[\frac{z_1}{2\sqrt{t}} + \lambda\sqrt{\alpha_r t}\right] +$$

$$\frac{2\lambda E_z(R_1+R_2) e^{\left[\frac{2}{E_z(R_1+R_2)} z_1 + \frac{4t}{E_z^2(R_1+R_2)^2} - \alpha_r\lambda^2 t\right]}}{[4 - E_z^2(R_1+R_2)^2 \alpha_r \lambda^2]}$$

$$\left. \mathrm{erfc}\left[\frac{z_1}{2\sqrt{t}} + \frac{2\sqrt{t}}{E_z(R_1+R_2)}\right] \right\} J_1(\lambda a) J_0(\lambda r) \frac{d\lambda}{\lambda} +$$

$$\frac{aqR_1}{2}\int_0^\infty \left\{ \frac{e^{-\lambda\sqrt{\alpha_r}\, z_1}}{[2 + E_z(R_1+R_2)\lambda\sqrt{\alpha_r}]} \mathrm{erfc}\left[\frac{z_1}{2\sqrt{t}} - \lambda\sqrt{\alpha_r t}\right] + \right.$$

$$\frac{e^{+\lambda\sqrt{\alpha_r}\, z_1}}{[2 - E_z(R_1+R_2)\lambda\sqrt{\alpha_r}]} \mathrm{erfc}\left[\frac{z_1}{2\sqrt{t}} + \lambda\sqrt{\alpha_r t}\right] -$$

$$\frac{4 \cdot e^{\left[\frac{2}{E_z(R_1+R_2)} z_1 + \frac{4t}{E_z^2(R_1+R_2)^2} - \alpha_r\lambda^2 t\right]}}{[4 - E_z^2(R_1+R_2)^2 \alpha_r \lambda^2]}$$

$$\left. \mathrm{erfc}\left[\frac{|z_1|}{2\sqrt{t}} + \frac{2\sqrt{t}}{E_z(R_1+R_2)}\right] \right\} J_1(\lambda a) J_0(\lambda r) d\lambda;\ z > 0$$

Where $E_z = \rho C \sqrt{\alpha_z}$

This case better represents the actual measurement, since there is always some resistance layer in the setup, such as the substrate of the sensor or an air gap between the sensor and sample, which may occur due to imperfections in the surface of the material and/or sensor. This solution also cannot separate between the in-plane and off-plane diffusivities or conductivities, so no additional information can be obtained without knowing the volumetric heat capacity.

Equation (3) provides the temperature at different positions along the CHS spiral. The average temperature of the spiral may be provided by equation (6). This equation describes the average over the entire spiral (from r=0 to r=a), however the average on part of the spiral area can be calculated in a similar manner, for instance for half of the CHS radius (from r=0 to r=0.5a). Regressions performed on this equation proved that if $R_1$ and $R_2$ are known, $E_z$ and $\alpha_r$ can be extracted, same as can be done with equation (2).

$$T_{0Av}(t) = \tag{6}$$

$$\frac{2q}{E_z} \int_0^\infty \left\{ \frac{1}{[4 - E_z^2(R_1+R_2)^2 \alpha_r \lambda^2]} \left[ \frac{2\mathrm{erf}\left[+\lambda\sqrt{\alpha_r t}\right]}{\sqrt{\alpha_r}} - \lambda E_z(R_1+R_2) + \right.\right.$$

$$\lambda E_z(R_1+R_2) e^{\left[\frac{4t}{E_z^2(R_1+R_2)^2} - \alpha_r\lambda^2 t\right]} \cdot \mathrm{erfc}\left[\frac{2\sqrt{t}}{E_z(R_1+R_2)}\right] \right]$$

$$\left[ J_1(\lambda a)^2 \frac{d\lambda}{\lambda^2} + 2q(R_1+R_2)\int_0^\infty \left\{ \frac{1}{[4 - E_z^2(R_1+R_2)^2 \alpha_r \lambda^2]} \right.\right.$$

$$\left[ 2 - E_z(R_1+R_2)\lambda\sqrt{\alpha_r}\, \mathrm{erf}\left[+\lambda\sqrt{\alpha_r t}\right] - \right.$$

$$2e^{\left[\frac{4t}{E_z^2(R_1+R_2)^2} - \alpha_r\lambda^2 t\right]} \cdot \mathrm{erfc}\left[\frac{2\sqrt{t}}{E_z(R_1+R_2)}\right] \right]$$

$$\left[ J_1(\lambda a)^2 \frac{d\lambda}{\lambda^2} + \frac{2qR_1R_2}{(R_1+R_2)} \right]$$

$$\int_0^\infty \left\{ \frac{1}{[4 - E_z^2(R_1+R_2)^2 \alpha_r\lambda^2]} \left[ 2E_z(R_1+R_2)\lambda \right.\right.$$

$$\sqrt{\alpha_r} \cdot \mathrm{erf}\left[+\lambda\sqrt{\alpha_r t}\right] - E_z^2(R_1+R_2)^2$$

$$\alpha_r\lambda^2 + 4e^{\left[\frac{4t}{E_z^2(R_1+R_2)^2} - \alpha_r\lambda^2 t\right]} \cdot \mathrm{erfc}$$

$$\left.\left. \left[\frac{2\sqrt{t}}{E_z(R_1+R_2)}\right]\right]\right\} [J_1(\lambda a)]^2 \frac{d\lambda}{\lambda};\ z = 0$$

Note that it has been shown that equation (6) is reduced to equation (2) if $R_1$ and $R_2$ are both set to 0.

The separation of $k_r$ and $k_z$, as well as the calculation of $\rho C$ may be done with 2 different sensor measurements.

The product of $k_r k_z$ can also be converted to effusivity $E_z$ in the axial z direction, as follows.

$$\sqrt{k_z k_r} = \sqrt{A}$$

Resulting in:

$$E_z^2 = \rho C k_z \tag{7}$$

$$k_z k_r = A = k_z \rho C \alpha_r$$

$$k_z = A/(\rho C \alpha_r)$$

$$E_z^2 = \frac{\rho CA}{\rho C \alpha_r} = \frac{A}{\alpha_r} = \frac{k_z k_r}{\alpha_r}$$

$$E_z = \sqrt{\frac{k_z k_r}{\alpha_r}}$$

A set of two double-sided measurements on two identical samples 502a and 502b with 2 different sensors, or more particularly 2 different circular heating patches, is considered. Or alternatively, two measurements of two pairs of similar samples but each pair of samples with different dimensions, and with a single sensor. These two measurements allow the derivation of $\rho C$ of the orthotropic material, and enable the separation of $k_r$ and $k_z$.

The following is a description of the first option, i.e. using two sensor sizes, which as described above can be achieved using a single CHS sensor such as sensor 100, and one pair of identical orthotropic samples.

The first measurement is a usual 3 dimensional measurement, where the sensor is smaller than the sample, and the heat can flow freely in the radial and axial directions without hitting the sides or the top of the sample. When using a sensor having multiple connection points to the heating element in order to allow different sized heating patches, the 3 dimensional measurement may be performed using an inner heating patch that is not the full size of the sensor. This measurement provides the radial diffusivity $\alpha_r$ and the product $k_z k_r$ or $E_z$ as explained above, equations (2) or (6) and (7). The second measurement is a 1 dimensional measurement, where the sensor diameter is the same as the sample diameter, and the heat propagates in the axial direction only and must reach the top surface of the sample. When using the sensor having multiple connection points to the heating element in order to allow different sized heating patches, the 1 dimensional measurement may be performed using an outer heating patch that is larger than the inner patch, and may be for example the full size of the sensor. This can be achieved by a longer measurement time than the first measurement. The samples' side and top surfaces must be isolated to prevent heat loss.

The solution for the 1 dimensional setup is:

$$T(t) = \frac{2q\sqrt{t}}{E_z} \sum_{n=0}^{\infty} \left[ \operatorname{ierfc}\frac{2nh}{2\sqrt{\alpha_z t}} + \operatorname{ierfc}\frac{2(n+1)h}{2\sqrt{\alpha_z t}} \right]; z = 0 \quad (8)$$

Where h is the height of the sample. Since $E_z$ is known from the first measurement, $\alpha_z$ can be regressed from the temperature versus time data using equation (8). Now $\rho C$ and all other properties in the radial and axial directions can be calculated.

Simulation Results

Initial results were obtained by Comsol simulations of PMMA (polymethylmethacrylate) and carbon fiber. The simulations setup followed the two measurements described above for each of the two sample materials.

In the 3D measurement, care was taken to ensure that the heat penetration depth was smaller than the sample size to preserve the full 3D effect. The regression was done on data from 0-10s.

In the second measurement, 1D, the regression was done on data from 0-60s, ensuring the heat wave did reach the top surface of the sample. Additionally, for the carbon fiber case, regression was done on data just from 10-60s and 30-60s to check the sensitivity of the method to different time windows. Fortunately, the regressed results in all cases were identical, meaning there is no sensitivity to time selection, as long as the heat reaches the far surfaces of the samples in the selected time window.

| Property | PMMA Simulation Input | Regressed value | Difference | Notes |
|---|---|---|---|---|
| $\rho C_p \left[\frac{J}{m^3 K}\right]$ | 1.534E6 | 1.538E6 | +0.29% | Same result using radial or axial data |
| $k_z \left[\frac{W}{mK}\right]$ | 0.280 | 0.2824 | +0.86% | |
| $k_r \left[\frac{W}{mK}\right]$ | 0.175 | 0.1742 | −0.47% | |
| $\alpha_z \left[\frac{m^2}{s}\right]$ | 1.83E-7 | 1.846E-7 | −0.87% | |
| $\alpha_r \left[\frac{m^2}{s}\right]$ | 1.14E-7 | 1.138E-7 | −0.18% | |
| $E_z \left[\frac{Ws^{\frac{1}{2}}}{m^2 K}\right]$ | 655.4 | 660.14 | +0.72% | |

| Property | Carbon Simulation Input | Fibre Regressed value | Difference | Notes |
|---|---|---|---|---|
| $\rho C_p \left[\frac{J}{m^3 K}\right]$ | 1.42E6 | 1.39E6 | −1.8% | Same result using radial or axial data |
| $k_z \left[\frac{W}{mK}\right]$ | 134.15 | 136.9265 | +2.1% | |
| $k_r \left[\frac{W}{mK}\right]$ | 4.07 | 3.9427 | −3.1% | |
| $\alpha_z \left[\frac{m^2}{s}\right]$ | 9.45E-5 | 9.819E-5 | +3.9% | |
| $\alpha_r \left[\frac{m^2}{s}\right]$ | 2.866E-6 | 2.827E-6 | −1.4% | |
| $E_z \left[\frac{Ws^{\frac{1}{2}}}{m^2 K}\right]$ | 13,802 | 13,818 | +0.1% | |

The results obtained by regression of the Comsol-generated data are tabulated in the tables above. There is a good agreement between the input values in the finite element simulation, and regressed values according to the analytical solutions (6) and (8), including the value of the volumetric heat capacity.

The above has described the measurement of bulk anisotropic materials, or more particularly orthotropic materials. Two measurements are required to separate between the thermal conductivity in the radial direction (in-plane) and axial direction (cross-plane or through-plane). Alternatively, one measurement is required if the volumetric heat capacity, which is the product of density x specific heat capacity, of the measured material is known.

Bulk measurement, sometimes also called semi-infinite or double-sided method, refers to measurement of materials large enough such that the heat pulse generated by a sensor sized for making 3 dimensional measurements, that is a sensor having a heating patch smaller than the sample, does not reach its boundaries during the measurement. The CHS sensor may also be used in a slab method. In the slab measurement method, the heat pulse reaches the external material opposite surface parallel to the sensor's surface during the measurement. The opposite surface may be insulated, or the measurement can be done in a vacuum environment to prevent heat losses. The slab method is used with materials that are normally available as thin sheets such as between about 1 mm to about 10 mm. These materials may include thermal interface materials (TIMs). While the materials measured in the slab method are thin, they are typically not thin enough to be considered thin films. Another example is highly thermal conductive metals and alloys, where the heat pulse penetrates very far inside the material during the measurement, and it is not practical to use very large samples of the material because of cost or availability. Thin plates of these materials are used with the slab method.

Figure 8:
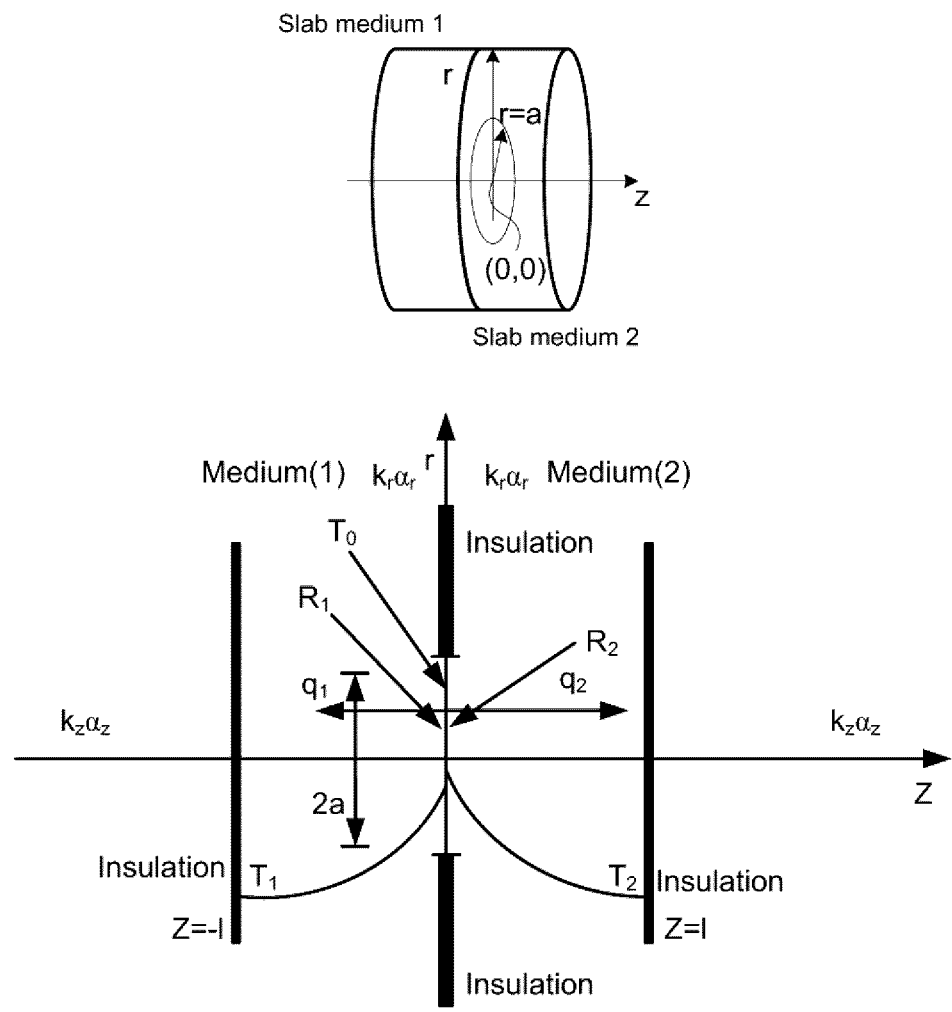
FIG. 8 depicts measurements of a slab material sample.

FIG. 8 depicts measurement setup of a material sample in a slab measurement. The measurement setup is similar to the bulk measurement setup depicted in FIG. 7 however the sample thickness is adequately thin such that the heat wave reaches the surfaces opposite the sensor during the measurement, and these surfaces are covered by an insulator, which may be a perfect or ideal insulator. The slab material being measured may be an isotropic material or an orthotropic material.

The following provides a solution for an isotropic slab method that includes thermal contact resistances. $T_0$ is the temperature on the sensor surface, and is used in the measurement.

$$T_0(r, t) = \frac{aq}{k}\int_0^\infty \frac{[\cosh(\lambda l) + k\lambda R_1\sinh(\lambda l)]}{[2\cosh(\lambda l) + k\lambda(R_1 + R_2)\sinh(\lambda l)]} \quad (9)$$

$$\frac{[\cosh(\lambda l) + k\lambda R_2\sinh(\lambda l)]}{\sinh(\lambda l)}J_1(\lambda a)J_0(\lambda r)\frac{d\lambda}{\lambda} -$$

$$\frac{aq}{k}\int_0^\infty \left\{\frac{e^{-\lambda^2 at}}{2\lambda^2 l} + l\sum_{n=1}^\infty \frac{e^{-\left(\lambda^2+\frac{n^2\pi^2}{l^2}\right)at}}{(\lambda^2 l^2 + n^2\pi^2)}\right\}J_1(\lambda a)J_0(\lambda r)d\lambda -$$

$$\frac{aq}{k}\int_0^\infty \sum_{m=0}^\infty \frac{e^{-\left(\lambda^2+\frac{\beta_m^2}{l^2}\right)at}[l\cos(\beta_m) - kR_1\beta_m\sin(\beta_m)]}{(\lambda^2 l^2 + \beta_m^2)\sin(\beta_m)}$$

$$\left[l\sin(\beta_m) - \frac{k(R_1+R_2)}{2}[\sin(\beta_m) + \beta_m\cos(\beta_m)]\right]$$

$$J_1(\lambda a)J_0(\lambda r)d\lambda$$

$$m = 0, 1, 2 \ldots n = 1, 2 \ldots ; z = 0$$

The $\beta_m$ are the roots of the transcendental equation:

$$\beta_m\tan(\beta_m) = \frac{2\sqrt{\alpha}\, l_1}{k(R_1+R_2)} = \frac{2l}{k(R_1+R_2)}; m = 0, 1, 2 \ldots$$

The average temperature on the CHS is given by:

$$T_{0Av}(t) = \frac{2q}{k}\int_0^\infty \frac{[\cosh(\lambda l) + k\lambda R_1\sinh(\lambda l)]}{[2\cosh(\lambda l) + k\lambda(R_1 + R_2)\sinh(\lambda l)]} \quad (10)$$

$$\frac{[\cosh(\lambda l) + k\lambda R_2\sinh(\lambda l)]}{\sinh(\lambda l)}J_1^2(\lambda a)\frac{d\lambda}{\lambda^2} -$$

$$\frac{2q}{k}\int_0^\infty \left\{\frac{e^{-\lambda^2 at}}{2\lambda^2 l} + l\sum_{n=1}^\infty \frac{e^{-\left(\lambda^2+\frac{n^2\pi^2}{l^2}\right)at}}{(\lambda^2 l^2 + n^2\pi^2)}\right\}J_1^2(\lambda a)\frac{d\lambda}{\lambda} -$$

$$\frac{2q}{k}\int_0^\infty \sum_{m=0}^\infty \frac{e^{-\left(\lambda^2+\frac{\beta_m^2}{l^2}\right)at}[l\cos(\beta_m) - kR_1\beta_m\sin(\beta_m)]}{(\lambda^2 l^2 + \beta_m^2)\sin(\beta_m)}$$

$$\left[l\sin(\beta_m) - \frac{k(R_1+R_2)}{2}[\sin(\beta_m) + \beta_m\cos(\beta_m)]\right]$$

$$J_1^2(\lambda a)\frac{d\lambda}{\lambda};$$

$$m = 0, 1, 2 \ldots n = 1, 2 \ldots ; z = 0$$

The steady-state temperature on the sensor surface is given by:

$$T_{0SS}(r) = \frac{aq}{k}\int_0^\infty \frac{[\cosh(\lambda l) + k\lambda R_1\sinh(\lambda l)]}{[2\cosh(\lambda l) + k\lambda(R_1+R_2)\sinh(\lambda l)]} \quad (11)$$

-continued $$\frac{[\cosh(\lambda l) + k\lambda R_2\sinh(\lambda l)]}{\sinh(\lambda l)}J_1(\lambda a)J_0(\lambda r)\frac{d\lambda}{\lambda}; z = 0$$

For orthotropic slabs, it is possible to separate between the radial and axial thermal conductivities ($k_r$ and $k_z$, respectively) in a single measurement without the need to know the volumetric heat capacity. The solution is provided in two forms which are equivalent, equations (12) and (13).

$$T_{Av}(t) = \quad (12)$$

$$-\frac{q\alpha_z}{k_z}\int_0^\infty \left\{\frac{e^{-\alpha_r\lambda^2 t}}{\alpha_r\lambda^2 l} + 2l\sum_{n=1}^\infty \frac{e^{-(\alpha_r\lambda^2 l^2 + \alpha_z n^2\pi^2)\frac{t}{l^2}}}{(\alpha_r\lambda^2 l^2 + \alpha_z n^2\pi^2)}\right\}[J_1(\lambda a)]^2\frac{d\lambda}{\lambda} +$$

$$\frac{q\sqrt{\alpha_z}}{k_z\sqrt{\alpha_r}}\int_0^\infty \coth\left(\sqrt{\frac{\alpha_r}{\alpha_z}}\lambda l\right)$$

$$[J_1(\lambda a)]^2\frac{d\lambda}{\lambda^2}; n = 1, 2 \ldots ; z = 0$$

The average steady-state temperature of the sensor is the second integral in (12). Using the Laurent series expansion for $$\frac{\coth\left(\sqrt{\frac{\alpha_r}{\alpha_z}}\lambda l\right)}{\sqrt{\frac{\alpha_r}{\alpha_z}}\lambda} \text{ in } \sqrt{\frac{\alpha_r}{\alpha_z}}\lambda,$$

equation (13) can be also written as:

$$T_{Av}(t) = \quad (13)$$

$$\frac{q}{k_z}\int_0^\infty \left\{(1-e^{-\alpha_r\lambda^2 t})\frac{1}{\frac{\alpha_r}{\alpha_z}\lambda^2 l} + 2l\sum_{n=1}^\infty \frac{1-e^{-(\alpha_r\lambda^2 l^2 + \alpha_z n^2\pi^2)\frac{t}{l^2}}}{\left(\frac{\alpha_r}{\alpha_z}\lambda^2 l^2 + n^2\pi^2\right)}\right\}$$

$$[J_1(\lambda a)]^2\frac{d\lambda}{\lambda}; n = 1, 2 \ldots$$

In equation (13), describing the orthotropic slab method measurement, it can be seen that the in-plane and off-plane thermal diffusivities appear only inside the integral, while $k_z$ only appears outside the integral. Therefore, the regression of the measured temperature-time data can be regressed according to equation (13) to produce separately the thermal diffusivities and $k_z$. From the relationship $$\rho C_p = \frac{k_z}{\alpha_z} = \frac{k_r}{\alpha_r}$$

the value $k_r$ can also be calculated, thus extracting the in-plane and off-plane thermal diffusivities and thermal conductivities from a single measurement.

The above described using a CHS sensor in double sided measurements using two samples of the same material. It may not always be possible, practical, or desirable to use two samples of the material, for example if the material is rare or expensive. In such cases it may be possible to measure the thermal characteristics of a single sample of the material by sandwiching the sensor between the single sample and an insulating piece of material with known thermal characteristics. Such an arrangement allows the measuring of thermal characteristics of materials having a high conductivity since the insulating material directs significantly all of the heat from the sensor into the sample material. However, such an arrangement may not provide useful results for low conductivity materials since the amount of heat transmitted into the sample material as compared to the insulating material will be unknown. The following describes the use of a CHS sensor in making single sided measurements, or measurements using different materials on each side of the sensor, including cases of measuring a material of low conductivity.

A circular heat source sensor can be used to heat two different material samples, one with known thermal diffusivity and thermal conductivity, and determine the unknown thermal diffusivity and thermal conductivity of the other material from the sensor temperature vs time measurements. The materials of the two samples do not need to be the same, allowing the thermal characteristics of a material to be determined when only a single sample is available.

Figure 9:
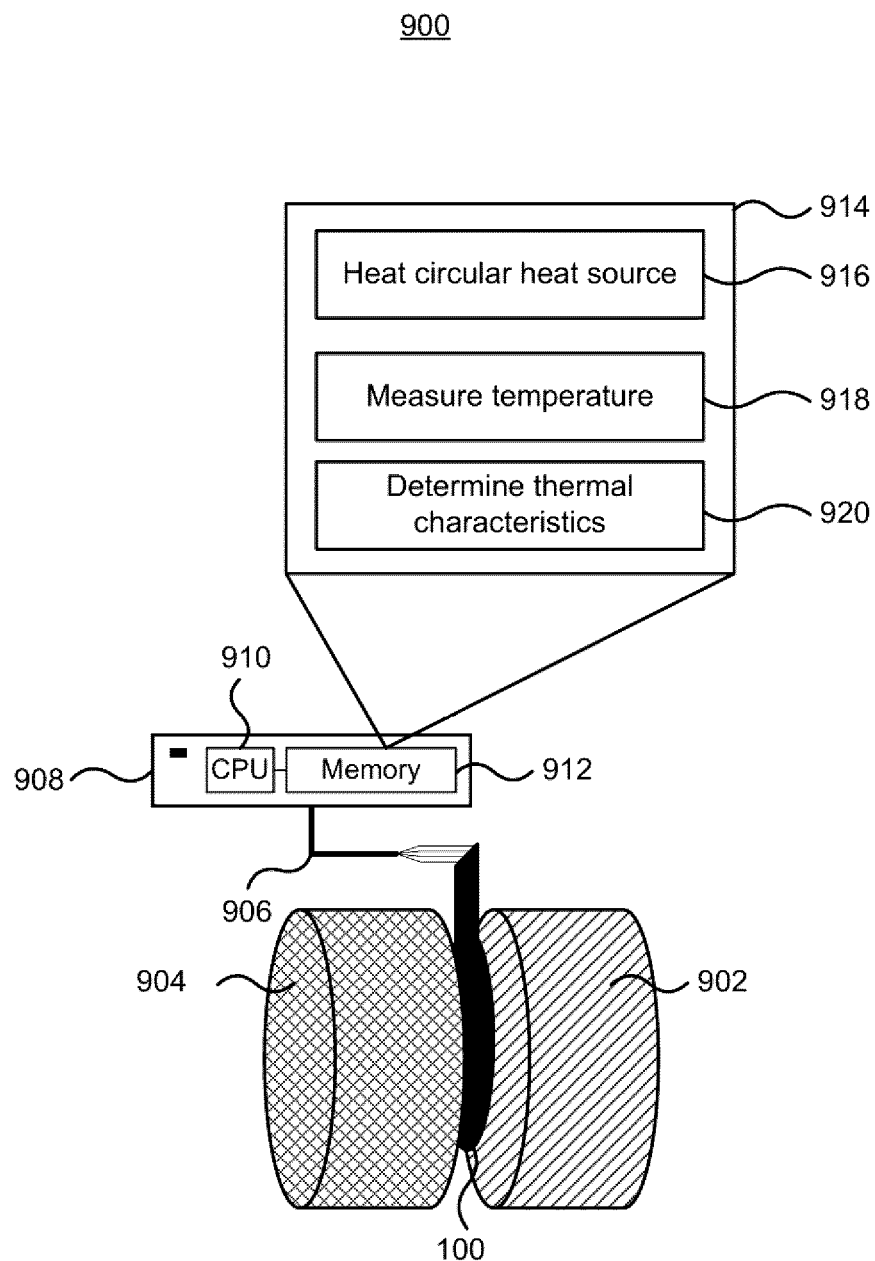
FIG. 9 depicts a measurement system using a circular heat source sensor to make single-sided measurements.

FIG. 9 depicts a measurement system using a circular heat source sensor. The system 900 allows thermal conductivity properties of a single material sample 902 to be determined. A second sample 904 having known thermal characteristics is used in determining the characteristics of the unknown material. The samples 902, 904 may be isotropic materials. In measuring the samples 902, 904 a circular heat source sensor 100 may be affixed to between two samples 902, 904. The sensor may comprise a spiral heating element formed of a material that has a resistance that depends upon the temperature. Accordingly, the sensor 100 may be used to both provide heat to the samples 902, 904 by applying current to the heating element as well as monitor the temperature by monitoring the voltage, which depends upon the resistance and so the temperature. The sensor 100 and samples 902, 904 may be sized so that the samples are larger than the sensor. The connection leads of the sensor 100 may be connected by wires 906 to a controller 908 that controls operation of the sensor 100. The controller 908 comprises a processor 910 and a memory 912 that stores instructions that can be executed by the processor 910. When executed, the instructions configure the controller to provide measurement functionality 914.

The measurement functionality 914 begins with heating the circular heat source sensor (916). The controller 908 may provide a heating current to the sensor. The heating may be done for a short period of time so that the heat does not reach the top or side surfaces of the samples 902, 904 so that the samples are heated in 3-dimensions. During this heating time, the sensor used for heating is continuously monitored by the controller 908, by means of measuring the voltage, or equivalently the resistance of the heating element of the sensor using the same electrical connections which provide the heating current, since the resistance depends upon the temperature, using the spiral TCR, temperature coefficient of resistivity. Alternatively, the heated area temperature may be measured by another means, such as a thermocouple. The unknown thermal characteristics of the measured sample may be determined using the applied heat and measured temperatures. The thermal characteristics may be determined as set forth further below.

The following provides the 3D temperature fields generated by a finite 2-dimensional circular heat source embedded inside two different semi-infinite sample bodies (semi-infinite in the sense that the heat wave does not reach the boundaries of samples during the measurement). This is analogous to a circular heat source sensor sandwiched between two larger samples of differing materials. Two different temperature fields are derived for the semi-infinite planes as well as the corresponding heat fluxes. The derivation of the solution uses first principles with no prior assumptions, and employs the Hankel and Laplace transforms. The Laplace inversion theorem is used to find the inverse Laplace transform of the temperature and flux transformed functions. The analytical solution is accurate with no approximations, however it must be evaluated numerically, since the final integrals cannot be calculated analytically.

Very little published work can be found, which deals with the case of 3D heat flow from a finite circular heated surface to two different semi-infinite planes. The reason being the objective difficulty in the solution of the heat equation. As described further below, two different transforms can be used to simplify the heat equation in cylindrical coordinates, the Hankel and Laplace transforms. However, the inverse Laplace transform of the transformed solution for this setup is not tabulated, and requires the use of the inversion theorem, and piece by piece integration of the contour in the complex plane.

Figure 10:
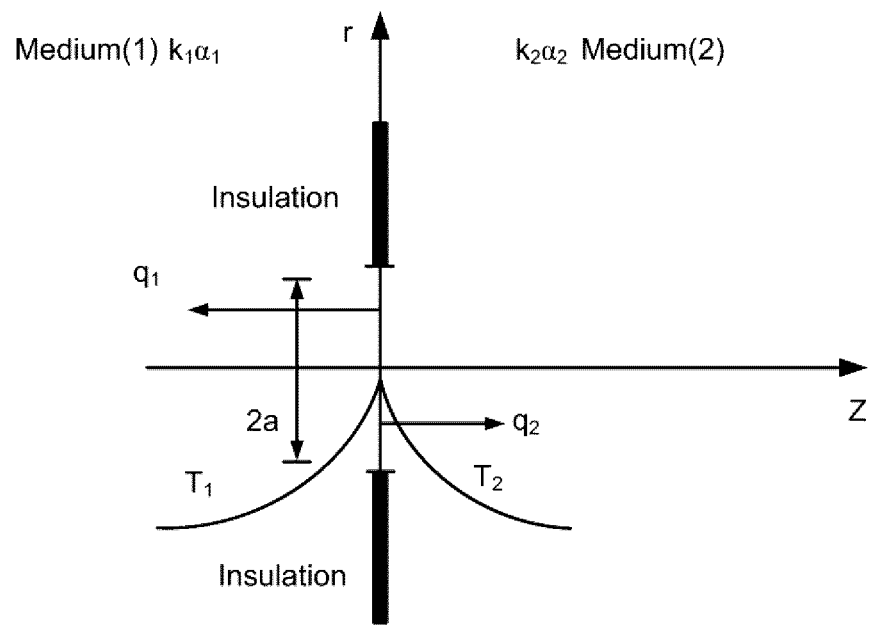
FIG. 10 depicts measurements of two different material samples with no contact resistance.

FIG. 10 describes the case of the 2D circular heat source (CHS) sensor with, a diameter 2a, in between two different isotropic media, with the interface between the CHS sensor and media free of contact resistance. The CHS sensor is supplied with flux q W/m$^2$ continuously for the duration of the measurement. Successive integral transforms, namely Laplace and Hankel are used to simplify the partial differential equations.

Let $T_1(r,z,t)$ be the temperature field in medium 1 and $T_2(r,z,t)$ in medium 2. The heat equations in the two different media and the associated initial and boundary conditions are:

$$\frac{\partial^2 T_1}{\partial r^2} + \frac{1}{r}\frac{\partial T_1}{\partial r} + \frac{\partial^2 T_1}{\partial Z^2} = \frac{1}{\alpha_1}\frac{\partial T_1}{\partial t}; z < 0 \quad (14)$$

$$\frac{\partial^2 T_2}{\partial r^2} + \frac{1}{r}\frac{\partial T_2}{\partial r} + \frac{\partial^2 T_2}{\partial Z^2} = \frac{1}{\alpha_2}\frac{\partial T_2}{\partial t}; z > 0 \quad (15)$$

$$T_1(r, z, t=0) = T_2(r, z, t=0) = 0 \quad (16)$$

Zero temperature everywhere at $t = 0$.

$$-k_1 \frac{\partial T_1}{\partial Z}\bigg|_{z=0} = \begin{cases} -q_1(r,t) & 0 \le r < a \\ 0 & r > a \end{cases}; t > 0 \quad (17)$$

Flux only in CHS area.

$$-k_2 \frac{\partial T_Z}{\partial Z}\bigg|_{z=0} = \begin{cases} q_2(r,t) & 0 \le r < a \\ 0 & r > a \end{cases}; t > 0 \quad (18)$$

Flux only in CHS area.

$$q_1(r,t) + q_2(r,t) = q \text{ The total flux is constant.} \quad (19)$$

$$T_1(r, z=0, t) = T_2(r, z=0, t) \text{ No contact resistance.} \quad (20)$$

Solution must converge at r=0, and vanish at r=+∞ and at z=+/−∞.

Note that in (17), (18) and (19) only the heat fluxes' values at z=0 are of interest.

The equations and initial and boundary conditions are transformed to Laplace domain. The Laplace transform operator, denoted $\mathcal{L}$, is on the time t (t→s). The transformed temperature functions are denoted $\varphi_i(r,z,s)$.

$$\frac{\partial^2 \varphi_1}{\partial r^2} + \frac{1}{r}\frac{\partial \varphi_1}{\partial r} + \frac{\partial^2 \varphi_1}{\partial Z^2} = \frac{s\varphi_1 - T_1(t=0)}{\alpha_1} = \frac{s}{\alpha_1}\varphi_1 \quad (21)$$

$$\varphi_1 = \varphi_1(r, z, s)$$

$$\frac{\partial^2 \varphi_2}{\partial r^2} + \frac{1}{r}\frac{\partial \varphi_2}{\partial r} + \frac{\partial^2 \varphi_2}{\partial Z^2} = \frac{s\varphi_2 - T_2(t=0)}{\alpha_2} = \frac{s}{\alpha_2}\varphi_2 \quad (22)$$

$$\varphi_2 = \varphi_2(r, z, s)$$

$$-k_1 \frac{\partial \varphi_1}{\partial Z}\bigg|_{z=0} = \begin{cases} -\mathcal{L}\{q_1(r,t)\} & 0 \le r < a \\ 0 & r > a \end{cases}; t > 0 \quad (23)$$

$$-k_2 \frac{\partial \varphi_2}{\partial Z}\bigg|_{z=0} = \begin{cases} \mathcal{L}\{q_2(r,t)\} & 0 \le r < a \\ 0 & r > a \end{cases}; t > 0 \quad (24)$$

$$\mathcal{L}\{q_1(r,t)\} + \mathcal{L}\{q_2(r,t)\} = q_1(r,s) + q_2(r,s) = q/s \quad (25)$$

$$\varphi_1(r, z=0, s) = \varphi_2(r, z=0, s) \quad (26)$$

Now the Hankel transformation of order 0, denoted $\mathcal{H}_0$, can be applied on the equations and conditions (21) to (26) to obtain equations (27) to (31). The transform is on r ($r \to \lambda$). The transformed temperature functions in the Laplace-Hankel domain are denoted as $\theta_i(\lambda, z, s)$.

$$-\lambda^2 \theta_1 + \frac{\partial^2 \theta_1}{\partial Z^2} = \frac{s}{\alpha_1}\theta_1; z < 0; \theta_1(\lambda, z, s) \quad (27)$$

$$\frac{\partial^2 \theta_1}{\partial Z^2} - \left(\frac{s}{\alpha_1} + \lambda^2\right)\theta = 0; z < 0$$

$$-\lambda^2 \theta_2 + \frac{\partial^2 \theta_2}{\partial Z^2} = \frac{s}{\alpha_2}\theta_2; z > 0; \theta_2(\lambda, z, s) \quad (28)$$

$$\frac{\partial^2 \theta_2}{\partial Z^2} - \left(\frac{s}{\alpha_2} + \lambda^2\right)\theta = 0; z > 0$$

$$-k_1 \frac{\partial \theta_1}{\partial Z}\bigg|_{z=0} = \mathcal{H}_0\{-q_1(r,s)\} \quad (29)$$

$$-k_2 \frac{\partial \theta_2}{\partial Z}\bigg|_{z=0} = \mathcal{H}_0\{q_2(r,s)\} \quad (30)$$

$$\mathcal{H}_0\{q_1(r,s)\} + \mathcal{H}_0\{q_2(r,s)\} = \mathcal{H}_0\left\{\frac{q}{s}\right\} = \frac{q}{s}\int_0^a rJ_0(\lambda r)dr = \frac{aq}{s}\frac{J_1(\lambda a)}{\lambda} \quad (31)$$

Let's denote $\mathcal{H}_0\{q_1(r,s)\} = Q_1(\lambda, s)$ and $\mathcal{H}_0\{q_2(r,s)\} = Q_2(\lambda, s)$. Solutions to (27) and (28) are of the form $$\theta_1 = A e^{\sqrt{s/\alpha_1 + \lambda^2}\, z}; z < 0 \quad (32)$$

$$\theta_2 = B e^{-\sqrt{s/\alpha_2 + \lambda^2}\, z}; z > 0 \quad (33)$$

$$\theta_1(\lambda, z=0, s) = \theta_2(\lambda, z=0, s); z=0 \quad (34)$$

The coefficients A and B must be independent of z, and are to be found from the boundary conditions. From (29) and (30):

$$\frac{\partial \theta_1}{\partial Z}\bigg|_{z=0} = \sqrt{s/\alpha_1 + \lambda^2} \cdot A \cdot e^{\sqrt{s/\alpha_1 + \lambda^2}\cdot 0} = \frac{Q_1(\lambda, s)}{k_1} \quad (35)$$

$$\frac{\partial \theta_2}{\partial Z}\bigg|_{z=0} = -\sqrt{s/\alpha_2 + \lambda^2} \cdot B \cdot e^{-\sqrt{s/\alpha_2 + \lambda^2}\cdot 0} = -\frac{Q_2(\lambda, s)}{k_2} \quad (36)$$

$$A = \frac{Q_1(\lambda, s)}{k_1} \frac{1}{\sqrt{s/\alpha_1 + \lambda^2}} = \frac{Q_1(\lambda, s)}{k_1} \frac{\sqrt{\alpha_1}}{\sqrt{s + \alpha_1 \lambda^2}} \quad (37)$$

$$B = \frac{Q_2(\lambda, s)}{k_2} \frac{1}{\sqrt{s/\alpha_2 + \lambda^2}} = \frac{Q_2(\lambda, s)}{k_2} \frac{\sqrt{\alpha_2}}{\sqrt{s + \alpha_2 \lambda^2}} \quad (38)$$

$$\theta_1 = \frac{Q_1(\lambda, s)}{k_1} \frac{\sqrt{\alpha_1}}{\sqrt{s + \alpha_1 \lambda^2}} e^{\sqrt{s + \alpha_1 \lambda^2}\cdot \frac{z}{\sqrt{\alpha_1}}}; z < 0 \quad (39)$$

$$\theta_2 = \frac{Q_2(\lambda, s)}{k_2} \frac{\sqrt{\alpha_2}}{\sqrt{s + \alpha_2 \lambda^2}} e^{-\sqrt{s + \alpha_2 \lambda^2}\cdot \frac{z}{\sqrt{\alpha_2}}}; z > 0 \quad (40)$$

From (34) at z=0:

$$\frac{Q_1(\lambda, s)}{k_1} \frac{\sqrt{\alpha_1}}{\sqrt{s + \alpha_1 \lambda^2}} = \frac{Q_2(\lambda, s)}{k_2} \frac{\sqrt{\alpha_2}}{\sqrt{s + \alpha_2 \lambda^2}}$$

$$Q_1(\lambda, s) = Q_2(\lambda, s) \frac{k_1 \sqrt{\alpha_2}}{k_2 \sqrt{\alpha_1}} \frac{\sqrt{s + \alpha_1 \lambda^2}}{\sqrt{s + \alpha_2 \lambda^2}}$$

From (31):

$$Q_1(\lambda, s) + Q_2(\lambda, s) = \quad (41)$$

$$Q_2(\lambda, s)\left[1 + \frac{k_1\sqrt{\alpha_2}}{k_2\sqrt{\alpha_1}}\frac{\sqrt{s+\alpha_1\lambda^2}}{\sqrt{s+\alpha_2\lambda^2}}\right] = \frac{aq}{s}\frac{J_1(\lambda a)}{\lambda}$$

$$Q_2(\lambda, s) = \frac{aq}{s}\frac{J_1(\lambda a)}{\lambda}\frac{k_2\sqrt{\alpha_1}\sqrt{s+\alpha_2\lambda^2}}{k_1\sqrt{\alpha_2}\sqrt{s+\alpha_1\lambda^2} + k_2\sqrt{\alpha_1}\sqrt{s+\alpha_2\lambda^2}}$$

$$Q_1(\lambda, s) = \frac{aq}{s}\frac{J_1(\lambda a)}{\lambda}\frac{k_1\sqrt{\alpha_2}\sqrt{s+\alpha_1\lambda^2}}{k_1\sqrt{\alpha_2}\sqrt{s+\alpha_1\lambda^2} + k_2\sqrt{\alpha_1}\sqrt{s+\alpha_2\lambda^2}} \quad (42)$$

$$A = \frac{aq}{s}\frac{J_1(\lambda a)}{\lambda}\cdot \frac{\sqrt{\alpha_1 \alpha_2}}{k_1\sqrt{\alpha_2}\sqrt{s+\alpha_1\lambda^2} + k_2\sqrt{\alpha_1}\sqrt{s+\alpha_2\lambda^2}} \quad (43)$$

$$B = \frac{aq}{s}\frac{J_1(\lambda a)}{\lambda}\cdot \frac{\sqrt{\alpha_1 \alpha_2}}{k_1\sqrt{\alpha_2}\sqrt{s+\alpha_1\lambda^2} + k_2\sqrt{\alpha_1}\sqrt{s+\alpha_2\lambda^2}} \quad (44)$$

$$\theta_1 = \frac{aq\sqrt{\alpha_1}}{s}\frac{\sqrt{\alpha_2}}{k_1\sqrt{\alpha_2}\sqrt{s+\alpha_1\lambda^2} + k_2\sqrt{\alpha_1}\sqrt{s+\alpha_2\lambda^2}} e^{+\sqrt{s+\alpha_1\lambda^2}\frac{z}{\sqrt{\alpha_2}}}\frac{J_1(\lambda a)}{\lambda}; z<0 \quad (45)$$

$$\theta_2 = \frac{aq\sqrt{\alpha_1}}{s}\frac{\sqrt{\alpha_2}}{k_1\sqrt{\alpha_2}\sqrt{s+\alpha_1\lambda^2} + k_2\sqrt{\alpha_1}\sqrt{s+\alpha_2\lambda^2}} e^{-\sqrt{s+\alpha_2\lambda^2}\frac{z}{\sqrt{\alpha_2}}}\frac{J_1(\lambda a)}{\lambda}; z<0 \quad (46)$$

Note that if the media 1 and 2 are identical, then $\theta_1=\theta_2$ and both are equal to ½ of the solution obtained for a semi-infinite medium with q flux supply.

Now the Laplace-Hankel plane is transformed back to Laplace domain.

$$\varphi_1 = aq \int_0^\infty \left[ \frac{1}{s} \frac{\sqrt{\alpha_1}\sqrt{\alpha_2} \cdot e^{+\sqrt{s+\alpha_1\lambda^2}\frac{z}{\sqrt{\alpha_1}}}}{\left[ k_1\sqrt{\alpha_2}\sqrt{s+\alpha_1\lambda^2} + k_2\sqrt{\alpha_1}\sqrt{s+\alpha_2\lambda^2} \right]} \right] \frac{J_1(\lambda a)}{\lambda} \lambda J_0(\lambda r) d\lambda \quad (47)$$

for $z < 0$.

$$\varphi_2 = aq \int_0^\infty \left[ \frac{1}{s} \frac{\sqrt{\alpha_1}\sqrt{\alpha_2} \cdot e^{-\sqrt{s+\alpha_2\lambda^2}\frac{z}{\sqrt{\alpha_2}}}}{\left[ k_1\sqrt{\alpha_2}\sqrt{s+\alpha_1\lambda^2} + k_2\sqrt{\alpha_1}\sqrt{s+\alpha_2\lambda^2} \right]} \right] \frac{J_1(\lambda a)}{\lambda} \lambda J_0(\lambda r) d\lambda \quad (48)$$

for $z > 0$.

The expressions inside the square brackets have to be transformed from Laplace domain back to the time domain to write down the temperature equations. However, the inverse transform of these functions is not straightforward, since there are 2 different variables inside the square roots. The inverse transform integral in the complex plane must be calculated.

Prior to developing the solution, the expressions in the square brackets are verified to be valid when the two media are identical, i.e. $\alpha_1=\alpha_2=\alpha$, and $k_1=k_2=k$.

$$\varphi_2(r, z, s) = aq \int_0^\infty \left[ \frac{\alpha \cdot e^{-\sqrt{s/\alpha+\lambda^2} z}}{s\left[ k\alpha\sqrt{s+\alpha\lambda^2} + k\sqrt{\alpha}\sqrt{s+\alpha_2\lambda^2} \right]} \right] J_1(\lambda a) J_0(\lambda r) d\lambda =$$

$$\frac{aq}{2k} \int_0^\infty \left[ \frac{e^{-\sqrt{s/\alpha+\lambda^2} z}}{s \cdot \sqrt{\frac{s}{\alpha}+\lambda^2}} \right] J_1(\lambda a) Jo(\lambda r) d\lambda$$

This is the same result obtained for a semi-infinite plane, divided by 2 to accommodate the case of an infinite plane.

Solution Using the Inversion Theorem

Denoting the functions in the square brackets of (47) and (48) in the Laplace-Hankel plane $F_1(\lambda,z,s)$ and $F_2(\lambda,z,s)$ respectively, it is necessary to find the inverse Laplace transform functions $f_1(\lambda,z,t)$ and $f_2(\lambda,z,t)$ in the Hankel-time domain by the inversion theorem.

$$f_1(\lambda, z, t) = \quad (49)$$

$$\mathcal{L}^{-1}\{F_1(\lambda, z, s)\} = \mathcal{L}^{-1}\left\{ \frac{1}{s} \frac{\sqrt{\alpha_1}\sqrt{\alpha_2} \cdot e^{\sqrt{s+\alpha_1\lambda^2}\frac{z}{\sqrt{\alpha_1}}}}{\left[ k_1\sqrt{\alpha_2}\sqrt{s+\alpha_1\lambda^2} + k_2\sqrt{\alpha_1}\sqrt{s+\alpha_2\lambda^2} \right]} \right\} =$$

$$\frac{1}{2\pi j} \int_{\sigma_1-j\infty}^{\sigma_1+j\infty} e^{st} \cdot \frac{\sqrt{\alpha_1}\sqrt{\alpha_2}}{s} \frac{e^{\sqrt{s+\alpha_1\lambda^2}\frac{z}{\sqrt{\alpha_1}}}}{\left[ k_1\sqrt{\alpha_2}\sqrt{s+\alpha_1\lambda^2} + k_2\sqrt{\alpha_1}\sqrt{s+\alpha_2\lambda^2} \right]} ds =$$

$$\frac{1}{2\pi j} \int_{\sigma_1-j\infty}^{\sigma_1+j\infty} e^{st} \cdot \frac{\sqrt{\alpha_1}\sqrt{\alpha_2}}{s} \overline{F}_1(\lambda, z, s) ds;$$

$z < 0$ $$f_2(\lambda, z, t) = \quad (50)$$

$$\mathcal{L}^{-1}\{F_2(\lambda, z, s)\} = \mathcal{L}^{-1}\left\{ \frac{1}{s} \frac{\sqrt{\alpha_1}\sqrt{\alpha_2} \cdot e^{-\sqrt{s+\alpha_2\lambda^2}\frac{z}{\sqrt{\alpha_2}}}}{\left[ k_1\sqrt{\alpha_2}\sqrt{s+\alpha_1\lambda^2} + k_2\sqrt{\alpha_1}\sqrt{s+\alpha_2\lambda^2} \right]} \right\} =$$

$$\frac{1}{2\pi j} \int_{\sigma_1-j\infty}^{\sigma_1+j\infty} e^{st} \cdot \frac{\sqrt{\alpha_1}\sqrt{\alpha_2}}{s} \frac{e^{-\sqrt{s+\alpha_2\lambda^2}\frac{z}{\sqrt{\alpha_2}}}}{\left[ k_1\sqrt{\alpha_2}\sqrt{s+\alpha_1\lambda^2} + k_2\sqrt{\alpha_1}\sqrt{s+\alpha_2\lambda^2} \right]} ds =$$

$$\frac{1}{2\pi j} \int_{\sigma_1-j\infty}^{\sigma_1+j\infty} e^{st} \cdot \frac{\sqrt{\alpha_1}\sqrt{\alpha_2}}{s} \overline{F}_2(\lambda, z, s) ds;$$

$z > 0$ Where $$F_1(\lambda, z, s) = \frac{\sqrt{\alpha_1}\sqrt{\alpha_2}}{s} \overline{F}_1(\lambda, z, s) = U(s) \cdot \overline{F}_1(\lambda, z, s),$$

$$F_2(\lambda, z, s) = \frac{\sqrt{\alpha_1}\sqrt{\alpha_2}}{s} \overline{F}_2(\lambda, z, s) = U(s) \cdot \overline{F}_2(\lambda, z, s),$$

and $\sigma_1$ is the abscissa of convergence.

Firstly, the inverse transform is found for $\overline{F}_1(\lambda,z,s)$ and $\overline{F}_2(\lambda,z,s)$, $\overline{f}_1(\lambda,z,t)$ and $\overline{f}_2(\lambda,z,t)$, respectively, and then use the convolution theorem to convolve with the inverse transform of the second part of $F_1(\lambda,z,s)$ and $F_2(\Delta,z,s)$, i.e.

$$U(s) = \frac{\sqrt{\alpha_1}\sqrt{\alpha_2}}{s}, \text{ where}$$

$U(s) = \mathcal{L}\{u(t)\}$ and $$u(t) = \begin{Bmatrix} 0, & t<0 \\ \sqrt{\alpha_1}\sqrt{\alpha_2}, & t>0 \end{Bmatrix}$$

is a modified unity function. By the convolution theorem, the following is obtained:

$\mathcal{L}\{u(t)*\overline{f}_1(\lambda,z,t)\}=U(s)\cdot\overline{F}_1(\lambda,z,s)$ and $u(t)*\overline{f}_1(\lambda,z,t)=\int_0^t u(t-\tau)\overline{f}_1(\lambda,z,\tau)d\tau$ for $t>\tau$.

Substituting for u(t), the following is obtained:

$\mathcal{L}\{u(t)*\overline{f}_1(\lambda,z,t)\}=\sqrt{\alpha_1}\sqrt{\alpha_2}\int_0^t \overline{f}_1(\lambda,z,\tau)d\tau$ for $t>\tau$.

Similar evaluation applies for $F_2(\lambda,z,s)$.

The following is defined, $$b_1 \equiv a_1\lambda^2; b_2 \equiv a_2\lambda^2; z_1 \equiv \frac{z}{\sqrt{\alpha_1}}; z_2 \equiv \frac{z}{\sqrt{\alpha_2}} \quad (51)$$

The Laplace-Hankel functions at hand $\overline{F}_1(\lambda,z,s)$ and $\overline{F}_2(\lambda,z,s)$ are not analytic, but rather double-valued in the complex plane because of the square roots. They have 2 branch points at $-b_1$ and $-b_2$.

Figure 11:
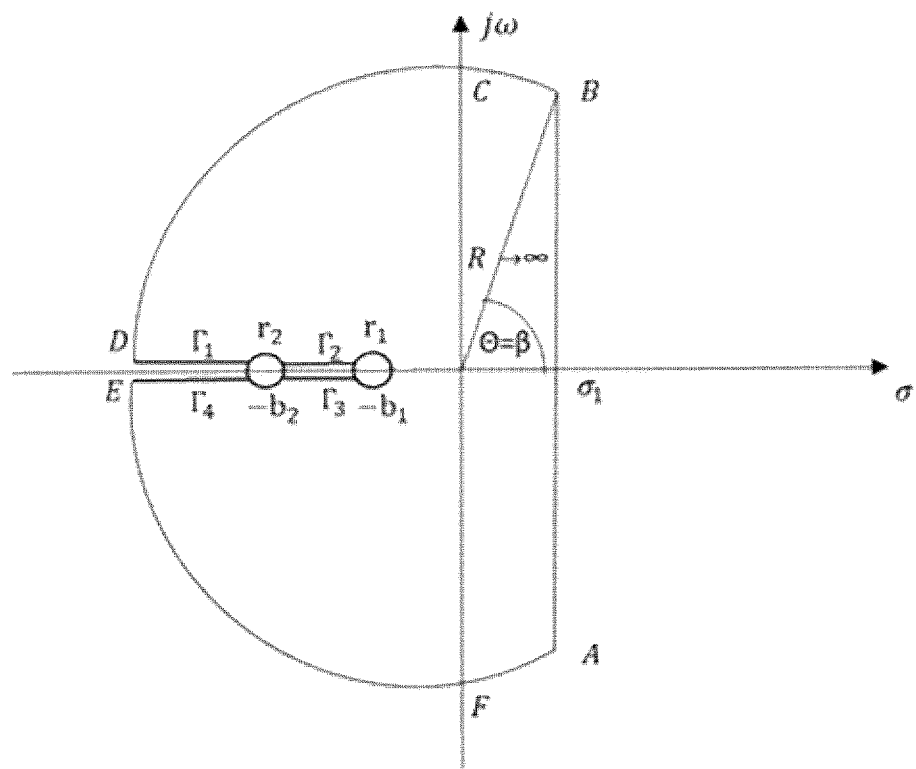
FIG. 11 depicts a contour of integration for the temperature solution.

To carry out the integration in the complex plane, Henrici-like contour is used, as described in L D' Amore and al., *An extension of the Henrici formula for Laplace transform inversion*, Inverse Problems 16 (2000) 1441-1456, except that the branch points $s=-b_1$ and $s=-b_2$ are excluded. Therefore, a contour of integration is chosen as shown in FIG. 11. It is noted that the functions $\overline{F}_1(\lambda,z,s)$ and $\overline{F}_2(\lambda,z,s)$ have no poles inside the contour of integration.

Note that it is also possible to carry out the integration on $F_1(\lambda,z,s)$ and $F_2(\lambda,z,s)$ rather than on $\overline{F}_1(\lambda,z,s)$ and $\overline{F}_2(\lambda,z,s)$. In this case, a simple pole will exist at $s=0$, and the residues of the functions $F_1(\lambda,z,s)$ and $F_2(\lambda,z,s)$ at $s=0$ have to be evaluated and added to the line integrals. No integration over $\tau$ will be required in this case.

The following identities are used $$e^{j\pi} = -1; e^{-j\pi} = -1; e^{j\frac{\pi}{2}} = j; e^{-j\frac{\pi}{2}} = -j; e^{j2\pi} = 1; e^{-j2\pi} = 1 \quad (52)$$

And the following arbitrarily set, without losing generality of the solution, $$\alpha_2 > \alpha_1 \Rightarrow b_2 > b_1 > 0 \quad (53)$$

According to Cauchy's theorem, the sum of all the line integrals in FIG. 10 is 0, since there are no poles inside the contour.

$$\frac{1}{2\pi j}\int_{\sigma_1-j\infty}^{\sigma_1+j\infty} e^{st} \cdot \frac{\sqrt{\alpha_1}\sqrt{\alpha_2}}{+s} F_2(\lambda,z,s)ds + \quad (54)$$

$$\int_{BC} + \int_{CD} + \int_{\Gamma_1} + \int_{r_1} + \int_{\Gamma_2} + \int_{r_2} + \int_{\Gamma_3} + \int_{\Gamma_4} + \int_{EF} + \int_{FA} = 0$$

It can be shown that the integrals of the small circles $r_1$ and $r_2$ and the segments of the large circles R vanish as $r_i$ tends to 0 and R tends to $\infty$. Therefore, the remaining integrals are on $\Gamma_2$, $\Gamma_3$, and $\Gamma_4$. These integrals are denoted $I_1$, $I_2$, $I_3$, and $I_4$ respectively, and (54) becomes $$\frac{1}{2\pi j}\int_{\sigma_1-j\infty}^{\sigma_1+j\infty} e^{st} \cdot \frac{\sqrt{\alpha_1}\sqrt{\alpha_2}}{+s} F_2(\lambda,z,s)ds = -\left[\int_{\Gamma_1} + \int_{\Gamma_2} + \int_{\Gamma_3} + \int_{\Gamma_4}\right] \quad (55)$$

Integration in Upper Branch Cut of FIG. 11

Starting with the integration of $\overline{F}_2(\lambda,z,s)$ in the upper branch, there are 2 parts, one is the line where s varies from $-\infty$ to $-b_2$, and the other from $-b_2$ to $-b_1$. Let $$s=\sigma e^{j\pi}=-\sigma; ds=-d\sigma; \sigma>0 \quad (56)$$

In the first part of the upper branch cut there is $$s: -\infty \to -b_2; \Rightarrow \sigma: \infty \to b_2; b_2 < \sigma < \infty; \Rightarrow \sigma > b_1 \quad (57)$$

$$\sqrt{s+b_2} = \sqrt{\frac{\sigma e^{j\pi}+}{b_2}} = \sqrt{\frac{\sigma e^{j\pi}-}{b_2 e^{j\pi}}} = e^{j\frac{\pi}{2}}\sqrt{\frac{\sigma-}{b_2}} = j\sqrt{\frac{\sigma-}{b_2}} \quad (58)$$

$$\sqrt{s+b_1} = \sqrt{\frac{\sigma e^{j\pi}+}{b_1}} = \sqrt{\frac{\sigma e^{j\pi}-}{b_1 e^{j\pi}}} = e^{j\frac{\pi}{2}}\sqrt{\frac{\sigma-}{b_1}} = j\sqrt{\frac{\sigma-}{b_1}} \quad (59)$$

In the second part of the upper branch cut there is $$s:-b_2 \to -b_1; \Rightarrow \sigma: b_2 \to b_1; b_1 < \sigma < b_2 \quad (60)$$

$$\sqrt{s+b_2} = \sqrt{b_2-\sigma} \quad (61)$$

$$\sqrt{s+b_1} = j\sqrt{\sigma-b_1} \quad (62)$$

Start the line integrations gives:

$$I_1 = \frac{1}{2\pi j}\int_{-\infty}^{-b_2} \frac{e^{st}e^{-z_2\sqrt{s+b_2}}}{k_1\sqrt{\alpha_2}\sqrt{s+b_1}+k_2\sqrt{\alpha_1}\sqrt{s+b_2}}ds =$$

$$\frac{1}{2\pi j}\int_{+\infty}^{+b_2} \frac{e^{-\sigma t}e^{-jz_2\sqrt{\sigma-b_2}}}{k_1\sqrt{\alpha_2}(j\sqrt{\sigma-b_1})+k_2\sqrt{\alpha_1}(j\sqrt{\sigma-b_2})}d(-\sigma) =$$

$$-\frac{1}{2\pi}\int_{+b_2}^{+\infty} \frac{e^{-\sigma t}e^{-jz_2\sqrt{\sigma-b_2}}}{k_1\sqrt{\alpha_2}\sqrt{\sigma-b_1}+k_2\sqrt{\alpha_1}\sqrt{\sigma-b_2}}d\sigma$$

while changing the sign and flipping the integral limits.

$$I_2 = \frac{1}{2\pi j}\int_{-b_2}^{-b_1} \frac{e^{st}e^{-z_2\sqrt{s+b_2}}}{k_1\sqrt{\alpha_2}\sqrt{s+b_1}+k_2\sqrt{\alpha_1}\sqrt{s+b_2}}ds =$$

$$\frac{1}{2\pi j}\int_{b_2}^{b_1} \frac{e^{-\sigma t}e^{-z_2(+\sqrt{b_2-\sigma})}}{k_1\sqrt{\alpha_2}(j\sqrt{\sigma-b_1})+k_2\sqrt{\alpha_1}(+\sqrt{b_2-\sigma})}d(-\sigma) =$$

$$\frac{1}{2\pi j}\int_{b_1}^{b_2} \frac{e^{-\sigma t}e^{-z_2\sqrt{b_2-\sigma}}}{jk_1\sqrt{\alpha_2}\sqrt{\sigma-b_1}+k_2\sqrt{\alpha_1}\sqrt{b_2-\sigma}}d\sigma$$

while changing the sign and flipping the integral limits.

Figure 12:
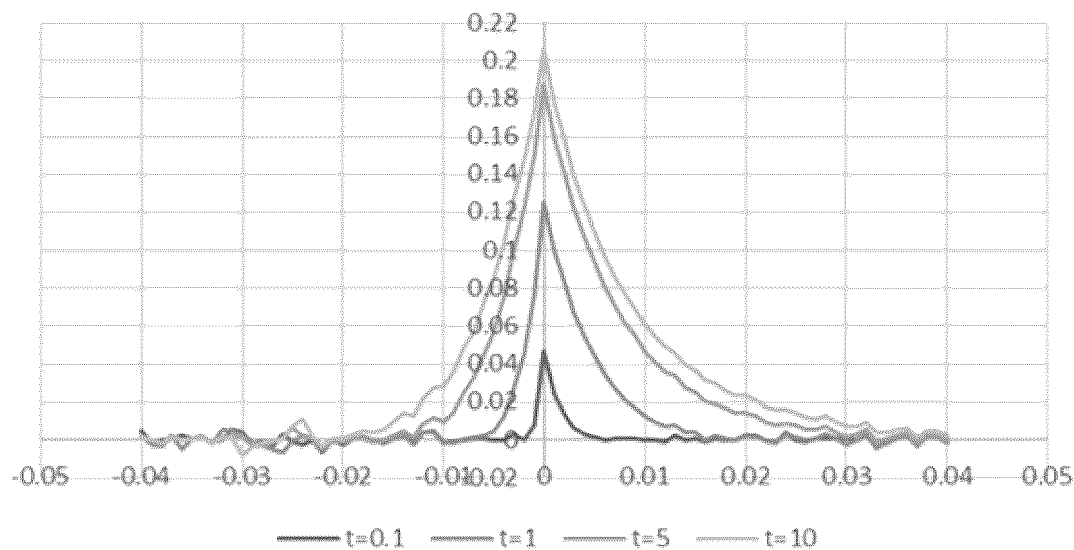
FIG. 12 depicts plots of temperature fields on both sides of the sensor.

Integration in Lower Branch Cut of FIG. 12

In the lower branch cut there are also 2 sections, one is the line where s varies from $-b_1$ to $-b_2$ and the other from $-b_2$ to $-\infty$. Here, s can be written as:

$$s=\sigma e^{-j\pi}=-\sigma; ds=-d\sigma; \sigma>0. \quad (63)$$

In the first part of the lower branch cut there is $$s: -b_1 \to -b_2; \Rightarrow \sigma: b_1 \to b_2; b_1 < \sigma < b_2 \quad (64)$$

$$\sqrt{s+b_1} = \sqrt{\sigma e^{-j\pi} + b_1} \quad (65)$$
$$= \sqrt{\sigma e^{-j\pi} - b_1 e^{-j\pi}}$$
$$= e^{-j\frac{\pi}{2}}\sqrt{\sigma - b_1}$$
$$= -j\sqrt{\sigma - b_1}$$

$$\sqrt{s+b_2} = \sqrt{b_2 - \sigma} \quad (66)$$

In the second part of the lower branch cut $$s: -b_2 \to -\infty; \Rightarrow \sigma: b_2 \to \infty; b_2 < \sigma < \infty; \Rightarrow \sigma > b_1 \quad (67)$$

$$\sqrt{s+b_1} = \sqrt{\sigma e^{-j\pi} + b_1}$$
$$= \sqrt{\sigma e^{-j\pi} - b_1 e^{-j\pi}}$$
$$= e^{-j\frac{\pi}{2}}\sqrt{\sigma - b_1}$$
$$= -j\sqrt{\sigma - b_1}$$

$$\sqrt{s+b_2} = \sqrt{\sigma e^{-j\pi} + b_2}$$
$$= \sqrt{\sigma e^{-j\pi} - b_2 e^{-j\pi}}$$
$$= e^{-j\frac{\pi}{2}}\sqrt{\sigma - b_1}$$
$$= -j\sqrt{\sigma - b_2}$$

$$I_3 = \frac{1}{2\pi j}\int_{-b_1}^{-b_2} \frac{e^{st}e^{-z_2\sqrt{s+b_2}}}{k_1\sqrt{\alpha_2}\sqrt{s+b_1} + k_2\sqrt{\alpha_1}\sqrt{s+b_2}} ds \quad (68)$$

$$= \frac{1}{2\pi j}\int_{b_1}^{b_2} \frac{e^{-\sigma t}e^{-z_2(+\sqrt{b_2-\sigma})}}{k_1\sqrt{\alpha_2}(-j\sqrt{\sigma-b_1}) + k_2\sqrt{\alpha_1}(+\sqrt{b_2-\sigma})} d(-\sigma)$$

$$= -\frac{1}{2\pi j}\int_{b_1}^{b_2} \frac{e^{-\sigma t}e^{-z_2\sqrt{b_2-\sigma}}}{-jk_1\sqrt{\alpha_2}\sqrt{\sigma-b_1} + k_2\sqrt{\alpha_1}\sqrt{b_2-\sigma}} d\sigma$$

$$I_4 = \frac{1}{2\pi j}\int_{-b_2}^{-\infty} \frac{e^{st}e^{-z_2\sqrt{s+b_2}}}{k_1\sqrt{\alpha_2}\sqrt{s+b_1} + k_2\sqrt{\alpha_1}\sqrt{s+b_2}} ds \quad (69)$$

$$= \frac{1}{2\pi j}\int_{b_2}^{\infty} \frac{e^{-\sigma t}e^{-z_2(-j\sqrt{\sigma-b_2})}}{k_1\sqrt{\alpha_2}(-j\sqrt{\sigma-b_1}) + k_2\sqrt{\alpha_1}(-j\sqrt{\sigma-b_2})} d(-\sigma)$$

$$= -\frac{1}{2\pi}\int_{b_2}^{\infty} \frac{e^{-\sigma t}e^{jz_2\sqrt{\sigma-b_2}}}{k_1\sqrt{\alpha_2}\sqrt{\sigma-b_1} + k_2\sqrt{\alpha_1}\sqrt{\sigma-b_2}} d\sigma$$

Now add $I_1+I_4$ and $I_2+I_3$.

$$I_1 + I_4 = -\frac{1}{2\pi}\int_{b_2}^{\infty} \frac{e^{-\sigma t}\left[e^{-jz_2\sqrt{\sigma-b_2}} + e^{jz_2\sqrt{\sigma-b_2}}\right]}{k_1\sqrt{\alpha_2}\sqrt{\sigma-b_1} + k_2\sqrt{\alpha_1}\sqrt{\sigma-b_2}} d\sigma$$

$$= -\frac{1}{\pi}\int_{b_2}^{\infty} \frac{e^{-\sigma t}\cos(z_2\sqrt{\sigma-b_2})}{k_1\sqrt{\alpha_2}\sqrt{\sigma-b_1} + k_2\sqrt{\alpha_1}\sqrt{\sigma-b_2}} d\sigma$$

$$I_2 + I_3 = +\frac{1}{2\pi j}\int_{b_1}^{b_2} \frac{e^{-\sigma t}e^{-z_2\sqrt{b_2-\sigma}}}{k_2\sqrt{\alpha_1}\sqrt{b_2-\sigma} + jk_1\sqrt{\alpha_2}\sqrt{\sigma-b_1}} d\sigma -$$

$$\frac{1}{2\pi j}\int_{b_1}^{b_2} \frac{e^{-\sigma t}e^{-z_2\sqrt{b_2-\sigma}}}{k_2\sqrt{\alpha_1}\sqrt{b_2-\sigma} - jk_1\sqrt{\alpha_2}\sqrt{\sigma-b_1}} d\sigma$$

$$= -\frac{k_1\sqrt{\alpha_2}}{\pi}\int_{b_1}^{b_2} \frac{e^{-\sigma t}e^{-z_2\sqrt{b_2-\sigma}} \cdot \sqrt{\sigma-b_1}}{k_2^2\alpha_1(b_2-\sigma) + k_1^2\alpha_2(\sigma-b_1)} d\sigma$$

The sum of all the integrals of the contour must be zero because there are no poles inside the contour, according to Cauchy's theorem.

$$f_2(\lambda, z, t) = \frac{1}{2\pi j}\int_{\sigma_1-j\infty}^{\sigma_1+j\infty} e^{st} F_2(\lambda, z, s) ds$$

$$= -\int_0^t \sqrt{\alpha_1}\sqrt{\alpha_2}(I_1 + I_2 + I_3 + I_4) d\tau$$

$$= \frac{\sqrt{\alpha_1}\sqrt{\alpha_2}}{\pi}\int_0^t$$

$$\left[\int_{b_2}^{\infty} \frac{e^{-\sigma t}\cos(z_2\sqrt{\sigma-b_2})}{k_1\sqrt{\alpha_2}\sqrt{\sigma-b_1} + k_2\sqrt{\alpha_1}\sqrt{\sigma-b_2}} d\sigma\right] d\tau +$$

$$\frac{k_1\sqrt{\alpha_1}\,\alpha_2}{\pi}\int_0^t$$

$$\left[\int_{b_1}^{b_2} \frac{e^{-\sigma t}e^{-z_2\sqrt{b_2-\sigma}} \cdot \sqrt{\sigma-b_1}}{k_2^2\alpha_1(b_2-\sigma) + k_1^2\alpha_2(\sigma-b_1)} d\sigma\right] d\tau$$

The temperature result in Hankel plane is therefore:

$$f_2(\lambda, z, t) = \quad (70)$$

$$\frac{\sqrt{\alpha_1}\sqrt{\alpha_2}}{\pi}\int_0^t d\tau \left[\int_{b_2}^{\infty} \frac{e^{-\sigma t}\cos(z_2\sqrt{\sigma-b_2})}{k_1\sqrt{\alpha_2}\sqrt{\sigma-b_1} + k_2\sqrt{\alpha_1}\sqrt{\sigma-b_2}} d\sigma\right] +$$

$$\frac{k_1\alpha_2\sqrt{\alpha_1}}{\pi}\int_0^t d\tau \left[\int_{b_1}^{b_2} \frac{e^{-\sigma t}e^{-z_2\sqrt{b_2-\sigma}} \cdot \sqrt{\sigma-b_1}}{k_2^2\alpha_1(b_2-\sigma) + k_1^2\alpha_2(\sigma-b_1)} d\sigma\right]$$

And from (48) the temperature in the time domain is $$T_2(r, z, t) = aq\int_0^{\infty} [f_2(\lambda, z, t)] J_1(\lambda a) J_0(\lambda r) d\lambda$$

$$= aq\int_0^{\infty} \left\{\frac{\sqrt{\alpha_1}\sqrt{\alpha_2}}{\pi}\int_0^t \right.$$

$$\left[\int_{b_2}^{\infty} \frac{e^{-\sigma t}\cos(z_2\sqrt{\sigma-b_2})}{k_1\sqrt{\alpha_2}\sqrt{\sigma-b_1} + k_2\sqrt{\alpha_1}\sqrt{\sigma-b_2}} d\sigma\right] d\tau +$$

$$\frac{k_1\alpha_2\sqrt{\alpha_1}}{\pi}\int_0^t$$

$$\left.\left[\int_{b_1}^{b_2} \frac{e^{-\sigma t}e^{-z_2\sqrt{b_2-\sigma}} \cdot \sqrt{\sigma-b_1}}{k_2^2\alpha_1(b_2-\sigma) + k_1^2\alpha_2(\sigma-b_1)} d\sigma\right] d\tau\right\}$$

$$J_1(\lambda a) J_0(\lambda r) d\lambda$$

$T_2(r, z, t) =$ $$\frac{aq\sqrt{\alpha_1}\sqrt{\alpha_2}}{\pi}\int_0^\infty \left\{\int_0^t \left[\int_{b_2}^\infty \frac{e^{-\sigma t}\cos(z_2\sqrt{\sigma-b_2})}{k_1\sqrt{\alpha_2}\sqrt{\sigma-b_1}+k_2\sqrt{\alpha_1}\sqrt{\sigma-b_2}}d\sigma\right]d\tau\right\}$$

$J_1(\lambda a)J_0(\lambda r)d\lambda +$ $$\frac{aqk_1\alpha_2\sqrt{\alpha_1}}{\pi}\int_0^\infty\left\{\int_0^t\left[\int_{b_1}^{b_2}\frac{e^{-\sigma t}e^{-z_2\sqrt{b_2-\sigma}}\cdot\sqrt{\sigma-b_1}}{k_2^2\alpha_1(b_2-\sigma)+k_1^2\alpha_2(\sigma-b_1)}d\sigma\right]d\tau\right\}$$

$J_1(\lambda a)J_0(\lambda r)d\lambda; z_2 > 0$ $T_2(r, z, t) = \frac{aq\sqrt{\alpha_1}\sqrt{\alpha_2}}{\pi}$ $$\int_0^\infty\left\{\int_0^t e^{-\sigma\tau}d\tau\left[\int_{b_2}^\infty\frac{\cos(z_2\sqrt{\sigma-b_2})}{k_1\sqrt{\alpha_2}\sqrt{\sigma-b_1}+k_2\sqrt{\alpha_1}\sqrt{\sigma-b_2}}d\sigma\right]\right\}$$

$J_1(\lambda a)J_0(\lambda r)d\lambda +$ $$\frac{aqk_1\alpha_2\sqrt{\alpha_1}}{\pi}\int_0^\infty\left\{\int_0^t e^{-\sigma\tau}d\tau\left[\int_{b_1}^{b_2}\frac{e^{-z_2\sqrt{b_2-\sigma}}\sqrt{\sigma-b_1}}{k_2^2\alpha_1(b_2-\sigma)+k_1^2\alpha_2(\sigma-b_1)}d\sigma\right]\right\}$$

$J_1(\lambda a)J_0(\lambda r)d\lambda; z_2 > 0$

By changing the order of integration. The following is obtained after integration over τ

$T_2(r, z, t) = \frac{aq\sqrt{\alpha_1}\sqrt{\alpha_2}}{\pi}$ (71)

$$\int_0^\infty\left\{\int_{b_2}^\infty\frac{[1-e^{-\sigma t}]}{\sigma}\frac{\cos(z_2\sqrt{\sigma-b_2})}{k_1\sqrt{\alpha_2}\sqrt{\sigma-b_1}+k_2\sqrt{\alpha_1}\sqrt{\sigma-b_2}}d\sigma\right\}$$

$J_1(\lambda a)J_0(\lambda r)d\lambda + \frac{aqk_1\alpha_2\sqrt{\alpha_1}}{\pi}$ $$\int_0^\infty\left\{\int_{b_1}^{b_2}\frac{[1-e^{-\sigma t}]}{\sigma}\frac{e^{-z_2\sqrt{b_2-\sigma}}\cdot\sqrt{\sigma-b_1}}{k_2^2\alpha_1(b_2-\sigma)+k_1^2\alpha_2(\sigma-b_1)}d\sigma\right\}$$

$J_1(\lambda a)J_0(\lambda r)d\lambda; z_2 > 0$

This solution reverts to the known solution with two identical media when $\alpha_1=\alpha_2=\alpha$; $k_1=k_2=k$ and hence $b_1=b_2=b$. The temperature field becomes, $T_2(r, z, t) =$ (72)

$$\frac{aq\alpha}{\pi}\int_0^\infty\left\{\int_b^\infty\frac{[1-e^{-\sigma t}]}{\sigma}\frac{\cos\left(\frac{z}{\sqrt{\alpha}}\sqrt{\sigma-b}\right)}{k\sqrt{\alpha}\sqrt{\sigma-b}+k\sqrt{\alpha}\sqrt{\sigma-b}}d\sigma\right\}$$

$J_1(\lambda a)J_0(\lambda r)d\lambda +$ $$\frac{aqk\alpha\sqrt{\alpha}}{\pi}\int_0^\infty\left\{\int_b^b\frac{[1-e^{-\sigma t}]}{\sigma}\frac{e^{-\frac{z}{\sqrt{\alpha}}\sqrt{b-\sigma}}\cdot\sqrt{\sigma-b}}{k^2\alpha(b-\sigma)+k^2\alpha(\sigma-b)}d\sigma\right\}$$

$J_1(\lambda a)J_0(\lambda r)d\lambda$

The second integral vanishes because of the equal lower and upper limits of the nested integral inside the curly brackets, and only the first integral remains. Substituting $x=\sqrt{\sigma-b}$; $\sigma=x^2+b$; $x:0\to\infty$; $d\sigma=2xdx$ and using Table of Integral Transforms Volume I, A. Erdelyi, Editor, California Institute of Technology 1.4 (15) p. 15 the following is obtained.

$$T_2(r, z, t) = \frac{aq\alpha}{\pi}\int_0^\infty\left\{\int_0^\infty\frac{[1-e^{-(x^2+b)t}]}{(x^2+b)}\frac{\cos\left(\frac{z}{\sqrt{\alpha}}x\right)}{2k\sqrt{\alpha}\,x}2xdx\right\}$$

$J_1(\lambda a)J_0(\lambda r)d\lambda$ $$= \frac{aq\alpha}{\pi k\sqrt{\alpha}}\int_0^\infty\left\{\int_0^\infty\frac{1}{(x^2+b)}\cos\left(\frac{z}{\sqrt{\alpha}}x\right)dx -\right.$$

$$\left. e^{-bt}\int_0^\infty\frac{e^{-x^2t}}{(x^2+b)}\cos\left(\frac{z}{\sqrt{\alpha}}x\right)dx\right\}J_1(\lambda a)J_0(\lambda r)d\lambda$$

$$= \frac{aq\alpha}{\pi k\sqrt{\alpha}}\int_0^\infty\left\{\frac{\pi}{2\sqrt{b}}e^{-\sqrt{b}\frac{z}{\sqrt{\alpha}}} - e^{-bt}\frac{\pi}{4\sqrt{b}}e^{bt}\right.$$

$$\left[e^{-\sqrt{b}\frac{z}{\sqrt{\alpha}}}\cdot\text{erfc}\left(\sqrt{bt}-\frac{z}{2\sqrt{\alpha t}}\right) + e^{\sqrt{b}\frac{z}{\sqrt{\alpha}}}\cdot\right.$$

$$\left.\text{erfc}\left(\sqrt{bt}+\frac{z}{2\sqrt{\alpha t}}\right)\right]\bigg\}J_1(\lambda a)J_0(\lambda r)d\lambda$$

Remembering that $b=\alpha\lambda^2$ and using the identity $\text{erfc}(-x)=1-\text{erf}(-x)=1+\text{erf}(x)=2-\text{erfc}(x)$ $$T_2(r, z, t) = \frac{aq\alpha}{\pi k\sqrt{\alpha}}\frac{\pi}{2\sqrt{\alpha}}\int_0^\infty\left\{\frac{1}{\lambda}e^{-\lambda z} - \frac{1}{2\lambda}[e^{-\lambda z}\cdot\right.$$ (73)

$$\text{erfc}\left(\lambda\sqrt{\alpha t}-\frac{z}{2\sqrt{\alpha t}}\right) +$$

$$\left.e^{+\lambda z}\cdot\text{erfc}\left(\lambda\sqrt{\alpha t}+\frac{z}{2\sqrt{\alpha t}}\right)]\right\}J_1(\lambda a)J_0(\lambda r)d\lambda$$

$$= \frac{aq}{2k}\int_0^\infty\left\{\frac{1}{\lambda}e^{-\lambda z}-\frac{1}{\lambda}e^{-\lambda z}+e^{-\lambda z}\cdot\right.$$

$$\text{erfc}\left(\frac{z}{2\sqrt{\alpha t}}-\lambda\sqrt{\alpha t}\right)-e^{+\lambda z}\cdot$$

$$\left.\text{erfc}\left(\frac{z}{2\sqrt{\alpha t}}+\lambda\sqrt{\alpha t}\right)\right\}J_1(\lambda a)J_0(\lambda r)d\lambda$$

$T_2(r, z, t) =$ $$\frac{aq}{2k}\int_0^\infty\left[e^{-\lambda z}\cdot\text{erfc}\left(\frac{z}{z\sqrt{\alpha t}}-\lambda\sqrt{\alpha t}\right) - e^{+\lambda z}\cdot\text{erfc}\left(\frac{z}{2\sqrt{\alpha t}}+\lambda\sqrt{\alpha t}\right)\right]$$

$J_1(\lambda a)J_0(\lambda r)\frac{d\lambda}{\lambda}$

This is the same solution we obtained for the CHS embedded inside an isotropic infinite plane.

A similar integration procedure can be applied for the inverse transform of $\overline{F}_1(\lambda,s)$. Expressions (54) to (62) and (63) to (69) are equally applicable here.

$$\frac{1}{2\pi j}\int_{\sigma_1-j\infty}^{\sigma_1+j\infty}e^{st}\cdot\frac{\sqrt{\alpha_1}\sqrt{\alpha_2}}{s}\overline{F}_1(\lambda,z,s)ds = -\left[\int_{\Gamma_1}+\int_{\Gamma_2}+\int_{\Gamma_3}+\int_{\Gamma_4}\right]$$ (74)

$$I_1 = \frac{1}{2\pi j}\int_{-\infty}^{-b_2} \frac{e^{st}e^{z_1\sqrt{s+b_1}}}{k_1\sqrt{\alpha_2}\sqrt{s+b_1}+k_2\sqrt{\alpha_1}\sqrt{s+b_2}}ds =$$

$$= \frac{1}{2\pi j}\int_{+\infty}^{+b_2} \frac{e^{-\sigma t}e^{-jz_1\sqrt{\sigma-b_1}}}{k_1\sqrt{\alpha_2}(j\sqrt{\sigma-b_1})+k_2\sqrt{\alpha_1}(j\sqrt{\sigma-b_2})}d(-\sigma)$$

$$= -\frac{1}{2\pi}\int_{b_2}^{\infty} \frac{e^{-\sigma t}e^{jz_1\sqrt{\sigma-b_1}}}{k_1\sqrt{a_2}\sqrt{\sigma-b_1}+k_2\sqrt{a_1}\sqrt{\sigma-b_2}}d\sigma$$

while changing the sign and flipping the integral limits.

$$I_2 = \frac{1}{2\pi j}\int_{-b_2}^{-b_1} \frac{e^{st}e^{z_1\sqrt{s+b_1}}}{k_1\sqrt{\alpha_2}\sqrt{s+b_1}+k_2\sqrt{\alpha_1}\sqrt{s+b_2}}ds$$

$$= \frac{1}{2\pi j}\int_{b_2}^{b_1} \frac{e^{-\sigma t}e^{jz_1\sqrt{\sigma-b_1}}}{k_1\sqrt{a_2}(j\sqrt{\sigma-b_1})+k_2\sqrt{\alpha_1}(+\sqrt{b_2-\sigma})}d(-\sigma)$$

$$= \frac{1}{2\pi j}\int_{b_1}^{b_2} \frac{e^{-\sigma t}e^{jz_1\sqrt{\sigma-b_1}}}{jk_1\sqrt{\alpha_2}\sqrt{\sigma-b_1}+k_2\sqrt{\alpha_1}\sqrt{b_2-\sigma}}d\sigma$$

while changing the sign and flipping the integral limits.

$$I_3 = \frac{1}{2\pi j}\int_{-b_1}^{-b_2} \frac{e^{st}e^{z_1\sqrt{s+b_1}}}{k_1\sqrt{\alpha_2}\sqrt{s+b_1}+k_2\sqrt{\alpha_1}\sqrt{s+b_2}}ds$$

$$= \frac{1}{2\pi j}\int_{b_1}^{b_2} \frac{e^{-\sigma t}e^{z_1(-j\sqrt{\sigma-b_1})}}{k_1\sqrt{\alpha_2}(-j\sqrt{\sigma-b_1})+k_2\sqrt{\alpha_1}(+\sqrt{b_2-\sigma})}d(-\sigma)$$

$$= -\frac{1}{2\pi j}\int_{b_1}^{b_2} \frac{e^{-\sigma t}e^{-jz_1\sqrt{\sigma-b_1}}}{-jk_1\sqrt{\alpha_2}\sqrt{\sigma-b_1}+k_2\sqrt{\alpha_1}\sqrt{b_2-\sigma}}d\sigma$$

$$I_4 = \frac{1}{2\pi j}\int_{-b_2}^{-\infty} \frac{e^{st}e^{z_1\sqrt{s+b_1}}}{k_1\sqrt{\alpha_2}\sqrt{s+b_1}+k_2\sqrt{\alpha_1}\sqrt{s+b_2}}ds$$

$$= \frac{1}{2\pi j}\int_{b_2}^{\infty} \frac{e^{-\sigma t}e^{z_1(-j\sqrt{\sigma-b_1})}}{k_1\sqrt{\alpha_2}(-j\sqrt{\sigma-b_1})+k_2\sqrt{\alpha_1}(-j\sqrt{\sigma-b_2})}d(-\sigma)$$

$$= -\frac{1}{2\pi}\int_{b_2}^{\infty} \frac{e^{-\sigma t}e^{-jz_1\sqrt{\sigma-b_1}}}{k_1\sqrt{\alpha_2}\sqrt{\sigma-b_1}+k_2\sqrt{\alpha_1}\sqrt{\sigma-b_2}}d\sigma$$

Now add $I_1+I_4$ and $I_2+I_3$.

$$I_1+I_4 = -\frac{1}{2\pi}\int_{b_2}^{\infty} \frac{e^{-\sigma t}\left[e^{jz_1\sqrt{\sigma-b_1}}+e^{-jz_1\sqrt{\sigma-b_1}}\right]}{k_1\sqrt{\alpha_2}\sqrt{\sigma-b_1}+k_2\sqrt{\alpha_1}\sqrt{\sigma-b_2}}d\sigma$$

$$= -\frac{1}{\pi}\int_{b_2}^{\infty} \frac{e^{-\sigma t}\cos(z_1\sqrt{\sigma-b_1})}{k_1\sqrt{\alpha_2}\sqrt{\sigma-b_1}+k_2\sqrt{\alpha_1}\sqrt{\sigma-b_2}}d\sigma$$

$$I_2+I_3 = \frac{1}{2\pi j}\int_{b_1}^{b_2} \frac{e^{-\sigma t}e^{jz_1\sqrt{\sigma-b_1}}}{jk_1\sqrt{\alpha_2}\sqrt{\sigma-b_1}+k_2\sqrt{a_1}\sqrt{b_2-\sigma}}d\sigma -$$

$$\frac{1}{2\pi j}\int_{b_1}^{b_2} \frac{e^{-\sigma t}e^{-jz_1\sqrt{\sigma-b_1}}}{-jk_1\sqrt{\alpha_2}\sqrt{\sigma-b_1}+k_2\sqrt{\alpha_1}\sqrt{b_2-\sigma}}d\sigma$$

The denominators and the second exponents are conjugates.

$$I_2+I_3 = \frac{1}{2\pi j}\int_{b_1}^{b_2}e^{-\sigma t}\left[\frac{V1}{k_2^2\alpha_1(b_2-\sigma)+k_1^2\alpha_2(\sigma-b_1)}\right]d\sigma$$

$$= \frac{1}{2\pi j}\int_{b_1}^{b_2}e^{-\sigma t}\left[\frac{k_2\sqrt{\alpha_1}\sqrt{b_2-\sigma}\left(e^{jz_1\sqrt{\sigma-b_1}}-e^{-jz_1\sqrt{\sigma-b_1}}\right)-jk_1\sqrt{a_2}\sqrt{\sigma-b_1}\left(e^{jz_1\sqrt{\sigma-b_1}}+e^{-jz_1\sqrt{\sigma-b_1}}\right)}{k_2^2\alpha_1(b_2-\sigma)+k_1^2\alpha_2(\sigma-b_1)}\right]d\sigma$$

$$= \frac{1}{2\pi j}\int_{b_1}^{b_2}e^{-\sigma t}\left[\frac{k_2\sqrt{\alpha_1}\sqrt{b_2-\sigma}\cdot 2j\sin(z_1\sqrt{\sigma-b_1})-jk_1\sqrt{\alpha_2}\sqrt{\sigma-b_1}\cdot 2\cos(z_1\sqrt{\sigma-b_1})}{k_2^2\alpha_1(b_2-\sigma)+k_1^2a_2(\sigma-b_1)}\right]d\sigma$$

Where:

$V2$ is $k_2\sqrt{\alpha_1}\sqrt{b_2-\sigma}\cdot e^{jz_1\sqrt{\sigma-b_1}} - jk_1\sqrt{\alpha_2}\sqrt{\sigma-b_1}\cdot e^{jz_1\sqrt{\sigma-b_1}} - k_2\sqrt{\alpha_1}\sqrt{b_2-\sigma}\,e^{-jz_1\sqrt{\sigma-b_1}} - jk_1\sqrt{\alpha_2}\sqrt{\sigma-b_1}\,e^{-jz_1\sqrt{\sigma-b_1}}$ $$I_2+I_3 = \frac{1}{\pi}\int_{b_1}^{b_2} e^{-\sigma t}\left[\frac{k_2\sqrt{\alpha_1}\sqrt{b_2-\sigma}\cdot\sin(z_1\sqrt{\sigma-b_1})-}{k_1\sqrt{\alpha_2}\sqrt{\sigma-b_1}\cdot\cos(z_1\sqrt{\sigma-b_1})}\right]d\sigma$$
$$\frac{k_2^2\alpha_1(b_2-\sigma)+k_1^2\alpha_2(\sigma-b_1)}{}$$

The sum of all the integrals of the contour must be zero because there are no poles inside the contour, according to Cauchy's theorem. The temperature in the Hankel plane is therefore $$f_1(\lambda,z,t) =$$
$$\frac{1}{2\pi j}\int_{\sigma_1-j\infty}^{\sigma_1+j\infty} e^{st}F_1(\lambda,z,s)ds = -\int_0^t \sqrt{\alpha_1}\sqrt{\alpha_2}(I_1+I_2+I_3+I_4)d\tau =$$
$$\frac{\sqrt{\alpha_1}\sqrt{\alpha_2}}{\pi}\int_0^t d\tau\left[\int_{b_2}^\infty \frac{e^{-\sigma t}\cos(z_1\sqrt{\sigma-b_1})}{k_1\sqrt{\alpha_2}\sqrt{\sigma-b_1}+k_2\sqrt{\alpha_1}\sqrt{\sigma-b_2}}d\sigma\right]-$$
$$\frac{k_2\alpha_1\sqrt{\alpha_2}}{\pi}\int_0^t d\tau\left[\int_{b_1}^{b_2} e^{-\sigma t}\frac{k_2\sqrt{\alpha_1}\sqrt{b_2-\sigma}\cdot\sin(z_1\sqrt{\sigma-b_1})}{k_2^2\alpha_1(b_2-\sigma)+k_1^2\alpha_2(\sigma-b_1)}d\sigma\right]+$$
$$\frac{k_1\alpha_2\sqrt{\alpha_1}}{\pi}$$
$$\int_0^t d\tau\left[\int_{b_1}^{b_2} e^{-\sigma t}\frac{k_1\sqrt{\alpha_2}\sqrt{\sigma-b_1}\cdot\cos(z_1\sqrt{\sigma-b_1})}{k_2^2\alpha_1(b_2-\sigma)+k_1^2\alpha_2(\sigma-b_1)}d\sigma\right]; z_1<0$$

And from (47) the temperature in the time domain is $$T_1(r,z,t) = aq\int_0^\infty [f_1(\lambda,z,t)]J_1(\lambda a)J_0(\lambda r)d\lambda = aq$$
$$\int_0^\infty\left\{\frac{\sqrt{\alpha_1}\sqrt{\alpha_2}}{\pi}\int_0^t d\tau\left[\int_{b_2}^\infty e^{-\sigma t}\frac{\cos(z_1\sqrt{\sigma-b_1})}{k_1\sqrt{\alpha_2}\sqrt{\sigma-b_1}+k_2\sqrt{\alpha_1}\sqrt{\sigma-b_2}}d\sigma\right]-\frac{k_2\alpha_1\sqrt{\alpha_2}}{\pi}\right.$$
$$\int_0^t d\tau\left[\int_{b_1}^{b_2} e^{-\sigma t}\frac{k_2\sqrt{\alpha_1}\sqrt{b_2-\sigma}\cdot\sin(z_1\sqrt{\sigma-b_1})}{k_2^2\alpha_1(b_2-\sigma)+k_1^2\alpha_2(\sigma-b_1)}d\sigma\right]+$$
$$\frac{k_1\alpha_2\sqrt{\alpha_1}}{\pi}$$
$$\left.\int_0^t d\tau\left[\int_{b_1}^{b_2} e^{-\sigma t}\frac{k_1\sqrt{\alpha_2}\sqrt{\sigma-b_1}\cdot\cos(z_1\sqrt{\sigma-b_1})}{k_2^2\alpha_1(b_2-\sigma)+k_1^2\alpha_2(\sigma-b_1)}d\sigma\right]\right\}$$
$$J_1(\lambda a)J_0(\lambda r)d\lambda; z_1<0$$

$$T_1(r,z,t) = \frac{aq\sqrt{\alpha_1}\sqrt{\alpha_2}}{\pi}$$
$$\int_0^\infty\left\{\int_0^t\left[\int_{b_2}^\infty e^{-\sigma t}\frac{\cos(z_1\sqrt{\sigma-b_1})}{k_1\sqrt{\alpha_2}\sqrt{\sigma-b_1}+k_2\sqrt{\alpha_1}\sqrt{\sigma-b_2}}d\sigma\right]d\tau\right\}$$
$$J_1(\lambda a)J_0(\lambda r)d\lambda - \frac{aqk_2\alpha_1\sqrt{\alpha_2}}{\pi}$$
$$\int_0^\infty\left\{\int_0^t\left[\int_{b_1}^{b_2} e^{-\sigma t}\frac{k_2\sqrt{\alpha_1}\sqrt{b_2-\sigma}\cdot\sin(z_1\sqrt{\sigma-b_1})}{k_2^2\alpha_1(b_2-\sigma)+k_1^2\alpha_2(\sigma-b_1)}d\sigma\right]d\tau\right\}$$

$$J_1(\lambda a)J_0(\lambda r)d\lambda + \frac{aqk_1\alpha_2\sqrt{\alpha_1}}{\pi}$$
$$\int_0^\infty\left\{\int_0^t\left[\int_{b_1}^{b_2} e^{-\sigma t}\frac{k_1\sqrt{\alpha_2}\sqrt{\sigma-b_1}\cdot\cos(z_1\sqrt{\sigma-b_1})}{k_2^2\alpha_1(b_2-\sigma)+k_1^2\alpha_2(\sigma-b_1)}d\sigma\right]d\tau\right\}$$
$$J_1(\lambda a)J_0(\lambda r)d\lambda; z<0$$

By changing the order of integration and integrating over r the following is obtained $$T_1(r,z,t) = \frac{aq\sqrt{\alpha_1}\sqrt{\alpha_2}}{\pi} \quad (75)$$
$$\int_0^\infty\left\{\int_{b_2}^\infty \frac{1-e^{-\sigma t}}{\sigma}\frac{\cos(z_1\sqrt{\sigma-b_1})}{k_1\sqrt{\alpha_2}\sqrt{\sigma-b_1}+k_2\sqrt{\alpha_1}\sqrt{\sigma-b_2}}d\sigma\right\}$$
$$J_1(\lambda a)J_0(\lambda r)d\lambda - \frac{aqk_2\alpha_1\sqrt{\alpha_2}}{\pi}$$
$$\int_0^\infty\left\{\int_{b_1}^{b_2} \frac{1-e^{-\sigma t}}{\sigma}\frac{\sqrt{b_2-\sigma}\cdot\sin(z_1\sqrt{\sigma-b_1})}{k_2^2\alpha_1(b_2-\sigma)+k_1^2\alpha_2(\sigma-b_1)}d\sigma\right\}$$
$$J_1(\lambda a)J_0(\lambda r)d\lambda + \frac{aqk_1\alpha_2\sqrt{\alpha_1}}{\pi}$$
$$\int_0^\infty\left\{\int_{b_1}^{b_2} \frac{1-e^{-\sigma t}}{\sigma}\frac{\sqrt{\sigma-b_1}\cdot\cos(z_1\sqrt{\sigma-b_1})}{k_2^2\alpha_1(b_2-\sigma)+k_1^2\alpha_2(\sigma-b_1)}d\sigma\right\}$$
$$J_1(\lambda a)J_0(\lambda r)d\lambda; z<0$$

It can easily be verified that in the case of two media are identical, the last two integrals in (75) vanish and the first integral is reduced to the first integral in (72), thus confirming that $T_1(r,z,t)=T_2(r,z,t)$ for identical media as expected.

Temperature Field on the CHS Surface (z=0)

To find the temperature field on the CHS surface, substitute 0 for $z_1$ in (75) and for $z_2$ in (71). Both results should be identical.

$$T_1(r,z=0,t) = \frac{aq\sqrt{\alpha_1}\sqrt{\alpha_2}}{\pi}$$
$$\int_0^\infty\left\{\int_{b_2}^\infty \frac{1-e^{-\sigma t}}{\sigma}\frac{\cos(0)}{k_1\sqrt{\alpha_2}\sqrt{\sigma-b_1}+k_2\sqrt{\alpha_1}\sqrt{\sigma-b_2}}d\sigma\right\}$$
$$J_1(\lambda a)J_0(\lambda r)d\lambda -$$
$$\frac{aqk_2\alpha_1\sqrt{\alpha_2}}{\pi}\int_0^\infty\left\{\int_{b_1}^{b_2}\frac{1-e^{-\sigma t}}{\sigma}\frac{\sqrt{b_2-\sigma}\cdot\sin(0)}{k_2^2\alpha_1(b_2-\sigma)+k_1^2\alpha_2(\sigma-b_1)}d\sigma\right\}$$
$$J_1(\lambda a)J_0(\lambda r)d\lambda +$$
$$\frac{aqk_1\alpha_2\sqrt{\alpha_1}}{\pi}\int_0^\infty\left\{\int_{b_1}^{b_2}\frac{1-e^{-\sigma t}}{\sigma}\frac{\sqrt{\sigma-b_1}\cdot\cos(0)}{k_2^2\alpha_1(b_2-\sigma)+k_1^2\alpha_2(\sigma-b_1)}d\sigma\right\}$$
$$J_1(\lambda a)J_0(\lambda r)d\lambda; z_1=0$$

The second integral vanishes, and $T_1$ becomes $$T_1(r,z=0,t) = \frac{aq\sqrt{\alpha_1}\sqrt{\alpha_2}}{\pi} \quad (76)$$
$$\int_0^\infty\left\{\int_{b_2}^\infty \frac{1-e^{-\sigma t}}{\sigma}\frac{1}{k_1\sqrt{\alpha_2}\sqrt{\sigma-b_1}+k_2\sqrt{\alpha_1}\sqrt{\sigma-b_2}}d\sigma\right\}$$

$$J_1(\lambda a)J_0(\lambda r)d\lambda + \frac{aqk_2\alpha_2\sqrt{\alpha_1}}{\pi}$$

$$\int_0^\infty \left\{ \int_{b_1}^{b_2} \frac{1-e^{-\sigma t}}{\sigma} \frac{\sqrt{\sigma-b_1}}{k_2^2\alpha_1(b_2-\sigma)+k_1^2\alpha_2(\sigma-b_1)} d\sigma \right\}$$

$$J_1(\lambda a)J_0(\lambda r)d\lambda; z_1 = 0$$

Similarly, for $T_2$ becomes $$T_2(r, z=0, t) = \frac{aq\sqrt{\alpha_1}\sqrt{\alpha_2}}{\pi} \tag{77}$$

$$\int_0^\infty \left\{ \int_{b_2}^\infty \frac{1-e^{-\sigma t}}{\sigma} \frac{1}{k_1\sqrt{\alpha_2}\sqrt{\sigma-b_1}+k_2\sqrt{\alpha_1}\sqrt{\sigma-b_2}} d\sigma \right\}$$

$$J_1(\lambda a)J_0(\lambda r)d\lambda + \frac{aqk_1\alpha_2\sqrt{\alpha_1}}{\pi}$$

$$\int_0^\infty \left\{ \int_{b_1}^{b_2} \frac{1-e^{-\sigma t}}{\sigma} \frac{\sqrt{\sigma-b_1}}{k_2^2\alpha_1(b_2-\sigma)+k_1^2\alpha_2(\sigma-b_1)} d\sigma \right\}$$

$$J_1(\lambda a)J_0(\lambda r)d\lambda; z_2 = 0$$

(76) and (77) are equal at z=0, since there is no contact resistance. This confirms boundary condition (20).

The average temperature on the CHS surface is obtained by integration of the two terms over the CHS radius from r=0 to r=a, and dividing by its area.

$$T_{1Av}(z=0, t) = \frac{aq\sqrt{\alpha_1}\sqrt{\alpha_2}}{\pi}$$

$$\int_0^\infty \left\{ \int_{b_2}^\infty \frac{1-e^{-\sigma t}}{\sigma} \frac{1}{k_1\sqrt{\alpha_2}\sqrt{\sigma-b_1}+k_2\sqrt{\alpha_1}\sqrt{\sigma-b_2}} d\sigma \right\}$$

$$J_1(\lambda a)\left[\frac{1}{\pi a^2}\int_0^a 2\pi r J_0(\lambda r) dr\right] d\lambda +$$

$$\frac{aqk_1\alpha_2\sqrt{\alpha_1}}{\pi} \int_0^\infty \left\{ \int_{b_1}^{b_2} \frac{1-e^{-\sigma t}}{\sigma} \frac{\sqrt{\sigma-b_1}}{k_2^2\alpha_1(b_2-\sigma)+k_1^2\alpha_2(\sigma-b_1)} d\sigma \right\}$$

$$J_1(\lambda a)\left[\frac{1}{2\pi a^2}\int_0^a 2\pi r J_0(\lambda r) dr\right] d\lambda; z_1 = 0$$

And since the value of the integral in the square brackets is $$\frac{1}{\pi a^2}\int_0^a J_0(\lambda r) 2\pi r dr = 2\frac{J_1(\lambda a)}{a\lambda}$$

The average temperature fields on the CHS surface are obtained $$T_{1Av}(z=0, t) = T_{2Av}(z=0, t) = \frac{2q\sqrt{\alpha_1}\sqrt{\alpha_2}}{\pi} \tag{78}$$

$$\int_0^\infty \left\{ \int_{b_2}^\infty \frac{1-e^{-\sigma t}}{\sigma} \frac{1}{k_1\sqrt{\alpha_2}\sqrt{\sigma-b_1}+k_2\sqrt{\alpha_1}\sqrt{\sigma-b_2}} d\sigma \right\}$$

$$J_1^2(\lambda a)\frac{d\lambda}{\lambda} + \frac{2qk_1\alpha_2\sqrt{\alpha_1}}{\pi}$$

$$\int_0^\infty \left\{ \int_{b_1}^{b_2} \frac{1-e^{-\sigma t}}{\sigma} \frac{\sqrt{\sigma-b_1}}{k_2^2\alpha_1(b_2-\sigma)+k_1^2\alpha_2(\sigma-b_1)} d\sigma \right\}$$

$$J_1^2(\lambda a)\frac{d\lambda}{\lambda}; z = 0$$

Steady-State

The limits of the temperature fields in (75) and (71) are calculated as the time tends to infinity.

$$\lim_{t\to\infty} T_1(r, z, t) = \frac{aq\sqrt{\alpha_1}\sqrt{\alpha_2}}{\pi} \tag{79}$$

$$\int_0^\infty \left\{ \int_{b_2}^\infty \frac{1}{\sigma} \frac{\cos(z_1\sqrt{\sigma-b_1})}{(k_1\sqrt{\alpha_2}\sqrt{\sigma-b_1}+k_2\sqrt{\alpha_1}\sqrt{\sigma-b_2})} d\sigma \right\}$$

$$J_1(\lambda a)J_0(\lambda r)d\lambda - \frac{aqk_1\alpha_1\sqrt{\alpha_2}}{\pi}$$

$$\int_0^\infty \left\{ \int_{b_1}^{b_2} \frac{1}{\sigma} \frac{\sqrt{b_2-\sigma}\cdot\sin(z_1\sqrt{\sigma-b_1})}{k_2^2\alpha_1(b_2-\sigma)+k_1^2\alpha_2(\sigma-b_1)} d\sigma \right\} J_1(\lambda a)J_0(\lambda r)d\lambda +$$

$$\frac{aqk_1\alpha_2\sqrt{\alpha_1}}{\pi}\int_0^\infty \left\{ \int_{b_1}^{b_2} \frac{1}{\sigma} \frac{\sqrt{\sigma-b_1}\cdot\cos(z_1\sqrt{\sigma-b_1})}{k_2^2\alpha_1(b_2-\sigma)+k_1^2\alpha_2(\sigma-b_1)} d\sigma \right\}$$

$$J_1(\lambda a)J_0(\lambda r)d\lambda; z_1 < 0$$

$$\lim_{t\to\infty} T_2(r, z, t) = \frac{aq\sqrt{\alpha_1}\sqrt{\alpha_2}}{\pi} \tag{80}$$

$$\int_0^\infty \left\{ \int_{b_2}^\infty \frac{1}{\sigma} \frac{\cos(z_2\sqrt{\sigma-b_2})}{(k_1\sqrt{\alpha_2}\sqrt{\sigma-b_1}+k_2\sqrt{\alpha_1}\sqrt{\sigma-b_2})} d\sigma \right\}$$

$$J_1(\lambda a)J_0(\lambda r)d\lambda +$$

$$\frac{aqk_1\alpha_2\sqrt{\alpha_1}}{\pi}\int_0^\infty \left\{ \int_{b_1}^{b_2} \frac{1}{\sigma} \frac{e^{-z_2\sqrt{b_2-\sigma}}\cdot\sqrt{\sigma-b_1}}{k_2^2\alpha_1(b_2-\sigma)+k_1^2\alpha_2(\sigma-b_1)} d\sigma \right\}$$

$$J_1(\lambda a)J_0(\lambda r)d\lambda; z_2 > 0$$

The temperature fields (75) and (71) are plotted in FIG. 12. Note that at z=0 both temperature fields become equal, since they were derived with the assumption that there is no contact resistance (20). The absolute slope value of the temperature in medium 1 (SS304) is larger than that of medium 2 (brass), since the heat propagates farther inside medium 2 than in medium 1 cf. FIG. 12.

Figure 13:
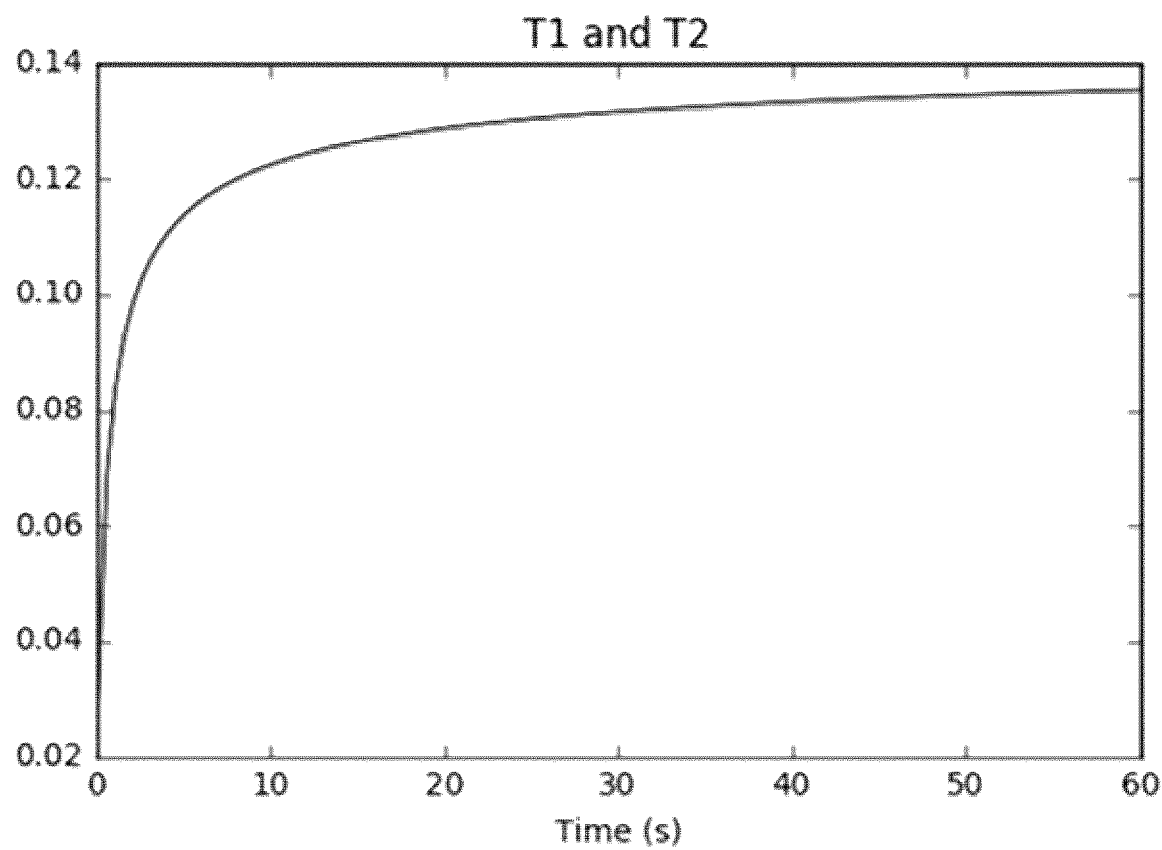
FIG. 13 depicts a temperature increase on the sensor surface vs. time.

The calculated temperature fields on the sensor surface are depicted in FIG. 13.

Heat Flux

To find the heat fluxes it is not possible to use (17), (18) and (19) along with the derivatives of (71) and (75), since the integrands of the latter may not be satisfying the Leibnitz rule [TBD]. Therefore, to calculate the heat fluxes, the calculation starts from (42) and the line integrals on $Q_1(\lambda,s)$ and $Q_2(\lambda,s)$ in the complex plane are performed.

The contour of integration chosen for the flux is shown in FIG. 13. There are two branch cuts at the points of discontinuity $s=-b_1$ and $s=-b_2$ and a simple pole at s=0. Like before, the line integral over the line AB is evaluated. The integrals over the parts with R vanish as R tends to infinity, and likewise the integrals over $r_1$ and $r_2$ vanish as they tend to 0 (see Appendix section below). What is left is, in accordance with Cauchy's theorem $$\frac{1}{2\pi j}\int_{\sigma_1-j\infty}^{\sigma_1+j\infty} e^{st}\cdot Q_1(\lambda,s)ds + \frac{aqJ_1(\lambda a)}{\lambda}(I_1+I_2+I_3+I_4) = \quad (81)$$

$$Res(Q_1(\lambda,s))_{s=0}$$

Where the first term is the integral of the line AB, and $I_1$ to $I_4$ are the line integrals over the sections $\Gamma_1$ to $\Gamma_4$, respectively (with the factor $$\frac{aqJ_1(\lambda a)}{\lambda}$$

removed). Using substitution (51) it is written:

$$Q_1(\lambda,s) = \frac{aq}{s}\frac{J_1(\lambda a)}{\lambda}\frac{k_1\sqrt{\alpha_2}\sqrt{s+\alpha_1\lambda^2}}{k_1\sqrt{\alpha_2}\sqrt{s+\alpha_1\lambda^2}+k_2\sqrt{\alpha_1}\sqrt{s+\alpha_2\lambda^2}} =$$

$$\frac{aqJ_1(\lambda a)}{\lambda}\frac{1}{s}\frac{k_1\sqrt{\alpha_2}\sqrt{s+b_1}}{k_1\sqrt{\alpha_2}\sqrt{s+b_1}+k_2\sqrt{\alpha_1}\sqrt{s+b_2}}$$

The residue of $Q_1(\lambda,s)$ at $s=0$ is:

$$Res(Q_1(s,\lambda))_{s=0} =$$

$$s(Q_1(\lambda,s))_{s=0} = \frac{aqJ_1(\lambda a)k_1\sqrt{\alpha_2}}{\lambda}\frac{\sqrt{b_1}}{k_2\sqrt{\alpha_1}\sqrt{b_2}+k_1\sqrt{\alpha_2}\sqrt{b_1}}$$

For the line integral $\Gamma_1$ (56) to (59) are used $$I_1 = \frac{1}{2\pi j}\int_{-\infty}^{-b_2}\frac{e^{st}\sqrt{s+b_1}}{s[k_1\sqrt{\alpha_2}\sqrt{s+b_1}+k_2\sqrt{\alpha_1}\sqrt{s+b_2}]}ds =$$

$$\frac{1}{2\pi j}\int_{+\infty}^{+b_2}\frac{e^{-\sigma t}\sqrt{\sigma-b_2}}{(-\sigma)[k_1\sqrt{\alpha_2}(j\sqrt{\sigma-b_1})+k_2\sqrt{\alpha_1}(j\sqrt{\sigma-b_2})]}d(-\sigma) =$$

$$-\frac{1}{2\pi j}\int_{+b_2}^{+\infty}\frac{e^{-\sigma t}\sqrt{\sigma-b_1}}{\sigma[k_1\sqrt{\alpha_2}\sqrt{\sigma-b_1}+k_2\sqrt{\alpha_1}\sqrt{\sigma-b_2}]}d\sigma$$

For the line integral $\Gamma_2$ (60) to (62) are used $$I_2 = \frac{1}{2\pi j}\int_{-b_2}^{-b_1}\frac{e^{st}\sqrt{s+b_1}}{s[k_1\sqrt{\alpha_2}\sqrt{s+b_1}+k_2\sqrt{\alpha_1}\sqrt{s+b_2}]}ds =$$

$$\frac{1}{2\pi j}\int_{+b_2}^{+b_1}\frac{e^{-\sigma t}j\sqrt{\sigma-b_1}}{(-\sigma)[k_1\sqrt{\alpha_2}(j\sqrt{\sigma-b_1})+k_2\sqrt{\alpha_1}(j\sqrt{\sigma-b_2})]}d(-\sigma) =$$

$$-\frac{1}{2\pi}\int_{+b_1}^{+b_2}\frac{e^{-\sigma t}\sqrt{\sigma-b_1}}{\sigma[k_1\sqrt{\alpha_2}\sqrt{\sigma-b_1}+k_2\sqrt{\alpha_1}\sqrt{\sigma-b_2}]}d\sigma$$

For the line integral $\Gamma_3$ (63) to (66) are used $$I_3 = \frac{1}{2\pi j}\int_{-b_1}^{-b_2}\frac{e^{st}\sqrt{s+b_1}}{s[k_1\sqrt{\alpha_2}\sqrt{s+b_1}+k_2\sqrt{\alpha_1}\sqrt{s+b_2}]}ds =$$

$$\frac{1}{2\pi j}\int_{+b_1}^{+b_2}\frac{e^{-\sigma t}(j\sqrt{\sigma-b_1})}{(-\sigma)[k_1\sqrt{\alpha_2}(-j\sqrt{\sigma-b_1})+k_2\sqrt{\alpha_1}\sqrt{b_2-\sigma}]}d(-\sigma) =$$

$$-\frac{1}{2\pi}\int_{+b_1}^{+b_2}\frac{e^{-\sigma t}\sqrt{\sigma-b}}{\sigma[-jk_1\sqrt{\alpha_2}\sqrt{\sigma-b_1}+k_2\sqrt{\alpha_1}\sqrt{b_2-\sigma}]}d\sigma$$

For the line integral $\Gamma_4$ (67) to (69) are used $$I_4 = \frac{1}{2\pi j}\int_{-b_2}^{-\infty}\frac{e^{st}\sqrt{s+b_1}}{s[k_1\sqrt{\alpha_2}\sqrt{s+b_1}+k_2\sqrt{\alpha_1}\sqrt{\sigma-b_2}]}ds =$$

$$\frac{1}{2\pi j}\int_{+b_2}^{+\infty}\frac{e^{-\sigma t}(-j\sqrt{\sigma-b_1})}{(-\sigma)[k_1\sqrt{\alpha_2}(-j\sqrt{\sigma-b_1})+k_2\sqrt{\alpha_1}(-j\sqrt{\sigma-b_2})]}d(-\sigma) =$$

$$\frac{1}{2\pi j}\int_{+b_2}^{+\infty}\frac{e^{-\sigma t}\sqrt{\sigma-b_1}}{\sigma[k_1\sqrt{\alpha_2}\sqrt{\sigma-b_1}+k_2\sqrt{\alpha_1}\sqrt{\sigma-b_2}]}d\sigma$$

Now adding the line integrals, the following is obtained $$I_1+I_4=0$$

$$I_2+I_3 = -\frac{1}{2\pi}\int_{+b_1}^{+b_2}\frac{e^{-\sigma t}\sqrt{\sigma-b_1}}{\sigma[jk_1\sqrt{\alpha_2}\sqrt{\sigma-b_1}+k_2\sqrt{\alpha_1}\sqrt{b_2-\sigma}]}d\sigma -$$

$$\frac{1}{2\pi}\int_{+b_1}^{+b_2}\frac{e^{-\sigma t}\sqrt{\sigma-b_1}}{\sigma[-jk_1\sqrt{\alpha_2}\sqrt{\sigma-b_1}+k_2\sqrt{\alpha_1}\sqrt{b_2-\sigma}]}d\sigma =$$

$$-\frac{k_2\sqrt{\alpha_1}}{\pi}\int_{b_1}^{b_2}\frac{e^{-\sigma t}\sqrt{\sigma-b_1}\sqrt{b_2-\sigma}}{\sigma[k_1^2\alpha_2(\sigma-b_1)+k_2^2\alpha_1(b_2-\sigma)]}d\sigma$$

The fluxes in the Hankel plane are denoted as $q_1(\lambda,t)$.

$$q_1(\lambda,t) = \frac{1}{2\pi j}\int_{\sigma_1-j\infty}^{\sigma_1+j\infty}e^{st}\cdot Q_1(\lambda,s)ds = \quad (82)$$

$$-\frac{aqJ_1(\lambda a)k_1\sqrt{\alpha_2}}{\lambda}(I_2+I_5)+Res(Q_1(\lambda,s))_{s=0} = \frac{aqJ_1(\lambda a)k_1\sqrt{\alpha_2}}{\lambda}$$

$$\frac{k_2\sqrt{\alpha_1}}{\pi}\int_{b_1}^{b_2}\frac{e^{-\sigma t}\sqrt{\sigma-b_1}\sqrt{b_2-\sigma}}{\sigma[k_1^2\alpha_2(\sigma-b_1)+k_2^2\alpha_1(b_2-\sigma)]}d\sigma +$$

$$\frac{aqJ_1(\lambda a)k_1\sqrt{\alpha_2}}{\lambda}\frac{\sqrt{b_1}}{k_1\sqrt{\alpha_2}\sqrt{b_1}+k_2\sqrt{\alpha_1}\sqrt{b_2}}$$

Converting from Hankel plane to the time domain $$q_1(r,t) = \quad (83)$$

$$\frac{aqk_1\sqrt{\alpha_2}\,k_2\sqrt{\alpha_1}}{\pi}\int_0^\infty\left\{\int_{b_1}^{b_2}\frac{e^{-\sigma t}}{\sigma}\frac{\sqrt{\sigma-b_1}\sqrt{b_2-\sigma}}{k_1^2\alpha_2(\sigma-b_1)+k_2^2\alpha_1(b_2-\sigma)}d\sigma\right\}$$
$$J_1(\lambda a)J_0(\lambda r)d\lambda +$$

$$aqk_1\sqrt{\alpha_2}\int_0^\infty\left\{\frac{\sqrt{b_1}}{k_1\sqrt{\alpha_2}\sqrt{b_1}+k_2\sqrt{\alpha_1}\sqrt{b_2}}\right\}J_1(\lambda a)J_0(\lambda r)d\lambda$$

And similarly, for $q_2(r,t)$ it can be shown that $$q_2(r, t) = -\frac{aqk_1\sqrt{\alpha_2}\,k_2\sqrt{\alpha_1}}{\pi} \quad (84)$$

$$\int_0^\infty \left\{\int_{b_1}^{b_2} \frac{e^{-\sigma t}}{\sigma} \frac{\sqrt{\sigma-b_1}\,\sqrt{b_2-\sigma}}{k_1^2\alpha_2(\sigma-b_1)+k_2^2\alpha_1(b_2-\sigma)} d\sigma \right\} J_1(\lambda a)J_0(\lambda r)d\lambda +$$

$$aqk_2\sqrt{\alpha_1}\int_0^\infty \left\{\frac{\sqrt{b_2}}{k_1\sqrt{\alpha_2}\,\sqrt{b_1}+k_2\sqrt{\alpha_1}\,\sqrt{b_2}}\right\} J_1(\lambda a)J_0(\lambda r)d\lambda$$

The first terms in (83) and (84) are identical but with opposite signs, and they represent the transient part of the heat fluxes. They vanish as the time tends to infinity. The second integrals describe the heat fluxes at steady-state. If (83) and (84) are added the sum of the second integrals is obtained, which comes to q, in conformity with (19).

$$q_1(r,t)+q_2(r,t) =$$

$$aqk_1\sqrt{\alpha_2}\int_0^\infty \left\{\frac{\sqrt{b_1}}{k_1\sqrt{\alpha_2}\,\sqrt{b_1}+k_2\sqrt{\alpha_1}\,\sqrt{b_2}}\right\} J_1(\lambda a)J_0(\lambda r)d\lambda +$$

$$aqk_2\sqrt{\alpha_1}\int_0^\infty \left\{\frac{\sqrt{b_2}}{k_1\sqrt{\alpha_2}\,\sqrt{b_1}+k_2\sqrt{\alpha_1}\,\sqrt{b_2}}\right\} J_1(\lambda a)J_0(\lambda r)d\lambda =$$

$$aq\int_0^\infty J_1(\lambda a)J_0(\lambda r)d\lambda = aq\frac{1}{a} = q$$

The average values of the fluxes over the CHS area are $$q_{1Av}(t) = \frac{2qk_1\sqrt{\alpha_2}\,k_2\sqrt{\alpha_1}}{\pi} \quad (85)$$

$$\int_0^\infty \left\{\int_{b_1}^{b_2} \frac{e^{-\sigma t}}{\sigma} \frac{\sqrt{\sigma-b_1}\,\sqrt{b_2-\sigma}}{k_1^2\alpha_2(\sigma-b_1)k_2^2\alpha_1(b_2-\sigma)} d\sigma\right\} J_1^2(\lambda a)\frac{d\lambda}{\lambda} +$$

$$2qk_1\sqrt{\alpha_2}\int_0^\infty \left\{\frac{\sqrt{b_1}}{k_1\sqrt{\alpha_2}\,\sqrt{b_1}+k_2\sqrt{\alpha_1}\,\sqrt{b_2}}\right\} J_1^2(\lambda a)\frac{d\lambda}{\lambda}$$

$$q_{2Av}(t) = -\frac{2qk_1\sqrt{\alpha_2}\,k_2\sqrt{\alpha_1}}{\pi} \quad (86)$$

$$\int_0^\infty \left\{\int_{b_1}^{b_2} \frac{e^{-\sigma t}}{\sigma} \frac{\sqrt{\sigma-b_1}\,\sqrt{b_2-\sigma}}{k_1^2\alpha_2(\sigma-b_1)+k_2^2\alpha_1(b_2-\sigma)} d\sigma\right\} J_1^2(\lambda a)\frac{d\lambda}{\lambda} +$$

$$2qk_2\sqrt{\alpha_1}\int_0^\infty \left\{\frac{\sqrt{b_2}}{k_1\sqrt{\alpha_2}\,\sqrt{b_1}+k_2\sqrt{\alpha_1}\,\sqrt{b_2}}\right\} J_1^2(\lambda a)\frac{d\lambda}{\lambda}$$

Heat Flux Simulation Results

Figure 15:
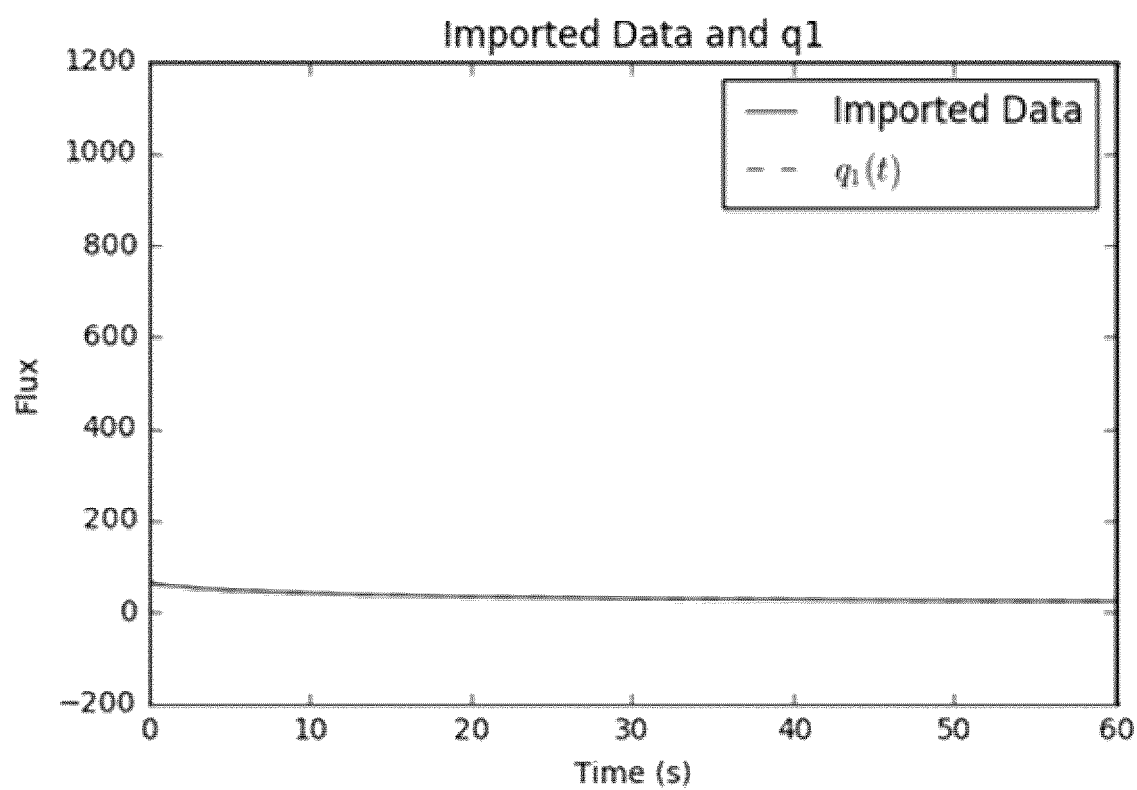
FIG. 15 depicts a chart of heat flux vs. time from finite element simulation data in comparison to the analytical derived solution.
Figure 16:
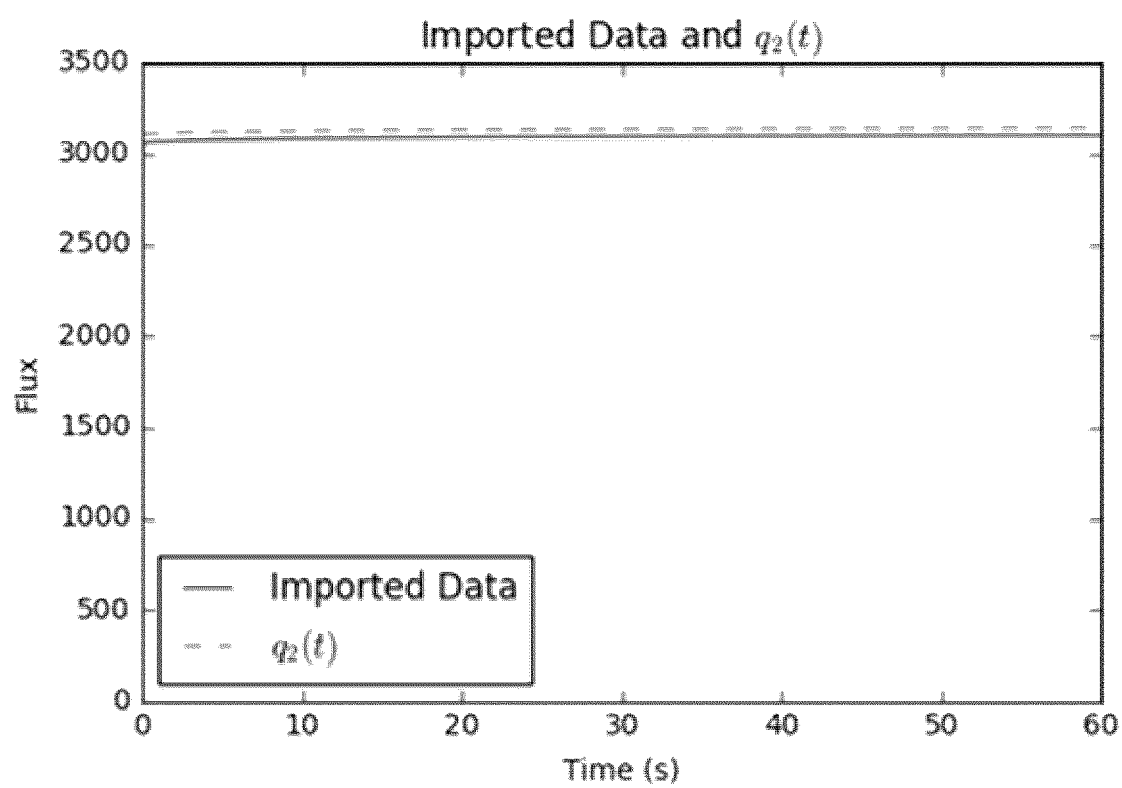
FIG. 16 depicts a further chart of heat flux vs. time from finite element simulation data in comparison to the analytical derived solution.
Figure 17:
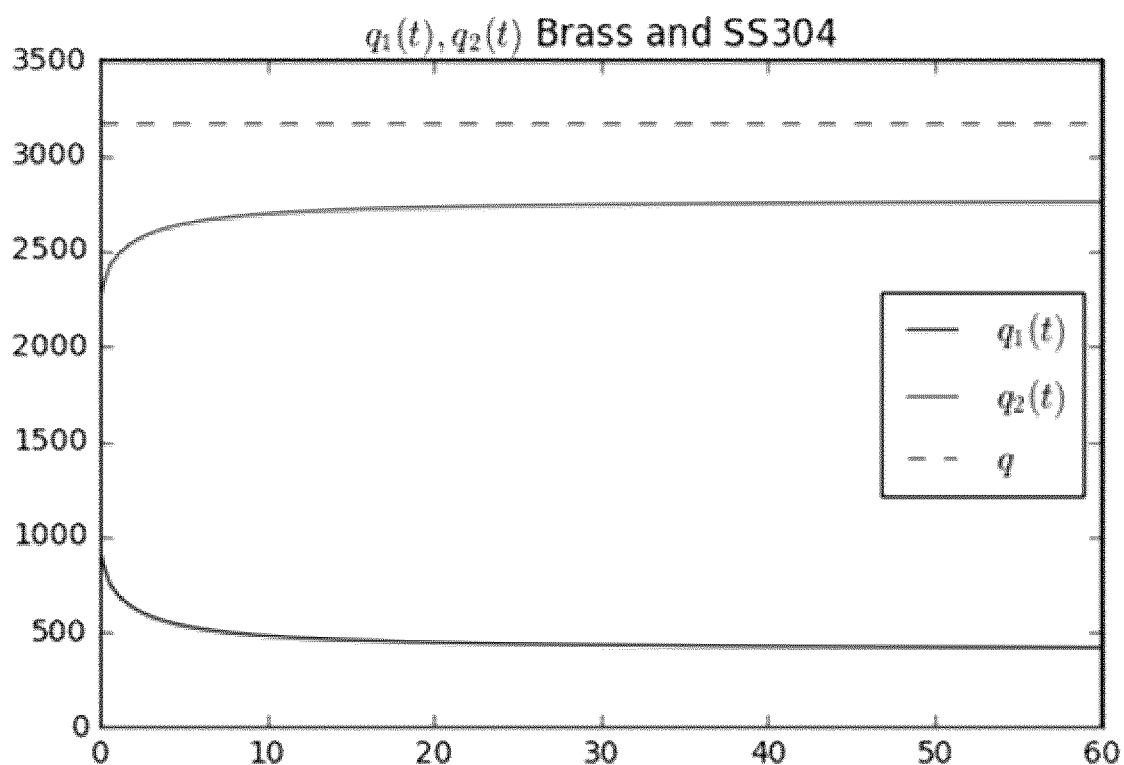
FIG. 17 depicts the calculated heat flux from the analytical derived solution of two metals.

FIGS. 15 to 16 depict simulation results for the heat flux of LAF6720 (insulator) and SS304. The error is about 1%. FIG. 15 depicts a chart of heat flux vs. time. FIG. 16 depicts a further chart of heat flux vs. time. These charts compare the results of finite element simulation with the analytically derived solutions.

The above has depicted the determination of temperature and heat flux characteristics for different materials with no contact resistance between the sensor and materials. A similar technique may be used in determining the temperature characteristics for different materials when a contact resistance is present between the sensor and one of the materials.

Figure 18:
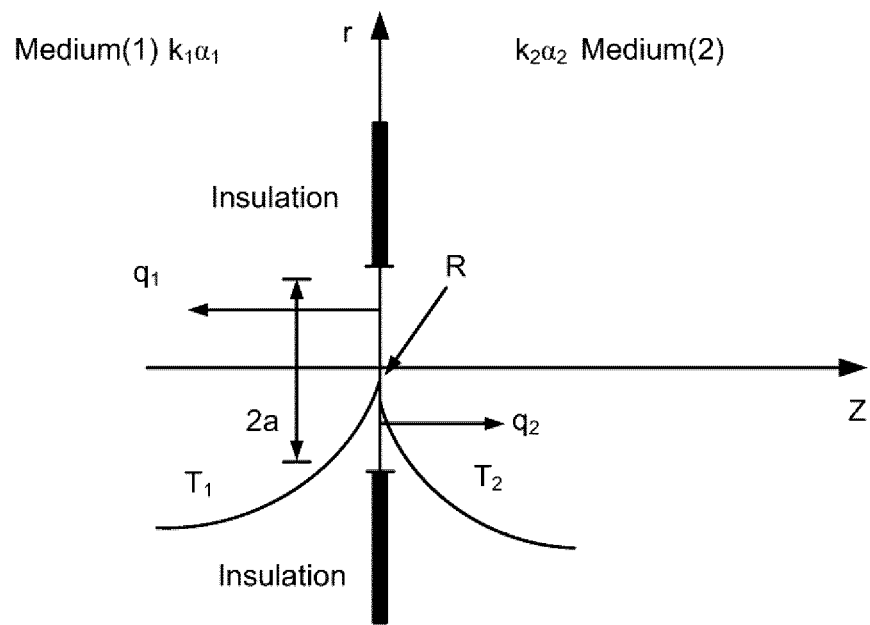
FIG. 18 depicts a setup of two different material samples with a contact resistance between the sensor and one of the material samples.

FIG. 18 depicts the setup of two different material samples with a contact resistance between the sensor and one of the material samples. FIG. 18 describes the case of the 2D circular heat source (CHS) sensor with, a diameter 2a, in between two different isotropic media, with the interface between the CHS sensor and the second medium having a contact resistance R. The CHS sensor is supplied with flux q W/m² continuously. Successive integral transforms, namely Laplace and Hankel are used to simplify the partial differential equations.

Let $T_1(r,z,t)$ be the temperature field in medium 1 and $T_2(r,z,t)$ in medium 2. The heat equations in the two different media and the associated initial and boundary conditions are:

$$\frac{\partial^2 T_1}{\partial r^2} + \frac{1}{r}\frac{\partial T_1}{\partial r} + \frac{\partial^2 T_1}{\partial Z^2} = \frac{1}{\alpha_1}\frac{\partial T_1}{\partial t}; z<0 \quad (87)$$

$$\frac{\partial^2 T_2}{\partial r^2} + \frac{1}{r}\frac{\partial T_2}{\partial r} + \frac{\partial^2 T_2}{\partial Z^2} = \frac{1}{\alpha_1}\frac{\partial T_2}{\partial t}; z>0 \quad (88)$$

$$T_1(r,z,t=0) = \quad (89)$$
$$T_2(r,z,t=0) = 0 \text{ Zero temperature everywhere at } t=0.$$

$$-k_1\frac{\partial T_1}{\partial z}\bigg|_{z=0} = \quad (90)$$

$$\left\{\begin{array}{ll}-q_1(r,t) & 0\leq r<a \\ 0 & r>a\end{array}; t>0\right\} \text{ Flux only in circle area.}$$

$$-k_2\frac{\partial T_2}{\partial z}\bigg|_{z=0} = \left\{\begin{array}{ll}q_2(r,t) & 0\leq r<a \\ 0 & r>a\end{array}; t>0\right\} \quad (91)$$

$$q_1(r,t)+q_2(r,t) = q \text{ The total flux is constant.} \quad (92)$$

$$T_1(r,z=0,t)-T_2(r,z=0,t) = \quad (93)$$
$$Rq_2(r,t) \text{ Contact resistance on side 2.}$$

The solution must converge at r=0, and vanish at r=+∞ and at z=+/−∞.

The equations and initial and boundary conditions are transformed to Laplace domain. The Laplace transform operator, denoted $\mathcal{L}$, is on the time t (t→s). The transformed temperature functions are denoted $\varphi_i(r,z,s)$.

$$\frac{\partial^2 \varphi_1}{\partial r^2} + \frac{1}{r}\frac{\partial^2 \varphi_1}{\partial r} + \frac{\partial^2 \varphi_1}{\partial Z^2} = \frac{s\varphi_1 - T_1(t=0)}{\alpha_1} = \frac{s}{\alpha_1}\varphi_1; \quad (94)$$
$$\varphi_1 = \varphi_1(r,z,s)$$

$$\frac{\partial^2 \varphi_2}{\partial r^2} + \frac{1}{r}\frac{\partial \varphi_2}{\partial r} + \frac{\partial^2 \varphi_2}{\partial Z^2} = \frac{s\varphi_2 - T_2(t=0)}{\alpha_2} = \frac{s}{\alpha_2}\varphi_2; \quad (95)$$
$$\varphi_2 = \varphi_2(r,z,s)$$

$$-k_1\frac{\partial \varphi_1}{\partial Z}\bigg|_{z=0} = \left\{\begin{array}{ll}\mathcal{L}\{-q_1(r,t)\} & 0\leq r<a \\ 0 & r>a\end{array}; t>0\right\} \quad (96)$$

$$-k_2\frac{\partial \varphi_2}{\partial Z}\bigg|_{z=0} = \left\{\begin{array}{ll}\mathcal{L}\{q_2(r,t)\} & 0\leq r<a \\ 0 & r>a\end{array}; t>0\right\} \quad (97)$$

$$\mathcal{L}\{q_1(r,t)\} + \mathcal{L}\{q_2(r,t)\} = q_1(r,s)+q_2(r,s) = q/s \quad (98)$$

$$\varphi_1(r,z=0,s) - \varphi_2(r,z=0,s) = Rq_2(r,s); z=0 \quad (99)$$

Now the Hankel transformation of order 0, denoted $\mathcal{H}_0$, can be applied on the equations and conditions (94) to (99) to obtain equations (100) to (104). The transform is on r (r→λ). The transformed temperature functions in the Laplace-Hankel domain are denoted as $\theta_i(\lambda,z,s)$.

$$-\lambda^2 \theta_1 + \frac{\partial^2 \theta_1}{\partial Z^2} = \frac{s}{\alpha_1} \theta_1 \quad (100)$$

$$\theta_1 = \theta_1(\lambda, z, s)$$

$$\frac{\partial^2 \theta_1}{\partial Z^2} - \left(\frac{s}{\alpha_1} + \lambda^2\right)\theta_1 = 0; \; z < 0$$

$$-\lambda^2 \theta_2 + \frac{\partial^2 \theta_2}{\partial Z^2} = \frac{s}{\alpha_2} \theta_2 \quad (101)$$

$$\theta_2 = \theta_2(\lambda, z, s)$$

$$\frac{\partial^2 \theta_2}{\partial Z^2} - \left(\frac{s}{\alpha_2} + \lambda^2\right)\theta_2 = 0; \; z > 0$$

$$-k_1 \frac{\partial \theta_1}{\partial Z}\bigg|_{z=0} = \mathcal{H}_0\{-q_1(r,s)\} \quad (102)$$

$$-k_2 \frac{\partial \theta_2}{\partial Z}\bigg|_{z=0} = \mathcal{H}_0\{q_2(r,s)\} \quad (103)$$

$$\mathcal{H}_0\{q_1(r,s)\} + \mathcal{H}_0\{q_2(r,s)\} = \mathcal{H}_0\left\{\frac{q}{s}\right\} = \frac{q}{s}\int_0^a r J_0(\lambda r)dr = \frac{aq}{s}\frac{J_1(\lambda a)}{\lambda} \quad (104)$$

Denoting $\mathcal{H}_0\{q_1(r,s)\}=Q_1(\lambda,s)$ and $\mathcal{H}_0\{q_z(r,s)\}=Q_2(\lambda,s)$. Solutions to (100) and (101) are of the form $$\theta_1 + A e^{\sqrt{s/\alpha_1+\lambda^2}\,z} \; z<0 \quad (105)$$

$$\theta_2 = B e^{-\sqrt{s/\alpha_2+\lambda^2}\,z} \; z>0 \quad (106)$$

$$\theta_1(\lambda, z=0, s) - \theta_2(\lambda, z=0, s) = RQ_2(\lambda, s) \text{ at } z=0 \quad (107)$$

The coefficients A and B must be independent of z and are to be found from the boundary conditions. From (102) and (103) it is found:

$$\frac{\partial \theta_1}{\partial Z}\bigg|_{z=0} = \sqrt{\frac{s}{\alpha_1} + \lambda^2} \cdot A \cdot e^{\sqrt{\frac{s}{\alpha_1}+\lambda^2}\cdot 0} = \frac{Q_1(\lambda, s)}{k_1} \quad (108)$$

$$\frac{\partial \theta_2}{\partial Z}\bigg|_{z=0} = -\sqrt{\frac{s}{\alpha_2} + \lambda^2} \cdot B \cdot e^{-\sqrt{\frac{s}{\alpha_2}+\lambda^2}\cdot 0} = -\frac{Q_2(\lambda, s)}{k_2} \quad (109)$$

$$A = \frac{Q_1(\lambda, s)}{k_1} \frac{1}{\sqrt{\frac{s}{\alpha_1}+\lambda^2}} = \frac{Q_1(\lambda, s)}{k_1} \frac{\sqrt{\alpha_1}}{\sqrt{s+\alpha_1\lambda^2}} \quad (110)$$

$$B = \frac{Q_2(\lambda, s)}{k_2} \frac{1}{\sqrt{\frac{s}{\alpha_2}+\lambda^2}} = \frac{Q_2(\lambda, s)}{k_2} \frac{\sqrt{\alpha_2}}{\sqrt{s+\alpha_2\lambda^2}} \quad (111)$$

$$\theta_1 = \frac{Q_1(\lambda, s)}{k_1} \frac{\sqrt{\alpha_1}}{\sqrt{s+\alpha_1\lambda^2}} e^{\sqrt{s+\alpha_1\lambda^2}\cdot\frac{z}{\sqrt{\alpha_1}}}; \; z < 0 \quad (112)$$

$$\theta_2 = \frac{Q_2(\lambda, s)}{k_2} \frac{\sqrt{\alpha_2}}{\sqrt{s+\alpha_2\lambda^2}} e^{-\sqrt{s+\alpha_2\lambda^2}\cdot\frac{z}{\sqrt{\alpha_2}}}; \; z > 0 \quad (113)$$

From (107) at z=0 the following is obtained, $$\frac{Q_1(\lambda, s)}{k_1} \frac{\sqrt{\alpha_1}}{\sqrt{s+\alpha_1\lambda^2}} - \frac{Q_2(\lambda, s)}{k_2} \frac{\sqrt{\alpha_2}}{\sqrt{s+\alpha_2\lambda^2}} = RQ_2(\lambda, s)$$

$$\frac{Q_1(\lambda, s)}{k_1} \frac{\sqrt{\alpha_1}}{\sqrt{s+\alpha_1\lambda^2}} - Q_2(\lambda, s)\left[R + \frac{\sqrt{\alpha_2}}{k_2\sqrt{s+\alpha_2\lambda^2}}\right] = 0$$

$$Q_1(\lambda, s) = Q_2(\lambda, s) \frac{\left(Rk_2\sqrt{s+\alpha_2\lambda^2} + \sqrt{\alpha_2}\right)}{\sqrt{\alpha_1}} \frac{k_1\sqrt{s+\alpha_1\lambda^2}}{k_2\sqrt{s+\alpha_2\lambda^2}}$$

From (104) it is written, $$Q_1(\lambda, s) + Q_2(\lambda, s) = Q_2(\lambda, s)\left[1 + \frac{\left(Rk_2\sqrt{s+\alpha_2\lambda^2} + \sqrt{\alpha_2}\right)}{\sqrt{\alpha_1}} \frac{k_1\sqrt{s+\alpha_1\lambda^2}}{k_2\sqrt{s+\alpha_2\lambda^2}}\right] \quad (114)$$

$$= \frac{aq}{s}\frac{J_1(\lambda a)}{\lambda}$$

$$Q_2(\lambda, s) = \frac{aq}{s}\frac{J_1\lambda a}{\lambda} \frac{k_2\sqrt{\alpha_1}\sqrt{s+\alpha_2\lambda^2}}{k_2\sqrt{\alpha_1}\sqrt{s+\alpha_2\lambda^2} + \left(Rk_2\sqrt{s+\alpha_2\lambda^2} + \sqrt{\alpha_2}\right)k_1\sqrt{s+\alpha_1\lambda^2}}$$

$$Q_1(\lambda, s) = \frac{aq}{s}\frac{J_1(\lambda a)}{\lambda} - Q_2(\lambda, s) \quad (115)$$

$$= \frac{aq}{s}\frac{J_1(\lambda a)}{\lambda}\left[1 - \frac{\left(Rk_2\sqrt{s+\alpha_2\lambda^2} + \sqrt{\alpha_2}\right)}{\sqrt{\alpha_1}}\frac{k_1\sqrt{s+\alpha_1\lambda^2}}{k_2\sqrt{s+\alpha_2\lambda^2}}\right]$$

$$= \frac{aq}{s}\frac{J_1(\lambda a)}{\lambda}$$

$$\frac{k_2\sqrt{\alpha_1}\sqrt{s+\alpha_2\lambda^2} + \left(Rk_2\sqrt{s+\alpha_2\lambda^2} + \sqrt{\alpha_2}\right)k_1\sqrt{s+\alpha_1\lambda^2} - k_2\sqrt{\alpha_1}\sqrt{s+\alpha_2\lambda^2}}{k_2\sqrt{\alpha_1}\sqrt{s+\alpha_2\lambda^2} + \left(Rk_2\sqrt{s+\alpha_2\lambda^2} + \sqrt{\alpha_2}\right)k_1\sqrt{s+\alpha_1\lambda^2}}$$

$$Q_1(\lambda, s) = \frac{aq}{s}\frac{J_1(\lambda a)}{\lambda} \frac{k_1\sqrt{s+\alpha_1\lambda^2}\left(Rk_2\sqrt{s+\alpha_2\lambda^2} + \sqrt{\alpha_2}\right)}{k_2\sqrt{\alpha_1}\sqrt{s+\alpha_2\lambda^2}\left(Rk_2\sqrt{s+\alpha_2\lambda^2} + \sqrt{\alpha_2}\right)k_1\sqrt{s+\alpha_1\lambda^2}} \quad (116)$$

$$A = \frac{Q_1(\lambda, s)}{k_1}\frac{\sqrt{\alpha_1}}{\sqrt{s+\alpha_1\lambda^2}} \quad (117)$$

$$= \frac{aq}{s}\frac{J_1(\lambda a)}{\lambda} \cdot \frac{k_1\sqrt{s+\alpha_1\lambda^2}\left(Rk_2\sqrt{s+\alpha_2\lambda^2} + \sqrt{\alpha_2}\right)}{k_2\sqrt{\alpha_1}\sqrt{s+\alpha_2\lambda^2}\,k_1\sqrt{s+\alpha_1\lambda^2}\left(Rk_2\sqrt{s+\alpha_2\lambda^2} + \sqrt{\alpha_2}\right)}$$

-continued $$B = \frac{Q_2(\lambda, s)}{k_2} \frac{\sqrt{\alpha_2}}{\sqrt{s + \alpha_2 \lambda^2}}$$

$$= \frac{aq}{s} \frac{J_1(\lambda a)}{\lambda} \cdot \frac{\sqrt{\alpha_1 \alpha_2}}{k_2 \sqrt{\alpha_1} \sqrt{s + \alpha_2 \lambda^2} \, k_1 \sqrt{s + \alpha_1 \lambda^2} \left(Rk_2 \sqrt{s + \alpha_2 \lambda^2} + \sqrt{\alpha_2}\right)}$$

(118)

$$\theta_1 = \frac{aq}{s} \frac{J_1(\lambda a)}{\lambda} \cdot \frac{\sqrt{\alpha_1} \left(Rk_2 \sqrt{s + \alpha_2 \lambda^2} + \sqrt{\alpha_2}\right) e^{+\sqrt{s+\alpha_1\lambda^2} \frac{z}{\sqrt{\alpha_1}}}}{k_2 \sqrt{\alpha_1} \sqrt{s + \alpha_2 \lambda^2} \, k_1 \sqrt{s + \alpha_1 \lambda^2} \left(Rk_2 \sqrt{s + \alpha_2 \lambda^2} + \sqrt{\alpha_2}\right)}; \quad z < 0$$

(119)

$$\theta_2 = \frac{aq}{s} \frac{J_1(\lambda a)}{\lambda} \cdot \frac{\sqrt{\alpha_1 \alpha_2} \, e^{-\sqrt{s+\alpha_2\lambda^2} \frac{z}{\sqrt{\alpha_2}}}}{k_2 \sqrt{\alpha_1} \sqrt{s + \alpha_2 \lambda^2} \, k_1 \sqrt{s + \alpha_1 \lambda^2} \left(Rk_2 \sqrt{s + \alpha_2 \lambda^2} + \sqrt{\alpha_2}\right)}; \quad z > 0$$

(120)

Note that if the media 1 and 2 are identical and R=0, then $\theta_1 = \theta_2$ and both are equal to ½ of the solution obtained earlier for a semi-infinite medium with supply of flux q W/m².

The Laplace-Hankel plane can be converted back to Laplace domain.

$$\phi_1 = aq \int_0^\infty \left[ \frac{1}{s} \frac{\sqrt{\alpha_1} \left(Rk_2 \sqrt{s + \alpha_2 \lambda^2} + \sqrt{\alpha_2}\right) e^{+\sqrt{s+\alpha_1\lambda^2} \frac{z}{\sqrt{\alpha_1}}}}{k_2 \sqrt{\alpha_1} \sqrt{s + \alpha_2 \lambda^2} + k_1 \sqrt{s + \alpha_1 \lambda^2} \left(Rk_2 \sqrt{s + \alpha_2 \lambda^2} + \sqrt{\alpha_2}\right)} \right] \frac{J_1(\lambda a)}{\lambda} \lambda J_0(\lambda r) d\lambda$$

(121)

for $z < 0$.

$$\phi_2 = aq \int_0^\infty \left[ \frac{1}{s} \frac{\sqrt{\alpha_1 \alpha_2} \, e^{-\sqrt{s+\alpha_2\lambda^2} \frac{z}{\sqrt{\alpha_2}}}}{k_2 \sqrt{\alpha_1} \sqrt{s + \alpha_2 \lambda^2} + k_1 \sqrt{s + \alpha_1 \lambda^2} \left(Rk_2 \sqrt{s + \alpha_2 \lambda^2} + \sqrt{\alpha_2}\right)} \right] \frac{J_1(\lambda a)}{\lambda} \lambda J_0(\lambda r) d\lambda$$

(122)

for $z > 0$.

The expressions inside the square brackets have to be transformed from Laplace domain back to the time domain to write down the temperature equations. However, the inverse transform of these functions is not straightforward, since there are 2 different variables inside the square roots, and the square root is a double-valued function.

Prior to developing the solution, the expressions in the square brackets are verified that they are valid when the two media are identical, i.e. $\alpha_1=\alpha_2=\alpha$, and $k_1=k_2=k$.

$$\phi_2(r,z,s) = aq \int_0^\infty \left[ \frac{\alpha \cdot e^{-\sqrt{s/\alpha+\lambda^2}\, z}}{s\left[k\alpha\sqrt{s+\alpha\lambda^2}+k\sqrt{\alpha}\sqrt{s+\alpha\lambda^2}\right]} \right] J_1(\lambda a) J_0(\lambda r) d\lambda$$

$$= \frac{aq}{2k} \int_0^\infty \left[ \frac{e^{-\sqrt{s/\alpha+\lambda^2}\, z}}{s \cdot \sqrt{s/\alpha+\lambda^2}} \right] J_1(\lambda a) J_0(\lambda r) d\lambda$$

This is the same result obtained for a semi-infinite plane, divided by 2 to accommodate the case of an infinite plane.

Solution Using the Inversion Theorem

Denoting the functions in the square brackets of (121) and (122) $F_1(\lambda,z,s)$ and $F_2(\lambda,z,s)$ respectively, it is necessary to find the inverse Laplace transform functions $f_1(\lambda,z,t)$ and $f_2(\lambda,z,t)$ in the Hankel domain by the inversion theorem.

where $U_1(s) = \mathcal{L}\{u_1(t)\}$ and $$u_1(t) = \left\{ \begin{array}{ll} 0, & t<0 \\ \sqrt{\alpha_1}, & t>0 \end{array} \right\} \text{ and }$$

$$U_2(t) = \left\{ \begin{array}{ll} 0, & t<0 \\ \sqrt{\alpha_1}\sqrt{\alpha_2}, & t>0 \end{array} \right\}$$

are modified unity functions. By the convolution theorem it is obtained:

$\mathcal{L}\{u_2(t)*\bar{f}_2(\lambda,z,t)\}=U_1(s)\cdot\overline{F}_1(\lambda,z,s)$ and $u_1(t)*\bar{f}_1(\lambda,z,t)=\int_0^t u_1(t-\tau)\bar{f}_1(\lambda,z,\tau)d\tau$ or $t>\tau$ Substituting for $u_1(t)$, the following is obtained $u_1(t)*\bar{f}_1(\lambda,z,t)=\sqrt{\alpha_1}\int_0^t \bar{f}_1(\lambda,z,\tau)d\tau$ for $t>\tau$.

And similarly for $F_2(\lambda,z,s)$.

$\mathcal{L}\mathcal{L}\{u_2(t)*\bar{f}_2(\lambda,z,t)\}=U_2(s)\cdot\overline{F}_2(\lambda,z,s)$ $u_2(t)*\bar{f}_2(\lambda,z,t)=\sqrt{\alpha_1}\sqrt{\alpha_2}\int_0^t \bar{f}_2(\lambda,z,\tau)d\tau$ or $t>\tau$.

$$f_1(\lambda,z,t) = \mathcal{L}^{-1}\{F_1(\lambda,z,s)\}\left\{\frac{1}{s}\frac{\sqrt{\alpha_1}\left(Rk_2\sqrt{s+\alpha_2\lambda^2}+\sqrt{\alpha_2}\right)e^{+\sqrt{s+\alpha_1\lambda^2}\frac{z}{\sqrt{\alpha_1}}}}{k_2\sqrt{\alpha_1}\sqrt{s+\alpha_2\lambda^2}+k_1\sqrt{s+\alpha_1\lambda^2}\left(Rk_2\sqrt{s+\alpha_2\lambda^2}+\sqrt{\alpha_2}\right)}\right\} \quad (123)$$

$$= \frac{1}{2\pi j}\int_{\sigma_1-j\infty}^{\sigma_1+j\infty} e^{st}\cdot\frac{1}{s}\frac{\sqrt{\alpha_1}\left(Rk_2\sqrt{s+\alpha_2\lambda^2}+\sqrt{\alpha_2}\right)e^{+\sqrt{s+\alpha_1\lambda^2}\frac{z}{\sqrt{\alpha_1}}}}{k_2\sqrt{\alpha_1}\sqrt{s+\alpha_2\lambda^2}+k_1\sqrt{s+\alpha_1\lambda^2}\left(Rk_2\sqrt{s+\alpha_2\lambda^2}+\sqrt{\alpha_2}\right)}ds$$

$$= \frac{1}{2\pi j}\int_{\sigma_1-j\infty}^{\sigma_1+j\infty} e^{st}\cdot\frac{\sqrt{\alpha_1}}{s}\overline{F}_1(\lambda,z,s)ds;\, z<0$$

$$f_2(\lambda,z,t) = \mathcal{L}^{-1}\{F_2(\lambda,z,s)\} \quad (124)$$

$$= \mathcal{L}^{-1}\left\{\frac{1}{s}\frac{\sqrt{\alpha_1\alpha_2}\, e^{+\sqrt{s+\alpha_2\lambda^2}\frac{z}{\sqrt{\alpha_2}}}}{k_2\sqrt{\alpha_1}\sqrt{s+\alpha_2\lambda^2}+k_1\sqrt{s+\alpha_1\lambda^2}\left(Rk_2\sqrt{s+\alpha_2\lambda^2}+\sqrt{\alpha_2}\right)}\right\}$$

$$= \frac{1}{2\pi j}\int_{\sigma_1-j\infty}^{\sigma_1+j\infty} e^{st}\cdot\frac{1}{s}\frac{\sqrt{\alpha_1\alpha_2}\, e^{+\sqrt{s+\alpha_2\lambda^2}\frac{z}{\sqrt{\alpha_2}}}}{k_2\sqrt{\alpha_1}\sqrt{s+\alpha_2\lambda^2}+k_1\sqrt{s+\alpha_1\lambda^2}\left(Rk_2\sqrt{s+\alpha_2\lambda^2}+\sqrt{\alpha_2}\right)}ds$$

$$\frac{1}{2\pi j}\int_{\sigma_1-j\infty}^{\sigma_1+j\infty} e^{st}\cdot\frac{\sqrt{\alpha_1}\sqrt{\alpha_2}}{s}\overline{F}_2(\lambda,z,s)ds;\, z>0$$

Where $F_1(\lambda,z,s) = \frac{\sqrt{\alpha_1}}{\sigma}\overline{F}_1(\lambda,z,s) = U_1(s)\cdot\overline{F}_1(\lambda,z,s)$, $F_2(\lambda,z,s) = \frac{\sqrt{\alpha_1}\sqrt{\alpha_2}}{\sigma}\overline{F}_2(\lambda,z,s) = U_2(s)\cdot\overline{F}_2(\lambda,z,s)$, and $\sigma_1$ is the abscissa of convergence.

Firstly, the inverse transform of $\overline{F}_1(\lambda,z,s)$ and $\overline{F}_2(\lambda,z,s)$, $\bar{f}_1(\lambda,z,t)$ and $\bar{f}_2(\lambda,z,t)$ respectively, are found and then the convolution theorem is used to convolve with the inverse transform of the second parts of $F_1(\lambda,z,s)$ and $F_2(\lambda,z,s)$, i.e.

$$U_1(s) = \frac{\sqrt{\alpha_1}}{s} \text{ and } U_2(s) = \frac{\sqrt{\alpha_1}\sqrt{\alpha_2}}{s},$$

Defining:

$$b_1 \equiv a_1\lambda^2;\, b_2 \equiv a_2\lambda^2;\, z_1 \equiv \frac{z}{\sqrt{\alpha_1}};\, z_2 \equiv \frac{z}{\sqrt{\alpha_2}}$$

The Laplace-Hankel functions at hand, $\overline{F}_1(\lambda,z,s)$ and $\overline{F}_2(\lambda,z,s)$, are not analytic, but rather double-valued in the complex plane because of the square roots. They have 2 branch points at $s=-b_1$ and $s=-b_2$.

To carry out the integration in the complex plane the Henrici-like contour is used, except that the branch points $s=-b_1$ and $s=-b_2$ are excluded. Therefore, a contour of integration is chosen as shown in FIG. 11, and notice that the functions $F_1(\lambda,z,s)$ and $F_2(\lambda,z,s)$ have no poles inside the contour of integration.

The following identities are used, $$e^{j\pi} = -1;$$
$$e^{-j\pi} = -1;$$
$$e^{j\frac{\pi}{2}} = j;$$
$$e^{-j\frac{\pi}{2}} = -j;$$
$$e^{j2\pi} = 1;$$
$$e^{-j2\pi} = 1$$
(125)

And the following can be arbitrarily set, $$\alpha_2 > b_2 \Rightarrow b_2 > b_1 > 0. \tag{126}$$

According to Cauchy's theorem, the sum of all the line integrals in FIG. 11 is 0, since there are no poles inside the contour.

$$\frac{1}{2\pi j}\int_{\sigma_1-j\infty}^{\sigma_1+j\infty} e^{st}\overline{F_2}(\lambda,z,s)ds + \tag{127}$$

$$\int_{BC} + \int_{CD} + \int_{\Gamma_1} + \int_{r_1} + \int_{\Gamma_2} + \int_{r_2} + \int_{\Gamma_3} + \int_{\Gamma_4} + \int_{EF} + \int_{FA} = 0$$

It can be shown that the integral of the small circles $r_1$ and $r_2$ and the large circles vanish as $r_i$ tends to 0 and R tends to $\infty$. Therefore, the remaining integrals are on $\Gamma_1$, $\Gamma_2$, $\Gamma_3$, and $\Gamma_4$. These integrals are denoted $I_1$, $I_2$, $I_3$, and $I_4$ respectively, and (127) becomes $$\frac{1}{2\pi j}\int_{\sigma_1-j\infty}^{\sigma_1+j\infty} e^{st}\overline{F_2}(\lambda,z,s)ds = -\left[\int_{\Gamma_1} + \int_{\Gamma_2} + \int_{\Gamma_3} + \int_{\Gamma_4}\right] \tag{128}$$

Upper Branch of FIG. 11

The integration of $F_2(\lambda,z,s)$ starts in the upper branch of FIG. 11. There are 2 parts, one is the line where s varies from $-\infty$ to $-b_2$, and the other from $-b_2$ to $-b_1$. Let $$s=\sigma e^{j\pi}=-\sigma; ds=-d\sigma; \sigma>0. \tag{129}$$

In the first part of the upper branch cut there is:

$$s: -\infty \to -b_2; \Rightarrow \sigma: \infty \to b_2; b_2 < \sigma < \infty \tag{130}$$

$$\sqrt{s+b_2} = \sqrt{\sigma e^{j\pi} + b_2} \tag{131}$$
$$= \sqrt{\sigma e^{j\pi} - b_2 e^{j\pi}}$$
$$= e^{j\frac{\pi}{2}}\sqrt{\sigma - b_2}$$
$$= j\sqrt{\sigma - b_2}$$

$$\sqrt{s+b_1} = \sqrt{\sigma e^{j\pi} + b_1} \tag{132}$$
$$= \sqrt{\sigma e^{j\pi} - b_1 e^{j\pi}}$$
$$= e^{j\frac{\pi}{2}}\sqrt{\sigma - b_1}$$
$$= j\sqrt{\sigma - b_1}$$

In the second part of the upper branch cut there is:

$$s: -b_2 \to -b_1; \Rightarrow \sigma: b_2 \to b_1; b_1 < \sigma < b_2 \tag{133}$$

$$\sqrt{s+b_2} = \sqrt{b_2 - \sigma} \tag{134}$$

$$\sqrt{s+b_1} = j\sqrt{\sigma - b_1} \tag{135}$$

We now calculate the integrals $I_1$ and $I_2$.

$$I_1 = \frac{1}{2\pi j}\int_{-\infty}^{-b_2} \frac{e^{st}e^{-z_2\sqrt{s+b_2}}}{k_2\sqrt{\alpha_1}\sqrt{s+b_2} + k_1\sqrt{s+b_1}(Rk_2\sqrt{s+b_2} + \sqrt{\alpha_2})}ds \tag{136}$$

$$= \frac{1}{2\pi j}\int_{+\infty}^{+b_2} \frac{e^{-\sigma t}e^{-jz_2\sqrt{\sigma-b_2}}}{k_2\sqrt{\alpha_1}\,j\sqrt{\sigma-b_2} + k_1 j\sqrt{\sigma-b_1}(Rk_2 j\sqrt{\sigma-b_2} + \sqrt{\alpha_2})}d(-\sigma)$$

$$= \frac{1}{2\pi}\int_{+b_2}^{+\infty} \frac{e^{-\sigma t}e^{-jz_2\sqrt{\sigma-b_2}}}{[k_2\sqrt{\alpha_1}\sqrt{\sigma-b_2} + k_1\sqrt{\alpha_2}\sqrt{\sigma-b_1}] + jRk_1k_2\sqrt{\sigma-b_1}\sqrt{\sigma-b_2}}d\sigma$$

while changing the sign and flipping the integral limits.

$$I_2 = \frac{1}{2\pi j}\int_{-b_2}^{-b_1} \frac{e^{st}e^{-z_2\sqrt{s+b_2}}}{k_2\sqrt{\alpha_1}\sqrt{s+b_2} + k_1\sqrt{s+b_1}(Rk_2\sqrt{s+b_2} + \sqrt{a_2})}ds \tag{137}$$

$$= \frac{1}{2\pi j}\int_{b_2}^{b_1} \frac{e^{-\sigma t}e^{-z_2(\sqrt{b_2-\sigma})}}{k_2\sqrt{\alpha_1}\sqrt{b_2-\sigma} + k_1 j\sqrt{\sigma-b_1}(Rk_2\sqrt{b_2-\sigma} + \sqrt{a_2})}d(-\sigma)$$

$$= \frac{1}{2\pi j}\int_{b_1}^{b_2} \frac{e^{-\sigma t}e^{-z_2\sqrt{b_2-\sigma}}}{k_2\sqrt{\alpha_1}\sqrt{b_2-\sigma} + jk_1\sqrt{\sigma-b_1}(Rk_2\sqrt{b_2-\sigma} + \sqrt{a_2})}d\sigma$$

while changing the sign and flipping the integral limits.

Lower Branch of FIG. 11

In the lower branch cut there are also 2 sections, one is the line where s varies from $-b_1$ to $-b_2$ and from $-b_2$ to $-\infty$. Here, s is written as:

$$s=\sigma e^{-j\pi}=-\sigma; ds=-d\sigma; \sigma>0. \tag{138}$$

Note: In the lower branch s can also be represented as $s=-\sigma e^{j2\pi}$ with same results.

In the first part of the lower branch cut there is $$s: -b_1 \to -b_2; \Rightarrow \sigma: b_1 \to b_2; b_1 < \sigma < b_2 \tag{139}$$

$$\sqrt{s+b_1} = \sqrt{\sigma e^{-j\pi} + b_1} \tag{140}$$
$$= \sqrt{\sigma e^{-j\pi} - b_1 e^{-j\pi}}$$
$$= e^{-j\frac{\pi}{2}}\sqrt{\sigma - b_1}$$
$$= -j\sqrt{\sigma - b_1}$$

$$\sqrt{s+b_2} = \sqrt{b_2 - \sigma} \tag{141}$$

In the second part of the lower branch cut $$s: -b_2 \to -\infty; \Rightarrow \sigma: b_2 \to \infty; b_2 < \sigma < \infty; \Rightarrow \sigma > b_1 \tag{142}$$

-continued $$\sqrt{s+b_1} = \sqrt{\sigma e^{-j\pi} + b_1}$$
$$= \sqrt{\sigma e^{-j\pi} - b_1 e^{-j\pi}}$$
$$= e^{-j\frac{\pi}{2}}\sqrt{\sigma - b_1}$$
$$= -j\sqrt{\sigma - b_1}$$
(143)

$$\sqrt{s+b_2} = \sqrt{\sigma e^{-j\pi} + b_2}$$
$$= \sqrt{\sigma e^{-j\pi} - b_2 e^{-j\pi}}$$
$$= e^{-j\frac{\pi}{2}}\sqrt{\sigma - b_1}$$
$$= -j\sqrt{\sigma - b_2}$$
(144)

$$I_3 = \frac{1}{2\pi j}\int_{-b_1}^{-b_2}\frac{e^{st}e^{-z_2\sqrt{s+b_2}}}{k_2\sqrt{\alpha_1}\sqrt{s+b_2} + k_1\sqrt{s+b_1}\left(Rk_2\sqrt{s+b_2} + \sqrt{\alpha_2}\right)}ds$$

$$= \frac{1}{2\pi j}\int_{b_1}^{b_2}\frac{e^{-\sigma t}e^{2(+\sqrt{b_2-\sigma})}}{k_2\sqrt{\alpha_1}\sqrt{b_2-\sigma} + k_1(-j)\sqrt{\sigma - b_1}\left(Rk_2\sqrt{b_2-\sigma} + \sqrt{a_2}\right)}d(-\sigma)$$

$$= -\frac{1}{2\pi j}\int_{b_1}^{b_2}\frac{e^{-\sigma t}e^{-z_2\sqrt{b_2-\sigma}}}{k_2\sqrt{\alpha_1}\sqrt{b_2-\sigma} - jk_1\sqrt{\sigma - b_1}\left[Rk_2\sqrt{b_2-\sigma} + \sqrt{\alpha_2}\right]}d\sigma$$

$$I_4 = \frac{1}{2\pi j}\int_{-b_2}^{-\infty}\frac{e^{st}e^{-z_2\sqrt{s+b_2}}}{k_2\sqrt{\alpha_1}\sqrt{s+b_2} + k_1\sqrt{s+b_1}\left(Rk_2\sqrt{s+b_2} + \sqrt{\alpha_2}\right)}ds$$
(146)

$$= \frac{1}{2\pi j}\int_{b_2}^{\infty}\frac{e^{-\sigma t}e^{-z_2(-j\sqrt{\sigma-b_2})}}{k_2\sqrt{\alpha_1}(-j)\sqrt{\sigma-b_2} + k_1(-j)\sqrt{\sigma-b_1}\left(Rk_2(-j)\sqrt{\sigma-b_2} + \sqrt{a_2}\right)}d(-\sigma)$$

$$= -\frac{1}{2\pi}\int_{b_2}^{\infty}\frac{e^{-\sigma t}e^{jz_2\sqrt{\sigma-b_2}}}{\left[k_2\sqrt{\alpha_1}\sqrt{\sigma-b_2} + k_1\sqrt{\alpha_2}\sqrt{\sigma-b_1}\right] - jRk_1k_2\sqrt{\sigma-b_1}\sqrt{\sigma-b_2}}d\sigma$$

Now add $I_1+I_4$ and $I_2+I_3$.

$$I_1 + I_4 = -\frac{1}{\pi}\int_{b_2}^{\infty}\frac{e^{-\sigma t}\left[k_2\sqrt{\alpha_1}\sqrt{\sigma-b_2} + k_1\sqrt{\alpha_2}\sqrt{\sigma-b_1}\right]\cos(z_2\sqrt{\sigma-b_2})}{\left(k_2\sqrt{\alpha_1}\sqrt{\sigma-b_2} + k_1\sqrt{\alpha_2}\sqrt{\sigma-b_1}\right)^2 + R^2k_1^2k_2^2(\sigma-b_1)(\sigma-b_2)}d\sigma + \frac{1}{\pi}$$

$$\int_{b_2}^{\infty}\frac{e^{-\sigma t}Rk_1k_2\sqrt{\sigma-b_1}\sqrt{\sigma-b_2}\sin(z_2\sqrt{\sigma-b_2})}{\left(k_2\sqrt{a_1}\sqrt{\sigma-b_2} + k_1\sqrt{\alpha_2}\sqrt{\sigma-b_1}\right)^2 + k_1^2k_2^2R^2(\sigma-b_1)(\sigma-b_2)}d\sigma$$

$$I_2 + I_3 = \frac{1}{2\pi j}\int_{b_1}^{b_2}\frac{e^{-\sigma t}e^{-z_2\sqrt{b_2-\sigma}}(-2j)k_1\sqrt{\sigma-b_1}\left[Rk_2\sqrt{b_2-\sigma} + \sqrt{\alpha_2}\right]}{k_2^2 a_1(b_2-\sigma) + k_1^2(\sigma-b_1)\left[Rk_2\sqrt{b_2-\sigma} + \sqrt{\alpha_2}\right]^2}d\sigma$$

$$= -\frac{1}{\pi}\int_{b_1}^{b_2}\frac{e^{-\sigma t}e^{-z_2\sqrt{b_2-\sigma}}k_1\sqrt{\sigma-b_1}\left[Rk_2\sqrt{b_2-\sigma} + \sqrt{\alpha_2}\right]}{k_2^2\alpha_1(b_2-\sigma) + k_1^2(\sigma-b_1)\left[(Rk)_2\sqrt{b_2-\sigma} + \sqrt{\alpha_2}\right]^2}d\sigma$$

The sum of all the integrals of the contour must be zero because there are no poles inside the contour, according to Cauchy's theorem.

$$f_2(\lambda, z, t) = \frac{1}{2\pi j}\int_{\sigma_1-\infty}^{\sigma_1+j\infty}e^{st}F_2(\lambda, z, s)ds$$

$$= -\int_0^t \sqrt{a_1}\sqrt{a_2}\,(I_1+I_2+I_3+I_4)d\tau$$

$$= \frac{\sqrt{a_1\alpha_2}}{\pi}\int_0^t\Bigg\{\int_{b_2}^{\infty}\frac{e^{-\sigma t}\left[k_2\sqrt{\alpha_1}\sqrt{\sigma-b_2} + k_1\sqrt{\alpha_2}\sqrt{\sigma-b_1}\right]\cos(z_2\sqrt{\sigma-b_2})}{\left(k_2\sqrt{\alpha_1}\sqrt{\sigma-b_2} + k_1\sqrt{\alpha_2}\sqrt{\sigma-b_1}\right)^2 + k_1^2k_2^2R^2(\sigma-b_1)(\sigma-b_2)}d\sigma -$$

$$\int_{b_2}^{\infty}\frac{e^{-\sigma t}k_1k_2R\sqrt{\sigma-b_1}\sqrt{\sigma-b_2}\sin(z_2\sqrt{\sigma-b_2})}{\left(k_2\sqrt{\alpha_1}\sqrt{\sigma-b_2} + k_1\sqrt{\alpha_2}\sqrt{\sigma-b_1}\right)^2 + k_1^2k_2^2R^2(\sigma-b_1)(\sigma-b_2)}d\sigma +$$

$$\int_{b_1}^{b_2}\frac{e^{-\sigma t}e^{-z_2\sqrt{b_2-\sigma}}k_1\sqrt{\sigma-b_1}\left[Rk_2\sqrt{b_2-\sigma} + \sqrt{\alpha_2}\right]}{k_2^2\alpha_1(b_2-\sigma) + k_1^2(\sigma-b_1)\left[Rk_2\sqrt{b_2-\sigma} + \sqrt{\alpha_2}\right]^2}d\sigma\Bigg\}d\tau$$

Converting the equation from Hankel plane to the time domain will give the desired temperature field.

$T_2(r,z,t) = aq\int_0^\infty [f_2(\lambda,z,t)] J_1(\lambda a) J_0(\lambda r) d\lambda$ The temperature in the time domain, after changing the order of integration and integrating over $\tau$ is:

$$T_2(r, z, t) = \frac{aq\sqrt{\alpha_1 \alpha_2}}{\pi} \int_0^\infty \tag{147}$$

$$\left\{ \int_{b_2}^\infty \frac{1 - e^{-\sigma t}}{\sigma} \frac{[k_2\sqrt{\alpha_1}\sqrt{\sigma - b_2} + k_1\sqrt{\alpha_2}\sqrt{\sigma - b_1}]\cos(z_2\sqrt{\sigma - b_2})}{(k_2\sqrt{\alpha_1}\sqrt{\sigma - b_2} + k_1\sqrt{\alpha_2}\sqrt{\sigma - b_1})^2 + k_1^2 k_2^2 R^2 (\sigma - b_1)(\sigma - b_2)} d\sigma \right\}$$

$J_1(\lambda a) J_0(\lambda r) d\lambda -$ $\frac{aq k_1 k_2 R \sqrt{\alpha_1 \alpha_2}}{\pi} \int_0^\infty$ $$\left\{ \int_{b_2}^\infty \frac{1 - e^{-\sigma t}}{\sigma} \frac{\sqrt{\sigma - b_1}\sqrt{\sigma - b_2}\sin(z_2\sqrt{\sigma - b_2})}{(k_2\sqrt{\alpha_1}\sqrt{\sigma - b_2} + k_1\sqrt{\alpha_2}\sqrt{\sigma - b_1})^2 + k_1^2 k_2^2 R^2 (\sigma - b_1)(\sigma - b_2)} d\sigma \right\}$$

$J_1(\lambda a) J_0(\lambda r) d\lambda +$ $\frac{aq k_1 \sqrt{\alpha_1 \alpha_2}}{\pi} \int_0^\infty$ $$\left\{ \int_{b_1}^{b_2} \frac{1 - e^{-\sigma t}}{\sigma} \frac{e^{-z_2\sqrt{b_2 - \sigma}}\sqrt{\sigma - b_1}[Rk_2\sqrt{b_2 - \sigma} + \sqrt{\alpha_2}]}{k_2^2 \alpha_1 (b_2 - \sigma) + k_1^2(\sigma - b_1)[Rk_2\sqrt{b_2 - \sigma} + \sqrt{a_2}]^2} d\sigma \right\}$$

$J_1(\lambda a) J_0(\lambda r) d\lambda;$ $z_2 > 0$

It can be verified that this solution reverts to the known solution with two different media when R=0. The second integral vanishes because of the coefficient R=0, and the temperature field becomes:

$$T_2(r, z, t) = \frac{aq\sqrt{\alpha_1 \alpha_2}}{\pi} \int_0^\infty \int_{b_2}^\infty \frac{1 - e^{-\sigma t}}{\sigma} \tag{148}$$

$\frac{[k_2\sqrt{\alpha_1}\sqrt{\sigma - b_2} + k_1\sqrt{\alpha_2}\sqrt{\sigma - b_1}]\cos(z_2\sqrt{\sigma - b_2})}{(k_2\sqrt{\alpha_1}\sqrt{\sigma - b_2} + k_1\sqrt{\alpha_2}\sqrt{\sigma - b_1})^2 + k_1^2 k_2^2 (0)^2 (\sigma - b_1)(\sigma - b_2)}$ $d\sigma J_1(\lambda a) J_0(\lambda r) d\lambda +$ $\frac{aq k_1 \sqrt{\alpha_1 \alpha_2}}{\pi} \int_0^\infty \int_{b_1}^{b_2} \frac{1 - e^{-\sigma t}}{\sigma}$ $\frac{e^{-z_2\sqrt{b_2 - \sigma}}\sqrt{\sigma - b_1}[(0)k_2\sqrt{b_2 - \sigma} + \sqrt{\alpha_2}]}{k_2^2 \alpha_1 (b_2 - \sigma) + k_1^2(\sigma - b_1)[(0)k_2\sqrt{b_2 - \sigma} + \sqrt{\alpha_2}]^2} d\sigma J_1(\lambda a) J_0(\lambda r) d\lambda$ $= \frac{aq\sqrt{\alpha_1 \alpha_2}}{\pi} \int_0^\infty \int_{b_2}^\infty \frac{1 - e^{-\sigma t}}{\sigma}$ $\frac{[k_2\sqrt{a_1}\sqrt{\sigma - b_2} + k_1\sqrt{\alpha_2}\sqrt{\sigma - b_1}]\cos(z_2\sqrt{\sigma - b_2})}{(k_2\sqrt{a_1}\sqrt{\sigma - b_2} + k_1\sqrt{\alpha_2}\sqrt{\sigma - b_1})^2} d\sigma J_1(\lambda a) J_0(\lambda r) d\lambda +$ $\frac{aq k_1 \sqrt{a_1} \alpha_2}{\pi} \int_0^\infty \int_{b_1}^{b_2} \frac{1 - e^{-\sigma t}}{\sigma} \frac{e^{-z_2\sqrt{b_2 - \sigma}}\sqrt{\sigma - b_1}}{k_2^2 \alpha_1 (b_2 - \sigma) + k_1^2(\sigma - b_1)[\sqrt{\alpha_2}]^2}$ $d\sigma J_1(\lambda a) J_0(\lambda r) d\lambda$ $$= \frac{aq\sqrt{\alpha_1\alpha_2}}{\pi}\int_0^\infty \left\{\int_{b_2}^\infty \frac{1-e^{-\sigma t}}{\sigma}\frac{\cos(z_2\sqrt{\sigma-b_2})}{k_2\sqrt{\alpha_1}\sqrt{\sigma-b_2}+k_1\sqrt{\alpha_2}\sqrt{\sigma-b_1}}d\sigma\right\}$$
$$J_1(\lambda a)J_0(\lambda r)d\lambda +$$
$$\frac{aqk_1\sqrt{\alpha_1}\,\alpha_2}{\pi}\int_0^\infty\left\{\int_{b_1}^{b_2}\frac{1-e^{-\sigma t}}{\sigma}\frac{e^{-z_2\sqrt{b_2-\sigma}}\sqrt{\sigma-b_1}}{k_2^2\alpha_1(b_2-\sigma)+k_1^2(\sigma-b_1)\alpha_2}d\sigma\right\}$$
$$J_1(\lambda a)J_0(\lambda r)d\lambda$$

$z_2 > 0; R = 0$

Let $x = \sqrt{\sigma-b_2}$; $\sigma = x^2+b_2$; $\sqrt{\sigma-b_1} = \sqrt{x^2+b_2-b_1}$; (149)
$d\sigma = 2xdx$ for the first integral. As $\sigma: b_2 \to \infty; \Rightarrow x: 0 \to \infty$.
Let $y = \sqrt{\sigma-b_1}$; $\sigma = y^2+b_1$; $\sqrt{b_2-\sigma} = \sqrt{b_2-y^2-b_1}$;
$d\sigma = 2ydy$ for the second integral. As $\sigma: b_1 \to b_2; \Rightarrow y: 0 \to \sqrt{b_2-b_1}$.

$$T_2(r,z,t) = \frac{2aq\sqrt{\alpha_1\alpha_2}}{\pi}\int_0^\infty\int_{b_2}^\infty \qquad (150)$$

$$\frac{1-e^{-(x^2+b_2)t}}{x^2+b_2}\frac{x\cos(z_2 x)}{k_2\sqrt{\alpha_1}\,x+k_1\sqrt{\alpha_2}\sqrt{x^2+b_2-b_1}}dx J_1(\lambda a)J_0(\lambda r)d\lambda +$$

$$\frac{2aqk_1 a_2\sqrt{\alpha_1}}{\pi}\int_0^\infty\int_{b_1}^{b_2}$$

$$\frac{1-e^{-(y^2+b_1)t}}{y^2+b_1}\frac{y^2 e^{-z_2\sqrt{b_2-\sigma}}}{k_2^2\alpha_1(b_2-y^2-b_1)+k_1^2 y^2\alpha_2}dy J_1(\lambda a)J_0(\lambda r)d\lambda$$

This is the solution of CHS embedded between two different media with no contact resistance we have obtained before (see (71)), thus confirming the validity of (147).

The procedure for the inverse transform can be applied to $\overline{F}_1(\lambda,z,s)$. Expressions (129) to (135) and (138) to (145) are equally applicable here.

$$\frac{1}{2\pi j}\int_{\sigma_1-j\infty}^{\sigma_1+j\infty}e^{st}\cdot\frac{\sqrt{\alpha_1}}{s}\overline{F}_1(\lambda,z,s)ds = -\left[\int_{\Gamma_1}+\int_{\Gamma_2}+\int_{\Gamma_3}+\int_{\Gamma_4}\right] \qquad (151)$$

$$I_1 = \frac{1}{2\pi j}\int_{-\infty}^{-b_2}\frac{(Rk_2\sqrt{s+b_2}+\sqrt{a_2})e^{st}e^{z_1\sqrt{s+b_1}}}{k_1\sqrt{s+b_1}(Rk_2\sqrt{s+b_2}+\sqrt{\alpha_2})+k_2\sqrt{\alpha_1}\sqrt{s+b_2}}ds \qquad (152)$$

$$= \frac{1}{2\pi j}\int_{+\infty}^{+b_2}$$

$$\frac{e^{-\sigma t}(Rk_2 j\sqrt{\sigma-b_2}+\sqrt{a_2})e^{jz_1\sqrt{\sigma-b_1}}}{k_1(j\sqrt{\sigma-b_1})(Rk_2 j\sqrt{\sigma-b_2}+\sqrt{\alpha_2})+k_2\sqrt{\alpha_1}(j\sqrt{\sigma-b_2})}d(-\sigma)$$

$$= -\frac{1}{2\pi}\int_{b_2}^\infty$$

$$\frac{(jRk_2\sqrt{\sigma-b_2}+\sqrt{\alpha_2})e^{-\sigma t}e^{jz_1\sqrt{\sigma-b_1}}}{jk_1 k_2 R\sqrt{\sigma-b_1}\sqrt{\sigma-b_2}+[k_2\sqrt{\alpha_1}\sqrt{\sigma-b_2}+k_1\sqrt{\alpha_2}\sqrt{\sigma-b_1}]}$$

$d\sigma;\ z_1 < 0$ while changing the sign and flipping the integral limits.

$$I_2 = \frac{1}{2\pi j}\int_{-b_2}^{-b_1} \frac{(Rk_2\sqrt{s+b_2}+\sqrt{\alpha_2})e^{st}e^{z_1\sqrt{s+b_1}}}{k_1\sqrt{s+b_1}(Rk_2\sqrt{s+b_2}+\sqrt{\alpha_2})+k_2\sqrt{\alpha_1}\sqrt{s+b_2}}ds \quad (153)$$

$$= \frac{1}{2\pi j}\int_{b_2}^{b_1} \frac{e^{-\sigma t}(Rk_2\sqrt{b_2-\sigma}+\sqrt{\alpha_2})e^{jz_1\sqrt{\sigma-b_1}}}{k_1(j\sqrt{\sigma-b_1})(Rk_2\sqrt{b_2-\sigma}+\sqrt{\alpha_2})+k_2\sqrt{\alpha_1}(\sqrt{b_2-\sigma})}$$

$$d(-\sigma)$$

$$= \frac{1}{2\pi j}\int_{b_1}^{b_2} \frac{(Rk_2\sqrt{\sigma-b_2}+\sqrt{\alpha_2})e^{-\sigma t}e^{jz_1\sqrt{\sigma-b_1}}}{jk_1(\sqrt{\sigma-b_1})(Rk_2\sqrt{b_2-\sigma}+\sqrt{\alpha_2})+k_2\sqrt{\alpha_1}(\sqrt{b_2-\sigma})}d\sigma;\ z_1<0$$

while changing the sign and flipping the integral limits.

$$I_3 = \frac{1}{2\pi j}\int_{-b_1}^{-b_2} \frac{(Rk_2\sqrt{s+b_2}+\sqrt{\alpha_2})e^{st}e^{z_1\sqrt{s+b_1}}}{k_1\sqrt{s+b_1}(Rk_2\sqrt{s+b_2}+\sqrt{\alpha_2})+k_2\sqrt{\alpha_1}\sqrt{s+b_2}}ds \quad (154)$$

$$= \frac{1}{2\pi j}\int_{b_1}^{b_2} \frac{e^{-\sigma t}(Rk_2\sqrt{b_2-\sigma}+\sqrt{\alpha_2})e^{-jz_1\sqrt{\sigma-b_1}}}{k_1(-j\sqrt{\sigma-b_1})(Rk_2\sqrt{b_2-\sigma}+\sqrt{\alpha_2})+k_2\sqrt{\alpha_1}(\sqrt{b_2-\sigma})}$$

$$d(-\sigma)$$

$$= -\frac{1}{2\pi j}\int_{b_1}^{b_2} \frac{(Rk_2\sqrt{\sigma-b_2}+\sqrt{\alpha_2})e^{-\sigma t}e^{-jz_1\sqrt{\sigma-b_1}}}{-jk_1(\sqrt{\sigma-b_1})(Rk_2\sqrt{b_2-\sigma}+\sqrt{\alpha_2})+k_2\sqrt{\alpha_1}(\sqrt{b_2-\sigma})}d\sigma;\ z_1<0$$

$$I_4 = \frac{1}{2\pi j}\int_{-b_2}^{-\infty} \frac{(Rk_2\sqrt{s+b_2}+\sqrt{\alpha_2})e^{st}e^{z_1\sqrt{s+b_1}}}{k_1\sqrt{s+b_1}(Rk_2\sqrt{s+b_2}+\sqrt{\alpha_2})+k_2\sqrt{\alpha_1}\sqrt{s+b_2}}ds \quad (155)$$

$$= \frac{1}{2\pi j}\int_{b_2}^{\infty}$$

$$\frac{e^{-\sigma t}(Rk_2(-j)\sqrt{\sigma-b_2}+\sqrt{\alpha_2})e^{-jz_1\sqrt{\sigma-b_1}}}{k_1(-j\sqrt{\sigma-b_1})(Rk_2(-j)\sqrt{\sigma-b_2}+\sqrt{\alpha_2})+k_2\sqrt{\alpha_1}(-j\sqrt{\sigma-b_2})}d(-\sigma)$$

$$= -\frac{1}{2\pi}\int_{b_2}^{\infty}$$

$$\frac{(-jRk_2\sqrt{\sigma-b_2}+\sqrt{\alpha_2})e^{-\sigma t}e^{-jz_1\sqrt{\sigma-b_1}}}{-jk_1k_2R\sqrt{\sigma-b_1}\sqrt{\sigma-b_2}+[k_2\sqrt{\alpha_1}\sqrt{\sigma-b_2}+k_1\sqrt{\alpha_2}\sqrt{\sigma-b_1}]}d\sigma;\ z_1<0$$

Now add $I_1+I_4$ and $I_2+I_3$.

$$I_1 + I_4 = -\frac{1}{2\pi}\int_{b_2}^{\infty} \left[\frac{\begin{array}{c}(jRk_2\sqrt{\sigma-b_2}+\sqrt{\alpha_2})\\(-jk_1k_2R\sqrt{\sigma-b_1}\sqrt{\sigma-b_2}+\\ [k_2\sqrt{\alpha_1}\sqrt{\sigma-b_2}+k_1\sqrt{\alpha_2}\sqrt{\sigma-b_1}])\end{array}}{\begin{array}{c}e^{-\sigma t}e^{jz_1\sqrt{\sigma-b_1}}+\\ k_1^2k_2^2R^2(\sigma-b_1)(\sigma-b_2)+\\ [k_2\sqrt{\alpha_1}\sqrt{\sigma-b_2}+k_1\sqrt{\alpha_2}\sqrt{\sigma-b_1}]^2\end{array}}d\sigma\right.$$

$$\left.+\int_{b_2}^{\infty}\frac{\begin{array}{c}(-jRk_2\sqrt{\sigma-b_2}+\sqrt{\alpha_2})\\(jk_1k_2R\sqrt{\sigma-b_1}\sqrt{\sigma-b_2}+\\ [k_2\sqrt{\alpha_1}\sqrt{\sigma-b_2}+k_1\sqrt{\alpha_2}\sqrt{\sigma-b_1}])\end{array}}{\begin{array}{c}e^{-\sigma t}e^{-jz_1\sqrt{\sigma-b_1}}+\\ k_1^2k_2^2R^2(\sigma-b_1)(\sigma-b_2)+\\ [k_2\sqrt{\alpha_1}\sqrt{\sigma-b_2}+k_1\sqrt{\alpha_2}\sqrt{\sigma-b_1}]^2\end{array}}d\sigma\right]$$

It is possible to start to simplify the fractions inside the integrals:

$$\frac{\begin{array}{c}[R^2k_1k_2^2\sqrt{\sigma-b_1}(\sigma-b_2)+\\ \sqrt{\alpha_2}(k_2\sqrt{\alpha_1}\sqrt{\sigma-b_2}+k_1\sqrt{\alpha_2}\sqrt{\sigma-b_1})+\\ jRk_2^2\sqrt{\alpha_1}(\sigma-b_2)+V1]e^{-\sigma t}e^{\mp jz_1\sqrt{\sigma-b_1}}\end{array}}{k_1^2k_2^2R^2(\sigma-b_1)(\sigma-b_2)+[k_2\sqrt{\alpha_1}\sqrt{\sigma-b_2}+k_1\sqrt{\alpha_2}\sqrt{\sigma-b_1}]^2}+$$

$$\frac{\begin{array}{c}[R^2k_1k_2^2\sqrt{\sigma-b_1}(\sigma-b_2)+\\ \sqrt{\alpha_2}(k_2\sqrt{\alpha_1}\sqrt{\sigma-b_2}+k_1\sqrt{\alpha_2}\sqrt{\sigma-b_1})-\\ jRk_2^2\sqrt{\alpha_1}(\sigma-b_2)-V2]e^{-\sigma t}e^{-jz_1\sqrt{\sigma-b_1}}\end{array}}{k_1^2k_2^2R^2(\sigma-b_1)(\sigma-b_2)+[k_2\sqrt{\alpha_1}\sqrt{\sigma-b_2}+k_1\sqrt{\alpha_2}\sqrt{\sigma-b_1}]^2}=$$

$$\frac{\begin{array}{c}[R^2k_1k_2^2\sqrt{\sigma-b_1}(\sigma-b_2)+\\ \sqrt{\alpha_2}(k_2\sqrt{\alpha_1}\sqrt{\sigma-b_2}+k_1\sqrt{\alpha_2}\sqrt{\sigma-b_1})+\\ jRk_2^2\sqrt{\alpha_1}(\sigma-b_2)]e^{-\sigma t}e^{\mp jz_1\sqrt{\sigma-b_1}}\end{array}}{k_1^2k_2^2R^2(\sigma-b_1)(\sigma-b_2)+[k_2\sqrt{\alpha_1}\sqrt{\sigma-b_2}+k_1\sqrt{\alpha_2}\sqrt{\sigma-b_1}]^2}+$$

$$\frac{\begin{array}{c}[R^2k_1k_2^2\sqrt{\sigma-b_1}(\sigma-b_2)+\\ \sqrt{\alpha_2}(k_2\sqrt{\alpha_1}\sqrt{\sigma-b_2}+k_1\sqrt{\alpha_2}\sqrt{\sigma-b_1})-\\ jRk_2^2\sqrt{\alpha_1}(\sigma-b_2)]e^{-\sigma t}e^{-jz_1\sqrt{\sigma-b_1}}\end{array}}{k_1^2k_2^2R^2(\sigma-b_1)(\sigma-b_2)+[k_2\sqrt{\alpha_1}\sqrt{\sigma-b_2}+k_1\sqrt{\alpha_2}\sqrt{\sigma-b_1}]^2}$$

Where:

$V1$ is $jRk_1k_2\sqrt{\alpha_2}\sqrt{\sigma-b_1}\sqrt{\sigma-b_2}-jRk_1k_2\sqrt{\alpha_2}\sqrt{\sigma-b_1}\sqrt{\sigma-b_2}$ $V2$ is $jRk_1k_2\sqrt{\alpha_2}\sqrt{\sigma-b_1}\sqrt{\sigma-b_2}+jRk_1k_2\sqrt{\alpha_2}\sqrt{\sigma-b_1}\sqrt{\sigma-b_2}$ It can be simplified further by letting $C=R^2k_1k_2^2\sqrt{\sigma-b_1}(\sigma-b_2)+\sqrt{\alpha_2}(k_2\sqrt{\alpha_1}\sqrt{\sigma-b_2}+k_1\sqrt{\alpha_2}\sqrt{\sigma-b_1})$, $D=Rk_2^2\sqrt{\alpha_1}(\sigma-b_2)$, giving:

$$\frac{[C+jD]e^{-\sigma t}e^{jz_1\sqrt{\sigma-b_1}}+[C-jD]e^{-\sigma t}e^{-jz_1\sqrt{\sigma-b_1}}}{k_1^2k_2^2R^2(\sigma-b_1)(\sigma-b_2)+[k_2\sqrt{\alpha_1}\sqrt{\sigma-b_2}+k_1\sqrt{\alpha_2}\sqrt{\sigma-b_1}]^2}e^{-\sigma t}$$

$$\frac{C[e^{jz_1\sqrt{\sigma-b_1}}+e^{-jz_1\sqrt{\sigma-b_1}}]+jD[e^{jz_1\sqrt{\sigma-b_1}}-e^{-jz_1\sqrt{\sigma-b_1}}]}{k_1^2k_2^2R^2(\sigma-b_1)(\sigma-b_2)+[k_2\sqrt{\alpha_1}\sqrt{\sigma-b_2}+k_1\sqrt{\alpha_2}\sqrt{\sigma-b_1}]^2}e^{-\sigma t}$$

Since $e^{j\theta}+e^{-j\theta}=2\cos(\theta)$ and $e^{j\theta}-e^{-j\theta}=2j\sin(\theta)$, the simplification results in:

$$\frac{(2C\cos(z_1\sqrt{\sigma-b_1})+j^2 2D\sin(z_1\sqrt{\sigma-b_1}))e^{-\sigma t}}{k_1^2k_2^2R^2(\sigma-b_1)(\sigma-b_2)+[k_2\sqrt{\alpha_1}\sqrt{\sigma-b_2}+k_1\sqrt{\alpha_2}\sqrt{\sigma-b_1}]^2}$$

The integrals become:

$$I_1+I_4=-\frac{1}{2\pi}$$

$$\int_{b_2}^{\infty}\frac{(2C\cos(z_1\sqrt{\sigma-b_1})-2D\sin(z_1\sqrt{\sigma-b_1}))e^{-\sigma t}}{k_1^2k_2^2R^2(\sigma-b_1)(\sigma-b_2)+[k_2\sqrt{\alpha_1}\sqrt{\sigma-b_2}+k_1\sqrt{\alpha_2}\sqrt{\sigma-b_1}]^2}d\sigma$$

Recalling the definitions of C and D:

$$I_1+I_4=$$

$$-\frac{1}{\pi}\int_{b_2}^{\infty}\frac{(V1)\cos(z_1\sqrt{\sigma-b_1})-Rk_2^2\sqrt{\alpha_1}(\sigma-b_2)\sin(z_1\sqrt{\sigma-b_1})}{k_1^2k_2^2R^2(\sigma-b_1)(\sigma-b_2)+[k_2\sqrt{\alpha_1}\sqrt{\sigma-b_2}+k_1\sqrt{\alpha_2}\sqrt{\sigma-b_1}]^2}e^{-\sigma t}d\sigma$$

Where:

$V1$ is $R^2k_1k_2^2\sqrt{\sigma-b_1}(\sigma-b_2)+$ $\sqrt{\alpha_2}(k_2\sqrt{\alpha_1}\sqrt{\sigma-b_2}+k_1\sqrt{\alpha_2}\sqrt{\sigma-b_1})$ $I_2+I_3=$ $$\frac{1}{2\pi j}\int_{b_1}^{b_2}\frac{(Rk_2\sqrt{b_2-\sigma}+\sqrt{\alpha_2})e^{-\sigma t}e^{jz_1\sqrt{\sigma-b_1}}}{jk_1(\sqrt{\sigma-b_1})(Rk_2\sqrt{b_2-\sigma}+\sqrt{\alpha_2})+k_2\sqrt{\alpha_1}(\sqrt{b_2-\sigma})}d\sigma-\frac{1}{2\pi j}$$

$$\int_{b_1}^{b_2}\frac{(Rk_2\sqrt{b_2-\sigma}+\sqrt{\alpha_2})e^{-\sigma t}e^{-jz_1\sqrt{\sigma-b_1}}}{-jk_1(\sqrt{\sigma-b_1})(Rk_2\sqrt{b_2-\sigma}+\sqrt{\alpha_2})+k_2\sqrt{\alpha_1}(\sqrt{b_2-\sigma})}d\sigma$$

The denominators in the integrals of $I_2+I_3$ and the second exponents are conjugates. This is of the form $$\frac{e^{jx}}{a+jb}-\frac{e^{-jx}}{a-jb}=-2j\frac{a\sin x+b\cos x}{a^2+b^2},$$

therefore:

$$I_2 + I_3 = -\frac{1}{\pi}\int_{b_1}^{b_2} e^{-\sigma t}\frac{(Rk_2\sqrt{b_2-\sigma}+\sqrt{\alpha_2})(k_2\sqrt{\alpha_1}\sqrt{b_2-\sigma}\sin(z_1\sqrt{\sigma-b_1})+k_1\sqrt{\sigma-b_1}(Rk_2\sqrt{b_2-\sigma}+\sqrt{\alpha_2})\cos(z_1\sqrt{\sigma-b_1}))}{k_1^2(\sigma-b_1)(Rk_2\sqrt{b_2-\sigma}+\sqrt{\alpha_2})^2+k_2^2\alpha_1(b_2-\sigma)}d\sigma;\ z_1<0 \qquad(156)$$

The sum of all the integrals of the contour must be zero because there are no poles inside the contour, according to Cauchy's theorem. Recalling (151)

$$f_1(\lambda,z,t)=\frac{1}{2\pi j}\int_{\sigma_1-j\infty}^{\sigma_1+j\infty}e^{st}F_1(\lambda,z,s)ds$$

$$=-\int_0^t\sqrt{a_1}\,(I_1+I_2+I_3+I_4)d\tau$$

$$=-\frac{\sqrt{\alpha_1}}{\pi}\int_0^t d\tau\frac{1}{\pi}\int_{b_1}^{b_2}e^{-\sigma t}\frac{(Rk_2\sqrt{b_2-\sigma}+\sqrt{\alpha_2})(V1)}{k_1^2(\sigma-b_1)(Rk_2\sqrt{lJ_2-\sigma}+\sqrt{\alpha_2})^2+k_2^2\alpha_1(b_2-\sigma)}d\sigma+$$

$$\frac{\sqrt{\alpha_1}}{\pi}\int_0^t d\tau\frac{1}{\pi}\int_{b_2}^{\infty}\frac{V2}{k_1^2k_2^2R^2(\sigma-b_1)(\sigma-b_2)+[k_2\sqrt{\alpha_1}\sqrt{\sigma-b_2}+k_1\sqrt{\alpha_2}\sqrt{\sigma-b_1}]^2}e^{-\sigma t}d\sigma;\ z_1<0$$

Where:

$V1$ is $k_2\sqrt{\alpha_1}\sqrt{b_2-\sigma}\sin(z_1\sqrt{\sigma-b_1})+k_1\sqrt{\sigma-b_1}(Rk_2\sqrt{b_2-\sigma}+\sqrt{\alpha_2})\cos(z_1\sqrt{\sigma-b_1})$; and $V2$ is $(R^2k_1k_2^2\sqrt{\sigma-b_1}(\sigma-b_2)+\sqrt{\alpha_2}(k_2\sqrt{\alpha_1}\sqrt{\sigma-b_2}+k_1\sqrt{\alpha_2}\sqrt{\sigma-b_1})\cos(z_1\sqrt{\sigma-b_1})-Rk_2^2\sqrt{\alpha_1}(\sigma-b_2)\sin(z_1\sqrt{\sigma-b_1})$ And the temperature in the time domain is $$T_1(r,z,t)=aq\int_0^\infty [f_1(\lambda,z,t)]J_1(\lambda a)J_0(\lambda r)d\lambda = aq\int_0^\infty\Bigg\{\frac{\sqrt{\alpha_1}}{\pi}\int_0^t d\tau\frac{1}{\pi}\int_{b_1}^{b_2}$$

$$=\frac{V1}{k_1^2(\sigma-b_1)(Rk_2\sqrt{b_2-\sigma}+\sqrt{\alpha_2})^2+k_2^2\alpha_1(b_2-\sigma)}e^{-\sigma t}d\sigma+\frac{\sqrt{a_1}}{\pi}\int_0^t d\tau\frac{1}{\pi}\int_{b_2}^{\infty}$$

$$\frac{(R^2k_1k_2^2\sqrt{\sigma-b_1}(\sigma-b_2)+\sqrt{\alpha_2}(k_2\sqrt{\alpha_1}\sqrt{\sigma-b_2}+k_1\sqrt{\alpha_2}\sqrt{\sigma-b_1}))\cos(z_1\sqrt{\sigma-b_1})}{k_1^2k_2^2R^2(\sigma-b_1)(\sigma-b_2)+[k_2\sqrt{\alpha_1}\sqrt{\sigma-b_2}+k_1\sqrt{\alpha_2}\sqrt{\sigma-b_1}]^2}$$

$$e^{-\sigma t}d\sigma-\frac{\sqrt{a_1}}{\pi}\int_0^t d\tau\frac{1}{\pi}\int_{b_2}^{\infty}\frac{Rk_2^2\sqrt{\alpha_1}(\sigma-b_2)\sin(z_1\sqrt{\sigma-b_1})}{k_1^2k_2^2R^2(\sigma-b_1)(\sigma-b_2)+[k_2\sqrt{\alpha_1}\sqrt{\sigma-b_2}+k_1\sqrt{\alpha_2}\sqrt{\sigma-b_1}]^2}e^{-\sigma t}d\sigma\Bigg\}J_1(\lambda a)J_0(\lambda r)d\lambda;\ z_1<0$$

Where:

$V1$ is $(Rk_2\sqrt{b_2-\sigma}+\sqrt{\alpha_2})(k_2\sqrt{\alpha_1}\sqrt{b_2-\sigma}\sin(z_1\sqrt{\sigma-b_1})+k_1\sqrt{\sigma-b_1}(Rk_2\sqrt{b_2-\sigma}+\sqrt{\alpha_2})^2\cos(z_1\sqrt{\sigma-b_1}))$ By changing the order of integration and integrating over $\tau$ it is obtained:

$$T_1(r,z,t)=\frac{aq\sqrt{\alpha_1}}{\pi}\int_0^\infty\Bigg\{\int_{b_2}^\infty\frac{1-e^{-\sigma t}}{\sigma}\frac{V1\cos(z_1\sqrt{\sigma-b_1})}{k_1^2k_2^2R^2(\sigma-b_1)(\sigma-b_2)+[k_2\sqrt{\alpha_1}\sqrt{\sigma-b_2}+k_1\sqrt{\alpha_2}\sqrt{\sigma-b_1}]^2}d\sigma\Bigg\} \qquad(157)$$

$$J_1(\lambda a)J_0(\lambda r)d\lambda-\frac{aq\sqrt{\alpha_1}}{\pi}\int_0^\infty\Bigg\{\int_{b_2}^\infty\frac{1-e^{-\sigma t}}{\sigma}\frac{Rk_2^2\sqrt{\alpha_1}(\sigma-b_2)\sin(z_1\sqrt{\sigma-b_1})}{k_1^2k_2^2R^2(\sigma-b_1)(\sigma-b_2)+[k_2\sqrt{\alpha_1}\sqrt{\sigma-b_2}+k_1\sqrt{\alpha_2}\sqrt{\sigma-b_1}]^2}d\sigma\Bigg\}$$

$$J_1(\lambda a)J_0(\lambda r)d\lambda+\frac{aq\sqrt{\alpha_1}}{\pi}\int_0^\infty\Bigg\{\int_{b_1}^{b_2}\frac{1-e^{-\sigma t}}{\sigma}\frac{k_2\sqrt{\alpha_1}\sqrt{b_2-\sigma}(Rk_2\sqrt{b_2-\sigma}+\sqrt{\alpha_2})\sin(z_1\sqrt{\sigma-b_1})}{k_1^2(\sigma-b_1)(Rk_2\sqrt{b_2-\sigma}+\sqrt{\alpha_2})^2+k_2^2\alpha_1(b_2-\sigma)}d\sigma\Bigg\}$$

$$J_1(\lambda a)J_0(\lambda r)d\lambda+\frac{aq\sqrt{\alpha_1}}{\pi}\int_0^\infty\Bigg\{\int_{b_1}^{b_2}\frac{1-e^{-\sigma t}}{\sigma}\frac{k_1\sqrt{\sigma-b_1}(Rk_2\sqrt{b_2-\sigma}+\sqrt{\alpha_2})^2\cos(z_1\sqrt{\sigma-b_1})}{k_1^2(\sigma-b_1)(Rk_2\sqrt{b_2-\sigma}+\sqrt{\alpha_2})^2+k_2^2\alpha_1(b_2-\sigma)}d\sigma\Bigg\}J_1(\lambda a)J_0(\lambda r)d\lambda;$$

Where:

$V1$ is $(R^2 k_1 k_2^2 \sqrt{\sigma-b_1}(\sigma-b_2)+\sqrt{\alpha_2}(k_2\sqrt{\alpha_1}\sqrt{\sigma-b_2}+k_1\sqrt{\alpha_2}\sqrt{\sigma-b_1}))$ Again, it is possible to show that this reduces to the known equation for two different media with no contact resistance when $R=0$:

$$T_1(r, z, t) = \frac{aq\sqrt{\alpha_1}}{\pi} \int_0^\infty \left\{ \int_{b_2}^\infty \frac{1-e^{-\sigma t}}{\sigma} \frac{V1}{k_1^2 k_2^2 (0)^2 (\sigma-b_1)(\sigma-b_2) + \left[k_2\sqrt{\alpha_1}\sqrt{\sigma-b_2}+k_1\sqrt{\alpha_2}\sqrt{\sigma-b_1}\right]^2} d\sigma \right\}$$

$$J_1(\lambda a)J_0(\lambda r)d\lambda - \frac{aq\sqrt{\alpha_1}}{\pi} \int_0^\infty \left\{ \int_{b_2}^\infty \frac{1-e^{-\sigma t}}{\sigma} \frac{(0)k_2^2\sqrt{\alpha_1}(\sigma-b_2)\sin(z_1\sqrt{\sigma-b_1})}{k_1^2 k_2^2 (0)^2 (\sigma-b_1)(\sigma-b_2) + \left[k_2\sqrt{\alpha_1}\sqrt{\sigma-b_2}+k_1\sqrt{\alpha_2}\sqrt{\sigma-b_1}\right]^2} d\sigma \right\}$$

$$J_1(\lambda a)J_0(\lambda r)d\lambda + \frac{aq\sqrt{\alpha_1}}{\pi} \int_0^\infty \left\{ \int_{b_1}^{b_2} \frac{1-e^{-\sigma t}}{\sigma} \frac{k_2\sqrt{\alpha_1}\sqrt{b_2-\sigma}\left((0)k_2\sqrt{b_2-\sigma}+\sqrt{\alpha_2}\right)\sin(z_1\sqrt{\sigma-b_1})}{k_1^2(\sigma-b_1)\left((0)k_2\sqrt{b_2-\sigma}+\sqrt{\alpha_2}\right)^2 + k_2^2\alpha_1(b_2-\sigma)} d\sigma \right\}$$

$$J_1(\lambda a)J_0(\lambda r)d\lambda + \frac{aq\sqrt{\alpha_1}}{\pi} \int_0^\infty \left\{ \int_{b_1}^{b_2} \frac{1-e^{-\sigma t}}{\sigma} \frac{k_1\sqrt{\sigma-b_1}\left((0)k_2\sqrt{b_2-\sigma}+\sqrt{\alpha_2}\right)^2\cos(z_1\sqrt{\sigma-b_1})}{k_1^2(\sigma-b_1)\left((0)k_2\sqrt{b_2-\sigma}+\sqrt{\alpha_2}\right)^2 + k_2^2\alpha_1(b_2-\sigma)} d\sigma \right\} J_1(\lambda a)J_0(\lambda r)d\lambda$$

Where:

$V1$ is $((0)^2 k_1 k_2^2 \sqrt{\sigma-b_1}(\sigma-b_2) + \sqrt{\alpha_2}(k_2\sqrt{a_1}\sqrt{\sigma-b_2}+k_1\sqrt{a_2}\sqrt{\sigma-b_1}))$ $\cos(z_1\sqrt{\sigma-b_1})$ $$T_1(r, z, t) = \frac{aq\sqrt{\alpha_1}\sqrt{\alpha_2}}{\pi}$$

$$\int_0^\infty \left\{ \int_{b_2}^\infty \frac{1-e^{-\sigma t}}{\sigma} \frac{\cos(z_1\sqrt{\sigma-lJ_1})}{k_2\sqrt{\alpha_1}\sqrt{\sigma-b_2}+k_1\sqrt{\alpha_2}\sqrt{\sigma-b_1}} d\sigma \right\}$$

$J_1(\lambda a)J_0(\lambda r)d\lambda +$ $$\frac{aqk_2\alpha_1\sqrt{\alpha_2}}{\pi} \int_0^\infty \left\{ \int_{b_1}^{b_2} \frac{1-e^{-\sigma t}}{\sigma} \frac{k_2\sqrt{\alpha_1}\sqrt{b_2-\sigma}\sin(z_1\sqrt{\sigma-b_1})}{k_1^2\alpha_2(\sigma-b_1)+k_2^2\alpha_1(b_2-\sigma)} d\sigma \right\}$$

$J_1(\lambda a)J_0(\lambda r)d\lambda + \frac{aqk_1\sqrt{a_1}\alpha_2}{\pi}$ $$\int_0^\infty \left\{ \int_{b_1}^{b_2} \frac{1-e^{-\sigma t}}{\sigma} \frac{\sqrt{\sigma-b_1}\cos(z_1\sqrt{\sigma-b_1})}{k_1^2\alpha_2(\sigma-b_1)+k_2^2\alpha_1(b_2-\sigma)} d\sigma \right\} J_1(\lambda a)J_0(\lambda r)d\lambda$$

Let $x=\sqrt{\sigma-b_2}$; $\sigma=x^2+b_2$; $\sqrt{\sigma-b_1}=\sqrt{x^2+b_2-b_1}$; $d\sigma=2xdx$ for the first integral. As $\sigma: b_2 \to \infty$; $\Rightarrow x: 0 \to \infty$.

Let $y=\sqrt{\sigma-b_1}$; $\sigma=y^2+b_1$; $\sqrt{b_2-\sigma}=\sqrt{b_2-\sigma}=\sqrt{b_2-y^2-b_1}$; $d\sigma=2ydy$ for the second and third integrals. As $\sigma: b_1 \to b_2$; $\Rightarrow y: 0 \to \sqrt{b_2-b_1}$ $$T_1(r, z, t) = \frac{2aq\sqrt{\alpha_1}\sqrt{\alpha_2}}{\pi}$$

-continued $$\int_0^\infty \left\{ \int_{b_2}^\infty \frac{1-e^{-(x^2+b_2)t}}{x^2+b_2} \frac{x\cos(z_1\sqrt{x^2+b_2-b_1})}{k_2\sqrt{\alpha_1}x+k_1\sqrt{\alpha_2}\sqrt{x^2+b_2-b_1}} dx \right\}$$

$J_1(\lambda a)J_0(\lambda r)d\lambda + \frac{2aqk_2 a_1\sqrt{\alpha_2}}{\pi}$ $$\int_0^\infty \left\{ \int_{b_1}^{b_2} \frac{1-e^{-(y^2+b_1)t}}{y^2+b_1} \frac{y\sqrt{b_2-y^2-b_1}\sin(z_1 y)}{k_1^2 y^2 \alpha_2 + k_2^2 \alpha_1 (b_2-y^2-b_1)} dy \right\}$$

$J_1(\lambda a)J_0(\lambda r)d\lambda + \frac{2aqk_1\sqrt{\alpha_1}\alpha_2}{\pi}$ $$\int_0^\infty \left\{ \int_{b_1}^{b_2} \frac{1-e^{-(y^2+b_1)t}}{y^2+b_1} \frac{y^2\cos(z_1 y)}{k_1^2 y^2 \alpha_2 + k_2^2 \alpha_1 (b_2-y^2-b_1)} dy \right\}$$

$J_1(\lambda a)J_0(\lambda r)d\lambda$

This is precisely the equation derived for two different media with no contact resistance, thus confirming the validity of the solution (157).

Temperature Field on the CHS Surface (z=0)

It is expected that $T_1(r,t)-T_2(r,t)=Rq_2(r,t)$ at $z=0$. To find the temperature field on the CHS surface, substitute 0 for $z_1$ in (157) and for $z_2$ in (147).

The second and third integrals vanish, and $T_1$ becomes $$T_1(r, z=0, t) = \frac{aq\sqrt{\alpha_1}}{\pi} \int_0^\infty \left\{ \int_{b_2}^\infty \frac{1-e^{-\sigma t}}{\sigma} \frac{(R^2 k_1 k_2^2 \sqrt{\sigma-b_1}\,(\sigma-b_2) + \sqrt{\alpha_2}\,(k_2\sqrt{\alpha_1}\,\sqrt{\sigma-b_2} + k_1\sqrt{\alpha_2}\,\sqrt{\sigma-b_1}\,))}{(k_1^2 k_2^2 R^2 (\sigma-b_1)(\sigma-b_2) + [k_2\sqrt{\alpha_1}\,\sqrt{\sigma-b_2} + k_1\sqrt{\alpha_2}\,\sqrt{\sigma-b_1}\,]^2)} d\sigma \right\}$$
$$J_1(\lambda a) J_0(\lambda r) d\lambda + \frac{aq\sqrt{\alpha_1}}{\pi} \int_0^\infty \left\{ \int_{b_1}^{b_2} \frac{1-e^{-\sigma t}}{\sigma} \frac{k_1\sqrt{\sigma-b_1}\,(Rk_2\sqrt{b_2-\sigma} + \sqrt{a_2}\,)^2}{k_1^2(\sigma-b_1)(Rk_2\sqrt{b_2-\sigma}+\sqrt{\alpha_2}\,)^2 + k_2^2 a_1 (b_2-\sigma)} d\sigma \right\} J_1(\lambda a) J_0(\lambda r) d\lambda;$$

$z_1 = 0$

Similarly, for $T_2$ it is obtained:

$$T_2(r, z=0, r) = \frac{aq\sqrt{\alpha_1 \alpha_2}}{\pi} \int_0^\infty \qquad (159)$$

$$\left\{ \int_{b_2}^\infty \frac{1-e^{-\sigma t}}{\sigma} \frac{[k_2\sqrt{a_1}\,\sqrt{\sigma-b_2} + k_1\sqrt{a_2}\,\sqrt{\sigma-b_1}\,]}{(k_2\sqrt{\alpha_1}\,\sqrt{\sigma-b_2} + k_1\sqrt{\alpha_2}\,\sqrt{\sigma-b_1}\,)^2 + k_1^2 k_2^2 R^2 (\sigma-b_1)(\sigma-b_2)} d\sigma \right\} J_1(\lambda a) J_0(\lambda r) d\lambda +$$

$$\frac{aqk_1\sqrt{\alpha_1 \alpha_2}}{\pi} \int_0^\infty$$

$$\left\{ \int_{b_1}^{b_2} \frac{1-e^{-\sigma t}}{\sigma} \frac{\sqrt{\sigma-b_1}\,(Rk_2\sqrt{b_2-\sigma}+\sqrt{a_2}\,)}{k_2^2 \alpha_1 (b_2-\sigma) + k_1^2(\sigma-b_1)[Rk_2\sqrt{b_2-\sigma}+\sqrt{a_2}\,]^2} d\sigma \right\} J_1(\lambda a) J_0(\lambda r) d\lambda;\ z_2 = 0$$

Note that with some manipulation it can be shown that $T_1(r,z=0,t) - T_2(r,z=0,t) = Rq_2(r,t)$, thus confirming boundary condition (93).

Average Temperature Over the CHS Surface

The average temperature on the CHS surface is obtained by integration of the two terms over the circle radius r, from r=0 to r=a, and dividing by the area of the CHS of each (158) and (159).

$$T_{1Av}(t) = \frac{aq\sqrt{\alpha_1}}{\pi} \int_0^\infty \{V1\} J_1(\lambda a) \left[ \frac{1}{\pi a^2} \int_0^a J_0(\lambda r) 2\pi r dr \right] d\lambda +$$

$$\frac{aq\sqrt{\alpha_1}}{\pi} \int_0^\infty \{V2\} J_1(\lambda a) \left[ \frac{1}{\pi a^2} \int_0^a J_0(\lambda r) 2\pi r dr \right] d\lambda;\ z_1 = 0$$

Where:

$$V1 \text{ is} \int_{b_2}^\infty \frac{1-e^{-\sigma t}}{\sigma}$$

-continued $$\frac{(R^2 k_1 k_2^2 \sqrt{\sigma-b_1}\,(\sigma-b_2) + \sqrt{\alpha_2}\,(k_2\sqrt{\alpha_1}\,\sqrt{\sigma-b_2} + k_1\sqrt{\alpha_2}\,\sqrt{\sigma-b_1}\,))\cos(z_1\sqrt{\sigma-b_1}\,)}{k_1^2 k_2^2 R^2 (\sigma-b_1)(\sigma-b_2) + [k_2\sqrt{a_1}\,\sqrt{\sigma-b_2} + k_1\sqrt{a_2}\,\sqrt{\sigma-b_1}\,]^2} d\sigma$$

$$V2 \text{ is} \int_{b_1}^{b_2} \frac{1-e^{-\sigma t}}{\sigma}$$

$$\frac{k_1\sqrt{\sigma-b_1}\,(Rk_2\sqrt{b_2-\sigma}+\sqrt{\alpha_2}\,)^2 \cos(z_1\sqrt{\sigma-b_1}\,)}{k_1^2(\sigma-b_1)(Rk_2\sqrt{b_2-\sigma}+\sqrt{a_2}\,)^2 + k_2^2 a_1 (b_2-\sigma)} d\sigma$$

And since the value of the integral in the square brackets is $$\frac{1}{\pi a^2} \int_0^a J_0(\lambda r) 2\pi r dr = 2\frac{J_1(\lambda a)}{a\lambda}$$

The average temperature fields on the CHS surface are obtained $$T_{1Av}(t) = \frac{q\sqrt{\alpha_1}}{\pi} \int_0^\infty \left\{ \int_{b_2}^\infty \frac{1-e^{-\sigma t}}{\sigma} \frac{V1}{k_1^2 k_2^2 R^2(\sigma-b_1)(\sigma-b_2) + \left[k_2\sqrt{\alpha_1}\sqrt{\sigma-b_2} + k_1\sqrt{\alpha_2}\sqrt{\sigma-b_1}\right]^2} d\sigma \right\} \quad (160)$$

$$\frac{(J_1(\lambda a))^2}{\lambda} d\lambda + \frac{q\sqrt{\alpha_1}}{\pi} \int_0^\infty$$

$$\left\{ \int_{b_1}^{b_2} \frac{1-e^{-\sigma t}}{\sigma} \frac{k_1\sqrt{\sigma-b_1}\left(Rk_2\sqrt{b_2-\sigma}+\sqrt{\alpha_2}\right)^2 \cos(z_1\sqrt{\sigma-b_1})}{k_1^2(\sigma-b_1)\left(Rk_2\sqrt{b_2-\sigma}+\sqrt{\alpha_2}\right)^2 + k_2^2\alpha_1(b_2-\sigma)} d\sigma \right\} \frac{(J_1(\lambda a))^2}{\lambda} d\lambda; z_1 = 0$$

Where:

$$V1 \text{ is } \left(R^2 k_1 k_2^2 \sqrt{\sigma-b_1}(\sigma-b_2) + \sqrt{\alpha_2}\left(k_2\sqrt{\alpha_1}\sqrt{\sigma-b_2} + k_1\sqrt{\alpha_2}\sqrt{\sigma-b_1}\right)\right)\cos(z_1\sqrt{\sigma-b_1}) \quad (161)$$

$$T_{2Av}(r|z=0, t) = \frac{q\sqrt{\alpha_1\alpha_2}}{\pi} \int_0^\infty \left\{ \int_{b_2}^\infty \frac{1-e^{-\sigma t}}{\sigma} \frac{\left[k_2\sqrt{\alpha_1}\sqrt{\sigma-b_2} + k_1\sqrt{\alpha_2}\sqrt{\sigma-b_1}\right]}{\left(k_2\sqrt{\alpha_1}\sqrt{\sigma-b_2} + k_1\sqrt{\alpha_2}\sqrt{\sigma-b_1}\right)^2 + k_1^2 k_2^2 R^2(\sigma-b_1)(\sigma-b_2)} d\sigma \right\}$$

$$\frac{(J_1(\lambda a))^2}{\lambda} d\lambda + \frac{qk_1\sqrt{\alpha_1\alpha_2}}{\pi} \int_0^\infty$$

$$\left\{ \int_{b_1}^{b_2} \frac{1-e^{-\sigma t}\sqrt{\sigma-b_1}\left[Rk_2\sqrt{b_2-\sigma}+\sqrt{\alpha_2}\right]}{\sigma k_2^2\alpha_1(b_2-\sigma) + k_1^2(\sigma-b_1)\left[Rk_2\sqrt{b_2-\sigma}+\sqrt{\alpha_2}\right]^2} d\sigma \right\} \frac{(J_1(\lambda a))^2}{\lambda} d\lambda; \quad z_2 = 0$$

Steady-State

The limits of the temperature fields in (147) and (157) are calculated as the time tends to infinity.

$$\lim_{t\to\infty} T_1(r, z, t) = \frac{aq\sqrt{\alpha_1}}{\pi} \int_0^\infty \left\{ \int_{b_2}^\infty \frac{1}{\sigma} \frac{\left(\left(R^2 k_1 k_2^2\sqrt{\sigma-b_1}(\sigma-b_2) + \sqrt{\alpha_2}\left(k_2\sqrt{\alpha_1}\sqrt{\sigma-b_2}+k_1\sqrt{\alpha_2}\sqrt{\sigma-b_1}\right)\right)\cos(z_1\sqrt{\sigma-b_1})\right)}{\left(k_1^2 k_2^2 R^2(\sigma-b_1)(\sigma-b_2) + \left[k_2\sqrt{\alpha_1}\sqrt{\sigma-b_2}+k_1\sqrt{\alpha_2}\sqrt{\sigma-b_1}\right]^2\right)} d\sigma \right\} \quad (162)$$

$$J_1(\lambda a)J_0(\lambda r)d\lambda - \frac{aq\sqrt{\alpha_1}}{\pi} \int_0^\infty \left\{ \int_{b_2}^\infty \frac{1}{\sigma} \frac{Rk_2^2\sqrt{\alpha_1}(\sigma-b_2)\sin(z_1\sqrt{\sigma-b_1})}{k_1^2 k_2^2 R^2(\sigma-b_1)(\sigma-b_2) + \left[k_2\sqrt{\alpha_1}\sqrt{\sigma-b_2}+k_1\sqrt{\alpha_2}\sqrt{\sigma-b_1}\right]^2} d\sigma \right\}$$

$$J_1(\lambda a)J_0(\lambda r)d\lambda + \frac{aq\sqrt{\alpha_1}}{\pi} \int_0^\infty \left\{ \int_{b_1}^{b_2} \frac{1}{\sigma} \frac{k_2\sqrt{\alpha_1}\sqrt{b_2-\sigma}\left(Rk_2\sqrt{b_2-\sigma}+\sqrt{\alpha_2}\right)\sin(z_1\sqrt{\sigma-b_1})}{k_1^2(\sigma-b_1)\left(Rk_2\sqrt{b_2-\sigma}+\sqrt{\alpha_2}\right)^2 + k_2^2\alpha_1(b_2-\sigma)} d\sigma \right\} J_1(\lambda a)J_0(\lambda r)d\lambda +$$

$$\left\{ \int_{b_1}^{b_2} \frac{1}{\sigma} \frac{k_1\sqrt{\sigma-b_1}\left(Rk_2\sqrt{b_2-\sigma}+\sqrt{\alpha_2}\right)^2 \cos(z_1\sqrt{\sigma-b_1})}{k_1^2(\sigma-b_1)\left(Rk_2\sqrt{b_2-\sigma}+\sqrt{\alpha_2}\right)^2 + k_2^2\alpha_1(b_2-\sigma)} d\sigma \right\} J_1(\lambda a)J_0(\lambda r)d\lambda; \quad z_1 < 0$$

$$\lim_{t\to\infty} T_2(r, z, t) = \frac{aq\sqrt{\alpha_1\alpha_2}}{\pi} \int_0^\infty \left\{ \int_{b_2}^\infty \frac{1}{\sigma} \frac{\left[k_2\sqrt{\alpha_1}\sqrt{\sigma-b_2}+k_1\sqrt{\alpha_2}\sqrt{\sigma-b_1}\right]\cos(z_2\sqrt{\sigma-b_2})}{\left(k_2\sqrt{\alpha_1}\sqrt{\sigma-b_2}+k_1\sqrt{\alpha_2}\sqrt{\sigma-b_1}\right)^2 + k_1^2 k_2^2 R^2(\sigma-b_1)(\sigma-b_2)} d\sigma \right\} \quad (163)$$

$$J_1(\lambda a)J_0(\lambda r)d\lambda - \frac{aqk_1 k_2 R\sqrt{\alpha_1\alpha_2}}{\pi} \int_0^\infty \left\{ \int_{b_2}^\infty \frac{1}{\sigma} \frac{\sqrt{\sigma-b_1}\sqrt{\sigma-b_2}\sin(z_2\sqrt{\sigma-b_2})}{\left(k_2\sqrt{\alpha_1}\sqrt{\sigma-b_2}+k_1\sqrt{\alpha_2}\sqrt{\sigma-b_1}\right)^2 + k_1^2 k_2^2 R^2(\sigma-b_1)(\sigma-b_2)} d\sigma \right\}$$

$$J_1(\lambda a)J_0(\lambda r)d\lambda + \frac{aqk_1\sqrt{\alpha_1\alpha_2}}{\pi} \int_0^\infty \left\{ \int_{b_1}^{b_2} \frac{1}{\sigma} \frac{e^{-z_2\sqrt{b_2-\sigma}}\sqrt{\sigma-b_1}\left[Rk_2\sqrt{b_2-\sigma}+\sqrt{\alpha_2}\right]}{k_2^2\alpha_1(b_2-\sigma) + k_1^2(\sigma-b_1)\left[Rk_2\sqrt{b_2-\sigma}+\sqrt{\alpha_2}\right]^2} d\sigma \right\} J_1(\lambda a)J_0(\lambda r)d\lambda; \quad z_2 > 0$$

Heat Flux

Figure 14:
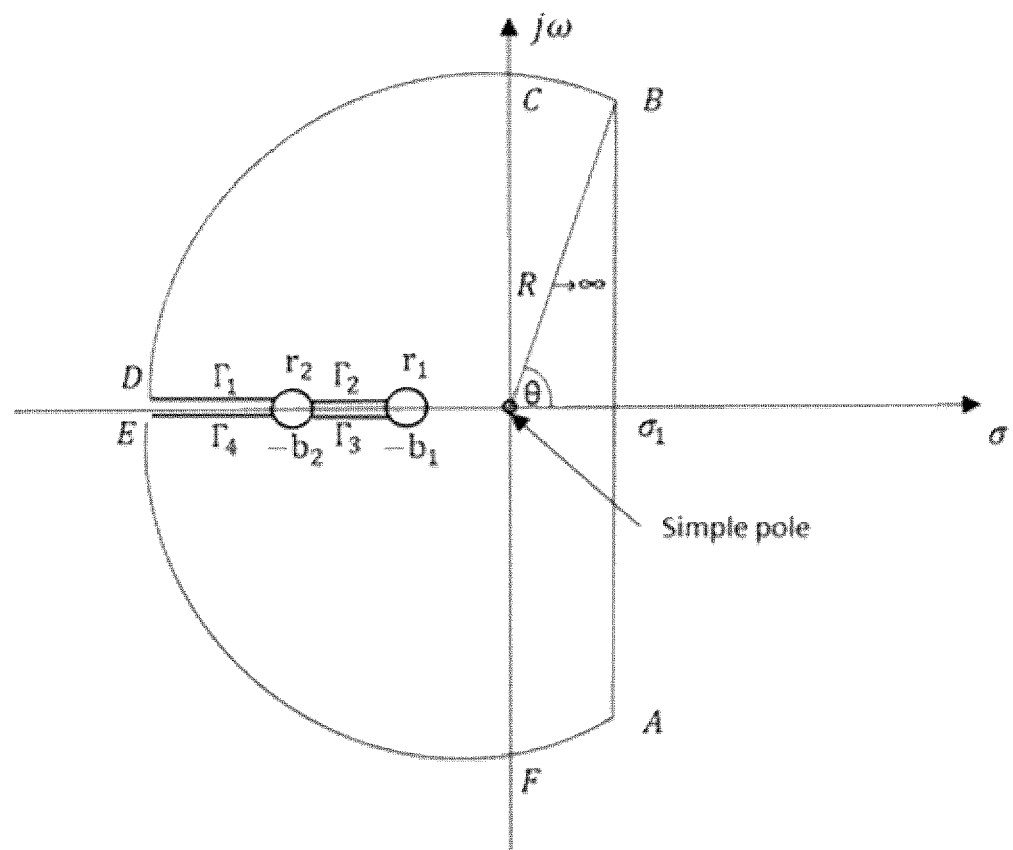
FIG. 14 depicts a contour of integration for the heat flux solution.

To calculate the heat flux flowing to each side, the calculation starts from (116). The contour of integration for the flux is shown in FIG. 14. It executes the line integrals on (111) as it is (with the 1/s part) to ensure that the inverse Laplace transform converges. Therefore, the pole at s=0 is added.

Like before, it is desirable to evaluate the line integral over the line AB. The integrals over the parts with R vanish as R tends to infinity, and likewise the integrals over $r_1$ and $r_2$ vanish as they tend to 0 (see Appendix section below).

For the line integrals $\Gamma_1$ to $\Gamma_4$ (129) to (136) and (138) to (144) are applicable.

$$Q_1(\lambda, s) = \frac{aq}{s} \frac{J_1(\lambda a)}{\lambda} \frac{k_1\sqrt{s+b_1}\left(Rk_2\sqrt{s+b_2} + \sqrt{\alpha_2}\right)}{k_2\sqrt{\alpha_1}\sqrt{s+b_2} + k_1\sqrt{s+b_1}\left(Rk_2\sqrt{s+b_2} + \sqrt{\alpha_2}\right)}$$

Split into 2 parts:

$$Q_{1,1}(\lambda, s) = \frac{aq}{s} \frac{J_1(\lambda a)}{\lambda} \frac{k_1\sqrt{s+b_1}\sqrt{\alpha_2}}{k_2\sqrt{\alpha_1}\sqrt{s+b_2} + k_1\sqrt{s+b_1}\left(Rk_2\sqrt{s+b_2} + \sqrt{\alpha_2}\right)} =$$

$$\frac{aqk_1\sqrt{\alpha_2}}{\lambda}J_1(\lambda a)\overline{Q_{1,1}}(\lambda, s)$$

$$Q_{1,2}(\lambda, s) = \frac{aq}{s} \frac{J_1(\lambda a)}{\lambda} \frac{Rk_1k_2\sqrt{s+b_1}\sqrt{s+b_2}}{k_2\sqrt{\alpha_1}\sqrt{s+b_2} + k_1\sqrt{s+b_1}\left(Rk_2\sqrt{s+b_2} + \sqrt{\alpha_2}\right)} =$$

$$\frac{aqRk_1k_2J_1(\lambda a)}{\lambda}\overline{Q_{1,2}}(\lambda, s)$$

For $\overline{Q_{1,1}}(\lambda,s)$ There is a simple pole at s=0. The residue of $\overline{Q_{1,1}}(\lambda,s)$ at this point is:

$$Res(\overline{Q_{1,1}}(\lambda, s))_{s=0} = s(\overline{Q_{1,1}}(\lambda, s))_{s=0} = \frac{\sqrt{b_1}}{k_2\sqrt{\alpha_1}\sqrt{b_2} + \left(Rk_2\sqrt{b_2} + \sqrt{\alpha_2}\right)k_1\sqrt{b_1}}$$

We can now calculate the line integrals.

$$I_1 = \frac{1}{2\pi j}\int_{-\infty}^{-b_2} e^{st}\overline{Q_{1,1}}(\lambda, s)ds =$$

$$\frac{1}{2\pi j}\int_{+\infty}^{+b_2} \frac{e^{-\sigma t}}{-\sigma} \frac{j\sqrt{\sigma-b_1}}{k_2\sqrt{\alpha_1}\,j\sqrt{\sigma-b_2} + \left(Rk_2\,j\sqrt{\sigma-b_2} + \sqrt{\alpha_2}\right)k_1\,j\sqrt{\sigma-b_1}} d(-\sigma) =$$

$$-\frac{1}{2\pi j}\int_{+b_2}^{+\infty} \frac{e^{-\sigma t}}{\sigma} \frac{\sqrt{\sigma-b_1}}{\left[k_2\sqrt{\alpha_1}\sqrt{\sigma-b_2} + k_1\sqrt{\alpha_2}\sqrt{\sigma-b_1}\right] + j\left[Rk_1k_2\sqrt{\sigma-b_1}\sqrt{\sigma-b_2}\right]} d(\sigma)$$

Let $D = k_2\sqrt{\alpha_1}\sqrt{\sigma-b_2} + k_1\sqrt{\alpha_2}\sqrt{\sigma-b_1}$, and $C = Rk_1k_2\sqrt{\sigma-b_1}\sqrt{\sigma-b_2}$ $$I_1 = -\frac{1}{2\pi j}\int_{b_2}^{\infty} \frac{e^{-\sigma t}}{\sigma} \frac{\sqrt{\sigma-b_1}}{D + jC} d\sigma$$

$$I_2 = \frac{1}{2\pi j}\int_{-b_2}^{-b_1} e^{st}\overline{Q_{1,1}}(\lambda, s)ds =$$

$$\frac{1}{2\pi j}\int_{+b_2}^{+b_1} \frac{e^{-\sigma t}}{-\sigma} \frac{j\sqrt{\sigma-b_1}}{k_2\sqrt{\alpha_1}\sqrt{b_2-\sigma} + \left(Rk_2\sqrt{b_2-\sigma} + \sqrt{\alpha_2}\right)k_1\,j\sqrt{\sigma-b_1}} d(-\sigma) =$$

$$-\frac{1}{2\pi}\int_{b_1}^{b_2} \frac{e^{-\sigma t}}{\sigma} \frac{\sqrt{\sigma-b_1}}{k_2\sqrt{\alpha_1}\sqrt{b_2-\sigma} + j\left(Rk_2\sqrt{b_2-\sigma} + \sqrt{\alpha_2}\right)k_1\sqrt{\sigma-b_1}} d\sigma$$

Let $E = k_2\sqrt{\alpha_1}\sqrt{b_2-\sigma}$ and $F = (Rk_2\sqrt{b_2-\sigma} + \sqrt{\alpha_2})k_1\sqrt{\sigma-b_1}$:

$$I_2 = -\frac{1}{2\pi}\int_{b_1}^{b_2} \frac{e^{-\sigma t}}{\sigma} \frac{\sqrt{\sigma-b_1}}{E + jF} d\sigma$$

$$I_3 = \frac{1}{2\pi j}\int_{-b_1}^{-b_2} e^{st}\overline{Q_{1,1}}(\lambda, s)ds =$$

$$\frac{1}{2\pi j}\int_{+b_1}^{+b_2} \frac{e^{-\sigma t}}{-\sigma} \frac{-j\sqrt{\sigma-b_1}}{k_2\sqrt{\alpha_1}\sqrt{b_2-\sigma} + \left(Rk_2\sqrt{b_2-\sigma} + \sqrt{\alpha_2}\right)k_1(-j)\sqrt{\sigma-b_1}} d(-\sigma) =$$

$$-\frac{1}{2\pi}\int_{+b_1}^{+b_2} \frac{e^{-\sigma t}}{\sigma} \frac{\sqrt{\sigma-b_1}}{k_2\sqrt{\alpha_1}\sqrt{b_2-\sigma} - j\left(Rk_2\sqrt{b_2-\sigma} + \sqrt{\alpha_2}\right)k_1\sqrt{\sigma-b_1}} d\sigma$$

Using the definitions E and F:

$$I_3 = -\frac{1}{2\pi}\int_{b_1}^{b_2} \frac{e^{-\sigma t}}{\sigma} \frac{\sqrt{\sigma-b_1}}{E - jF} d\sigma$$

$$I_4 = \frac{1}{2\pi j}\int_{-b_2}^{-\infty} e^{st}\overline{Q_{1,1}}(\lambda, s)ds =$$

$$\frac{1}{2\pi j}\int_{b_2}^{\infty} \frac{e^{-\sigma t}}{-\sigma} \frac{-j\sqrt{\sigma-b_1}}{k_2\sqrt{\alpha_1}(-j)\sqrt{\sigma-b_2} + \left(Rk_2(-j)\sqrt{\sigma-b_2} + \sqrt{\alpha_2}\right)k_1(-j)\sqrt{\sigma-b_1}} d(-\sigma)$$

Using our definitions of C and D:

$$I_4 = \frac{1}{2\pi j}\int_{b_2}^{\infty} \frac{e^{-\sigma t}}{\sigma} \frac{\sqrt{\sigma-b_1}}{D - jC} d\sigma$$

Now adding the line integrals, the following is obtained:

$$I_1 + I_4 = -\frac{1}{2\pi j}\int_{b_2}^{\infty} \frac{e^{-\sigma t}}{\sigma} \frac{\sqrt{\sigma-b_1}}{D + jC} d\sigma + \frac{1}{2\pi j}\int_{b_2}^{\infty} \frac{e^{-\sigma t}}{\sigma} \frac{\sqrt{\sigma-b_1}}{D - jC} d\sigma =$$

-continued $$\frac{1}{2\pi j}\int_{b_2}^{\infty}\frac{e^{-\sigma t}}{\sigma}\frac{(D+jC)\sqrt{\sigma-b_1}-(D-jC)\sqrt{\sigma-b_1}}{C^2+D^2}=$$

$$\frac{1}{2\pi j}\int_{b_2}^{\infty}\frac{e^{-\sigma t}}{\sigma}\frac{(2jC)\sqrt{\sigma-b_1}}{C^2+D^2}=\frac{1}{\pi}\int_{b_2}^{\infty}\frac{e^{-\sigma t}}{\sigma}\frac{C\sqrt{\sigma-b_1}}{C^2+D^2}d\sigma$$

$$I_2+I_3=-\frac{1}{2\pi}\int_{b_1}^{b_2}\frac{e^{-\sigma t}}{\sigma}\frac{\sqrt{\sigma-b_1}}{E+jF}d\sigma-\frac{1}{2\pi}\int_{b_1}^{b_2}\frac{e^{-\sigma t}}{\sigma}\frac{\sqrt{\sigma-b_1}}{E-jF}d\sigma=$$

$$-\frac{1}{2\pi}\int_{b_1}^{b_2}\frac{e^{-\sigma t}}{\sigma}\frac{(E+jF)\sqrt{\sigma-b_1}+(E-jF)\sqrt{\sigma-b_1}}{E^2+F^2}d\sigma=-\frac{1}{\pi}\int_{b_1}^{b_2}\frac{e^{-\sigma t}}{\sigma}\frac{E\sqrt{\sigma-b_1}}{E^2+F^2}d\sigma$$

For $\overline{Q_{1,2}}(\lambda,s)$

There is a simple pole at s=0. The residue of $\overline{Q_{1,2}}(\lambda,s)$ at this point is:

$$Res(\overline{Q_{1,2}}(\lambda,s))_{s=0}=s(\overline{Q_{1,2}}(\lambda,s))_{s=0}=\frac{\sqrt{b_1}\sqrt{b_2}}{k_2\sqrt{\alpha_1}\sqrt{b_2}+(Rk_2\sqrt{b_2}+\sqrt{\alpha_2})k_1\sqrt{b_1}}$$

$$I_1=\frac{1}{2\pi j}\int_{-\infty}^{-b_2}e^{st}\overline{Q_{1,2}}(\lambda,s)ds=$$

$$\frac{1}{2\pi j}\int_{+\infty}^{+b_2}\frac{e^{-\sigma t}}{-\sigma}\frac{j\sqrt{\sigma-b_1}\,j\sqrt{\sigma-b_2}}{k_2\sqrt{\alpha_1}\,j\sqrt{\sigma-b_2}+(Rk_2 j\sqrt{\sigma-b_2}+\sqrt{\alpha_2})k_1 j\sqrt{\sigma-b_1}}d(-\sigma)=$$

$$-\frac{1}{2\pi}\int_{+b_2}^{+\infty}\frac{e^{-\sigma t}}{\sigma}\frac{\sqrt{\sigma-b_1}\sqrt{\sigma-b_2}}{\left[\begin{array}{c}k_2\sqrt{\alpha_1}\sqrt{\sigma-b_2}+\\k_1\sqrt{\alpha_2}\sqrt{\sigma-b_1}\end{array}\right]+j[Rk_1k_2\sqrt{\sigma-b_1}\sqrt{\sigma-b_2}]}d(\sigma)$$

Using our definitions of C and D:

$$I_1=-\frac{1}{2\pi j}\int_{b_2}^{\infty}\frac{e^{-\sigma t}}{\sigma}\frac{\sqrt{\sigma-b_1}\sqrt{\sigma-b_2}}{D+jC}d\sigma$$

$$I_2=\frac{1}{2\pi j}\int_{-b_2}^{-b_1}e^{st}\overline{Q_{1,1}}(\lambda,s)ds=$$

$$\frac{1}{2\pi j}\int_{+b_2}^{+b_1}\frac{e^{-\sigma t}}{-\sigma}\frac{j\sqrt{\sigma-b_1}\sqrt{b_2-\sigma}}{k_2\sqrt{\alpha_1}\sqrt{b_2-\sigma}+(Rk_2\sqrt{b_2-\sigma}+\sqrt{\alpha_2})k_1 j\sqrt{\sigma-b_1}}d(-\sigma)=$$

$$-\frac{1}{2\pi}\int_{b_1}^{b_2}\frac{e^{-\sigma t}}{\sigma}\frac{\sqrt{\sigma-b_1}\sqrt{b_2-\sigma}}{k_2\sqrt{\alpha_1}\sqrt{b_2-\sigma}+j(Rk_2\sqrt{b_2-\sigma}+\sqrt{\alpha_2})k_1\sqrt{\sigma-b_1}}d\sigma$$

Using the definitions E and F:

$$I_2=-\frac{1}{2\pi}\int_{b_1}^{b_2}\frac{e^{-\sigma t}}{\sigma}\frac{\sqrt{\sigma-b_1}\sqrt{b_2-\sigma}}{E+jF}d\sigma$$

$$I_3=\frac{1}{2\pi j}\int_{-b_1}^{-b_2}e^{st}\overline{Q_{1,2}}(\lambda,s)ds=$$

$$\frac{1}{2\pi j}\int_{+b_1}^{+b_2}\frac{e^{-\sigma t}}{-\sigma}\frac{-j\sqrt{\sigma-b_1}\sqrt{b_2-\sigma}}{k_2\sqrt{\alpha_1}\sqrt{b_2-\sigma}+(Rk_2\sqrt{b_2-\sigma}+\sqrt{\alpha_2})k_1(-j)\sqrt{\sigma-b_1}}d(-\sigma)=$$

$$-\frac{1}{2\pi}\int_{+b_1}^{+b_2}\frac{e^{-\sigma t}}{\sigma}\frac{\sqrt{\sigma-b_1}\sqrt{b_2-\sigma}}{k_2\sqrt{\alpha_1}\sqrt{b_2-\sigma}-j(Rk_2\sqrt{b_2-\sigma}+\sqrt{\alpha_2})k_1\sqrt{\sigma-b_1}}d\sigma$$

Using the definitions E and F:

$$I_3=-\frac{1}{2\pi}\int_{b_1}^{b_2}\frac{e^{-\sigma t}}{\sigma}\frac{\sqrt{\sigma-b_1}\sqrt{b_2-\sigma}}{E-jF}d\sigma$$

$$I_4=\frac{1}{2\pi j}\int_{-b_2}^{-\infty}e^{st}\overline{Q_{1,2}}(\lambda,s)ds=$$

$$\frac{1}{2\pi j}\int_{b_2}^{\infty}\frac{e^{-\sigma t}}{-\sigma}\frac{(-j)\sqrt{\sigma-b_1}\,(-j)\sqrt{\sigma-b_2}}{k_2\sqrt{\alpha_1}\,(-j)\sqrt{\sigma-b_2}+(Rk_2(-j)\sqrt{\sigma-b_2}+\sqrt{\alpha_2})k_1(-j)\sqrt{\sigma-b_1}}d(-\sigma)=$$

$$-\frac{1}{2\pi}\int_{b_2}^{\infty}\frac{e^{-\sigma t}}{\sigma}\frac{\sqrt{\sigma-b_1}\sqrt{\sigma-b_2}}{\left[\begin{array}{c}k_2\sqrt{\alpha_1}\sqrt{\sigma-b_2}+\\k_1\sqrt{\alpha_2}\sqrt{\sigma-b_1}\end{array}\right]-j[Rk_1k_2\sqrt{\sigma-b_1}\sqrt{\sigma-b_2}]}d\sigma$$

Using the definitions of C and D:

$$I_4=-\frac{1}{2\pi}\int_{b_2}^{\infty}\frac{e^{-\sigma t}}{\sigma}\frac{\sqrt{\sigma-b_1}\sqrt{\sigma-b_2}}{D-jC}d\sigma$$

Now adding the line integrals, it is obtained:

$$I_1+I_4=-\frac{1}{2\pi}\int_{b_2}^{\infty}\frac{e^{-\sigma t}}{\sigma}\frac{\sqrt{\sigma-b_1}\sqrt{\sigma-b_2}}{D+jC}d\sigma-$$

$$\frac{1}{2\pi}\int_{b_2}^{\infty}\frac{e^{-\sigma t}}{\sigma}\frac{\sqrt{\sigma-b_1}\sqrt{\sigma-b_2}}{D-jC}d\sigma=$$

$$-\frac{1}{2\pi}\int_{b_2}^{\infty}\frac{e^{-\sigma t}}{\sigma}\frac{(D+jC)\sqrt{\sigma-b_1}\sqrt{\sigma-b_2}+(D-jC)\sqrt{\sigma-b_1}\sqrt{\sigma-b_2}}{D^2+C^2}d\sigma=$$

$$-\frac{1}{\pi}\int_{b_2}^{\infty}\frac{e^{-\sigma t}}{\sigma}\frac{D\sqrt{\sigma-b_1}\sqrt{\sigma-b_2}}{D^2+C^2}d\sigma$$

$$I_2+I_3=-\frac{1}{2\pi}\int_{b_1}^{b_2}\frac{e^{-\sigma t}}{\sigma}\frac{\sqrt{\sigma-b_1}\sqrt{b_2-\sigma}}{E+jF}d\sigma-$$

$$\frac{1}{2\pi}\int_{b_1}^{b_2}\frac{e^{-\sigma t}}{\sigma}\frac{\sqrt{\sigma-b_1}\sqrt{b_2-\sigma}}{E-jF}d\sigma=$$

$$-\frac{1}{2\pi}\int_{b_1}^{b_2}\frac{e^{-\sigma t}}{\sigma}\frac{(E-jF)\sqrt{\sigma-b_1}\sqrt{b_2-\sigma}+(E+jF)\sqrt{\sigma-b_1}\sqrt{b_2-\sigma}}{E^2+F^2}d\sigma=$$

$$-\frac{1}{\pi}\int_{b_1}^{b_2}\frac{e^{-\sigma t}}{\sigma}\frac{E\sqrt{\sigma-b_1}\sqrt{b_2-\sigma}}{E^2+F^2}d\sigma$$

And the flux in the Hankel plane becomes $$q_{1,1}(\lambda, t) = \frac{1}{2\pi j}\int_{\sigma_1-j\infty}^{\sigma_1+j\infty} e^{st} \cdot Q_{1,1}(\lambda, s)ds =$$

$$(-(I_1+I_2+I_3+I_4)+Res(\overline{Q_{1,1}}(\lambda, s)))\frac{aqJ_1(\lambda a)k_1\sqrt{\alpha_2}}{\lambda} =$$

$$\frac{aqJ_1(\lambda a)k_1\sqrt{\alpha_2}}{\lambda}\left\{-\frac{1}{\pi}\int_{b_2}^{\infty}\frac{e^{-\sigma t}}{\sigma}\frac{C\sqrt{\sigma-b_1}}{C^2+D^2}d\sigma + \right.$$

$$\frac{1}{\pi}\int_{b_1}^{b_2}\frac{e^{-\sigma t}}{\sigma}\frac{E\sqrt{\sigma-b_1}}{E^2+F^2}d\sigma +$$

$$\left.\frac{\sqrt{b_1}}{k_2\sqrt{\alpha_1}\sqrt{b_2}+(Rk_2\sqrt{b_2}+\sqrt{\alpha_2})k_1\sqrt{b_1}}\right\}$$

Similarly, for $q_{1,2}$:

$$q_{1,2}(\lambda, t) = \frac{1}{2\pi j}\int_{\sigma_1-j\infty}^{\sigma_1+j\infty} e^{st} \cdot Q_{1,2}(\lambda, s)ds =$$

$$(-(I_1+I_2+I_3+I_4)+Res(\overline{Q_{1,2}}(\lambda, s)))\frac{aqRk_1k_2J_1(\lambda a)}{\lambda} =$$

$$\frac{aqRk_1k_2J_1(\lambda a)}{\lambda}\left\{\frac{1}{\pi}\int_{b_2}^{\infty}\frac{e^{-\sigma t}}{\sigma}\frac{D\sqrt{\sigma-b_1}\sqrt{\sigma-b_2}}{D^2+C^2}d\sigma + \right.$$

$$\frac{1}{\pi}\int_{b_1}^{b_2}\frac{e^{-\sigma t}}{\sigma}\frac{E\sqrt{\sigma-b_1}\sqrt{b_2-\sigma}}{E^2+F^2}d\sigma +$$

$$\left.\frac{\sqrt{b_1}\sqrt{b_2}}{k_2\sqrt{\alpha_1}\sqrt{b_2}+(Rk_2\sqrt{b_2}+\sqrt{\alpha_2})k_1\sqrt{b_1}}\right\}$$

Recalling C, D, E, and F:

$$q_{1,1}(\lambda, t) = \frac{aqJ_1(\lambda a)k_1\sqrt{\alpha_2}}{\lambda}\left\{-\frac{1}{\pi}\int_{b_2}^{\infty}\frac{e^{-\sigma t}}{\sigma}\right.$$

$$\frac{Rk_1k_2\sqrt{\sigma-b_1}\sqrt{\sigma-b_2}\sqrt{\sigma-b_1}}{\left(k_2\sqrt{\alpha_1}\sqrt{\sigma-b_2}+k_1\sqrt{\alpha_2}\sqrt{\sigma-b_1}\right)^2+\left(Rk_1k_2\sqrt{\sigma-b_1}\sqrt{\sigma-b_2}\right)^2}d\sigma +$$

$$\frac{1}{\pi}\int_{b_1}^{b_2}\frac{e^{-\sigma t}}{\sigma}\frac{k_2\sqrt{\alpha_1}\sqrt{b_2-\sigma}\sqrt{\sigma-b_1}}{\left(k_2\sqrt{\alpha_1}\sqrt{b_2-\sigma}\right)^2+\left((Rk_2\sqrt{b_2-\sigma}+\sqrt{\alpha_2})k_1\sqrt{\sigma-b_1}\right)^2}d\sigma +$$

$$\left.\frac{\sqrt{b_1}}{k_2\sqrt{\alpha_1}\sqrt{b_2}+(Rk_2\sqrt{b_2}+\sqrt{\alpha_2})k_1\sqrt{b_1}}\right\}$$

$$q_{1,2}(\lambda, t) = \frac{aqRk_1k_2J_1(\lambda a)}{\lambda}$$

$$\left\{\frac{1}{\pi}\int_{b_2}^{\infty}\frac{e^{-\sigma t}}{\sigma}\frac{\left(k_2\sqrt{\alpha_1}\sqrt{\sigma-b_2}+k_1\sqrt{\alpha_2}\sqrt{\sigma-b_1}\right)\sqrt{\sigma-b_1}\sqrt{\sigma-b_2}}{\left(k_2\sqrt{\alpha_1}\sqrt{\sigma-b_2}+k_1\sqrt{\alpha_2}\sqrt{\sigma-b_1}\right)^2+\left(Rk_1k_2\sqrt{\sigma-b_1}\sqrt{\sigma-b_2}\right)^2}d\sigma + \right.$$

$$\frac{1}{\pi}\int_{b_1}^{b_2}\frac{e^{-\sigma t}}{\sigma}\frac{k_2\sqrt{\alpha_1}\sqrt{b_2-\sigma}\sqrt{\sigma-b_1}\sqrt{b_2-\sigma}}{\left(k_2\sqrt{\alpha_1}\sqrt{b_2-\sigma}\right)^2+\left((Rk_2\sqrt{b_2-\sigma}+\sqrt{\alpha_2})k_1\sqrt{\sigma-b_1}\right)^2}d\sigma +$$

$$\left.\frac{\sqrt{b_1}\sqrt{b_2}}{k_2\sqrt{\alpha_1}\sqrt{b_2}+(Rk_2\sqrt{b_2}+\sqrt{\alpha_2})k_1\sqrt{b_1}}\right\}$$

Now $q_1(\lambda,t) = q_{1,1}(\lambda,t) + q_{1,2}(\lambda,t)$:

$$q_1(\lambda, t) = \frac{aqJ_1(\lambda a)k_1\sqrt{\alpha_2}}{\lambda}$$

$$\left\{ -\frac{1}{\pi}\int_{b_2}^{\infty}\frac{e^{-\sigma t}}{\sigma}\frac{Rk_1k_2\sqrt{\sigma-b_1}\sqrt{\sigma-b_2}\sqrt{\sigma-b_1}}{\left(k_2\sqrt{\alpha_1}\sqrt{\sigma-b_2}+k_1\sqrt{\alpha_2}\sqrt{\sigma-b_1}\right)^2+\left(Rk_1k_2\sqrt{\sigma-b_1}\sqrt{\sigma-b_2}\right)^2}d\sigma + \right.$$

$$\frac{1}{\pi}\int_{b_1}^{b_2}\frac{e^{-\sigma t}}{\sigma}\frac{k_2\sqrt{\alpha_1}\sqrt{b_2-\sigma}\sqrt{\sigma-b_1}}{\left(k_2\sqrt{\alpha_1}\sqrt{b_2-\sigma}\right)^2+\left(\left(R k_2\sqrt{b_2-\sigma}+\sqrt{\alpha_2}\right)k_1\sqrt{\sigma-b_1}\right)^2}d\sigma +$$

$$\left. \frac{\sqrt{b_1}}{k_2\sqrt{\alpha_1}\sqrt{b_2}+\left(Rk_2\sqrt{b_2}+\sqrt{\alpha_2}\right)k_1\sqrt{b_1}}\right\} + \frac{aqRk_1k_2J_1(\lambda a)}{\lambda}$$

$$\left\{ \frac{1}{\pi}\int_{b_2}^{\infty}\frac{e^{-\sigma t}}{\sigma}\frac{\left(k_2\sqrt{\alpha_1}\sqrt{\sigma-b_2}+k_1\sqrt{\alpha_2}\sqrt{\sigma-b_1}\right)\sqrt{\sigma-b_1}\sqrt{\sigma-b_2}}{\left(k_2\sqrt{\alpha_1}\sqrt{\sigma-b_2}+k_1\sqrt{\alpha_2}\sqrt{\sigma-b_1}\right)^2+\left(Rk_1k_2\sqrt{\sigma-b_1}\sqrt{\sigma-b_2}\right)^2}d\sigma + \right.$$

$$\frac{1}{\pi}\int_{b_1}^{b_2}\frac{e^{-\sigma t}}{\sigma}\frac{k_2\sqrt{\alpha_1}\sqrt{b_2-\sigma}\sqrt{\sigma-b_1}\sqrt{b_2-\sigma}}{\left(k_2\sqrt{\alpha_1}\sqrt{b_2-\sigma}\right)^2+\left(\left(Rk_2\sqrt{b_2-\sigma}+\sqrt{\alpha_2}\right)k_1\sqrt{\sigma-b_1}\right)^2}d\sigma +$$

$$\left. \frac{\sqrt{b_1}\sqrt{b_2}}{k_2\sqrt{\alpha_1}\sqrt{b_2}+\left(Rk_2\sqrt{b_2}+\sqrt{\alpha_2}\right)k_1\sqrt{b_1}}\right\}$$

(25)

Converting from Laplace-Hankel plane to the space-time domain:

$$q_1(r, t) = -\frac{aqk_1^2 k_2 R\sqrt{\alpha_2}}{\pi}$$

$$\int_0^{\infty}\int_{b_2}^{\infty}\frac{e^{-\sigma t}}{\sigma}\frac{\left(k_2\sqrt{\alpha_1}\sqrt{\sigma-b_2}+k_1\sqrt{\alpha_2}\sqrt{\sigma-b_1}\right)\sqrt{\sigma-b_1}\sqrt{\sigma-b_2}}{\left(k_2\sqrt{\alpha_1}\sqrt{\sigma-b_2}+k_1\sqrt{\alpha_2}\sqrt{\sigma-b_1}\right)^2+\left(Rk_1k_2\sqrt{\sigma-b_1}\sqrt{\sigma-b_2}\right)^2}$$

$$d\sigma J_1(\lambda a)J_0(\lambda r)d\lambda + \frac{aqk_1k_2\sqrt{\alpha_1\alpha_2}}{\pi}\int_0^{\infty}\int_{b_1}^{b_2}\frac{e^{-\sigma t}}{\sigma}$$

$$\frac{k_2\sqrt{\alpha_1}\sqrt{b_2-\sigma}\sqrt{\sigma-b_1}}{\left(k_2\sqrt{\alpha_1}\sqrt{b_2-\sigma}\right)^2+\left(\left(Rk_2\sqrt{b_2-\sigma}+\sqrt{\alpha_2}\right)k_1\sqrt{\sigma-b_1}\right)^2}d\sigma J_1(\lambda a)J_0(\lambda r)d\lambda +$$

$$aqk_1\sqrt{\alpha_2}\int_0^{\infty}\frac{\sqrt{b_1}}{k_2\sqrt{\alpha_1}\sqrt{b_2}+\left(Rk_2\sqrt{b_2}+\sqrt{\alpha_2}\right)k_1\sqrt{b_1}}J_1(\lambda a)J_0(\lambda r)d\lambda +$$

$$\frac{aqk_1k_2R}{\pi}$$

$$\int_0^{\infty}\int_{b_2}^{\infty}\frac{e^{-\sigma t}}{\sigma}\frac{\left(k_2\sqrt{\alpha_1}\sqrt{\sigma-b_2}+k_1\sqrt{\alpha_2}\sqrt{\sigma-b_1}\right)\sqrt{\sigma-b_1}\sqrt{\sigma-b_2}}{\left(k_2\sqrt{\alpha_1}\sqrt{\sigma-b_2}+k_1\sqrt{\alpha_2}\sqrt{\sigma-b_1}\right)^2+\left(Rk_1k_2\sqrt{\sigma-b_1}\sqrt{\sigma-b_2}\right)^2}$$

$$d\sigma J_1(\lambda a)J_0(\lambda r)d\lambda + \frac{aqRk_1k_2^2\sqrt{\alpha_1}}{\pi}\int_0^{\infty}\int_{b_1}^{b_2}\frac{e^{-\sigma t}}{\sigma}$$

$$\frac{k_2\sqrt{\alpha_1}\sqrt{b_2-\sigma}\sqrt{\sigma-b_1}\sqrt{b_2-\sigma}}{\left(k_2\sqrt{\alpha_1}\sqrt{b_2-\sigma}\right)^2+\left(\left(Rk_2\sqrt{b_2-\sigma}+\sqrt{\alpha_2}\right)k_1\sqrt{\sigma-b_1}\right)^2}d\sigma J_1(\lambda a)J_0(\lambda r)d\lambda +$$

$$aqRk_1k_2\int_0^{\infty}\frac{\sqrt{b_1}\sqrt{b_2}}{k_2\sqrt{\alpha_1}\sqrt{b_2}+\left(Rk_2\sqrt{b_2}+\sqrt{\alpha_2}\right)k_1\sqrt{b_1}}J_1(\lambda a)J_0(\lambda r)d\lambda$$

This can be simplified down to 3 terms:

$$q_1(r, t) = \frac{aqRk_1k_2^2\sqrt{\alpha_1}}{\pi} \quad (164)$$

-continued $$\int_0^\infty \int_{b_2}^\infty \frac{e^{-\sigma t}}{\sigma} \frac{\sqrt{\sigma-b_1}\,(\sigma-b_2)}{\left(k_2\sqrt{\alpha_1}\,\sqrt{\sigma-b_2}+k_1\sqrt{\alpha_2}\,\sqrt{\sigma-b_1}\right)^2 + \left(Rk_1k_2\sqrt{\sigma-b_1}\,\sqrt{\sigma-b_2}\right)^2}$$

$$d\sigma J_1(\lambda a)J_0(\lambda r)d\lambda + \frac{aqk_1k_2\sqrt{\alpha_1}}{\pi}$$

$$\int_0^\infty \int_{b_1}^{b_2} \frac{e^{-\sigma t}}{\sigma} \frac{\sqrt{\sigma-b_1}\,\sqrt{b_2-\sigma}\,(k_2R\sqrt{b_2-\sigma}+\sqrt{\alpha_2})}{\left(k_2\sqrt{\alpha_1}\,\sqrt{b_2-\sigma}\right)^2 + \left((Rk_2\sqrt{b_2-\sigma}+\sqrt{\alpha_2})k_1\sqrt{\sigma-b_1}\right)^2}$$

$$d\sigma J_1(\lambda a)J_0(\lambda r)d\lambda +$$

$$aqk_1 \int_0^\infty \frac{\sqrt{b_1}\,(Rk_2\sqrt{b_2}+\sqrt{\alpha_2})}{k_2\sqrt{\alpha_1}\,\sqrt{b_2}+(Rk_2\sqrt{b_2}+\sqrt{\alpha_2})k_1\sqrt{b_1}} J_1(\lambda a)J_0(\lambda r)d\lambda$$

$q_2$ can be derived in the same manner, as follows:

$$Q_2(\lambda, s) = \frac{aq}{s} \frac{J_1(\lambda a)}{\lambda} \frac{k_2\sqrt{\alpha_1}\,\sqrt{s+b_2}}{k_2\sqrt{\alpha_1}\,\sqrt{s+b_2}+k_1\sqrt{s+b_1}\,(Rk_2\sqrt{s+b_2}+\sqrt{\alpha_2})} \quad 20$$

There's a simple pole at s=0. The residue of $\overline{Q_2}(\lambda,s)$ at this point is:

$$Res(\overline{Q_2}(\lambda, s))_{s=0} = s(\overline{Q_2}(\lambda, s))_{s=0} = \frac{k_2\sqrt{\alpha_1}\,\sqrt{b_2}}{k_2\sqrt{\alpha_1}\,\sqrt{b_2}+k_1\sqrt{b_1}\,(Rk_2\sqrt{b_2}+\sqrt{\alpha_2})}$$

$$I_1 = \frac{1}{2\pi j}\int_{-\infty}^{-b_2} e^{st}\overline{Q_2}(\lambda, s)ds =$$

$$\frac{1}{2\pi j}\int_{+\infty}^{+b_2} \frac{e^{-\sigma t}}{-\sigma} \frac{k_2\sqrt{\alpha_1}\,j\sqrt{\sigma-b_2}}{k_2\sqrt{\alpha_1}\,j\sqrt{\sigma-b_2}+(Rk_2j\sqrt{\sigma-b_2}+\sqrt{\alpha_2})k_1j\sqrt{\sigma-b_1}}d(-\sigma) =$$

$$\frac{k_2\sqrt{\alpha_1}}{2\pi}\int_{+b_2}^{+\infty} \frac{e^{-\sigma t}}{\sigma}$$

$$\frac{\sqrt{\sigma-b_2}}{-j[k_2\sqrt{\alpha_1}\,\sqrt{\sigma-b_2}+k_1\sqrt{\alpha_2}\,\sqrt{\sigma-b_1}]+[Rk_1k_2\sqrt{\sigma-b_1}\,\sqrt{\sigma-b_2}]}d(\sigma)$$

Recalling substitutes C, D $$I_1 = \frac{k_2\sqrt{\alpha_1}}{2\pi}\int_{b_2}^\infty \frac{e^{-\sigma t}}{\sigma} \frac{\sqrt{\sigma-b_2}}{C-jD}d\sigma$$

$$I_2 = \frac{1}{2\pi j}\int_{-b_2}^{-b_1} e^{st}\overline{Q_2}(\lambda, s)ds =$$

$$\frac{1}{2\pi j}\int_{+b_2}^{+b_1} \frac{e^{-\sigma t}}{-\sigma} \frac{k_2\sqrt{\alpha_1}\,\sqrt{b_2-\sigma}}{k_2\sqrt{\alpha_1}\,\sqrt{b_2-\sigma}+(Rk_2\sqrt{b_2-\sigma}+\sqrt{\alpha_2})k_1j\sqrt{\sigma-b_1}}d(-\sigma) =$$

$$-\frac{k_2\sqrt{\alpha_1}}{2\pi j}\int_{+b_1}^{+b_2} \frac{e^{-\sigma t}}{\sigma} \frac{k_2\sqrt{\alpha_1}\,\sqrt{b_2-\sigma}}{k_2\sqrt{\alpha_1}\,\sqrt{b_2-\sigma}+j(Rk_2\sqrt{b_2-\sigma}+\sqrt{\alpha_2})k_1\sqrt{\sigma-b_1}}d\sigma$$

Recalling substitutes E, F $$I_2 = -\frac{k_2\sqrt{\alpha_1}}{2\pi j}\int_{b_1}^{b_2} \frac{e^{-\sigma t}}{\sigma} \frac{\sqrt{b_2-\sigma}}{E+jF}d\sigma$$

$$I_3 = \frac{1}{2\pi j}\int_{-b_1}^{-b_2} e^{st}\overline{Q_2}(\lambda, s)ds =$$

-continued $$\frac{1}{2\pi j}\int_{+b_1}^{+b_2}\frac{e^{-\sigma t}}{-\sigma}\frac{k_2\sqrt{\alpha_1}\sqrt{b_2-\sigma}}{k_2\sqrt{\alpha_1}\sqrt{b_2-\sigma}+(Rk_2\sqrt{b_2-\sigma}+\sqrt{\alpha_2})k_1(-j)\sqrt{\sigma-b_1}}d(-\sigma)=$$

$$+\frac{1}{2\pi}\int_{+b_1}^{+b_2}\frac{e^{-\sigma t}}{\sigma}\frac{k_2\sqrt{\alpha_1}\sqrt{b_2-\sigma}}{k_2\sqrt{\alpha_1}\sqrt{b_2-\sigma}-j(Rk_2\sqrt{b_2-\sigma}+\sqrt{\alpha_2})k_1\sqrt{\sigma-b_1}}d\sigma$$

Using the definitions E and F:

$$I_3=-\frac{k_2\sqrt{\alpha_1}}{2\pi j}\int_{b_1}^{b_2}\frac{e^{-\sigma t}}{\sigma}\frac{\sqrt{b_2-\sigma}}{E-jF}d\sigma$$

$$I_4=\frac{1}{2\pi j}\int_{-b_2}^{-\infty}e^{st}\overline{Q_2}(\lambda,s)ds=\frac{k_2\sqrt{\alpha_1}}{2\pi j}$$

$$\int_{+b_2}^{+\infty}\frac{e^{-\sigma t}}{-\sigma}\frac{-j\sqrt{\sigma-b_2}}{k_2\sqrt{\alpha_1}(-j)\sqrt{\sigma-b_2}+(Rk_2(-j)\sqrt{\sigma-b_2}+\sqrt{\alpha_2})k_1(-j)\sqrt{\sigma-b_1}}d(-\sigma)=$$

$$\frac{k_2\sqrt{\alpha_1}}{2\pi}$$

$$\int_{+b_2}^{+\infty}\frac{e^{-\sigma t}}{\sigma}\frac{\sqrt{\sigma-b_2}}{j[k_2\sqrt{\alpha_1}\sqrt{\sigma-b_2}+k_1\sqrt{\alpha_2}\sqrt{\sigma-b_1}]+[Rk_1k_2\sqrt{\sigma-b_1}\sqrt{\sigma-b_2}]}d(\sigma)$$

Using the definitions C and D:

$$I_4=\frac{k_2\sqrt{\alpha_1}}{2\pi}\int_{b_2}^{\infty}\frac{e^{-\sigma t}}{\sigma}\frac{\sqrt{\sigma-b_2}}{C+jD}d\sigma$$

Now add the integrals:

$$I_1+I_4=$$

$$\frac{k_2\sqrt{\alpha_1}}{2\pi}\int_{b_2}^{\infty}\frac{e^{-\sigma t}}{\sigma}\frac{\sqrt{\sigma-b_2}}{C-jD}d\sigma+\frac{k_2\sqrt{\alpha_1}}{2\pi}\int_{b_2}^{\infty}\frac{e^{-\sigma t}}{\sigma}\frac{\sqrt{\sigma-b_2}}{C+jD}d\sigma=$$

$$\frac{k_2\sqrt{\alpha_1}}{2\pi}\int_{b_2}^{\infty}\frac{e^{-\sigma t}}{\sigma}\frac{(C-jD)\sqrt{\sigma-b_2}+(C+jD)\sqrt{\sigma-b_2}}{C^2+D^2}d\sigma=$$

$$\frac{k_2\sqrt{\alpha_1}}{\pi}\int_{b_2}^{\infty}\frac{e^{-\sigma t}}{\sigma}\frac{C\sqrt{\sigma-b_2}}{C^2+D^2}d\sigma$$

$$I_2+I_3=-\frac{k_2\sqrt{\alpha_1}}{2\pi j}\int_{b_1}^{b_2}\frac{e^{-\sigma t}}{\sigma}\frac{\sqrt{b_2-\sigma}}{E+jF}d\sigma+$$

$$\frac{k_2\sqrt{\alpha_1}}{2\pi j}\int_{b_1}^{b_2}\frac{e^{-\sigma t}}{\sigma}\frac{\sqrt{b_2-\sigma}}{E-jF}d\sigma=$$

-continued $$\frac{k_2\sqrt{\alpha_1}}{2\pi j}\int_{b_1}^{b_2}\frac{e^{-\sigma t}}{\sigma}\frac{(E+jF)\sqrt{b_2-\sigma}-(E-jF)\sqrt{b_2-\sigma}}{E^2+F^2}d\sigma=$$

$$\frac{k_2\sqrt{\alpha_1}}{\pi}\int_{b_1}^{b_2}\frac{e^{-\sigma t}}{\sigma}\frac{F\sqrt{b_2-\sigma}}{E^2+F^2}d\sigma$$

Now it is possible to obtain the heat flux in the Hankel plane:

$$q_2(\lambda,t)=\frac{1}{2\pi j}\int_{\sigma_1-j\infty}^{\sigma_1+j\infty}e^{st}\cdot Q_2(\lambda,s)ds=$$

$$(-(I_1+I_2+I_3+I_4)+Res(\overline{Q_2}(\lambda,s)))\frac{aqJ_1(\lambda a)k_1\sqrt{\alpha_2}}{\lambda}=$$

$$\frac{aqJ_1(\lambda a)k_1\sqrt{\alpha_2}}{\lambda}\left\{-\frac{k_2\sqrt{\alpha_1}}{\pi}\int_{b_2}^{\infty}\frac{e^{-\sigma t}}{\sigma}\frac{C\sqrt{\sigma-b_2}}{C^2+D^2}d\sigma-\right.$$

$$\frac{k_2\sqrt{\alpha_1}}{\pi}\int_{b_1}^{b_2}\frac{e^{-\sigma t}}{\sigma}\frac{F\sqrt{b_2-\sigma}}{E-jF}d\sigma+$$

$$\left.\frac{k_2\sqrt{\alpha_1}\sqrt{b_2}}{k_2\sqrt{\alpha_1}\sqrt{b_2}+k_1\sqrt{b_1}(Rk_2\sqrt{b_2}+\sqrt{\alpha_2})}\right\}$$

Recalling our definitions of C, D, E, and F:

$$q_2(\lambda,t)=\frac{aqJ_1(\lambda a)k_1\sqrt{\alpha_2}}{\lambda}\left\{-\frac{k_2\sqrt{\alpha_1}}{\pi}\right.$$

$$\int_{b_2}^{\infty}\frac{e^{-\sigma t}}{\sigma}\frac{Rk_1k_2\sqrt{\sigma-b_1}\sqrt{\sigma-b_2}\sqrt{\sigma-b_2}}{(Rk_1k_2\sqrt{\sigma-b_1}\sqrt{\sigma-b_2})^2+(k_2\sqrt{\alpha_1}\sqrt{\sigma-b_2}+k_1\sqrt{\alpha_2}\sqrt{\sigma-b_1})^2}d\sigma-$$

$$\frac{k_2\sqrt{\alpha_1}}{\pi}\int_{b_1}^{b_2}\frac{e^{-\sigma t}}{\sigma}\frac{(Rk_2\sqrt{b_2-\sigma}+\sqrt{\alpha_2})k_1\sqrt{\sigma-b_1}\sqrt{b_2-\sigma}}{(k_2\sqrt{\alpha_1}\sqrt{b_2-\sigma})^2+((Rk_2\sqrt{b_2-\sigma}+\sqrt{\alpha_2})k_1\sqrt{\sigma-b_1})^2}d\sigma+$$

$$\frac{k_2\sqrt{\alpha_1}\sqrt{b_2}}{k_2\sqrt{\alpha_1}\sqrt{b_2}+k_1\sqrt{b_1}\left(Rk_2\sqrt{b_2}+\sqrt{\alpha_2}\right)}\Bigg\}$$

After simplifying, the flux in the space-time domain becomes:

$$q_2(r,t) = -\frac{aqRk_1k_2^2\sqrt{\alpha_1}}{\pi} \tag{165}$$

$$\int_0^\infty \int_{b_2}^\infty \frac{e^{-\sigma t}}{\sigma} \frac{\sqrt{\sigma-b_1}\,(\sigma-b_2)}{\left(Rk_1k_2\sqrt{\sigma-b_1}\sqrt{\sigma-b_2}\right)^2 + \left(\frac{k_2\sqrt{\alpha_1}\sqrt{\sigma-b_2}+}{k_1\sqrt{\alpha_2}\sqrt{\sigma-b_1}}\right)^2} d\sigma J_1(\lambda a) J_0(\lambda r) d\lambda -$$

$$\frac{aqk_1k_2\sqrt{\alpha_1}}{\pi} \int_0^\infty \int_{b_1}^{b_2} \frac{e^{-\sigma t}}{\sigma} \frac{\sqrt{\sigma-b_1}\sqrt{b_2-\sigma}\left(Rk_2\sqrt{b_2-\sigma}+\sqrt{\alpha_2}\right)}{\left(k_2\sqrt{\alpha_1}\sqrt{b_2-\sigma}\right)^2 + \left(\frac{Rk_2\sqrt{b_2-\sigma}+}{\sqrt{\alpha_2}}\right)^2} d\sigma J_1(\lambda a) J_0(\lambda r) d\lambda +$$

$$aq\int_0^\infty \frac{k_2\sqrt{\alpha_1}\sqrt{b_2}}{k_2\sqrt{\alpha_1}\sqrt{b_2}+k_1\sqrt{b_1}\left(Rk_2\sqrt{b_2}+\sqrt{\alpha_2}\right)} J_1(\lambda a) J_0(\lambda r) d\lambda$$

The first two terms in $q_1(r,t)$ (164) and $q_2(r,t)$ (165) are the transient parts of the heat flux, and they vanish as the time tends to infinity. The third terms are time independent, and they describe the heat fluxes at steady-state. Note that the steady-state terms are the result of the simple pole at s=0. This result can be understood since the Laplace parameter s is in the time frequency domain (1/t), therefore t→∞ (steady-state) is equivalent to s→0.

Note that the sum of $q_1(r,t)+q_2(r,t)=q$ as expected. The 2 time-dependent integrals in $q_1(r,t)$ and $q_2(r,t)$ cancel each other when added, and the 2 steady-state integrals add to q.

The average values of the flux over the CHS area are:

$$q_{1Av}(t) = \tag{166}$$

$$\frac{2qRk_1k_2^2\sqrt{a_1}}{\pi} \int_0^\infty \int_{b_2}^\infty \frac{e^{-\sigma t}}{\sigma} \frac{\sqrt{\sigma-b_1}\,(\sigma-b_2)}{\left(k_2\sqrt{\alpha_1}\sqrt{\sigma-b_2}+k_1\sqrt{\alpha_2}\sqrt{\sigma-b_1}\right)^2 + \left(Rk_1k_2\sqrt{\sigma-b_1}\sqrt{\sigma-b_2}\right)^2}$$

$$d\sigma \frac{(J_1(\lambda a))^2}{\lambda} d\lambda + \frac{2qk_1k_2\sqrt{\alpha_1}}{\pi}$$

$$\int_0^\infty \int_{b_1}^{b_2} \frac{e^{-\sigma t}}{\sigma} \frac{\sqrt{\sigma-b_1}\sqrt{b_2-\sigma}\left(k_2R\sqrt{b_2-\sigma}+\sqrt{\alpha_2}\right)}{\left(k_Z\sqrt{\alpha_1}\sqrt{b_2-\sigma}\right)^2 + \left(\left(Rk_2\sqrt{b_2-\sigma}+\sqrt{\alpha_2}\right)k_1\sqrt{\sigma-b_1}\right)^2}$$

$$d\sigma \frac{(J_1(\lambda a))^2}{\lambda} d\lambda + 2qk_1$$

$$\int_0^\infty \frac{\sqrt{b_1}\left(Rk_2\sqrt{b_2}+\sqrt{\alpha_2}\right)}{k_2\sqrt{\alpha_1}\sqrt{b_2}+\left(Rk_2\sqrt{b_2}+\sqrt{\alpha_2}\right)k_1\sqrt{b_1}} \frac{(J_1(\lambda a))^2}{\lambda} d\lambda$$

$$q_{2Av}(t) = -\frac{2qRk_1k_2^2\sqrt{\alpha_1}}{\pi} \int_0^\infty \int_{b_2}^\infty \frac{e^{-\sigma t}}{\sigma} \tag{167}$$

$$\frac{\sqrt{\sigma-b_1}\,(\sigma-b_2)}{\left(Rk_1k_2\sqrt{\sigma-b_1}\sqrt{\sigma-b_2}\right)^2 + \left(k_2\sqrt{\alpha_1}\sqrt{\sigma-b_2}+k_1\sqrt{\alpha_2}\sqrt{\sigma-b_1}\right)^2}$$

$$d\sigma \frac{(J_1(\lambda a))^2}{\lambda} d\lambda - \frac{2qk_1k_2\sqrt{\alpha_1}}{\pi}$$

$$\int_0^\infty \int_{b_1}^{b_2} \frac{e^{-\sigma t}}{\sigma} \frac{\sqrt{\sigma-b_1}\sqrt{b_2-\sigma}\left(Rk_2\sqrt{b_2-\sigma}+\sqrt{\alpha_2}\right)}{\left(k_2\sqrt{\alpha_1}\sqrt{b_2-\sigma}\right)^2 + \left(\left(Rk_2\sqrt{b_2-\sigma}+\sqrt{\alpha_2}\right)k_1\sqrt{\sigma-b_1}\right)^2}$$

$$d\sigma \frac{(J_1(\lambda a))^2}{\lambda} d\lambda +$$

$$2qk_2\sqrt{a_1} \int_0^\infty \frac{\sqrt{b_2}}{k_2\sqrt{\alpha_1}\sqrt{b_2}+k_1\sqrt{b_1}\left(Rk_2\sqrt{b_2}+\sqrt{\alpha_2}\right)} \frac{(J_1(\lambda a))^2}{\lambda} d\lambda$$

The above has described a solution for single sided measurement with only one thermal contact resistance R. As set forth further below, the solution can be extended to include two different contact resistances on the surfaces of the CHS sensor.

Figure 19:
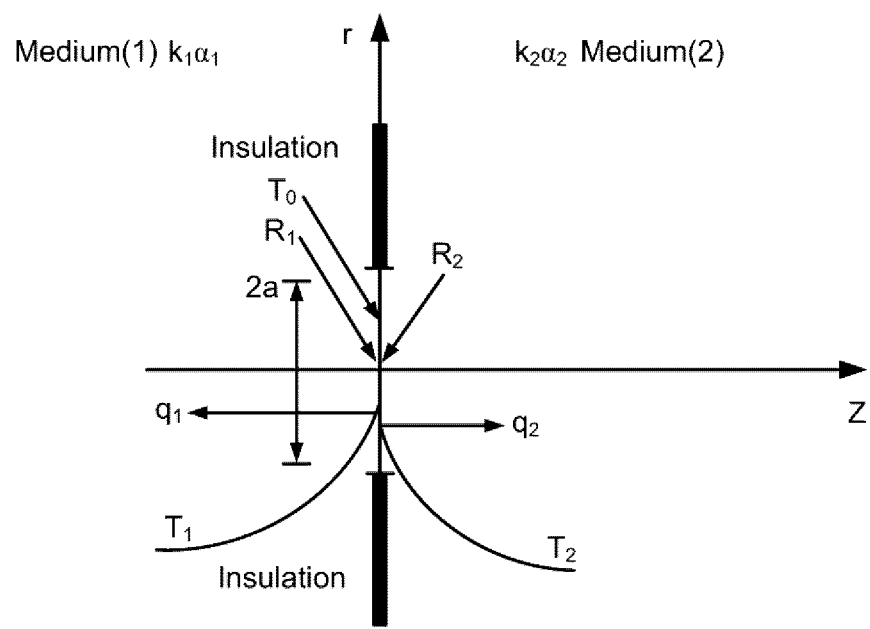
FIG. 19 depicts a setup of two different material samples with contact resistances between the sensor and each of the material samples.

FIG. 19 depicts measurement setup of a material sample in a single sided measurement with two contact resistances. Single sided measurements may use material samples on both sides of the sensor, however the material on each side of the sensor is different. The temperature on the sensor surface is given by:

$$T_0(r, z=0, t) = \tag{168}$$

$$-\frac{aq}{\pi} \int_0^\infty \left[ \int_{b_2}^\infty \frac{e^{-\sigma t}}{\sigma} \frac{\sqrt{\alpha_1}\,k_1\sqrt{\sigma-b_1}\,[\alpha_2+k_2^2R_2^2(\sigma-b_2)] + \sqrt{\alpha_2}\,k_2\sqrt{\sigma-b_2}\,[\alpha_1+k_1^2R_1^2(\sigma-b_1)]}{k_1^2k_2^2(\sigma-b_1)(\sigma-b_2)(R_1+R_2)^2 + \left(\sqrt{\alpha_1}\,k_2\sqrt{\sigma-b_2}+\sqrt{\alpha_2}\,k_1\sqrt{\sigma-b_1}\right)^2} d\sigma \right]$$

$$J_1(\lambda a) J_0(\lambda r) d\lambda -$$

-continued $$\frac{aq}{\pi}\int_0^\infty \left[\int_{b_1}^{b_2} \frac{e^{-\sigma t}}{\sigma} \frac{\sqrt{\alpha_1}\, k_1 \sqrt{\sigma-b_1}\,(\sqrt{\alpha_2}+k_2 R_2\sqrt{b_2-\sigma}\,)^2}{\alpha_1 k_2^2 (b_2-\sigma) + \begin{bmatrix} k_1 k_2 R_1 \sqrt{\sigma-b_1}\,\sqrt{b_2-\sigma}\,+ \\ k_1\sqrt{\sigma-b_1}\,(\sqrt{\alpha_2}+k_2 R_2\sqrt{b_2-\sigma}\,) \end{bmatrix}^2} d\sigma\right]$$

$$J_1(\lambda a)J_0(\lambda r)d\lambda +$$

$$aq\int_0^\infty \left[\frac{(1+k_1 R_1\lambda)(1+k_2 R_2\lambda)}{k_2(1+k_1 R_1\lambda)+k_1(1+k_2 R_2\lambda)}\right]J_1(\lambda a)J_0(\lambda r)\frac{d\lambda}{\lambda}$$

The average temperature on the CHS surface is obtained by integrating $T_0$ over r from 0 to α and dividing by the CHS area. This yields:

$$T_{0Av}(z=0,t) = \tag{169}$$

$$-\frac{2q}{\pi}\int_0^\infty \left[\int_{b_2}^\infty \frac{e^{-\sigma t}}{\sigma} \frac{\sqrt{\alpha_1}\,k_1\sqrt{\sigma-b_1}\,[\alpha_2+k_2^2 R_2^2(\sigma-b_2)]+\sqrt{\alpha_2}\,k_2\sqrt{\sigma-b_2}\,[a_1+k_1^2 R_1^2(\sigma-b_1)]}{k_1^2 k_2^2(\sigma-b_1)(\sigma-b_2)(R_1+R_2)^2+(\sqrt{\alpha_1}\,k_2\sqrt{\sigma-b_2}+\sqrt{\alpha_2}\,k_1\sqrt{\sigma-b_1}\,)^2} d\sigma\right]$$

$$J_1^2(\lambda a)\frac{d\lambda}{\lambda}-$$

$$\frac{2q}{\pi}\int_0^\infty \left[\int_{b_1}^{b_2} \frac{e^{-\sigma t}}{\sigma} \frac{\sqrt{\alpha_1}\,k_1\sqrt{\sigma-b_1}\,(\sqrt{\alpha_2}+k_2 R_2\sqrt{b_2-\sigma}\,^2)}{\alpha_1 k_2^2(b_2-\sigma)+\begin{bmatrix} k_1 k_2 R_1\sqrt{\sigma-b_1}\,\sqrt{t_2-\sigma}\,+ \\ k_1\sqrt{\sigma-b_1}\,(\sqrt{\alpha_2}+k_2 R_2\sqrt{b_2-\sigma}\,) \end{bmatrix}^2} d\sigma\right]$$

$$J_1^2(\lambda a)\frac{d\lambda}{\lambda}+2q\int_0^\infty \left[\frac{(1+k_1 R_1\lambda)(1+k_2 R_2\lambda)}{k_2(1+k_1 R_1\lambda)+k_1(1+k_2 R_2\lambda)}\right]J_{1^2}(\lambda a)\frac{d\lambda}{\lambda^2}$$

The setup depicted in FIG. 19 will have a steady-state, with the steady-state temperature fields determined by the third, time-independent, term in equation (169).

$$T_{0AvSS}(z=0) = 2q\int_0^\infty \left[\frac{(1+k_1 R_1\lambda)(1+k_2 R_2\lambda)}{k_2(1+k_1 R_1\lambda)+k_1(1+k_2 R_2\lambda)}\right]J_1^2(\lambda a)\frac{d\lambda}{\lambda^2} \tag{170}$$

In addition to using a CHS sensor in measuring thermal characteristics of bulk materials and slab materials, the CHS sensor may also be used to measure the thermal characteristics of thin film materials. As described above, thermal characteristics such as conductivity, effusivity and diffusivity, can be determined with an appropriate sensor and method by applying heat to a sample and measuring the temperature in a transient mode. However, if the sample is a thin film material, determining the thermal characteristics can be difficult, since the heat wave may completely penetrate the thin film in a very short time.

A circular heat source sensor can be used to heat two identical isotropic material samples with known thermal characteristics and determine the temperature of the materials. Two identical thin film materials (with same thermal characteristics and same thickness) with unknown thermal conductivity may be sandwiched between the sensor and the two identical known samples, thus creating a symmetrical system. From the sensor temperature measurements vs time (transient mode) and the known heat supplied to the sensor, the cross-plane thermal conductivity of the identical thin films' material may be determined, see for example ISO 22007-2:2008(E). The symmetry of the system dictates an equal, and constant in time, heat flow to each side of the sensor (i.e. 50% of the provided heat). This method uses the relationship known as Fourier equation of heat conduction $$\frac{1}{2}\frac{P}{\pi a^2} = \frac{1}{2}q = \frac{1}{R}\Delta T = \frac{1}{(d/k)}\Delta T$$

Where
P the power supplied to the sensor
a the radius of the sensor
q the total flux supplied to the sensor
R the thin film resistance
d the thin film thickness
k the thin film cross-plane thermal conductivity
ΔT the sensor temperature increase due to the thin film Since P, a, and d are known, and ΔT can be measured, the conductivity k can be determined. This method can be used for both a steady-state measurement and a transient measurement of a symmetrical system, because the heat flux flowing through the thin film is known and constant in time.

However, if the system is a) not symmetrical, i.e. only one thin film is used, and/or b) two thin films with identical thermal characteristics, but different thicknesses are used, and/or c) there exist parasitic thermal resistances on one or both sides of the CHS, and/or d) any variation of the above, then the system is no longer symmetrical, the heat flux passing thru the thin film is not constant in time and its value unknown, and therefore the determination of the thermal conductivity of the thin films is not possible with this method.

The transient method described further below is based on a new exact analytical solution of the problem of a circular heat source (CHS) embedded inside two identical large (relative to the CHS size and heat propagation) samples in contact with the CHS, whereby thermal contact resistances (similar or different) exist between the CHS surfaces and the two samples. This analytical solution can be used to measure the thermal conductivity of thin films (with thicknesses from sub micrometer to 100 or more micrometers), with the assumption that the absolute heat capacities of the CHS and the thin films are negligible relative to the large known samples. This assumption has been verified using finite element simulations for certain cases (e.g. a polyimide film and an air gap), as compared to the said analytical solution. The match is very good.

The new analytical solution describes the time evolvement of the temperature fields on the CHS surfaces and inside the samples, and the time evolvement of the heat flux flowing from the CHS surfaces to each of the samples. By comparing the measured CHS temperature vs time curve with the analytical solution, the unknown thin film resistance can be found. Since the thin film thickness is known, its thermal conductivity can be calculated using the equation k=d/R.

Figure 20:
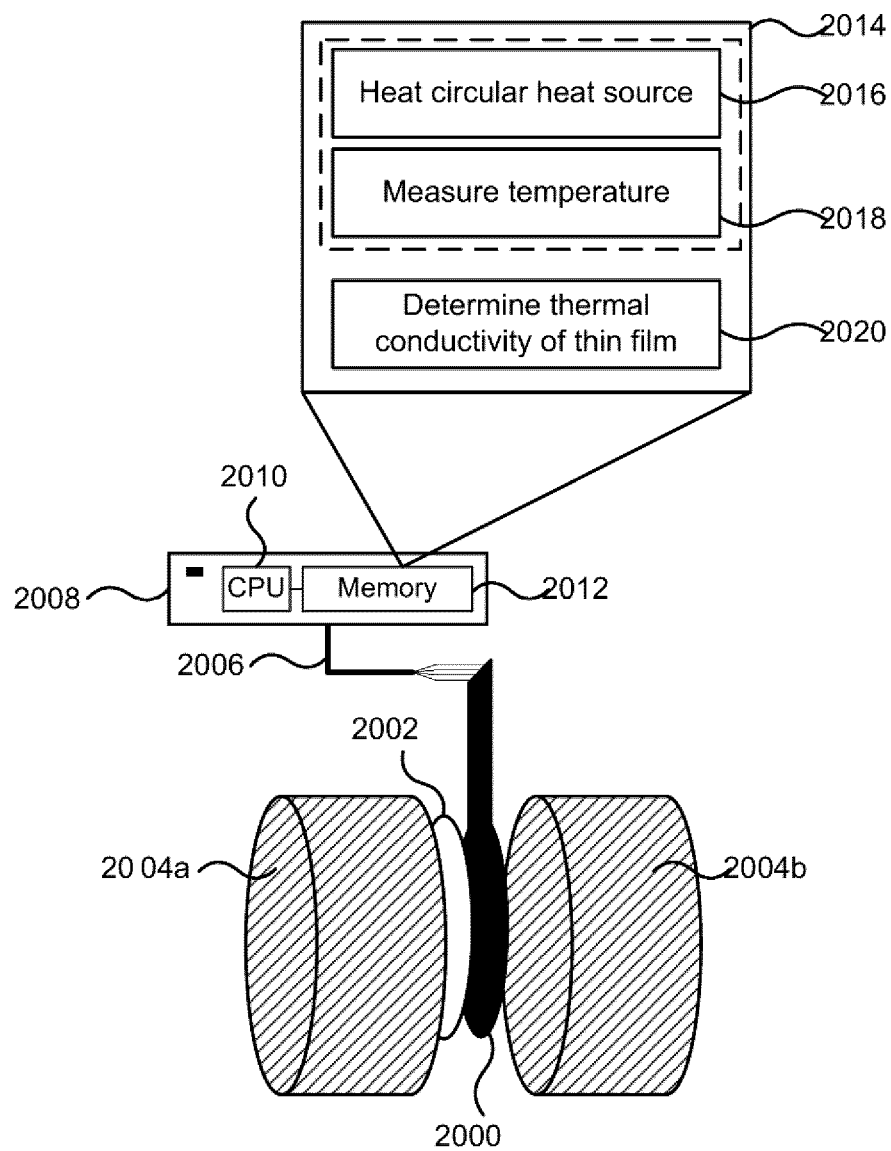
FIG. 20 depicts a measurement system using a circular heat source sensor for determining thermal characteristics of thin film materials.

FIG. 20 depicts a measurement system using a circular heat source sensor. The system 2000 allows thermal conductivity properties of a thin film material 2002 to be determined. The thin film material 2002 may be sandwiched between the CHS sensor and one of the material samples 2004a, 2004b that are substantially the same and may be isotropic materials. The CHS sensor may comprise a spiral heating element formed of a material that has a resistance that depends upon the temperature. Accordingly, the sensor 2000 may be used to both provide heat to the samples by applying current to the heating element as well as monitor the temperature by monitoring the voltage, which depends upon the resistance and so the temperature. The sensor 2000 and the thin film material 2002 and the material samples 2004a, 2004b may be sized so that the samples are larger than the sensor. The connection leads of the sensor 2000 may be connected by wires 2006 to a controller 2008 that controls operation of the sensor 2000. The controller 2008 comprises a processor 2010 and a memory 2012 that stores instructions that can be executed by the processor 2010. When executed, the instructions configure the controller to provide measurement functionality 2014.

The measurement functionality 2014 begins with heating the circular heat source sensor (2016). The controller 2008 may provide a heating current to the sensor. The heating may be done for a short period of time so that the heat does not reach the top or side surfaces of the samples 2004a, 2004b so that the samples are heated in 3-dimensions. During this heating time, the sensor used for heating is continuously monitored by the controller 2008, by means of measuring the voltage, or equivalently the resistance of the heating element of the sensor, using the same electrical connections, which provide the heating current. The measurement may employ 2-wire or 4-wire methods. The CHS temperature can be determined from its resistance measurement (2018) since the resistance depends upon the temperature, using the spiral TCR, temperature coefficient of resistivity. Alternatively, the heated area temperature may be measured by another means, such as a thermocouple. The thermal conductivity of the thin film material may be determined (2020) using the applied heat and measured temperatures. The thermal conductivity may be determined as set forth further below.

Figure 21:
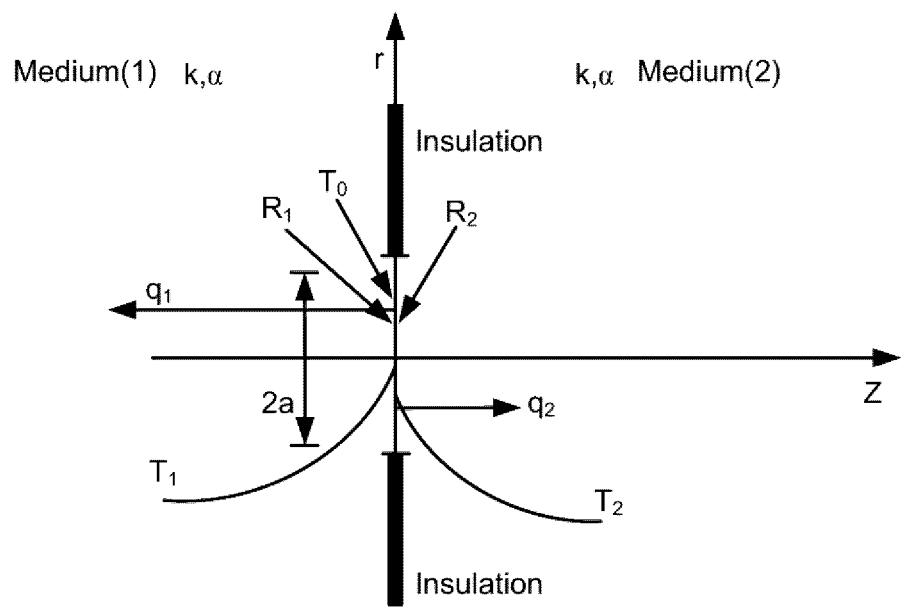
FIG. 21 depicts measurements of two identical material samples with two different contact resistances representing two different thin films.
Figure 22A:
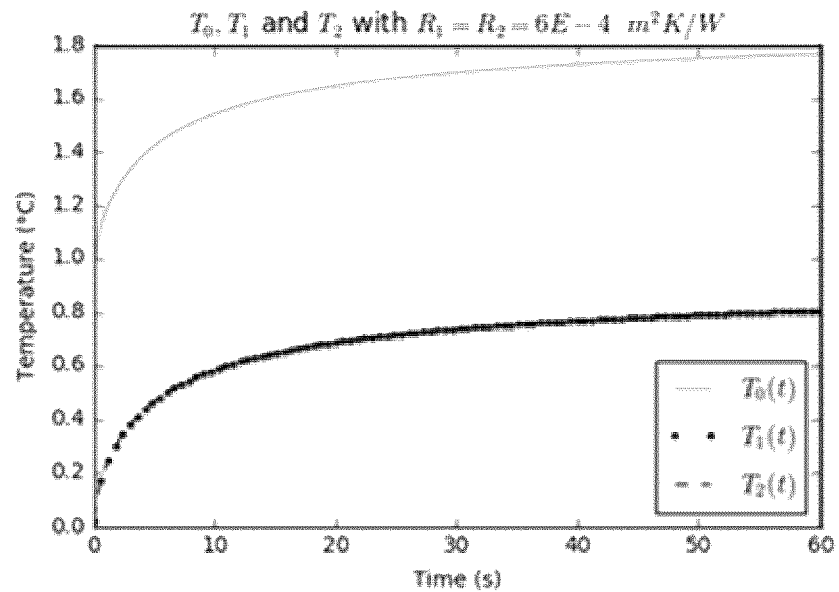
FIGS. 22A and 22B depict temperature measurements.
Figure 22B:
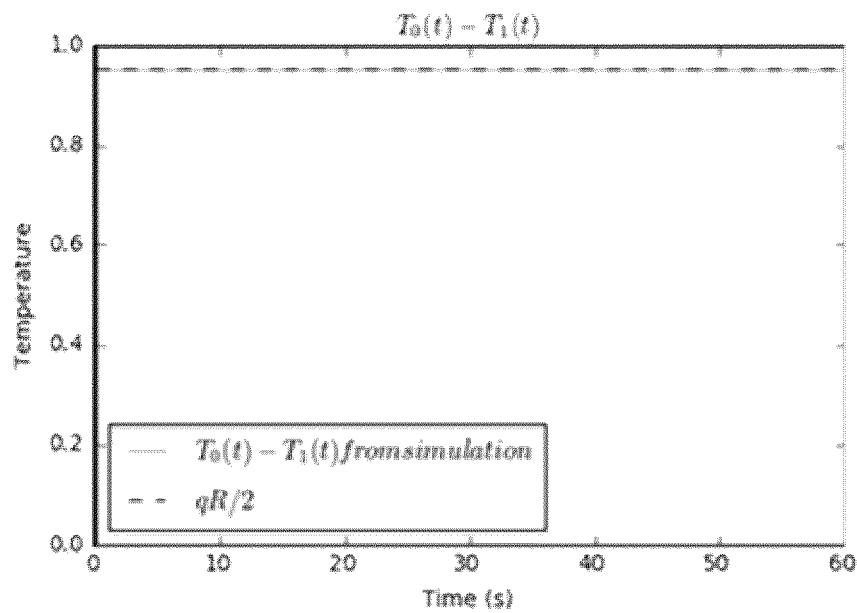

The following derives the 3-dimensional temperature fields generated by a circular heat source (CHS) sensor embedded inside an infinite plane (or two large, identical samples), when different thermal contact resistances are present on both surfaces of the CHS sensor. Three different temperature fields are derived: the temperature field inside the CHS sensor and the temperature fields in the semi-infinite planes on each side of the CHS sensor. The derivation of the solution uses first principles with no prior assumptions, except for neglecting the CHS sensor's heat capacity. It employs the Hankel and Laplace transforms. The analytical solution for a 2 dimensional CHS sensor presented here is exact with no approximations. The application of the solution to thin film thermal conductivity measurements is demonstrated. FIG. 21 depicts the setup of the CHS sensor which is embedded inside two identical and isotropic semi-infinite media 1 and 2. The CHS is assumed to be a 2D circle with a diameter of 2a and with no thickness or heat capacity. There are contact resistances between the sensor surfaces and the two media. The contact resistances may be considered as being from the thin film materials, which heat capacities are assumed to be negligible relative to the large media. Apart from the CHS area, the interface between the two media are thermally insulated. The total heat flux supplied to the CHS for t≥0 is constant and uniformly distributed over the CHS area, denoted q [W/m²], and zero for t<0.

Let $T_0(r,z=0,t)$ be the temperature on the 2D virtual CHS sensor confined to z=0, $T_1(r,z,t)$ the temperature field in medium 1 and $T_2(r,z,t)$ in medium 2. The heat conduction equations, initial and boundary conditions in media 1 and 2 in polar coordinates with angular symmetry are:

$$\frac{\partial^2 T_1}{\partial r^2} + \frac{1}{r}\frac{\partial T_1}{\partial r} + \frac{\partial^2 T_1}{\partial Z^2} = \frac{1}{\alpha}\frac{\partial T_1}{\partial t}; z<0 \tag{171}$$

$$\frac{\partial^2 T_2}{\partial r^2} + \frac{1}{r}\frac{\partial T_2}{\partial r} + \frac{\partial^2 T_2}{\partial Z^2} = \frac{1}{\alpha}\frac{\partial T_2}{\partial t}; z>0 \tag{172}$$

Zero initial temperature everywhere:

$$T_0(r,z=0,t=0) = T_1(r,z,t=0) = T_2(r,z,t=0) = 0; \tag{173}$$

$$-k\frac{\partial T_1}{\partial Z}\bigg|z=0 = \left\{\begin{array}{ll}-q_1(r,t) & 0 \le r < a \\ 0 & r > a\end{array}; t>0\right\} \tag{174}$$

It is assumed that the fluxes $q_1$ and $q_2$ are time dependent:

$$-k\frac{\partial T_2}{\partial Z}\bigg|z=0 = \left\{\begin{array}{ll}q_2(r,t) & 0 \le r < a \\ 0 & r > a\end{array}; t>0\right\} \tag{175}$$

The total flux q is constant:

$$q_1(r,t)+q_2(r,t)=q \tag{176}$$

Contact resistance $R_1$ [m²K/W] on medium 1:

$$T_0(r,z=0,t)-T_1(r,z=0,t)=R_1 q_1(r,t); z=0 \tag{177}$$

Contact resistance $R_2$ [m²/W] on medium 2:

$$T_0(r,z=0,t)-T_2(r,z=0,t)=R_2 q_2(r,t); z=0 \tag{178}$$

The solution must be finite at r=0 and vanish at r=∞ and at z=±∞.

The equations and initial and boundary conditions are transformed to Laplace domain. The transform is done on the time t (t→s). The transformed temperature functions are denoted $\varphi_i(r,z,s)$.

$$\frac{\partial^2 \varphi_1}{\partial r^2} + \frac{1}{r}\frac{\partial \varphi_1}{\partial r} + \frac{\partial^2 \varphi_1}{\partial Z^2} = \frac{s\varphi_1 - T_1(t=0)}{\alpha} = \frac{s}{\alpha}\varphi; z<0 \tag{179}$$
$$\varphi_1 = \varphi_1(r,z,s)$$

$$\frac{\partial^2 \varphi_2}{\partial r^2} + \frac{1}{r}\frac{\partial \varphi_Z}{\partial r} + \frac{\partial^2 \varphi_2}{\partial Z^2} = \frac{s\varphi_2 - T_2(t=0)}{\alpha} = \frac{s}{\alpha}\varphi_2; z>0 \tag{180}$$
$$\varphi_2 = \varphi_2(r,z,s)$$

$$-k\frac{\partial \varphi_1}{\partial Z}\bigg|z=0 = \left\{\begin{array}{ll}-q_1(r,s) & 0 \le r < a \\ 0 & r > a\end{array}; t>0\right\} \tag{181}$$

$$-k\frac{\partial \varphi_2}{\partial Z}\bigg|z=0 = \left\{\begin{array}{ll}q_2(r,s) & 0 \le r < a \\ 0 & r > a\end{array}; t>0\right\} \tag{182}$$

$$L\{q_1(r,t)\} + L\{q_2(r,t)\} = q_1(r,s) + q_2(r,s) = \frac{q}{s}; z=0 \tag{183}$$

$$\varphi_0(r,z=0,s) - \varphi_1(r,z=0,s) = R_1 q_1(r,s); z=0 \tag{184}$$
$$\varphi_0 = \varphi_0(r,z=0,s)$$

$$\varphi_0(r,z=0,s) - \varphi_2(r,z=0,s) = R_2 q_2(r,s); z=0 \tag{185}$$

Now the Hankel transformation of order 0 is applied on the equations and conditions (179) to (185) to obtain (186) to (192). The transform is on r (r→λ). The transformed temperature functions in Laplace-Hankel domain are denoted as $\theta_i(\lambda,z,s)$.

$$-\lambda^2 \theta_1 + \frac{\partial^2 \theta_1}{\partial z^2} = \frac{s}{\alpha}\theta_1; \theta_1 = \theta_1(\lambda, z, s) \quad (186)$$

$$\frac{\partial^2 \theta_1}{\partial z^2} - \left(\frac{s}{\alpha} + \lambda^2\right)\theta = 0; z < 0$$

$$-\lambda^2 \theta_2 + \frac{\partial^2 \theta_2}{\partial z^2} = \frac{s}{a}\theta_2; \theta_2 = \theta_2(\lambda, z, s) \quad (187)$$

$$\frac{\partial^2 \theta_2}{\partial z^2} - \left(\frac{s}{\alpha} + \lambda^2\right)\theta = 0; z > 0$$

$$-k\frac{\partial \theta_1}{\partial Z}\bigg|z = 0 = \mathcal{H}_0\{-q_1(r,s)\} \quad (188)$$

$$-k\frac{\partial \theta_2}{\partial Z}\bigg|z = 0 = \mathcal{H}_0\{q_2(r,s)\} \quad (189)$$

$$\mathcal{H}_0\{q_1(r,s)\} + \mathcal{H}_0\{q_2(r,s)\} = \quad (190)$$

$$\mathcal{H}_0\left\{\frac{q}{s}\right\} = \frac{q}{s}\int_0^a r J_0(\lambda r) dr = \frac{aq}{s}\frac{J_1(\lambda a)}{\lambda}; z = 0$$

The following is denoted $\mathcal{H}_0\{q_1(r,s)\} \equiv Q_1(\lambda,s)$ and $\mathcal{H}_0\{q_2(r,s)\} \equiv Q_2(\lambda,s)$.

$$\theta_0(\lambda, z=0, s) - \theta_1(\lambda, z=0, s) = R_1 Q_1(\lambda, s); z=0 \quad (191)$$

$$\theta_0(\lambda, z=0, s) - \theta_2(\lambda, z=0, s) = R_2 Q_2(\lambda, s); z=0 \quad (192)$$

Subtracting (191) from (192) the following is obtained:

$$\theta_1(\lambda, z=0, s) - \theta_2(\lambda, z=0, s) = [R_2 Q_2(\lambda, s) - R_1 Q_1(\lambda, s)]; z=0 \quad (193)$$

Solution to (186) and (187) is of the form $$\theta_1 = A e^{\sqrt{s/\alpha + \lambda^2} z}; z < 0 \quad (194)$$

$$\theta_2 = B e^{-\sqrt{s/\alpha + \lambda^2} z}; z > 0 \quad (195)$$

The coefficients A and B must be independent of z and are to be found from the boundary conditions. Applying (188) and (189):

$$\frac{\partial \theta_1}{\partial z} = \sqrt{s/\alpha + \lambda^2} \cdot A \cdot e^{\sqrt{s/\alpha + \lambda^2} z} = \frac{Q_1(\lambda, s)}{k}$$

$$\frac{\partial \theta_2}{\partial z} = -\sqrt{s/\alpha + \lambda^2} \cdot B \cdot e^{\sqrt{s/\alpha + \lambda^2} z} = -\frac{Q_2(\lambda, s)}{k}$$

$$A = \frac{Q_1(\lambda, s)}{k} \frac{1}{\sqrt{s/\alpha + \lambda^2}} \quad (196)$$

$$B = \frac{Q_2(\lambda, s)}{k} \frac{1}{\sqrt{s/\alpha + \lambda^2}} \quad (197)$$

$$\theta_1 = \frac{Q_1(\lambda, s)}{k} \frac{e^{\sqrt{s/\alpha + \lambda^2} z}}{\sqrt{s/\alpha + \lambda^2}}; z < 0 \quad (198)$$

$$\theta_2 = \frac{Q_2(\lambda, s)}{k} \frac{e^{-\sqrt{s/\alpha + \lambda^2} z}}{\sqrt{s/\alpha + \lambda^2}}; z > 0 \quad (199)$$

Substituting (198) and (199) into (193) the following is obtained:

$$\frac{Q_1(\lambda, s)}{k} \frac{1}{\sqrt{s/\alpha + \lambda^2}} - \frac{Q_2(\lambda, s)}{k} \frac{1}{\sqrt{s/\alpha + \lambda^2} z} =$$

$$[R_2 Q_2(\lambda, s) - R_1 Q_1(\lambda, s)]; z = 0$$

$$Q_1(\lambda, s) - Q_2(\lambda, s) = [R_2 Q_2(\lambda, s) - R_1 Q_1(\lambda, s)]\sqrt{s/\alpha + \lambda^2}; z = 0$$

$$Q_1(\lambda, s) = Q_2(\lambda, s)\left[\frac{1 + kR_2\sqrt{s/\alpha + \lambda^2}}{1 + kR_1\sqrt{s/\alpha + \lambda^2}}\right]; z = 0$$

$Q_1(\lambda, s)$ is substituted in (190) to obtain:

$$Q_2(\lambda, s)\left[\frac{1 + kR_2\sqrt{s/\alpha + \lambda^2}}{1 + kR_1\sqrt{s/\alpha + \lambda^2}}\right] + Q_2(\lambda, s) = \frac{aq}{s}\frac{J_1(\lambda a)}{\lambda} \quad (200)$$

$$Q_2(\lambda, s)\left[\frac{2 + k(R_2 + R_1)\sqrt{s/\alpha + \lambda^2}}{1 + kR_1\sqrt{s/\alpha + \lambda^2}}\right] = \frac{aq}{s}\frac{J_1(\lambda a)}{\lambda}$$

$$Q_2(\lambda, s) = \frac{aq}{s}\frac{J_1(\lambda a)}{\lambda} \cdot \frac{1 + kR_1\sqrt{s/\alpha + \lambda^2}}{2 + k(R_2 + R_1)\sqrt{s/\alpha + \lambda^2}}$$

$$Q_1(\lambda, s) = \frac{aq}{s}\frac{J_1(\lambda a)}{\lambda} - \frac{aq}{s}\frac{J_1(\lambda a)}{\lambda} \cdot \frac{1 + kR_1\sqrt{s/\alpha + \lambda^2}}{2 + k(R_2 + R_1)\sqrt{s/\alpha + \lambda^2}} \quad (201)$$

$$Q_1(\lambda, s) = \frac{aq}{s}\frac{J_1(\lambda a)}{\lambda} \cdot \frac{1 + kR_2\sqrt{s/\alpha + \lambda^2} z}{2 + k(R_2 + R_1)\sqrt{s/\alpha + \lambda^2} z}$$

The acid test on $Q_1$ and $Q_2$ can be conducted. If $R_1 = R_2 = 0$ then $$Q_1(\lambda, s) = Q_2(\lambda, s) = \frac{1}{2}\frac{aq}{s}\frac{J_1(\lambda a)}{\lambda}.$$

The total flux is evenly divided between the 2 media.
If $R_1 = \infty$ and $R_2 = 0$ then $Q_1(\lambda, s) = 0$ and $$Q_2(\lambda, s) = \frac{aq}{s}\frac{J_1(\lambda a)}{\lambda}$$

As expected in this case, the heat will flow only to medium 2.
If $R_1 = \infty$ and $R_2$ has any value $\neq 0$ then $$Q_2(\lambda, s) = \frac{aq}{s}\frac{J_1(\lambda a)}{\lambda} \cdot \frac{\frac{1}{\infty} + k\sqrt{s/\alpha + \lambda^2}}{\frac{2}{\infty} + (kR_2/\infty + k)\sqrt{s/a + \lambda^2}} = \frac{aq}{s}\frac{J_1(\lambda a)}{\lambda}.$$

Also in this case the entire flux will flow to medium 2.
$Q_1(\lambda, s)$ and $Q_2(\lambda, s)$ are substituted in (198) and (199) to get:

$$\theta_1(\lambda, z, s) =$$

$$\frac{aq}{k}\frac{J_1(\lambda a)}{\lambda} \cdot \frac{1}{s} \cdot \frac{1 + kR_2\sqrt{s/a + \lambda^2}}{2 + k(R_1 + R_2)\sqrt{s/\alpha + \lambda^2}} \cdot \frac{\sqrt{\alpha} \, e^{+\sqrt{s + \alpha\lambda^2}\frac{z}{\sqrt{\alpha}}}}{\sqrt{s + \alpha\lambda^2}};$$

$$z < 0$$

-continued $$\theta_2(\lambda, z, s) = \frac{aq}{k} \frac{J_1(\lambda a)}{\lambda} \cdot \frac{1}{s} \cdot \frac{1 + kR_1\sqrt{s/\alpha + \lambda^2}}{2 + k(R_1+R_2)\sqrt{s/\alpha + \lambda^2}} \cdot \frac{\sqrt{\alpha} e^{-\sqrt{s+\alpha\lambda^2}\frac{z}{\sqrt{\alpha}}}}{\sqrt{s+\alpha\lambda^2}};$$

$z > 0$

After rearranging:

$$\theta_1(\lambda, z, s) = \frac{aq}{k} \frac{J_1(\lambda a)}{\lambda} \cdot \left\{ \frac{\alpha}{k(R_1+R_2)} \frac{1}{s} \right. \tag{202}$$

$$\frac{1}{\left[2 \cdot \frac{\sqrt{\alpha}}{k(R_1+R_2)} + \sqrt{s+\alpha\lambda^2}\right]} \cdot \frac{e^{+\sqrt{s+\alpha\lambda^2}\frac{z}{\sqrt{\alpha}}}}{\sqrt{s+\alpha\lambda^2}} +$$

$$\left. \frac{\sqrt{\alpha} R_2}{(R_1+R_2)} \frac{1}{s} \frac{e^{+\sqrt{s+\alpha\lambda^2}\frac{z}{\sqrt{\alpha}}}}{\left[2 \cdot \frac{\sqrt{\alpha}}{k(R_1+R_2)} + \sqrt{s+\alpha\lambda^2}\right]} \right\};$$

$z < 0$ $$\theta_2(\lambda, z, s) = \frac{aq}{k} \frac{J_1(\lambda a)}{\lambda} \cdot \left\{ \frac{\alpha}{k(R_1+R_2)} \frac{1}{s} \right. \tag{203}$$

$$\frac{1}{\left[2 \cdot \frac{\sqrt{\alpha}}{k(R_1+R_2)} + \sqrt{s+\alpha\lambda^2}\right]} \cdot \frac{e^{-\sqrt{s+\alpha\lambda^2}\frac{z}{\sqrt{\alpha}}}}{\sqrt{s+\alpha\lambda^2}} +$$

$$\left. \frac{\sqrt{\alpha} R_1}{(R_1+R_2)} \frac{1}{s} \frac{e^{+\sqrt{s+\alpha\lambda^2}\frac{z}{\sqrt{\alpha}}}}{\left[2 \cdot \frac{\sqrt{\alpha}}{k(R_1+R_2)} + \sqrt{s+\alpha\lambda^2}\right]} \right\};$$

$z > 0$

And from (191), the following is obtained for $\theta_0$:

$$\theta_0(\lambda, z, s) = \theta_1(\lambda, z, s) + R_1 Q_1(\lambda, s) = \frac{aq}{k} \frac{J_1(\lambda a)}{\lambda} \cdot$$

$$\left\{ \frac{\alpha}{k(R_1+R_2)} \frac{1}{s} \frac{1}{\left[2 \cdot \frac{\sqrt{\alpha}}{k(R_1+R_2)} + \sqrt{s+\alpha\lambda^2}\right]} \cdot \frac{e^{+\sqrt{s+\alpha\lambda^2}\frac{z}{\sqrt{\alpha}}}}{\sqrt{s+\alpha\lambda^2}} + \right.$$

$$\left. \frac{\sqrt{\alpha} R_2}{(R_1+R_2)} \frac{1}{s} \frac{e^{+\sqrt{s+\alpha\lambda^2}\frac{z}{\sqrt{\alpha}}}}{\left[2 \cdot \frac{\sqrt{\alpha}}{k(R_1+R_2)} + \sqrt{s+\alpha\lambda^2}\right]} + \right.$$

$$\frac{aq}{k} \frac{J_1(\lambda a)}{\lambda} \cdot \left\{ \frac{R_1\sqrt{\alpha}}{(R_1+R_2)} \frac{1}{s} \frac{1}{\left[2 \cdot \frac{\sqrt{\alpha}}{k(R_1+R_2)} + \sqrt{s+\alpha\lambda^2}\right]} + \right.$$

$$\left. \frac{kR_1R_2}{(R_1+R_2)} \frac{1}{s} \frac{\sqrt{s+\alpha\lambda^2}}{\left[2 \cdot \frac{\sqrt{\alpha}}{k(R_1+R_2)} + \sqrt{s+\alpha\lambda^2}\right]} \right\};$$

$z = 0$

At $z=0$, where $\theta_0$ is defined, the exponents are equal to 1, and the equation can be simplified to $$\theta_0(\lambda, z, s) = \frac{aq}{k} \frac{J_1(\lambda a)}{\lambda} \cdot \tag{204}$$

$$\left\{ \frac{\alpha}{k(R_1+R_2)} \frac{1}{s} \frac{1}{\left[2 \cdot \frac{\sqrt{\alpha}}{k(R_1+R_2)} + \sqrt{s+\alpha\lambda^2}\right]} \cdot \frac{1}{\sqrt{s+\alpha\lambda^2}} + \right.$$

$$\sqrt{\alpha} \frac{1}{s} \frac{1}{\left[2 \cdot \frac{\sqrt{\alpha}}{k(R_1+R_2)} + \sqrt{s+\alpha\lambda^2}\right]} +$$

$$\left. \frac{kR_1R_2}{(R_1+R_2)} \frac{1}{s} \frac{\sqrt{s+\alpha\lambda^2}}{\left[2 \cdot \frac{\sqrt{\alpha}}{k(R_1+R_2)} + \sqrt{s+\alpha\lambda^2}\right]} \right\};$$

$z = 0$

Note that all the terms in $\theta_0$ include both $R_1$ and $R_2$ as expected.

Now the temperature fields are converted back from Laplace-Hankel plane to Laplace domain, which gives:

$$\varphi_0(r, z, s) = \tag{205}$$

$$\frac{aq\alpha}{k^2(R_1+R_2)} \int_0^\infty \left\{ \frac{1}{s} \frac{1}{\left[2 \cdot \frac{\sqrt{\alpha}}{k(R_1+R_2)} + \sqrt{s+\alpha\lambda^2}\right]} \cdot \frac{1}{\sqrt{s+\alpha\lambda^2}} \right\}$$

$$\frac{J_1(\lambda a)}{\lambda} \lambda J_0(\lambda r) d\lambda + \frac{aq\sqrt{\alpha}}{k}$$

$$\int_0^\infty \left\{ \frac{1}{s} \frac{1}{\left[2 \cdot \frac{\sqrt{\alpha}}{k(R_1+R_2)} + \sqrt{s+\alpha\lambda^2}\right]} \right\} \frac{J_1(\lambda a)}{\lambda} \lambda J_0(\lambda r) d\lambda +$$

$$\frac{aqR_1R_2}{(R_1+R_2)} \int_0^\infty \left\{ \frac{1}{s} \frac{\sqrt{s+\alpha\lambda^2}}{\left[2 \cdot \frac{\sqrt{\alpha}}{k(R_1+R_2)} + \sqrt{s+\alpha\lambda^2}\right]} \right\}$$

$$\frac{J_1(\lambda a)}{\lambda} \lambda J_0(\lambda r) d\lambda;$$

$z = 0$ $$\varphi_1(r, z, s) = \quad (206)$$

$$\frac{aq\alpha}{k^2(R_1+R_2)}\int_0^\infty \left\{\frac{1}{s}\frac{1}{\left[2\frac{\sqrt{\alpha}}{k(R_1+R_2)}+\sqrt{s+\alpha\lambda^2}\right]}\cdot\frac{e^{+\sqrt{s+\alpha\lambda^2}\frac{z}{\sqrt{\alpha}}}}{\sqrt{s+\alpha\lambda^2}}\right\}$$

$$\frac{J_1(\lambda a)}{\lambda}\lambda J_0(\lambda r)d\lambda + \frac{aq\sqrt{\alpha}\,R_2}{k(R_1+R_2)}$$

$$\int_0^\infty\left\{\frac{1}{s}\frac{e^{+\sqrt{s+\alpha\lambda^2}\frac{z}{\sqrt{\alpha}}}}{\left[2\cdot\frac{\sqrt{\alpha}}{k(R_1+R_2)}+\sqrt{s+\alpha\lambda^2}\right]}\right\}\frac{J_1(\lambda a)}{\lambda}\lambda J_0(\lambda r)d\lambda;$$

$$z < 0$$

$$\varphi_2(r, z, s) = \quad (207)$$

$$\frac{aq\alpha}{k^2(R_1+R_2)}\int_0^\infty\left\{\frac{1}{s}\frac{1}{\left[2\frac{\sqrt{\alpha}}{k(R_1+R_2)}+\sqrt{s+\alpha\lambda^2}\right]}\cdot\frac{e^{+\sqrt{s+\alpha\lambda^2}\frac{z}{\sqrt{\alpha}}}}{\sqrt{s+\alpha\lambda^2}}\right\}$$

$$\frac{J_1(\lambda a)}{\lambda}\lambda J_0(\lambda r)d\lambda + \frac{aq\sqrt{\alpha}\,R_1}{k(R_1+R_2)}$$

$$\int_0^\infty\left\{\frac{1}{s}\frac{e^{+\sqrt{s+\alpha\lambda^2}\frac{z}{\sqrt{\alpha}}}}{\left[2\cdot\frac{\sqrt{\alpha}}{k(R_1+R_2)}+\sqrt{s+\alpha\lambda^2}\right]}\right\}\frac{J_1(\lambda a)}{\lambda}\lambda J_0(\lambda r)d\lambda;$$

$$z > 0$$

To find $T_0$, $T_1$ and $T_2$, the expressions in the curly brackets are converted from Laplace domain to the time domain. Tabulated inverse transforms may be used, see G. A. Campbell, R. M. Foster, Fourier Integrals for Practical Applications, N.Y., Bell telephone laboratories, 1931, with the following nomenclature:

$$\gamma = 0;\ \sigma = z^2/\alpha;\ \lambda = \frac{2\sqrt{\alpha}}{k(R_1+R_2)};\ \rho = \alpha\lambda^2 \quad (208)$$

It is now possible to write the temperatures for the CHS sensor surface, medium 1 and medium 2 with the inverse Laplace transforms.

$$T_0(r, z=0, t) =$$

$$\frac{aq\alpha}{k^2(R_1+R_2)}\int_0^\infty\left\{\frac{1}{\frac{4\alpha}{k^2(R_1+R_2)^2}-\alpha\lambda^2}\left[\frac{\frac{2\sqrt{\alpha}}{k(R_1+R_2)}}{\lambda\sqrt{\alpha}}\mathrm{erf}[+\lambda\sqrt{\alpha t}]-1+\right.\right.$$

$$\left.\left.e^{\left[\frac{4\alpha t}{k^2(R_1+R_2)^2}-\alpha\lambda^2 t\right]}\cdot\mathrm{erfc}\left[\frac{2\sqrt{\alpha t}}{k(R_1+R_2)}\right]\right]\right\}J_1(\lambda a)J_0(\lambda r)d\lambda +$$

$$\frac{aq\sqrt{\alpha}}{k}\int_0^\infty\left\{\frac{1}{\frac{4\alpha}{k^2(R_1+R_2)^2}-\alpha\lambda^2}\left[\frac{2\sqrt{\alpha}}{k(R_1+R_2)}-\lambda\sqrt{\alpha}\cdot\mathrm{erf}[+\lambda\sqrt{\alpha t}]-\right.\right.$$

$$\left.\left.\frac{2\sqrt{\alpha}}{k(R_1+R_2)}\cdot e^{\left[\frac{4\alpha t}{k^2(R_1+R_2)^2}-\alpha\lambda^2 t\right]}\cdot\mathrm{erfc}\left[\frac{2\sqrt{\alpha t}}{k(R_1+R_2)}\right]\right]\right\}$$

$$J_1(\lambda a)J_0 d\lambda + \frac{aqR_1R_2}{(R_1+R_2)}\int_0^\infty\left\{\frac{1}{\frac{4\alpha}{k^2(R_1+R_2)^2}-\alpha\lambda^2}\right[$$

$$\frac{2\sqrt{\alpha}}{k(R_1+R_2)}\cdot\lambda\sqrt{\alpha}\cdot\mathrm{erf}[+\lambda\sqrt{\alpha t}]-\alpha\lambda^2+\frac{4\alpha}{k^2(R_1+R_2)^2}\cdot$$

$$\left.e^{\left[\frac{4\alpha t}{k^2(R_1+R_2)^2}-\alpha\lambda^2 t\right]}\cdot\mathrm{erfc}\left[\frac{2\sqrt{\alpha t}}{k(R_1+R_2)}\right]\right]\right\}J_1(\lambda a)J_0(\lambda r);$$

$$z = 0$$

$$T_1(r, z, t) =$$

$$\frac{aq\alpha}{k^2(R_1+R_2)}\int_0^\infty\left\{\frac{e^{-\lambda|z|}}{2\lambda\sqrt{\alpha}\cdot\left[\frac{2\sqrt{\alpha}}{k(R_1+R_2)}+\lambda\sqrt{\alpha}\right]}\mathrm{erfc}\left[\frac{|z|}{2\sqrt{\alpha t}}-\lambda\sqrt{\alpha t}\right]-\right.$$

$$\frac{e^{+\lambda|z|}}{2\lambda\sqrt{\alpha}\cdot\left[\frac{2\sqrt{\alpha}}{k(R_1+R_2)}-\lambda\sqrt{\alpha}\right]}\mathrm{erfc}\left[\frac{|z|}{2\sqrt{\alpha t}}+\lambda\sqrt{\alpha t}\right]+$$

$$\left.\frac{e^{\left[\frac{2\sqrt{\alpha}}{k(R_1+R_2)}\cdot\frac{|z|}{\sqrt{\alpha}}+\frac{4\alpha t}{k^2(R_1+R_2)^2}-\alpha\lambda^2 t\right]}}{\frac{4\alpha}{k^2(R_1+R_2)^2}-\alpha\lambda^2}\mathrm{erfc}\left[\frac{|z|}{2\sqrt{\alpha t}}+\frac{2\sqrt{\alpha t}}{k(R_1+R_2)}\right]\right\}$$

$$J_1(\lambda a)J_0(\lambda r)d\lambda + \frac{aq\sqrt{\alpha}\,R_2}{k}$$

$$\int_0^\infty\left\{\frac{e^{-\lambda|z|}}{2\left[\frac{2\sqrt{\alpha}}{k(R_1+R_2)}+\lambda\sqrt{\alpha}\right]}\mathrm{erfc}\left[\frac{|z|}{2\sqrt{\alpha t}}-\lambda\sqrt{\alpha t}\right]+\right.$$

$$\frac{e^{+\lambda|z|}}{2\left[\frac{2\sqrt{\alpha}}{k(R_1+R_2)}-\lambda\sqrt{\alpha}\right]}\mathrm{erfc}\left[\frac{|z|}{2\sqrt{\alpha t}}+\lambda\sqrt{\alpha t}\right]-$$

$$\frac{\frac{2\sqrt{\alpha}}{k(R_1+R_2)}\cdot e^{\left[\frac{2\sqrt{\alpha}}{k(R_1+R_2)}\cdot\frac{|z|}{\sqrt{\alpha}}+\frac{4\alpha t}{k^2(R_1+R_2)^2}-\alpha\lambda^2 t\right]}}{\frac{4\alpha}{k^2(R_1+R_2)^2}-\alpha\lambda^2}$$

$$\left.\mathrm{erfc}\left[\frac{|z|}{2\sqrt{\alpha t}}+\frac{2\sqrt{\alpha t}}{k(R_1+R_2)}\right]\right\}J_1(\lambda a)J_0(\lambda r)d\lambda;$$

$z < 0$ $T_2(r, z, t) =$ $\frac{aq\alpha}{k^2(R_1 + R_2)} \int_0^\infty \left\{ \frac{e^{-\lambda z}}{2\lambda\sqrt{\alpha} \cdot \left[\frac{2\sqrt{\alpha}}{k(R_1 + R_2)} + \lambda\sqrt{\alpha}\right]} \mathrm{erfc}\left[\frac{z}{2\sqrt{\alpha t}} - \lambda\sqrt{\alpha t}\right] - \right.$ $\frac{e^{+\lambda z}}{2\lambda\sqrt{\alpha} \cdot \left[\frac{2\sqrt{\alpha}}{k(R_1 + R_2)} - \lambda\sqrt{\alpha}\right]} \mathrm{erfc}\left[\frac{z}{2\sqrt{\alpha t}} + \lambda\sqrt{\alpha t}\right] +$ $\left. \frac{e^{\left[\frac{2\sqrt{\alpha}}{k(R_1+R_2)} \cdot \frac{z}{\sqrt{\alpha}} + \frac{4\alpha t}{k^2(R_1+R_2)^2} - \alpha\lambda^2 t\right]}}{\frac{4\alpha}{k^2(R_1+R_2)^2} - \alpha\lambda^2} \mathrm{erfc}\left[\frac{z}{2\sqrt{\alpha t}} + \frac{2\sqrt{\alpha t}}{k(R_1+R_2)}\right] \right\}$ $J_1(\lambda a) J_0(\lambda r) d\lambda + \frac{aq\sqrt{\alpha}\, R_1}{k}$ $\int_0^\infty \left\{ \frac{e^{-\lambda z}}{2\left[\frac{2\sqrt{\alpha}}{k(R_1+R_2)} + \lambda\sqrt{\alpha}\right]} \mathrm{erfc}\left[\frac{z}{2\sqrt{\alpha t}} - \lambda\sqrt{\alpha t}\right] + \right.$ $\frac{e^{+\lambda z}}{2\left[\frac{2\sqrt{\alpha}}{k(R_1+R_2)} - \lambda\sqrt{\alpha}\right]} \mathrm{erfc}\left[\frac{z}{2\sqrt{\alpha t}} + \lambda\sqrt{\alpha t}\right] -$ $\frac{\frac{2\sqrt{\alpha}}{k(R_1+R_2)} \cdot e^{\left[\frac{2\sqrt{\alpha}}{k(R_1+R_2)} \cdot \frac{z}{\sqrt{\alpha}} + \frac{4\alpha t}{k^2(R_1+R_2)^2} - \alpha\lambda^2 t\right]}}{\frac{4\alpha}{k^2(R_1+R_2)^2} - \alpha\lambda^2}$ $\left. \mathrm{erfc}\left[\frac{z}{2\sqrt{\alpha t}} + \frac{2\sqrt{\alpha t}}{k(R_1+R_2)}\right] \right\} J_1(\lambda a) J_0(\lambda r) d\lambda;$ $z > 0$ The above equations are rearranged to finally obtain the temperature fields.

(209)

$T_0(r, z = 0, t) =$ $\frac{aq}{k} \int_0^\infty \left\{ \frac{1}{[4 - \lambda^2 k^2(R_1+R_2)^2]} \left[2\mathrm{erf}\left[+\lambda\sqrt{\alpha t}\right] - \lambda k(R_1 + R_2)\right] \right.$ $\left. \left[1 - e^{\left[\frac{4\alpha t}{k^2(R_1+R_2)^2} - \alpha\lambda^2 t\right]} \cdot \mathrm{erfc}\left[\frac{2\sqrt{\alpha t}}{k(R_1+R_2)}\right]\right] \right\} J_1(\lambda a) J_0(\lambda r) \frac{d\lambda}{k} +$ $aq(R_1 + R_2)$ $\int_0^\infty \left\{ \frac{1}{[4 - \lambda^2 k^2(R_1+R_2)^2]} \left[2 - \lambda k(R_1+R_2) \mathrm{erf}\left[+\lambda\sqrt{\alpha t}\right] - \right.\right.$ $\left.\left. 2e^{\left[\frac{4\alpha t}{k^2(R_1+R_2)^2} - \alpha\lambda^2 t\right]} \cdot \mathrm{erfc}\left[\frac{2\sqrt{\alpha t}}{k(R_1+R_2)}\right] \right] \right\} J_1(\lambda a) J_0 d\lambda +$ $\frac{aq R_1 R_2}{(R_1 + R_2)} \int_0^\infty \frac{1}{[4 - \lambda^2 k^2(R_1+R_2)^2]} \left[\right.$ $2\lambda k \left((R_1+R_2) \cdot \mathrm{erf}\left[+\lambda\sqrt{\alpha t}\right] - \lambda^2 k^2 (R_1+R_2)^2 + \right.$ $\left.\left. 4e^{\left[\frac{4\alpha t}{k^2(R_1+R_2)^2} - \alpha\lambda^2 t\right]} \cdot \mathrm{erfc}\left[\frac{2\sqrt{\alpha t}}{k(R_1+R_2)}\right]\right) \right] J_1(\lambda a) J_0(\lambda r);$ $z = 0$ (210)

$T_1(r, z, t) = \frac{aq}{k} \int_0^\infty \left\{ \frac{e^{-\lambda|z|}}{2[2 + \lambda k(R_1+R_2)]} \mathrm{erfc}\left[\frac{|z|}{2\sqrt{\alpha t}} - \lambda\sqrt{\alpha t}\right] - \right.$ $\frac{e^{+\lambda|z|}}{2[2 + \lambda k(R_1+R_2)]} \mathrm{erfc}\left[\frac{|z|}{2\sqrt{\alpha t}} + \lambda\sqrt{\alpha t}\right] +$ $\frac{\lambda k(R_1+R_2) e^{\left[\frac{2\sqrt{\alpha}}{k(R_1+R_2)} \cdot \frac{|z|}{\sqrt{\alpha}} + \frac{4\alpha t}{k^2(R_1+R_2)^2} - \alpha\lambda^2 t\right]}}{[4 - \lambda^2 k^2(R_1+R_2)^2]}$ $\left. \mathrm{erfc}\left[\frac{|z|}{2\sqrt{\alpha t}} + \frac{2\sqrt{\alpha t}}{k(R_1+R_2)}\right] \right\}$ $J_1(\lambda a) J_0(\lambda r) \frac{d\lambda}{\lambda} + aq\sqrt{\alpha}\, R_2$ $\int_0^\infty \left\{ \frac{e^{-\lambda|z|}}{2[2 + \lambda k(R_1+R_2)]} \mathrm{erfc}\left[\frac{|z|}{2\sqrt{\alpha t}} - \lambda\sqrt{\alpha t}\right] + \right.$ $\frac{e^{+\lambda|z|}}{2[2 + \lambda k(R_1+R_2)]} \mathrm{erfc}\left[\frac{|z|}{2\sqrt{\alpha t}} + \lambda\sqrt{\alpha t}\right] -$ $\frac{2 \cdot e^{\left[\frac{2|z|}{k(R_1+R_2)} + \frac{4\alpha t}{k^2(R_1+R_2)^2} - \alpha\lambda^2 t\right]}}{[4 - \lambda^2 k^2(R_1+R_2)^2]} \mathrm{erfc}$ $\left. \left[\frac{|z|}{2\sqrt{\alpha t}} + \frac{2\sqrt{\alpha t}}{k(R_1+R_2)}\right] \right\} J_1(\lambda a) J_0(\lambda r) d\lambda;$ $z < 0$ (211)

$T_2(r, z, t) = \frac{aq}{k} \int_0^\infty \left\{ \frac{e^{-\lambda|z|}}{2[2 + \lambda k(R_1+R_2)]} \mathrm{erfc}\left[\frac{|z|}{2\sqrt{\alpha t}} - \lambda\sqrt{\alpha t}\right] - \right.$ -continued $$\frac{e^{+\lambda z}}{2[2-\lambda k(R_1+R_2)]}\text{erfc}\left[\frac{z}{2\sqrt{\alpha t}}+\lambda\sqrt{\alpha t}\right]+$$

$$\frac{\lambda k(R_1+R_2)e^{\left[\frac{2\sqrt{\alpha}}{k(R_1+R_2)}\cdot\frac{|z|}{\sqrt{\alpha}}+\frac{4\alpha t}{k^2(R_1+R_2)^2}-\alpha\lambda^2 t\right]}}{[4-\lambda^2 k^2(R_1+R_2)^2]}\text{erfc}$$

$$\left[\frac{|z|}{2\sqrt{\alpha t}}+\frac{2\sqrt{\alpha t}}{k(R_1+R_2)}\right]\Bigg\} J_1(\lambda a)J_0(\lambda r)\frac{d\lambda}{\lambda}+aq$$

$$\sqrt{\alpha}\,R_2\int_0^\infty\Bigg\{\frac{e^{-\lambda|z|}}{2[2+\lambda k(R_1+R_2)]}\text{erfc}\left[\frac{|z|}{2\sqrt{\alpha t}}-\lambda\sqrt{\alpha t}\right]+$$

$$\frac{e^{+\lambda|z|}}{2[2+\lambda k(R_1+R_2)]}\text{erfc}\left[\frac{|z|}{2\sqrt{\alpha t}}+\lambda\sqrt{\alpha t}\right]-$$

$$\frac{2\cdot e^{\left[\frac{2|z|}{k(R_1+R_2)}+\frac{4\alpha t}{k^2(R_1+R_2)^2}-\alpha\lambda^2 t\right]}}{[4-\lambda^2 k^2(R_1+R_2)^2]}$$

$$\text{erfc}\left[\frac{|z|}{2\sqrt{\alpha t}}+\frac{2\sqrt{\alpha t}}{k(R_1+R_2)}\right]\Bigg\} J_1(\lambda a)J_0(\lambda r)d\lambda;$$

$z > 0$

Acid Tests

Note the following expressions.

$$\lim_{r\to\infty} J_0(\lambda r)=0; \quad (212)$$

$$\lim_{r\to 0} J_0(\lambda r)=1;$$

$$\lim_{x\to+\infty}\text{erfc}(x)=0;$$

$$\lim_{x\to\infty}e^x\cdot\text{erfc}(x)=0;$$

$$\lim_{x\to 0+}\left[e^{1/x^2}\cdot\text{erfc}(1/x)\right]=0;$$

$$\lim_{x\to-\infty}\text{erfc}(x)=2 \text{ and}$$

$$\lim_{x\to+\infty}\text{erf}(x)=1.$$

Also, erfc[+∞] converges to 0 faster than the exponent function diverges to infinity; erfc(x)=1−erf(x); erf(−x)=−erf(x); erfc(−x)=2−erfc(x).

The acid tests on the temperature fields are conducted, and the validity of the solution verified in a few extreme cases.

Firstly, when $$r=0, \lim_{r\to 0} J_0(\lambda r)=1,$$

and the solutions (209), (210) and (211) are finite. If $r=\infty,$ $$\lim_{r\to\infty} J_0(\lambda r)=0,$$

thus the temperature fields vanish far from the CHS sensor. When $z=\pm\infty$ all the terms vanish since $$\lim_{x\to\infty} e^x\cdot\text{erfc}(x)=0.$$

This satisfies the condition that the solution must be finite at $r=0$ and vanish at $r=\infty$ and at $z=\pm\infty$.

When $R_1=R_2=0$, $T_1$ and $T_2$ should converge to the temperature fields for a CHS sensor embedded in an infinite plane, and at $z=0$ the three temperatures should be equal. Substituting $R_1=R_2=0$ in (209) to (211) the following is obtained $$T_0(r,z=0,t)=$$

$$\frac{aq}{k}\int_0^\infty\frac{1}{[4-0]}\{2\text{erf}[+\lambda\sqrt{\alpha t}]-0\cdot[1-0]\}J_1(\lambda a)J_0(\lambda r)\frac{d\lambda}{\lambda}+aq(0)$$

$$\int_0^\infty\frac{1}{[4-0]}\{2-\lambda k(0)\text{erf}[+\lambda\sqrt{\alpha t}]-2\cdot0\}J_1(\lambda a)J_0(\lambda r)d\lambda+\frac{aqR_1R_2}{k(R_1+R_2)}$$

$$\int_0^\infty\frac{1}{[4-0]}\left[2\lambda k(0)\cdot\text{erf}[+\lambda\sqrt{\alpha t}]-\lambda^2 k^2(0)^2+4\cdot 0\right]J_1(\lambda a)J_0(\lambda r)d\lambda;$$

$z=0$

The last integral vanishes because $R_1$ is the same order of magnitude as $R_2$, and therefore $$\lim_{x\to+0}\frac{x\cdot x}{2x}=0.$$

What is left is the first integral, which converges to the known solution of a CHS sensor embedded inside an infinite plane at $z=0$.

$$T_0(r,z=0,t)=\frac{aq}{2k}\int_0^\infty\text{erf}[+\lambda\sqrt{\alpha t}]J_1(\lambda a)J_0(\lambda r)\frac{d\lambda}{\lambda}; \quad (213)$$

$R_1=R_2=0; z=0$ $$T_1(r,z,t)=\frac{aq}{k}\int_0^\infty\Bigg\{\frac{e^{-\lambda|z|}}{2[2+0]}\text{erfc}\left[\frac{|z|}{2\sqrt{\alpha t}}-\lambda\sqrt{\alpha t}\right]-$$

$$\frac{e^{+\lambda|z|}}{2[2-0]}\text{erfc}\left[\frac{|z|}{2\sqrt{\alpha t}}+\lambda\sqrt{\alpha t}\right]+$$

$$\frac{\lambda k(0^+)e^{\left[\frac{2|z|}{k(0^+)}+\frac{4\alpha t}{k^2(0^+)^2}-\alpha\lambda^2 t\right]}}{[4-0]}\text{erfc}\left[\frac{|z|}{2\sqrt{\alpha t}}+\frac{2\sqrt{\alpha t}}{k(0^+)}\right]\Bigg\}$$

$$J_1(\lambda a)J_0(\lambda r)\frac{d\lambda}{\lambda}+aq(0^+)$$

$$\int_0^\infty\Bigg\{\frac{e^{-\lambda|z|}}{2[2+0]}\text{erfc}\left[\frac{|z|}{2\sqrt{\alpha t}}-\lambda\sqrt{\alpha t}\right]+$$

$$\frac{e^{+\lambda|z|}}{2[2-0]}\text{erfc}\left[\frac{|z|}{2\sqrt{\alpha t}}+\lambda\sqrt{\alpha t}\right]-$$

-continued $$\frac{2 \cdot e^{\left[\frac{2|z|}{k(0^+)} + \frac{4\alpha t}{k^2(0^+)^2} - \alpha\lambda^2 t\right]}}{[4-0]} \mathrm{erfc}\left[\frac{|z|}{2\sqrt{\alpha t}} + \frac{2\sqrt{\alpha t}}{k(0^+)}\right]\right\}$$

$$J_1(\lambda a)J_0(\lambda r)d\lambda; \; z<0$$

The second integral vanishes, and the first one becomes:

$$T_1(r,z,t) = \frac{\alpha q}{4k} \tag{214}$$

$$\int_0^\infty \left\{e^{-\lambda|z|}\mathrm{erfc}\left[\frac{|z|}{2\sqrt{\alpha t}} - \lambda\sqrt{\alpha t}\right] - e^{+\lambda|z|}\mathrm{erfc}\left[\frac{|z|}{2\sqrt{\alpha t}} + \lambda\sqrt{\alpha t}\right]\right\}$$

$$J_1(\lambda a)J_0(\lambda r)\frac{d\lambda}{\lambda};$$

$$R_1 = R_2 = 0;$$

$$z<0$$

Because of symmetry the result for $T_2$ is similar. The case of no contact resistance is obtained:

$$T_1(r,z,t) = T_2(r,z,t) = \tag{215}$$

$$\frac{\alpha q}{4k}\int_0^\infty \left\{e^{-\lambda|z|}\mathrm{erfc}\left[\frac{|z|}{2\sqrt{\alpha t}} - \lambda\sqrt{\alpha t}\right] - e^{+\lambda|z|}\mathrm{erfc}\left[\frac{|z|}{2\sqrt{\alpha t}} + \lambda\sqrt{\alpha t}\right]\right\}J_1(\lambda a)J_0(\lambda r)\frac{d\lambda}{\lambda};$$

$$R_1 = R_2 = 0; \; z<0 \text{ or } z>0$$

This is the solution known for a CHS sensor embedded inside an infinite medium.

And if z=0 is substituted, it is regressed to the same expression of $T_0$. As expected, the three temperatures equalize at z=0 when there is no contact resistance.

$$T_0(r,z=0,t) = T_1(r,z=0,t) = \tag{216}$$

$$T_2(r,z=0,t) = \frac{\alpha q}{2k}\int_0^\infty \mathrm{erf}\left[+\lambda\sqrt{\alpha t}\right]J_1(\lambda a)J_0(\lambda r)\frac{d\lambda}{\lambda};$$

$$R_1 = R_2 = 0; \; z=0$$

If $R_1=0$ and $R_2$ is finite, it can be shown that $T_1$ in (210) is reduced to a solution with a single contact resistance R. And similarly, for $T_2$.

$$T_1(r,z,t) = \frac{\alpha q}{k}\int_0^\infty \left\{\frac{e^{-\lambda|z|}}{2[2+\lambda kR]}\mathrm{erfc}\left[\frac{|z|}{2\sqrt{\alpha t}} - \lambda\sqrt{\alpha t}\right] - \right.$$

$$\frac{e^{+\lambda|z|}}{2[2-\lambda kR]}\mathrm{erfc}\left[\frac{|z|}{2\sqrt{\alpha t}} + \lambda\sqrt{\alpha t}\right] +$$

$$\left.\frac{\lambda kRe^{\left[\frac{2|z|}{kR} + \frac{4\alpha t}{k^2R^2} - \alpha\lambda^2 t\right]}}{[4-\lambda^2 k^2 R^2]}\mathrm{erfc}\left[\frac{|z|}{2\sqrt{\alpha t}} + \frac{2\sqrt{\alpha t}}{kR}\right]\right\}J_1(\lambda a)J_0(\lambda r)\frac{d\lambda}{\lambda} +$$

$$\alpha qR\int_0^\infty \left\{\frac{e^{-\lambda|z|}}{2[2+\lambda kR]}\mathrm{erfc}\left[\frac{|z|}{2\sqrt{\alpha t}} - \lambda\sqrt{\alpha t}\right] + \right.$$

$$\frac{e^{+\lambda|z|}}{2[2-\lambda kR]}\mathrm{erfc}\left[\frac{|z|}{2\sqrt{\alpha t}} + \lambda\sqrt{\alpha t}\right] - \frac{2 \cdot e^{\left[\frac{2|z|}{kR} + \frac{4\alpha t}{k^2R^2} - \alpha\lambda^2 t\right]}}{[4-\lambda^2 k^2 R^2]}$$

$$\left.\mathrm{erfc}\left[\frac{|z|}{2\sqrt{\alpha t}} + \frac{2\sqrt{\alpha t}}{kR}\right]\right\}J_1(\lambda a)J_0(\lambda r)d\lambda \; ; z<0$$

Another case is $R_1=0$ and $R_2=\infty$. In this case $T_1$ in (214) converges to the solution of a CHS with flux q in a semi-infinite medium.

Temperature Fields on the CHS Surface (z=0)

The general temperature fields (210) and (211) for the CHS surface, i.e. for z=0 can be written.

$$T_1(r,z=0,t) =$$

$$\frac{\alpha q}{k}\int_0^\infty \left\{\frac{1}{2[2+\lambda k(R_1+R_2)]}\mathrm{erfc}\left[-\lambda\sqrt{\alpha t}\right] - \frac{1}{2[2-\lambda k(R_1+R_2)]}\right.$$

$$\mathrm{erfc}\left[+\lambda\sqrt{\alpha t}\right] +$$

$$\left.\frac{\lambda k(R_1+R_2)e^{\left[\frac{4\alpha t}{k^2(R_1+R_2)^2} - \alpha\lambda^2 t\right]}}{[4-\lambda^2 k^2(R_1+R_2)^2]}\mathrm{erfc}\left[+\frac{2\sqrt{\alpha t}}{k(R_1+R_2)}\right]\right\}J_1(\lambda a)J_0(\lambda r)\frac{d\lambda}{\lambda} +$$

$$\alpha qR_2\int_0^\infty \left\{\frac{1}{2[2+\lambda k(R_1+R_2)]}\right.$$

$$\mathrm{erfc}\left[-\lambda\sqrt{\alpha t}\right] + \frac{1}{2[2-\lambda k(R_1+R_2)]}\mathrm{erfc}\left[+\lambda\sqrt{\alpha t}\right] -$$

$$\left.\frac{2 \cdot e^{\left[\frac{4\alpha t}{k^2(R_1+R_2)^2} - \alpha\lambda^2 t\right]}}{[4-\lambda^2 k^2(R_1+R_2)^2]}\mathrm{erfc}\left[+\frac{2\sqrt{\alpha t}}{k(R_1+R_2)}\right]\right\}J_1(\lambda a)J_0(\lambda r)d\lambda;$$

$$z=0$$

The temperature on the CHS sensor surface is obtained.

$$T_1(r,z=0,t) = \frac{\alpha q}{k}\int_0^\infty \left\{\frac{2\mathrm{erf}[\lambda\sqrt{\alpha t}] - \lambda k(R_1+R_2)}{[4-\lambda^2 k^2(R_1+R_2)^2]} + \right. \tag{217}$$

$$\left.\frac{\lambda k(R_1+R_2)e^{\left[\frac{4\alpha t}{k^2(R_1+R_2)^2} - \alpha\lambda^2 t\right]}}{[4-\lambda^2 k^2(R_1+R_2)^2]}\mathrm{erfc}\left[+\frac{2\sqrt{\alpha t}}{k(R_1+R_2)}\right]\right\}$$

$$J_1(\lambda a)J_0(\lambda r)\frac{\alpha\lambda}{\lambda} + \alpha qR_2$$

$$\int_0^\infty \left\{\frac{2-\lambda k(R_1+R_2) \cdot \mathrm{erf}[\lambda\sqrt{\alpha t}]}{[4-\lambda^2 k^2(R_1+R_2)^2]} - \frac{2 \cdot e^{\left[\frac{4\alpha t}{k^2(R_1+R_2)^2} - \alpha\lambda^2 t\right]}}{[4-\lambda^2 k^2(R_1+R_2)^2]}\right.$$

$$\left.\mathrm{erfc}\left[+\frac{2\sqrt{\alpha t}}{k(R_1+R_2)}\right]\right\}J_1(\lambda a)J_0(\lambda r)d\lambda;$$

$$z=0$$

-continued $$T_2(r, z=0, t) = \frac{aq}{k}\int_0^\infty \left\{\frac{2\text{erf}[\lambda\sqrt{\alpha t}] - \lambda k(R_1+R_2)}{[4-\lambda^2 k^2(R_1+R_2)^2]} + \right. \tag{218}$$

$$\frac{\lambda k(R_1+R_2)e^{\left[\frac{4\alpha t}{k^2(R_1+R_2)^2}-\alpha\lambda^2 t\right]}}{[4-\lambda^2 k^2(R_1+R_2)^2]}\text{erfc}\left[+\frac{2\sqrt{\alpha t}}{k(R_1+R_2)}\right]\right\}$$

$$J_1(\lambda a)J_0(\lambda r)\frac{d\lambda}{\lambda} +$$

$$aqR_1\int_0^\infty \left\{\frac{2-\lambda k(R_1+R_2)\cdot\text{erf}[\lambda\sqrt{\alpha t}]}{[4-\lambda^2 k^2(R_1+R_2)^2]} - \frac{2\cdot e^{\left[\frac{4\alpha t}{k^2(R_1+R_2)^2}-\alpha\lambda^2 t\right]}}{[4-\lambda^2 k^2(R_1+R_2)^2]} \right.$$

$$\left.\text{erfc}\left[+\frac{2\sqrt{\alpha t}}{k(R_1+R_2)}\right]\right\}J_1(\lambda a)J_0(\lambda r)d\lambda;\ z=0$$

Note that $T_1(r,z=0,t)=T_0(r,z=0,t)$ if $R_1=0$, and $T_2(r,z=0,t)=T_0(r,z=0,t)$ if $R_2=0$, and all three temperatures are equal on the CHS sensor surface if both $R_1=R_2=0$.

Steady-State

The steady-state behavior of the two temperature fields is calculated and compared with the known solutions in the extreme cases when the resistances are 0 or infinity.

Steady-state is achieved when the time is long relative to the geometry. The limit of $T_0$, $T_1$ and $T_2$ when $t\to\infty$ is calculated. Starting from (209), $$\lim_{t\to\infty}T_0(r, z=0, t) =$$

$$\frac{aq}{k}\int_0^\infty \frac{1}{[4-\lambda^2 k^2(R_1+R_2)^2]}\{2\cdot 1 - \lambda k(R_1+R_2)[1-0]\}J_1(\lambda a)J_0(\lambda r)\frac{d\lambda}{\lambda} +$$

$$aq(R_1+R_2)\int_0^\infty \frac{1}{[4-\lambda^2 k^2(R_1+R_2)^2]}\{2-\lambda k(R_1+R_2)\cdot 1 - 2\cdot 0\}J_1(\lambda a)J_0(\lambda r)d\lambda +$$

$$\frac{aqR_1R_2}{k(R_1+R_2)}\int_0^\infty \frac{1}{[4-\lambda^2 k^2(R_1+R_2)^2]}$$

$$[2\lambda k(R_1+R_2)\cdot 1 - \lambda^2 k^2(R_1+R_2)^2 + 4\cdot 0]J_1(\lambda a)J_0(\lambda r)d\lambda$$

$$\lim_{t\to\infty}T_0(r, z=0, t) = \frac{aq}{k}\int_0^\infty \frac{2-\lambda k(R_1+R_2)}{[4-\lambda^2 k^2(R_1+R_2)^2]}J_1(\lambda a)J_0(\lambda r)\frac{d\lambda}{\lambda} +$$

$$aq(R_1+R_2)\int_0^\infty \frac{2-\lambda k(R_1+R_2)}{[4-\lambda^2 k^2(R_1+R_2)^2]}J_1(\lambda a)J_0(\lambda r)d\lambda +$$

$$\frac{aqR_1R_2}{k(R_1+R_2)}\int_0^\infty \frac{2\lambda k(R_1+R_2) - \lambda^2 k^2(R_1+R_2)^2}{[4-\lambda^2 k^2(R_1+R_2)^2]}J_1(\lambda a)J_0(\lambda r)d\lambda$$

$$\lim_{t\to\infty}T_0(r, z=0, t) = \frac{aq}{k}\int_0^\infty \frac{1}{[2+\lambda k(R_1+R_2)]}J_1(\lambda a)J_0(\lambda r)\frac{d\lambda}{\lambda} +$$

$$\frac{aq}{k}\int_0^\infty \frac{\lambda k(R_1+R_2)}{[2+\lambda k(R_1+R_2)]}J_1(\lambda a)J_0(\lambda r)\frac{d\lambda}{\lambda} +$$

$$\frac{aqR_1R_2}{k}\int_0^\infty \frac{\lambda k[2-\lambda k(R_1+R_2)]}{[4-\lambda^2 k^2(R_1+R_Z)^2]}J_1(\lambda a)J_0(\lambda r)d\lambda$$

$$\lim_{t\to\infty}T_1(r, z, t) = \frac{aq}{k}\int_0^\infty \left\{\frac{e^{-\lambda|z|}}{2[2+\lambda k(R_1+R_2)]}\text{erfc}[-\infty] - \right.$$

$$\frac{e^{+\lambda|z|}}{2[2-\lambda k(R_1+R_2)]}\text{erfc}[+\infty] +$$

$$\frac{\lambda k Re^{\left[\frac{4\alpha t}{k^2(R_1+R_2)^2}-\alpha\lambda^2 t\right]}}{[4-\lambda^2 k^2(R_1+R_2)^2]}\text{erfc}[+\infty]\right\}J_1(\lambda a)J_0(\lambda r)\frac{a\lambda}{\lambda} +$$

$$aqR_2\int_0^\infty \left\{\frac{e^{-\lambda|z|}}{2[2+\lambda k(R_1+R_2)]}\text{erfc}[-\infty] + \right.$$

$$\frac{e^{+\lambda|z|}}{2[2-\lambda k(R_1+R_2)]}\text{erfc}[+\infty] -$$

$$\frac{2\cdot e^{\left[\frac{4\alpha t}{k^2(R_1+R_2)^2}-\alpha\lambda^2 t\right]}}{[4-\lambda^2 k^2(R_1+R_2)^2]}\text{erfc}[+\infty]\right\}$$

$$J_1(\lambda a)J_0(\lambda r)d\lambda = \frac{aq}{k}\int_0^\infty \left\{\frac{e^{-\lambda|z|}}{2[2+\lambda k(R_1+R_2)]}\cdot 2 - \right.$$

$$\left. 0+0\right\}J_1(\lambda a)J_0(\lambda r)\frac{a\lambda}{\lambda} +$$

$$aqR_2\int_0^\infty \left\{\frac{e^{-\lambda|z|}}{2[2+\lambda k(R_1+R_2)]}\cdot 2 + \right.$$

$$\left. 0-0\right\}J_1(\lambda a)J_0(\lambda r)d\lambda =$$

$$\frac{aq}{k}\int_0^\infty \left\{\frac{\lambda k R_2}{[2+\lambda k(R_1+R_2)]} + \right.$$

$$\left.\frac{1}{[2+\lambda k(R_1+R_2)]}\right\}e^{-\lambda|z|}J_1(\lambda a)J_0(\lambda r)$$

$$\frac{d\lambda}{\lambda} = \frac{aq}{k}\int_0^\infty \left\{\frac{1+\lambda k R_2}{[2+\lambda k(R_1+R_2)]}\right\}$$

$$e^{-\lambda|z|}J_1(\lambda a)J_0(\lambda r)\frac{d\lambda}{\lambda}$$

The steady-state temperature fields are:

$$\lim_{t\to\infty}T_0(r, z=0, t) = \frac{aq}{k}\int_0^\infty \frac{1+\lambda k(R_1+R_2)}{[2+\lambda k(R_1+R_2)]}J_1(\lambda a)J_0(\lambda r)\frac{a\lambda}{\lambda} + \tag{219}$$

$$\frac{aqR_1R_2}{k}\int_0^\infty \frac{\lambda k}{[2+\lambda k(R_1+R_2)]}J_1(\lambda a)J_0(\lambda r)d\lambda;$$

$$z=0$$

$$\lim_{t\to\infty}T_1(r, z, t) = \frac{aq}{k}\int_0^\infty \left\{\frac{1+\lambda k R_2}{[2+\lambda k(R_1+R_2)]}\right\}e^{-\lambda|z|}J_1(\lambda a)J_0(\lambda r)\frac{a\lambda}{\lambda}; \tag{220}$$

$$z<0$$

$$\lim_{t\to\infty}T_2(r, z, t) = \frac{aq}{k}\int_0^\infty \left\{\frac{1+\lambda k R_1}{[2+\lambda k(R_1+R_2)]}\right\}e^{-\lambda z}J_1(\lambda a)J_0(\lambda r)\frac{d\lambda}{\lambda}; \tag{221}$$

$$z>0$$

Note the important fact, that at steady-state the temperature fields are independent of the thermal diffusivity, and solely depend on the thermal conductivity and contact resistances. If $R_1=R_2=0$, the case of no contact resistance, all three temperature fields are identical and in compliance with the steady-state solution.

$$\lim_{t\to\infty}T_1(r, z, t) = \frac{aq}{2k}\int_0^\infty e^{-\lambda|z|}J_1(\lambda a)J_0(\lambda r)\frac{d\lambda}{\lambda}; \tag{222}$$

$$R_1 = R_2 = 0;\ z<0$$

$$\lim_{t\to\infty} T_2(r, z, t) = \frac{aq}{2k} \int_0^\infty e^{-\lambda z} J_1(\lambda a) J_0(\lambda r) \frac{d\lambda}{\lambda}; \quad (223)$$

$$R_1 = R_2 = 0; z > 0$$

If $R_2 = \infty$, the case of perfect insulation on medium 2, the steady-state equation for $T_1$ shall be that of a semi-infinite plane, and $T_2$ shall vanish.

$$\lim_{t\to\infty} T_1(r, z, t) = \quad (224)$$

$$\frac{aq}{k} \int_0^\infty \left\{ \frac{1/R_2 + \lambda k}{[2/R_2 + \lambda k]} \right\} e^{-\lambda|z|} J_1(\lambda a) J_0(\lambda r) \frac{a\lambda}{\lambda} =$$

$$\frac{aq}{k} \int_0^\infty e^{-\lambda|z|} J_1(\lambda a) J_0(\lambda r) \frac{d\lambda}{\lambda};$$

$$z < 0; R_2 = \infty$$

$$\lim_{t\to\infty} T_2(r, z, t) = \frac{aq}{k} \int_0^\infty \left\{ \frac{1 + \lambda k R_2}{[2 + \lambda k \cdot \infty]} \right\} e^{-\lambda z} J_1(\lambda a) J_0(\lambda r) \frac{d\lambda}{\lambda} = 0; \quad (225)$$

$$z > 0; R_2 = \infty$$

Average Temperature on the CHS Surface

Starting from (209) it is possible to calculate the average temperature on the CHS surface by integrating over r from zero to the CHS radius a, and dividing by the area. It can be written:

$$T_{0Av}(z=0, t) = \frac{q}{k} \int_0^\infty \frac{1}{\left[\frac{4 - \lambda^2 k^2}{(R_1 + R_2)^2}\right]} \left\{ 2\mathrm{erf}\left[+\lambda\sqrt{\alpha t}\right] - \right. \quad (226)$$

$$\lambda k(R_1 + R_2) \left[ 1 - e^{\left[\frac{4\alpha t}{k^2(R_1+R_2)^2} - \alpha\lambda^2 t\right]} \cdot \mathrm{erfc}\left[\frac{2\sqrt{\alpha t}}{k(R_1 + R_2)}\right] \right] \right\}$$

$$J_1(\lambda a) \left\{ \frac{1}{\pi a^2} \int_0^a J_0(\lambda r) 2\pi r \, dr \right\} \frac{d\lambda}{\lambda} +$$

$$aq(R_1 + R_2) \int_0^\infty \frac{1}{[4 - \lambda^2 k^2 (R_1 + R_2)^2]}$$

$$\left\{ 2 - \lambda k(R_1 + R_2) \mathrm{erf}\left[+\lambda\sqrt{\alpha t}\right] - \right.$$

$$\left. 2 e^{\left[\frac{4\alpha t}{k^2(R_1+R_2)^2} - \alpha\lambda^2 t\right]} \cdot \mathrm{erfc}\left[\frac{2\sqrt{\alpha t}}{k(R_1 + R_2)}\right] \right\}$$

$$J_1(\lambda a) \left\{ \frac{1}{\pi a^2} \int_0^a J_0(\lambda r) 2\pi r \, dr \right\} \lambda +$$

$$\frac{aqR_1 R_2}{k(R_1 + R_2)} \int_0^\infty \frac{1}{\left[\frac{4 - \lambda^2 k^2}{(R_1 + R_2)^2}\right]}$$

$$\left[ 2\lambda k(R_1 + R_2) \cdot \mathrm{erf}\left[+\lambda\sqrt{\alpha t}\right] - \lambda^2 k^2 (R_1 + R_2)^2 + \right.$$

$$\left. 4 e^{\left[\frac{4\alpha t}{k(R_1+R_2)^2} - \alpha\lambda^2 t\right]} \cdot \mathrm{erfc}\left[\frac{2\sqrt{\alpha t}}{k(R_1 + R_2)}\right] \right]$$

$$J_1(\lambda a) \left\{ \frac{1}{\pi a^2} \int_0^a J_0(\lambda r) 2\pi r \, dr \right\} d\lambda;$$

$$z = 0; r : 0 \to a$$

$$T_{0Av}(z=0, t) =$$

$$\frac{2q}{k} \int_0^\infty \frac{1}{\left[\frac{4 - \lambda^2 k^2}{(R_1 + R_2)^2}\right]} \left\{ 2\mathrm{erf}\left[+\lambda\sqrt{\alpha t}\right] - \right.$$

$$\lambda k(R_1 + R_2) \left[ 1 - e^{\left[\frac{4\alpha t}{k^2(R_1+R_2)^2} - \alpha\lambda^2 t\right]} \right].$$

$$\left. \mathrm{erfc}\left[\frac{2\sqrt{\alpha t}}{k(R_1 + R_2)}\right] \right\}$$

$$J_1(\lambda a)^2 \frac{d\lambda}{\lambda} + 2q(R_1 + R_2) \int_0^\infty \frac{1}{\left[\frac{4 - \lambda^2 k^2}{(R_1 + R_2)^2}\right]} \left\{ 2 - \lambda k(R_1 + R_2) \mathrm{erf} \right.$$

$$\left[+\lambda\sqrt{\alpha t}\right] - 2 e^{\left[\frac{4\alpha t}{k^2(R_1+R_2)^2} - \alpha\lambda^2 t\right]}.$$

$$\mathrm{erfc}\left[\frac{2\sqrt{\alpha t}}{k(R_1 + R_Z)}\right] \right\} [J_1(\lambda a)]^2 \frac{d\lambda}{\lambda} +$$

$$\frac{2qR_1 R_2}{k(R_1 + R_Z)} \int_0^\infty \frac{1}{\left[\frac{4 - \lambda^2 k^2}{(R_1 + R_2)^2}\right]}$$

$$\left[ \lambda k(R_1 + R_2) \cdot \mathrm{erf}\left[+\lambda\sqrt{\alpha t}\right] - \right.$$

$$\left. \lambda^2 k^2 (R_1 + R_2)^2 + 4 e^{\left[\frac{4\alpha t}{k(R_1+R_2)^2} - \alpha\lambda^2 t\right]} \right].$$

$$\mathrm{erfc}\left[\frac{2\sqrt{\alpha t}}{k(R_1 + R_2)}\right] \right] [J_1(\lambda a)]^2$$

$$\frac{d\lambda}{\lambda}; z = 0; r : 0 \to a$$

Note that the definite integral $$\frac{1}{\pi a^2} \int_0^a J_0(\lambda r) 2\pi r \, dr = \frac{2}{a} J_1(\lambda a) \frac{1}{\lambda}$$

was used.

An alternative form of equation (226) is:

$$T_{0Av}(z=0, t) = \quad (227)$$

$$-\frac{2q\sqrt{a}}{\pi k} \int_0^\infty \left[ \int_b^\infty \frac{e^{-\sigma t}}{\sigma} \frac{\left[\frac{2a + k^2(\sigma - b)}{(R_1^2 + R_2^2)}\right]}{\sqrt{\sigma - b} \left[\frac{4\alpha + k^2}{(\sigma - b)^2 (R_1 + R_2)^2}\right]} d\sigma \right]$$

$$J_1^2(\lambda a) \frac{d\lambda}{\lambda} + \frac{2q}{k} \int_0^\infty \left[ \frac{(1 + kR_1\lambda)(1 + kR_2\lambda)}{2 + k\lambda(R_1 + R_2)} \right] J_1^2(\lambda a) \frac{d\lambda}{\lambda^2}$$

With the notation $b = \alpha\lambda^2$. Equations (226) and (227) are equivalent mathematically and produce the same numeric results. Equation (227) is simpler and faster to calculate numerically, and it separates between the transient, time-dependent part, which is the first term, and the steady-state part (no dependency on time, t) which is the second term.

Heat Flux Analysis

Understanding the heat flux behavior is crucial to understanding the system. The expressions for the heat flux are developed and analyzed. Referring to (200) in the Laplace-Hankel plane, the fluxes are written as:

$$Q_1(\lambda, s) = \frac{aq}{s} \frac{J_1(\lambda a)}{\lambda} \cdot \frac{\sqrt{\alpha}}{k(R_2+R_1)} \frac{1}{\frac{2\sqrt{\alpha}}{k(R_2+R_1)} + \sqrt{s+\alpha\lambda^2}} +$$

$$\frac{aq}{s} \frac{J_1(\lambda a)}{\lambda} \cdot \frac{R_2}{(R_2+R_1)} \frac{\sqrt{s+\alpha\lambda^2}}{\frac{2\sqrt{\alpha}}{k(R_2+R_1)} + \sqrt{s+\alpha\lambda^2}}$$

$$Q_2(\lambda, s) = \frac{aq}{s} \frac{J_1(\lambda a)}{\lambda} \cdot \frac{\sqrt{\alpha}}{k(R_2+R_1)} \frac{1}{\frac{2\sqrt{\alpha}}{k(R_2+R_1)} + \sqrt{s+\alpha\lambda^2}} +$$

$$\frac{aq}{s} \frac{J_1(\lambda a)}{\lambda} \cdot \frac{R_1}{(R_2+R_1)} \frac{\sqrt{s+\alpha\lambda^2}}{\frac{2\sqrt{\alpha}}{k(R_2+R_1)} + \sqrt{s+\alpha\lambda^2}}$$

And converting from Laplace-Hankel plane to Laplace domain $$q_1(r, s) = aq \int_0^\infty \left[ \frac{\sqrt{\alpha}}{k(R_2+R_1)} \cdot \frac{1}{s} \cdot \frac{1}{\frac{2\sqrt{\alpha}}{k(R_2+R_1)} + \sqrt{s+\alpha\lambda^2}} + \right.$$

$$\left. \frac{R_2}{(R_2+R_1)} \cdot \frac{1}{s} \cdot \frac{\sqrt{s+\alpha\lambda^2}}{\frac{2\sqrt{\alpha}}{k(R_2+R_1)} + \sqrt{s+\alpha\lambda^2}} \right] \frac{J_1(\lambda a)}{\lambda} J_0(\lambda r) \lambda d\lambda$$

$$q_2(r, s) = aq \int_0^\infty \left[ \frac{\sqrt{\alpha}}{k(R_2+R_1)} \cdot \frac{1}{s} \cdot \frac{1}{\frac{2\sqrt{\alpha}}{k(R_2+R_1)} + \sqrt{s+\alpha\lambda^2}} + \right.$$

$$\left. \frac{R_1}{(R_2+R_1)} \cdot \frac{1}{s} \cdot \frac{\sqrt{s+\alpha\lambda^2}}{\frac{2\sqrt{\alpha}}{k(R_2+R_1)} + \sqrt{s+\alpha\lambda^2}} \right] \frac{J_1(\lambda a)}{\lambda} J_0(\lambda r) \lambda d\lambda$$

Now it is converted back from Laplace domain to the time domain, with same nomenclature as in (208) above.

$$q_1(r, t) =$$

$$aq \int_0^\infty \left\{ \frac{\sqrt{\alpha}}{k(R_1+R_2)} \frac{1}{\frac{4\alpha}{k^2(R_1+R_2)^2} - \alpha\lambda^2} \left[ \frac{2\sqrt{\alpha}}{k(R_1+R_2)} \cdot e^{-0} - \lambda\sqrt{\alpha} \cdot e^{-0} \cdot \right.\right.$$

$$\left.\left. \mathrm{erf}(\lambda\sqrt{\alpha t}) - \frac{2\sqrt{\alpha}}{k(R_1+R_2)} \cdot e^{\left[\frac{4\alpha t}{k^2(R_1+R_2)^2} - \alpha\lambda^2 t\right]} \cdot \right.\right.$$

$$\left.\left. \mathrm{erf}\left[\frac{2\sqrt{\alpha t}}{k(R_1+R_2)}\right] \right] \right\} J_1(\lambda a) J_0(\lambda r) d\lambda +$$

-continued $$aq \int_0^\infty \left\{ \frac{R_2}{(R_1+R_2)} \frac{1}{\frac{4\alpha}{k^2(R_1+R_2)^2} - \alpha\lambda^2} \left[ \frac{2\sqrt{\alpha}}{k(R_1+R_2)} \cdot \lambda \right.\right.$$

$$\sqrt{\alpha} \cdot e^{-0} \cdot \mathrm{erf}(\lambda\sqrt{\alpha t}) - \alpha\lambda^2 \cdot e^{-0} + \frac{4\alpha}{k^2(R_1+R_2)^2} \cdot$$

$$\left.\left. e^{\left[\frac{4\alpha t}{k^2(R_1+R_2)^2} - \alpha\lambda^2 t\right]} \cdot \mathrm{erf}\left[\frac{2\sqrt{\alpha t}}{k(R_1+R_2)}\right] \right] \right\} J_1(\lambda a) J_0(\lambda r) d\lambda$$

$$q_2(r, t) = aq \int_0^\infty \left\{ \frac{\sqrt{\alpha}}{k(R_1+R_2)} \frac{1}{\frac{4\alpha}{k^2(R_1+R_2)^2} - \alpha\lambda^2} \right.$$

$$\left[ \frac{2\sqrt{\alpha}}{k(R_1+R_2)} \cdot e^{-0} - \lambda\sqrt{\alpha} \cdot e^{-0} \cdot \mathrm{erf}(\lambda\sqrt{\alpha t}) - \frac{2\sqrt{\alpha}}{k(R_1+R_2)} \cdot \right.$$

$$\left.\left. e^{\left[\frac{4\alpha t}{k^2(R_1+R_2)^2} - \alpha\lambda^2 t\right]} \cdot \mathrm{erf}\left[\frac{2\sqrt{\alpha t}}{k(R_1+R_2)}\right] \right] \right\} J_1(\lambda a) J_0(\lambda r) d\lambda +$$

$$aq \int_0^\infty \left\{ \frac{R_1}{(R_1+R_2)} \frac{1}{\frac{4\alpha}{k^2(R_1+R_2)^2} - \alpha\lambda^2} \left[ \frac{2\sqrt{\alpha}}{k(R_1+R_2)} \cdot \lambda \right.\right.$$

$$\sqrt{\alpha} \cdot e^{-0} \cdot \mathrm{erf}(\lambda\sqrt{\alpha t}) - \alpha\lambda^2 \cdot e^{-0} + \frac{4\alpha}{k^2(R_1+R_2)^2} \cdot$$

$$\left.\left. e^{\left[\frac{4\alpha t}{k^2(R_1+R_2)^2} - \alpha\lambda^2 t\right]} \cdot \mathrm{erf}\left[\frac{2\sqrt{\alpha t}}{k(R_1+R_2)}\right] \right] \right\} J_1(\lambda a) J_0(\lambda r) d\lambda$$

After rearranging, the expressions for the time dependent fluxes are obtained.

$$q_1(r, t) = \tag{228}$$

$$aq \int_0^\infty \left\{ \frac{1}{[4 - \lambda^2 k^2(R_1+R_2)^2]} \left[ 2 - \lambda k(R_1+R_2) \cdot \mathrm{erf}(\lambda\sqrt{\alpha t}) - \right.\right.$$

$$\left.\left. 2 \cdot e^{\left[\frac{4\alpha t}{k^2(R_1+R_2)^2} - \alpha\lambda^2 t\right]} \cdot \mathrm{erfc}\left[\frac{2\sqrt{\alpha t}}{k(R_1+R_2)}\right] \right] \right\} J_1(\lambda a) J_0(\lambda r)$$

$$d\lambda + aqR_2 \int_0^\infty \left\{ \frac{1}{[4 - \lambda^2 k^2(R_1+R_2)^2]} \left[ 2\lambda k \cdot \mathrm{erf}(\lambda\sqrt{\alpha t}) - \right.\right.$$

$$\lambda^2 k^2(R_1+R_2) + \frac{4}{(R_1+R_2)} \cdot e^{\left[\frac{4\alpha t}{k^2(R_1+R_2)^2} - \alpha\lambda^2 t\right]} \cdot$$

$$\left.\left. \mathrm{erfc}\left[\frac{2\sqrt{\alpha t}}{k(R_1+R_2)}\right] \right] \right\} J_1(\lambda a) J_0(\lambda r) d\lambda$$

$$q_2(r, t) = \qquad (229)$$

$$aq \int_0^\infty \left\{ \frac{1}{[4 - \lambda^2 k^2 (R_1 + R_2)^2]} \left[ 2 - \lambda k (R_1 + R_2) \cdot \text{erf}(\lambda \sqrt{\alpha t}) - \right.\right.$$

$$\left.\left. 2 \cdot e^{\left[\frac{4\alpha t}{k^2 (R_1 + R_2)^2} - \alpha \lambda^2 t\right]} \cdot \text{erfc}\left[\frac{2\sqrt{\alpha t}}{k(R_1 + R_2)}\right] \right] \right\} J_1(\lambda a) J_0(\lambda r)$$

$$d\lambda + aq R_1 \int_0^\infty \left\{ \frac{1}{[4 - \lambda^2 k^2 (R_1 + R_2)^2]} \left[ 2\lambda k \cdot \text{erf}(\lambda \sqrt{\alpha t}) - \right.\right.$$

$$\left.\left. \lambda^2 k^2 (R_1 + R_2) + \frac{4}{(R_1 + R_2)} \cdot e^{\left[\frac{4\alpha t}{k^2 (R_1 + R_2)^2} - \alpha \lambda^2 t\right]} \cdot \right.\right.$$

$$\left.\left. \text{erfc}\left[\frac{2\sqrt{\alpha t}}{k(R_1 + R_2)}\right] \right] \right\} J_1(\lambda a) J_0(\lambda r) d\lambda$$

Various special cases may be considered. Firstly, we check the case when $R_1 = R_2 = R$, which describes a symmetrical system.

$$q_1(r, t) =$$

$$aq \int_0^\infty \left\{ \frac{1}{[4 - \lambda^2 k^2 4 R^2]} \left[ 2 - 2\lambda k R \cdot \text{erf}(\lambda \sqrt{\alpha t}) - 2 \cdot e^{\left[\frac{4\alpha t}{k^2 4 R^2} - \alpha \lambda^2 t\right]} \cdot \text{erfc}\left[\frac{2\sqrt{\alpha t}}{2kR}\right] \right] \right\} J_1(\lambda a) J_0(\lambda r) d\lambda +$$

$$aq R \int_0^\infty \left\{ \frac{1}{[4 - \lambda^2 k^2 4 R^2]} \left[ 2\lambda k \cdot \text{erf}(\lambda \sqrt{\alpha t}) - 2\lambda^2 k^2 R + \frac{4}{2R} \cdot e^{\left[\frac{4\alpha t}{k^2 4 R^2} - \alpha \lambda^2 t\right]} \cdot \text{erfc}\left[\frac{2\sqrt{\alpha t}}{2kR}\right] \right] \right\} J_1(\lambda a) J_0(\lambda r) d\lambda =$$

$$\frac{1}{2} aq \int_0^\infty \left\{ \frac{1}{[1 - \lambda^2 k^2 R^2]} \left[ 1 - \lambda k R \cdot \text{erf}(\lambda \sqrt{\alpha t}) - e^{\left[\frac{4\alpha t}{k^2 4 R^2} - \alpha \lambda^2 t\right]} \cdot \text{erfc}\left[\frac{2\sqrt{\alpha t}}{2kR}\right] \right] \right\} J_1(\lambda a) J_0(\lambda r) d\lambda +$$

$$\frac{1}{2} aq \int_0^\infty \left\{ \frac{1}{[1 - \lambda^2 k^2 R^2]} \left[ \lambda k R \cdot \text{erf}(\lambda \sqrt{\alpha t}) - \lambda^2 k^2 R^2 + e^{\left[\frac{4\alpha t}{k^2 4 R^2} - \alpha \lambda^2 t\right]} \cdot \text{erfc}\left[\frac{2\sqrt{\alpha t}}{2kR}\right] \right] \right\} J_1(\lambda a) J_0(\lambda r) d\lambda$$

Combining the two integrals, and remembering the definite integral $$\int_0^\infty J_1(\lambda a) J_0(\lambda r) d\lambda = \frac{1}{a} \text{ for } r < a, \text{ and for } r > a$$

we obtain $$q_1(r, t) = \frac{1}{2} aq \int_0^\infty \frac{1 - \lambda^2 k^2 R^2}{[1 - \lambda^2 k^2 R^2]} J_1(\lambda a) J_0(\lambda r) d\lambda = \frac{q}{2}; \qquad (230)$$

when $R_1 = R_2 = R$

A similar result is obtained for $q_2(r, t)$.

Conclusion: in a symmetrical system ($R_1 = R_2$) the heat flux flowing to each side of the CHS is equal to ½ q and is independent of time.

Substituting a special case with $R_1 = R_2 = 0$ in (228) and (229) the following is obtained:

$$q_1(r, t) =$$

$$aq \int_0^\infty \left\{ \frac{1}{[4 - 0]} \left[ 2 - \lambda k \cdot (0) \cdot \text{erf}(\lambda \sqrt{\alpha t}) - 2 \cdot e^{\left[\frac{4\alpha t}{k^2 (0)^2} - \alpha \lambda^2 t\right]} \cdot \text{erfc}\left[\frac{2\sqrt{\alpha t}}{k(0)}\right] \right] \right\}$$

$$J_1(\lambda a) J_0(\lambda r) d\lambda + aq \cdot (0) \cdot$$

$$\int_0^\infty \left\{ \frac{1}{[4 - 0]} \left[ 2\lambda k \cdot \text{erf}(\lambda \sqrt{\alpha t}) - \lambda^2 k^2 \cdot (0) + \frac{4}{(0)} \cdot e^{\left[\frac{4\alpha t}{k^2 (0)^2} - \alpha \lambda^2 t\right]} \cdot \right.\right.$$

$$\left.\left. \text{erfc}\left[\frac{2\sqrt{\alpha t}}{k(0)}\right] \right] \right\} J_1(\lambda a) J_0(\lambda r) d\lambda = \frac{q}{2}; R_1 = R_2 = 0$$

Similarly, $$q_2(r, t) = \frac{q}{2};$$

when $R_1 = R_2 = 0$.

If $R_1 = 0$, $0 < R_2 < \infty$, the fluxes should become identical to those with a contact resistance on medium 2, with $R_2$ replaced by R.

$$q_1(r, t) =$$

$$aq \int_0^\infty \left\{ \frac{1}{[4 - \lambda^2 k^2 (R_2)^2]} \left[ 2 - \lambda k (R_2) \cdot \text{erf}(\lambda \sqrt{\alpha t}) - 2 \cdot e^{\left[\frac{4\alpha t}{k^2 (R_2)^2} - \alpha \lambda^2 t\right]} \cdot \right.\right.$$

$$\left.\left. \text{erfc}\left[\frac{2\sqrt{\alpha t}}{k(R_2)}\right] \right] \right\} J_1(\lambda a) J_0(\lambda r) d\lambda +$$

$$aq R_2 \int_0^\infty \left\{ \frac{1}{[4 - \lambda^2 k^2 (R_2)^2]} \left[ 2\lambda k \cdot \text{erf}(\lambda \sqrt{\alpha t}) - \lambda^2 k^2 (R_2) + \right.\right.$$

$$\left.\left. \frac{4}{(R_2)} \cdot e^{\left[\frac{4\alpha t}{k^2 (R_2)^2} - \alpha \lambda^2 t\right]} \cdot \text{erfc}\left[\frac{2\sqrt{\alpha t}}{k(R_2)}\right] \right] \right\} J_1(\lambda a) J_0(\lambda r) d\lambda; R_1 = 0$$

$$q_2(r, t) =$$

$$aq \int_0^\infty \left\{ \frac{1}{[4 - \lambda^2 k^2 (R_2)^2]} \left[ 2 - \lambda k (R_2) \cdot \text{erf}(\lambda \sqrt{\alpha t}) - 2 \cdot e^{\left[\frac{4\alpha t}{k^2 (R_2)^2} - \alpha \lambda^2 t\right]} \cdot \right.\right.$$

$$\left.\left. \text{erfc}\left[\frac{2\sqrt{\alpha t}}{k(R_2)}\right] \right] \right\} J_1(\lambda a) J_0(\lambda r) d\lambda +$$

$$aq \cdot (0) \cdot \int_0^\infty \left\{ \frac{1}{[4 - \lambda^2 k^2 (R_2)^2]} \left[ 2\lambda k \cdot \text{erf}(\lambda \sqrt{\alpha t}) - \lambda^2 k^2 (R_2) + \frac{4}{(R_2)} \cdot \right.\right.$$

$$\left.\left. e^{\left[\frac{4\alpha t}{k^2 (R_2)^2} - \alpha \lambda^2 t\right]} \cdot \text{erfc}\left[\frac{2\sqrt{\alpha t}}{k(R_2)}\right] \right] \right\} J_1(\lambda a) J_0(\lambda r) d\lambda; R_1 = 0$$

$$q_2(r, t) = aq \int_0^\infty \left\{ \frac{1}{[4 - \lambda^2 k^2 (R_2)^2]} \left[ 2 - \lambda k (R_2) \cdot \text{erf}(\lambda \sqrt{\alpha t}) - \right.\right.$$

$$\left.\left. 2 \cdot e^{\left[\frac{4\alpha t}{k^2 (R_2)^2} - \alpha \lambda^2 t\right]} \cdot \text{erfc}\left[\frac{2\sqrt{\alpha t}}{k(R_2)}\right] \right] \right\} J_1(\lambda a) J_0(\lambda r) d\lambda; R_1 = 0$$

Steady-state occurs when $t \to \infty$. Starting from (228), the following is obtained:

$$\lim_{t \to \infty} q_1(r) = \tag{231}$$

$$aq \int_0^\infty \left\{ \frac{1}{[4 - \lambda^2 k^2 (R_1 + R_2)^2]} \left[ 2 - \lambda k(R_1 + R_2) \cdot \text{erf}\left(\lambda\sqrt{\alpha \cdot \infty}\right) - \right.\right.$$

$$\left.\left. 2 \cdot e^{\left[\frac{4\alpha \cdot \infty}{k^2(R_1+R_2)^2} - \alpha\lambda^2 \cdot \infty\right]} \cdot \text{erfc}\left[\frac{2\sqrt{\alpha \cdot \infty}}{k(R_1+R_2)}\right] \right] \right\} J_1(\lambda a) J_0(\lambda r) d\lambda +$$

$$aqR_2 \int_0^\infty \left\{ \frac{1}{[4 - \lambda^2 k^2 (R_1 + R_2)^2]} \left[ 2\lambda k \cdot \text{erf}\left(\lambda\sqrt{\alpha \cdot \infty}\right) - \right.\right.$$

$$\left.\left. \lambda^2 k^2 (R_1 + R_2) + \frac{4}{(R_1 + R_2)} \cdot e^{\left[\frac{4\alpha \cdot \infty}{k^2(R_1+R_2)^2} - \alpha\lambda^2 \cdot \infty\right]} \right.\right.$$

$$\left.\left. \text{erfc}\left[\frac{2\sqrt{\alpha \cdot \infty}}{k(R_1+R_2)}\right] \right] \right\} J_1(\lambda a) J_0(\lambda r) d\lambda =$$

$$aq \int_0^\infty \left\{ \frac{1}{[4 - \lambda^2 k^2 (R_1 + R_2)^2]} [2 - \lambda k(R_1 + R_2) \cdot \right.$$

$$\left. 1 - 2 \cdot 0] \right\} J_1(\lambda a) J_0(\lambda r) d\lambda +$$

$$aqR_2 \int_0^\infty \left\{ \frac{1}{[4 - \lambda^2 k^2 (R_1 + R_2)^2]} [2\lambda k \cdot 1 - \right.$$

$$\left. \lambda^2 k^2 (R_1 + R_2) + \frac{4}{(R_1 + R_2)} \cdot 0 ] \right\} J_1(\lambda a) J_0(\lambda r) d\lambda =$$

$$aq \int_0^\infty \left\{ \frac{2 - \lambda k(R_1 + R_2)}{[4 - \lambda^2 k^2 (R_1 + R_2)^2]} \right\} J_1(\lambda a) J_0(\lambda r) d\lambda +$$

$$aqR_2 \int_0^\infty \left\{ \frac{\lambda k[2 - \lambda k(R_1 + R_2)]}{[4 - \lambda^2 k^2 (R_1 + R_2)^2]} \right\} J_1(\lambda a) J_0(\lambda r) d\lambda$$

$$\lim_{t \to \infty} q_1(r, t) = aq \int_0^\infty \left\{ \frac{1 + \lambda k R_2}{[2 + \lambda k(R_1 + R_2)]} \right\} J_1(\lambda a) J_0(\lambda r) d\lambda$$

(232)

$$\lim_{t \to \infty} q_2(r, t) = aq \int_0^\infty \left\{ \frac{1 + \lambda k R_1}{[2 + \lambda k(R_1 + R_2)]} \right\} J_1(\lambda a) J_0(\lambda r) d\lambda$$

Note that at steady-state $q_1$ and $q_2$ are independent of the thermal diffusivity, and depend only on the thermal conductivity and the contact resistances. Also note that the sum of (231) and (232) is equal to q, as expected.

Sensitivity Analysis of Thin Films

Figure 23:
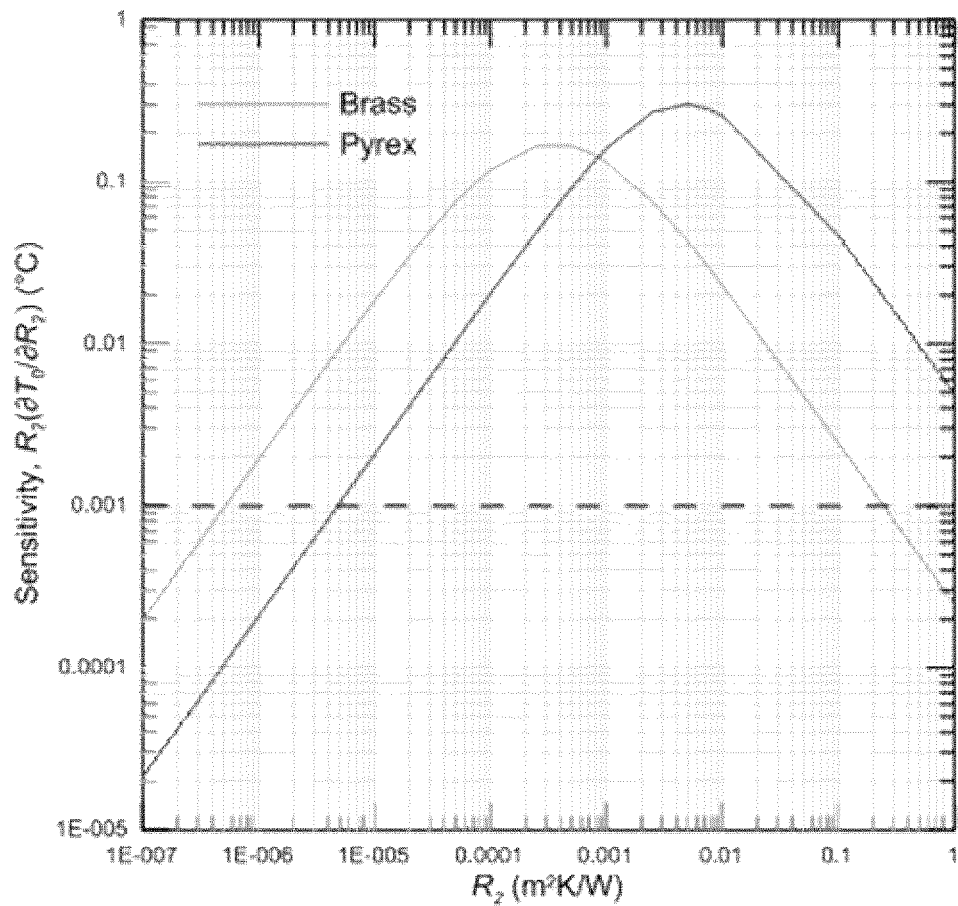
FIG. 23 is a graph showing the sensitivity of the measurement of a thin film using both brass and Pyrex material samples.

An analysis of the sensitivity of the isotropic backing material in relation to measured contact resistance may be done by taking the derivative of T0 with respect to $R_2$, times $R_2$ for normalization, was calculated numerically for Pyrex and brass. The result, $R_2(\delta T_0(r,t)/\delta R_2)$, has units of temperature and is plotted in FIG. 23 as a function of R2. It is obvious that for the measurement of thin films with equivalent thermal resistance of $>10^{-3}$ m$^2$K/W it is preferable to use relatively low conductivity media like Pyrex, while for thin films with equivalent thermal resistance of $<10^{-3}$ m$^2$K/W it is preferable to use high conductivity media like brass. If we assume that the sensitivity of the measurement system is around 0.001° C., the measurable limit of low resistance films would be approximately $5 \times 10^{-7}$ m$^2$K/W as the left side of the brass curve indicates. The right side of the Pyrex curve shows that film resistance of 1.0 m$^2$K/W can be measured, assuming the heat capacity of the film is negligible.

Finite Element Simulations and Application to Thin Film Measurement

Finite element simulations performed in Comsol are provided and compared with the analytical solution. Regressions of Comsol data show an excellent match between the simulated data and the theoretically predicted contact resistance, and the thin film thermal conductivity.

Figure 24A:
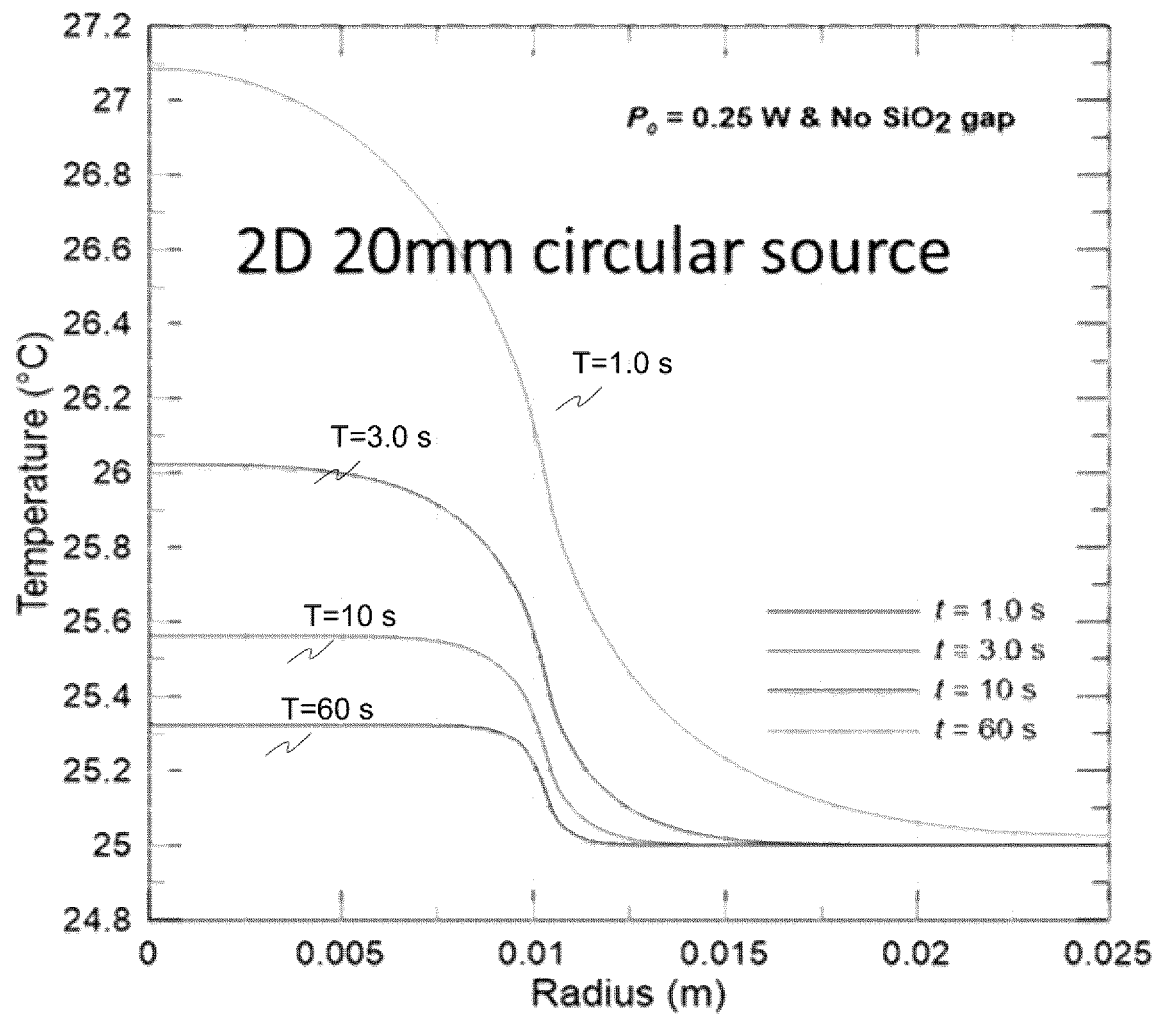
FIG. 24A shows a finite element simulation of the temperature vs the radial distance from the center of a 2-dimensional 20 mm diameter circular heat source embedded inside two identical Pyrex samples.
Figure 24B:
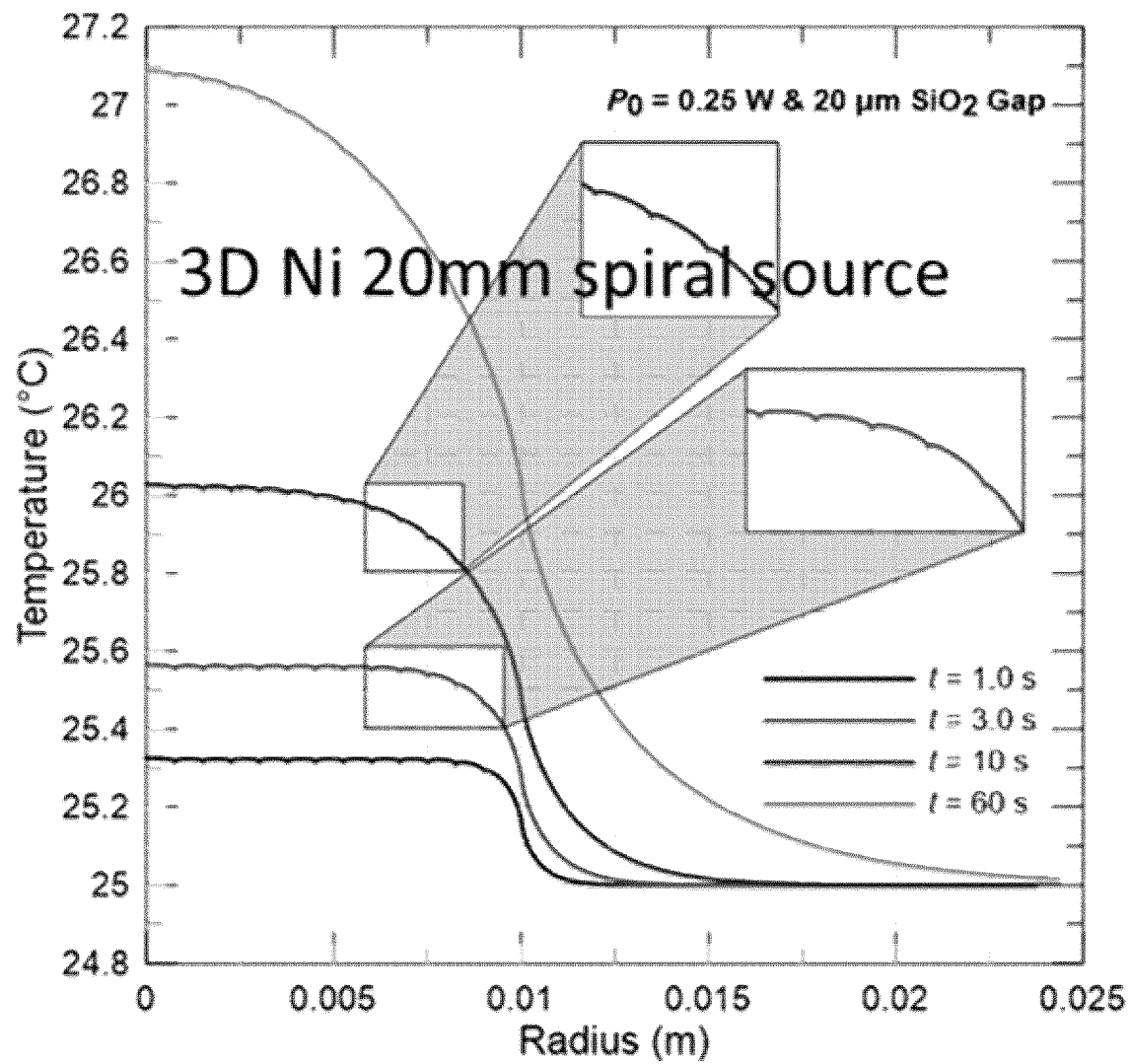
FIG. 24B presents a similar setup as FIG. 24A, except that the simulation included an actual tight spiral with 20 μm gap.
Figure 24C:
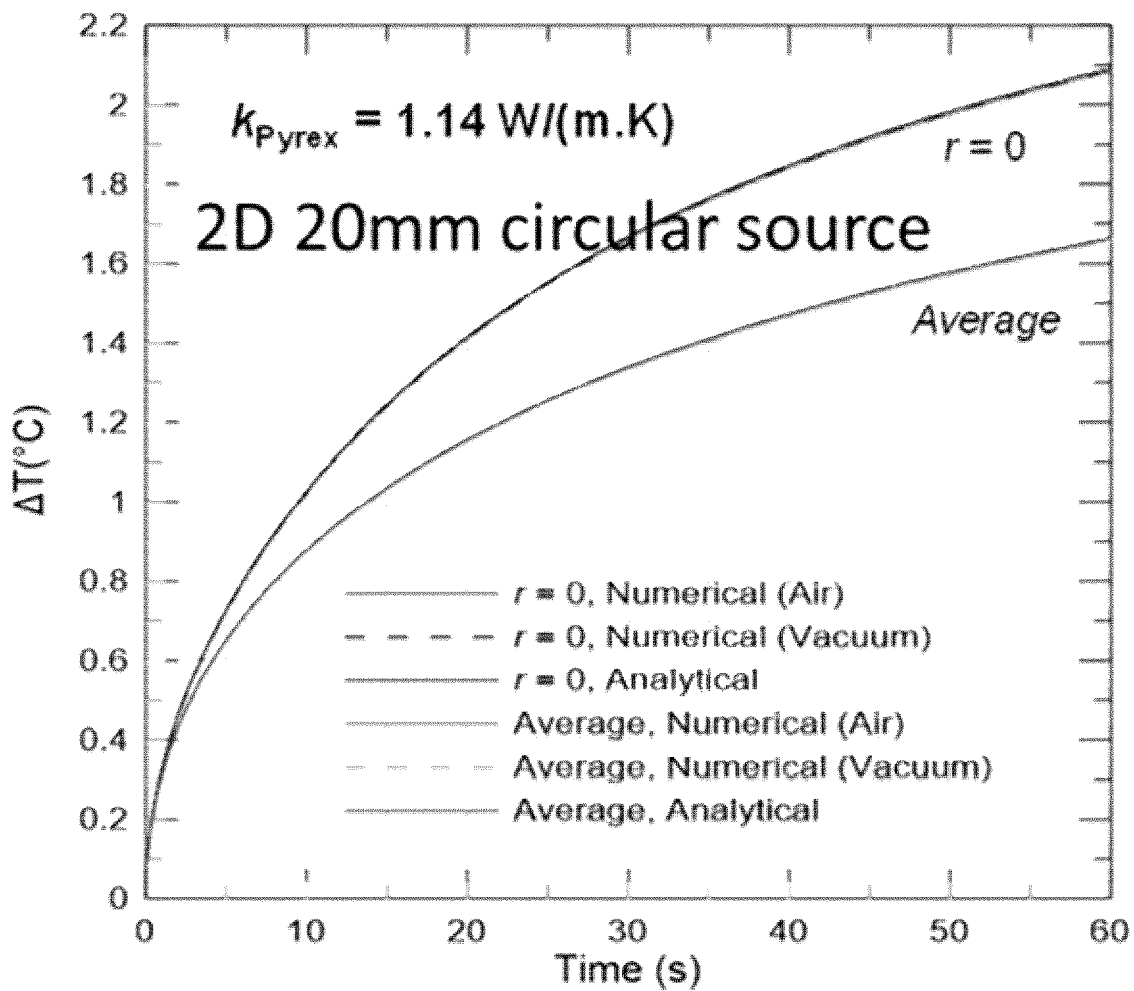
FIG. 24C shows the evolution of the CHS temperature over at the center of the CHS and the average over its area, for the simulation of FIG. 24A, overlaid on the temperature curves from the analytical solution.
Figure 24D:
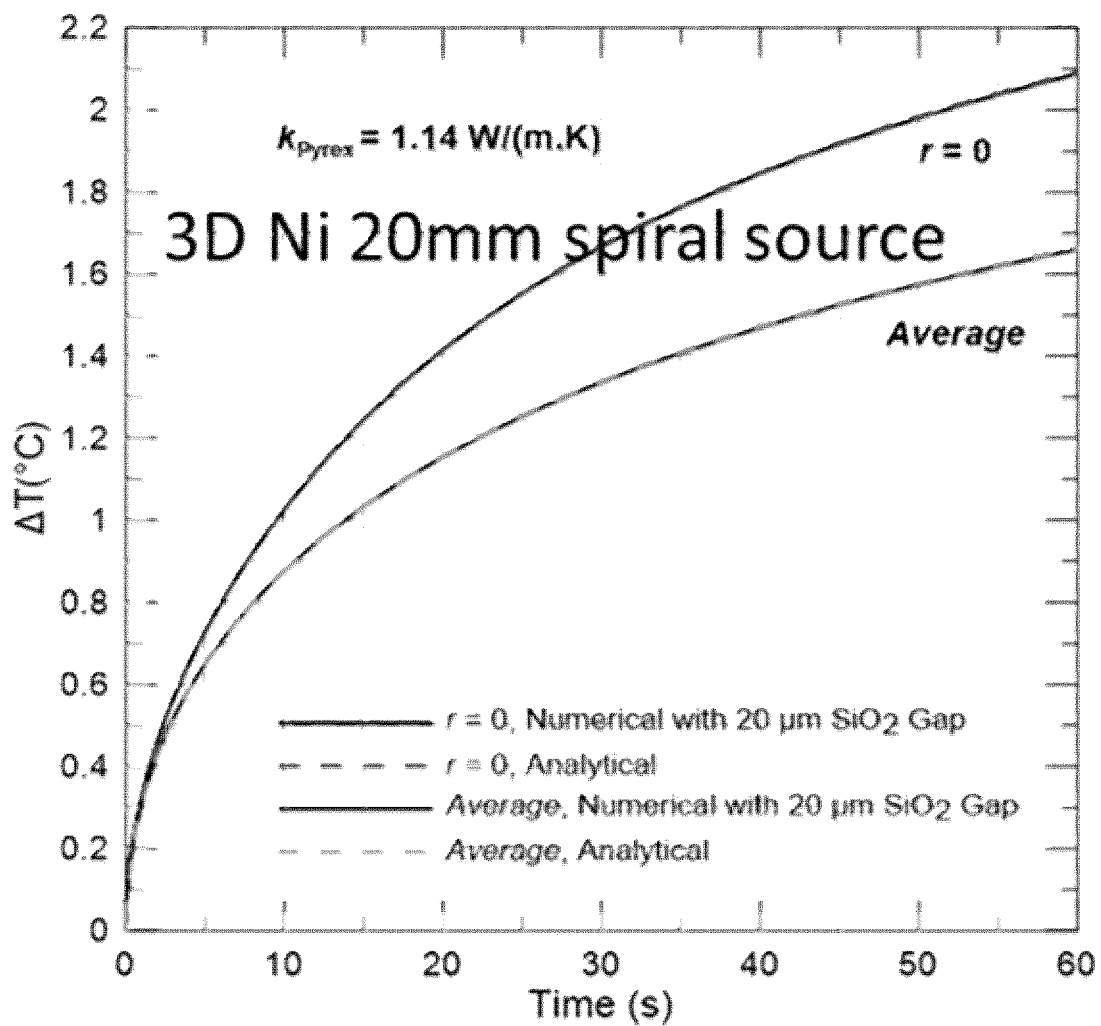
FIG. 24D shows the evolution of the CHS temperature over at the center of the CHS and the average over its area, for the simulation of FIG. 24B, overlaid on the temperature curves from the analytical solution.

FIG. 24A shows a finite element simulation of the temperature vs the radial distance from the center of a 2-dimensional 20 mm diameter circular heat source embedded inside two identical Pyrex samples (with thermal conductivity of 1.14 W/mK and no contact resistances). FIG. 24B presents a similar setup, except that the simulation included an actual tight spiral with 20 μm gap. It can be seen that the difference between the two is minimal, thus confirming that the analytical solution derived for a 2D CHS can be applied to an actual 3D sensor. Further proof is provided in FIGS. 24C and 24D, which show the evolvement of the CHS temperature over time in the above two cases at the center of the CHS and the average over its area. The analytical solution is superimposed on the finite element simulation curves, and the fit is again very good.

Figure 25A:
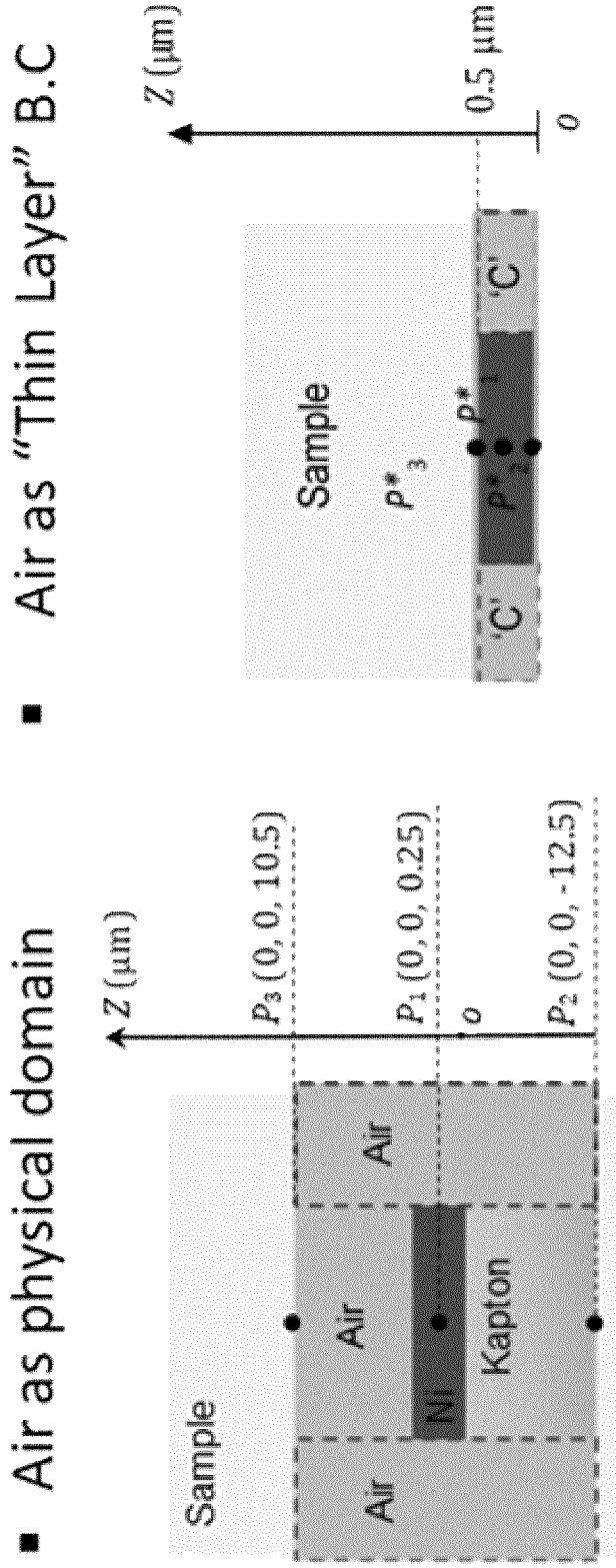
FIG. 25A shows a setup of two simulation cases.

FIG. 25A shows a setup of two simulation cases: one with two different thin layers, air and Kapton, between the CHS surfaces and the samples; the other is with two thermal contact resistances equivalent to the air and Kapton layers, but with no actual material or thickness.

Figure 25B:
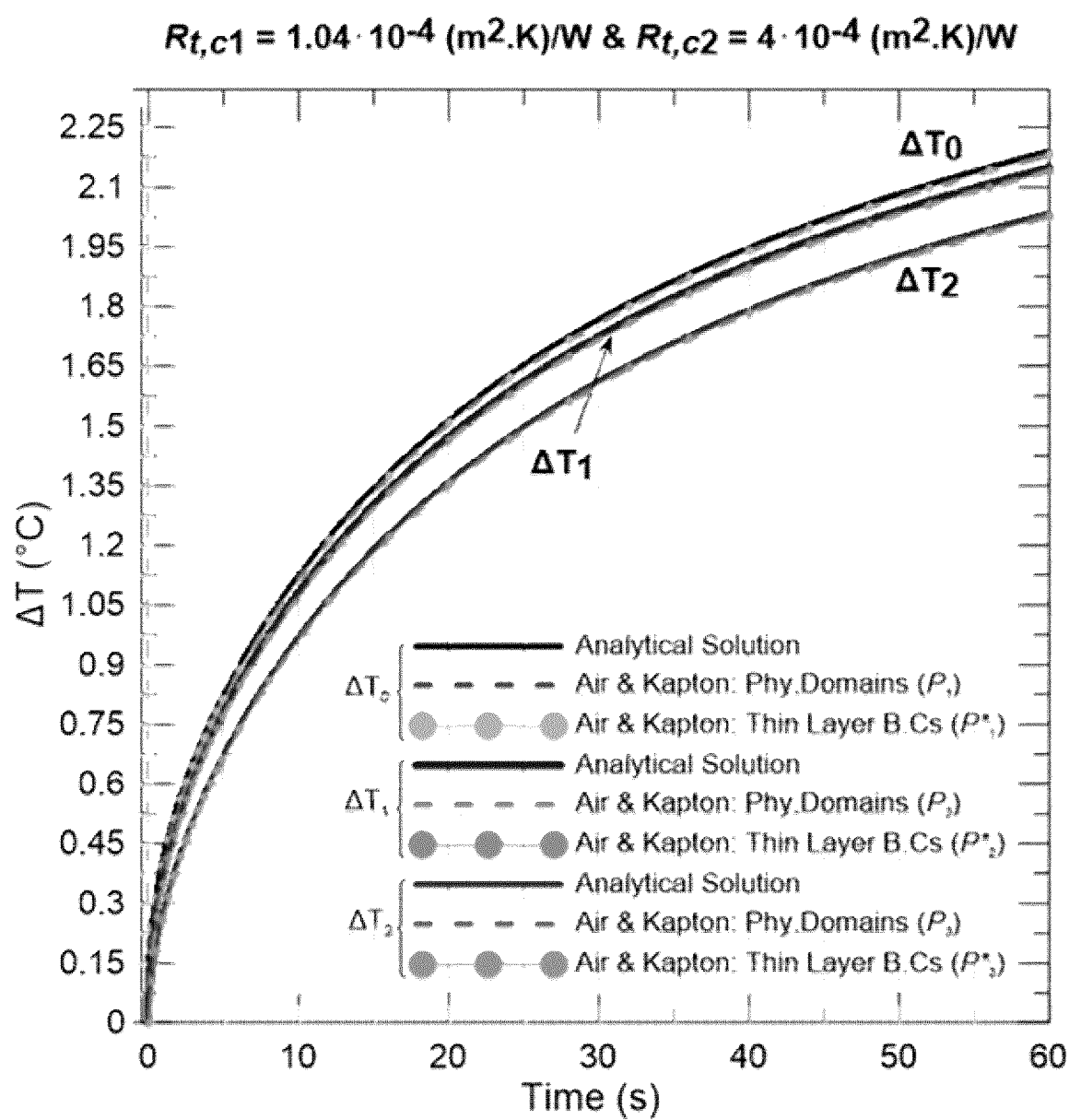
FIG. 25B shows the three temperature fields $T_0$, $T_1$ and $T_2$ vs time, overlaid on the temperature curves from the analytical solution.

FIG. 25B shows the three temperature fields $T_0$, $T_1$ and $T_2$ vs time, captured at the points $P_1$, $P_2$ and $P_3$, and equivalently at $P_1^*$, $P_2^*$ and $P_3^*$. Additionally, the temperature fields as calculated from the theoretical solution are added. The curves are superimposed, and it can be seen that the match is very good for all three temperature curves in all three cases. From this we can conclude that: a) the heat capacities of the CHS and the simulated thin layers are negligible; and b) the analytical solution is correct.

In the above derivations, it is desired to show that $T_0(r, z=0, t) - T_1(r, z=0, t)$ on the CHS surface (or at z=0) is independent of time if $R_1 = R_2$. Starting with equation (209) for $T_0(r, z=0, t)$, substitute $R_1 = R_2 = R$, rearrange and combine integrals, and finally get $$T_0(r, z = 0, t) = \frac{aq}{2} \int_0^\infty \frac{1}{1 - \lambda^2 k^2 R^2}$$

$$\left[ \frac{1}{k\lambda} \text{erf}\left(\lambda\sqrt{\alpha t}\right) + R - \lambda k R^2 \text{erf}\left(\lambda\sqrt{\alpha t}\right) - \lambda^2 k^2 R^3 \right] J_1(\lambda a) J_0(\lambda r) d\lambda$$

And similarly for $T_1(r, z=0, t)$:

$$T_1(r, z = 0, t) =$$

$$\frac{aq}{2} \int_0^\infty \frac{1}{1 - \lambda^2 k^2 R^2} \left[ \frac{1}{k\lambda} \text{erf}\left(\lambda\sqrt{\alpha t}\right) - \lambda k R^2 \text{erf}\left(\lambda\sqrt{\alpha t}\right) \right] J_1(\lambda a) J_0(\lambda r) d\lambda$$

Now it is possible to easily subtract $T_1(t)$ from $T_0(t)$:

$$T_0(r, z = 0, t) - T_1(r, z = 0, t) =$$

$$\frac{aq}{2} \int_0^\infty \frac{1}{1 - \lambda^2 k^2 R^2} \left[ \frac{1}{k\lambda} \text{erf}\left(\lambda\sqrt{\alpha t}\right) + R - \lambda k R^2 \text{erf}\left(\lambda\sqrt{\alpha t}\right) - \lambda^2 k^2 R^3 \right]$$

$$J_1(\lambda a) J_0(\lambda r) d\lambda - \frac{aq}{2}$$

-continued $$\int_0^\infty \frac{1}{1-\lambda^2 k^2 R^2}\left[\frac{1}{k\lambda}\text{erf}(\lambda\sqrt{\alpha t})-\lambda k R^2 \text{erf}(\lambda\sqrt{\alpha t})\right]J_1(\lambda a)J_0(\lambda r)d\lambda =$$

$$\frac{aq}{2}\int_0^\infty \frac{1}{1-\lambda^2 k^2 R^2}\left[\frac{1}{k\lambda}\text{erf}(\lambda\sqrt{\alpha t})-\frac{1}{k\lambda}\text{erf}(\lambda\sqrt{\alpha t})+R-\lambda k R^2\right.$$

$$\left.\text{erf}(\lambda\sqrt{\alpha t})+\lambda k R^2\text{erf}(\lambda\sqrt{\alpha t})-\lambda^2 k^2 R^3\right]J_1(\lambda a)J_0(\lambda r)d\lambda =$$

$$\frac{aq}{2}\int_0^\infty \frac{1}{1-\lambda^2 k^2 R^2}[R-\lambda^2 k^2 R^3]J_1(\lambda a)J_0(\lambda r)d\lambda =$$

$$\frac{aqR}{2}\int_0^\infty \frac{1}{1-\lambda^2 k^2 R^2}[1-\lambda^2 k^2 R^2]J_1(\lambda a)J_0(\lambda r)d\lambda$$

From the above, it is finally obtained:

$$T_0(r, z=0, t) - T_1(r, z=0, t) = \frac{aqR}{2}\int_0^\infty J_1(\lambda a)J_0(\lambda r)d\lambda = \frac{qR}{2};$$

$$R_1 = R_2 = R; z = 0$$

Using the definite integral $$\int_0^\infty J_1(\lambda a)J_0(\lambda r)d\lambda = \frac{1}{a}.$$

The following symbols are used in the above equations.

| Symbol | Units | Description |
| --- | --- | --- |
| a | m | Radius of CHS |
| r | m | Distance from center of CHS in x-y plane (the plane of the CHS) |
| q | W/m² | Heat flux generated by the CHS |
| ρ | Kg/m³ | Density |
| C | J/kg ° C. | Specific heat capacity |
| α | m²/s | Thermal diffusivity |
| k | W/mK | Thermal conductivity |
| $J_0$ | | Bessel function of order zero |
| $J_1$ | | Bessel function of order one |
| $\mathcal{H}_0$ | | Hankel transform operator of order zero |
| $\mathcal{L}$ | | Laplace transform operator |
| λ | m⁻¹ | Hankel transform parameter (1/r), and integration factor |
| s | s⁻¹ | Laplace transform parameter (1/t) |
| * | | Convolution operator |
| T | ° C. | Temperature |
| $T_{Av}$ | ° C. | Average temperature |
| t, t', $\tau$ | s | Time |
| R | m²K/W | Thermal resistance |
| λkR | | Neutral |
| aqR | mK | |

The above has provided details on various different types of measurements that can be made using a circular heat source. As described, a sensor may have a spiral heating element closely spaced elements, for example about 20 μm although spacings less than 75 μm are possible. The tightly spaced spiral heating element allows the heating element to be heated electrically, as well as measuring the resistance corresponding to the temperature electrically while still having the heating patch behave as a circular heat source. The description of the sensors above has described using the same electrical connections for heating the sensor as well as measuring its voltage/resistance. The sensor may include separate connections for supplying a heating current for measuring a temperature voltage. A measurement system may be provided that implements one or more of the different measurement techniques.

Figure 26:
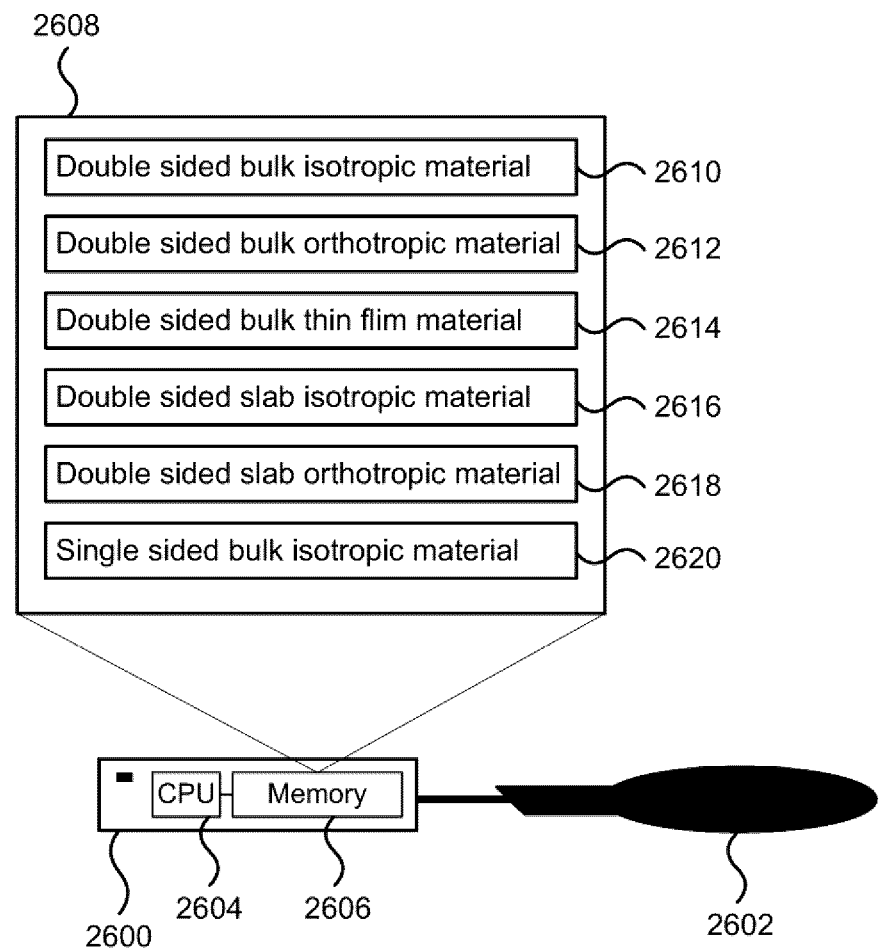
FIG. 26 depicts a measurement system using a circular heat source.

FIG. 26 depicts a measurement system using a circular heat source. The measurement system 2600 can be connected to a circular heat source sensor 2602. The circular heat source sensor 2602 may provide a single heating patch size, or may provide different heating patch sizes. The measurement system comprises a processor (CPU) 2604 or a controller and memory 2606 that stores instructions to provide various different measurement functionality 2608. The measurement functionality 2608 may include functionality 2610 for measuring thermal characteristics of bulk isotropic material using a double sided measurement process, functionality 2612 for measuring thermal characteristics of bulk orthotropic material using a double sided measurement process, functionality 2614 for measuring thermal characteristics of thin film material using a double sided measurement process with sample material of known characteristics, functionality 2616 for measuring thermal characteristics of slab isotropic material using a double sided measurement process, functionality 2618 for measuring thermal characteristics of slab orthotropic material using a double sided measurement process, and functionality 2620 for measuring thermal characteristics of bulk isotropic material using a single sided measurement process.

The measurement system 2600 may include an interface for selecting which operating mode to operate in. The measurement system may control the sensor to heat the sensor for a measurement period of time and as well as make measurements of the resistance, and so the average temperature of the sensor. The appropriate equation for the average temperature can be used to determine the thermal characteristics of the sample, including for example the thermal diffusivity and conductivity.

For measuring thermal characteristics of bulk isotropic material using a double sided measurement process the functionality 2610 may use the following equation for the average temperature:

$$T_{Av}(z=0, t) = \frac{q}{k}\int_0^\infty \left[\text{erf}(\lambda\sqrt{\alpha t})\right]J_1^2(\lambda a)\frac{d\lambda}{\lambda^2}$$

For measuring thermal characteristics of bulk orthotropic material using a double sided measurement process functionality 2612 may use the following equation for the average temperature:

$$T_{0Av}(t) = \frac{2q}{E_z}\int_0^\infty \left\{\frac{1}{[4-E_z^2(R_1+R_2)^2\alpha_r\lambda^2]}\left[\frac{2\text{erf}\left[+\lambda\sqrt{\alpha_r t}\right]}{\sqrt{\alpha_r}}-\right.\right.$$

$$\lambda E_z(R_1+R_2)+\lambda E_z(R_1+R_2)e^{\left[\frac{4t}{E_z^2(R_1+R_2)^2}-\alpha_r\lambda^2 t\right]}.$$

$$\left.\left.\text{erfc}\left[\frac{2\sqrt{t}}{E_z(R_1+R_2)}\right]\right]\right\}[J_1(\lambda a)]^2\frac{d\lambda}{\lambda^2}+2q(R_1+$$

$$R_2)\int_0^\infty \left\{\frac{1}{[4-E_z^2(R_1+R_2)^2\alpha_r\lambda^2]}\right.$$

$$[2-E_z(R_1+R_2)\lambda\sqrt{\alpha_r}\,\text{erf}\left[+\lambda\sqrt{\alpha_r t}\right]-$$

$$\left.2e^{\left[\frac{4t}{E_z^2(R_1+R_2)^2}-\alpha_r\lambda^2 t\right]}\cdot\text{erfc}\left[\frac{2\sqrt{t}}{E_z(R_1+R_2)}\right]\right\}$$

-continued $$[J_1(\lambda a)]^2 \frac{d\lambda}{\lambda} + \frac{2qR_1R_2}{(R_1+R_2)} \int_0^\infty$$

$$\left\{ \frac{1}{[4 - E_z^2(R_1+R_2)^2 \alpha_r \lambda^2]} \right.$$

$$[2E_z(R_1+R_2)\lambda\sqrt{\alpha_r} \cdot erf[+\lambda\sqrt{\alpha_r t}] -$$

$$E_z^2(R_1+R_2)^2 \alpha_r \lambda^2 + 4e^{\left[\frac{4t}{E_z^2(R_1+R_2)^2}\alpha_r\lambda^2\right]}.$$

$$\left. erfc\left[\frac{2\sqrt{t}}{E_z(R_1+R_2)}\right]\right\}[J_1(\lambda a)]^2 \frac{d\lambda}{\lambda}; z = 0$$

If the sensor does not provide different sizes of heating patches, it is not possible to determine or separate the individual radial and axial conductivities of the material. If the sensor is able to provide different sized heating patches, it is possible to perform both 1 dimensional and 3 dimensional heating measurements and the results used to determine or separate the individual radial and axial conductivities of the material using the following equation:

$$T(i) = \frac{2q\sqrt{t}}{E_z} \sum_{n=0}^{\infty} \left[ ierfc \frac{2nh}{2\sqrt{\alpha_z t}} + \frac{2(n+1)h}{2\sqrt{\alpha_z t}} \right]$$

For measuring thermal characteristics of thin film material using a double sided measurement process with sample material of known characteristics, functionality 2614 may use the following equation for the average temperature:

$$T_{0Av}(z=0, t) = -\frac{2q\sqrt{\alpha}}{\pi k}$$

$$\int_0^\infty \left[ \int_b^\infty \frac{e^{-\sigma t}}{\sigma} \frac{[2\alpha + k^2(\sigma-b)(R_1^2+R_2^2)]}{\sqrt{\sigma-b}\,[4\alpha + k^2(\sigma-b)^2(R_1+R_2)^2]} d\sigma \right] J_1^2(\lambda a)\frac{d\lambda}{\lambda} +$$

$$\frac{2q}{k} \int_0^\infty \left[ \frac{(1+kR_1\lambda)(1+kR_2\lambda)}{2+k\lambda(R_1+R_2)} \right] J_1^2(\lambda a)\frac{d\lambda}{\lambda^2}$$

For measuring thermal characteristics of slab isotropic material using a double sided measurement process, functionality 2616 may use the following equation for the average temperature:

$$T_{0Av}(t) = \frac{2q}{k}\int_0^\infty \frac{[\cosh(\lambda l) + k\lambda R_1 \sinh(\lambda l)]}{[2\cosh(\lambda l) + k\lambda(R_1+R_2)\sinh(\lambda l)]}$$

$$\frac{[\cosh(\lambda l) + k\lambda R_2 \sinh(\lambda l)]}{\sinh(\lambda l)} J_1^2(\lambda a)\frac{d\lambda}{\lambda^2} -$$

$$\frac{2q}{k}\int_0^\infty \left\{ \frac{e^{-\lambda^2 \alpha t}}{2\lambda^2 l} + l\sum_{n=1}^\infty \frac{e^{-\left(\lambda^2 + \frac{n^2\pi^2}{l^2}\right)\alpha t}}{(\lambda^2 l^2 + n^2\pi^2)} \right\} J_1^2(\lambda a)\frac{d\lambda}{\lambda} -$$

$$\frac{2q}{k}\int_0^\infty \sum_{m=0}^\infty \frac{e^{-\left(\lambda^2 + \frac{\beta_m^2}{l^2}\right)\alpha t}[l\cos(\beta_m) - kR_1\beta_m\sin(\beta_m)]}{(\lambda^2 l^2 + \beta_m^2)\sin(\beta_m)}$$

$$\left[ l\sin(\beta_m) - \frac{k(R_1+R_2)}{2}[\sin(\beta_m) + \beta_m\cos(\beta_m)] \right]$$

$$J_1^2(\lambda a)\frac{d\lambda}{\lambda}$$

For measuring thermal characteristics of slab orthotropic material using a double sided measurement process, functionality 2618 may use the following equation for the average temperature:

$$T_{Av}(t) = \frac{q}{k_z}\int_0^\infty$$

$$\left\{ (1-e^{-\alpha_r\lambda^2 t})\frac{1}{\frac{\alpha_r}{\alpha_z}\lambda^2 l} + 2l\sum_{n=1}^\infty \frac{1-e^{-(\alpha_r\lambda^2 l^2 + \alpha_z n^2 \pi^2)\frac{t}{l^2}}}{\left(\frac{\alpha_r}{\alpha_z}\lambda^2 l^2 + n^2\pi^2\right)} \right\}$$

$$[J_1(\lambda a)]\frac{d\lambda}{\lambda}$$

$n = 1, 2 \ldots$

For measuring thermal characteristics of bulk isotropic material using a single sided measurement process, functionality 2620 may use the following equation for the average temperature:

$$T_{0Av}(z=0, t) = -\frac{2q}{\pi}\int_0^\infty \left[ \int_{b_2}^\infty \frac{e^{-\sigma t}}{\sigma} \frac{\begin{bmatrix} \sqrt{\alpha_1}\,k_1\sqrt{\sigma-b_1} \\ [\alpha_2 + k_2^2 R_2^2(\sigma-b_2)] + \\ \sqrt{\alpha_2}\,k_2\sqrt{\sigma-b_2} \\ [\alpha_1 + k_1^2 R_1^2(\sigma-b_1)] \\ k_1^2 k_2^2(\sigma-b_1) \\ (\sigma-b_2)(R_1+R_2)^2 + \\ \left(\frac{\sqrt{\alpha_1}\,k_2\sqrt{\sigma-b_2}}{\sqrt{\alpha_2}\,k_1\sqrt{\sigma-b_1}} + \right)^2 \end{bmatrix}}{} d\sigma \right]$$

$$J_1^2(\lambda a)\frac{d\lambda}{\lambda} -$$

$$\frac{2q}{\pi}\int_0^\infty \left[ \int_{b_1}^{b_2} \frac{e^{-\sigma t}}{\sigma} \frac{(\sqrt{\alpha_2}+k_2 R_2\sqrt{b_2-\sigma})^2}{a_1 k_2^2(b_2-\sigma)+} d\sigma \right.$$

$$\left. \begin{bmatrix} k_1 k_2 R_1 \sqrt{\sigma-b_1}\,\sqrt{b_2-\sigma} + \\ k_1\sqrt{\sigma-b_1} \\ (\sqrt{\alpha_2}+k_2 R_2\sqrt{b_2-\sigma}) \end{bmatrix}^2 \right]$$

$$J_1^2(\lambda a)\frac{d\lambda}{\lambda} +$$

$$2q\int_0^\infty \left[ \frac{(1+k_1 R_1\lambda)(1+k_2 R_2\lambda)}{k_2(1+k_1 R_1\lambda) + k_1(1+k_2 R_2\lambda)} \right] J_1^2(\lambda a)\frac{d\lambda}{\lambda^2}$$

Figure 27:
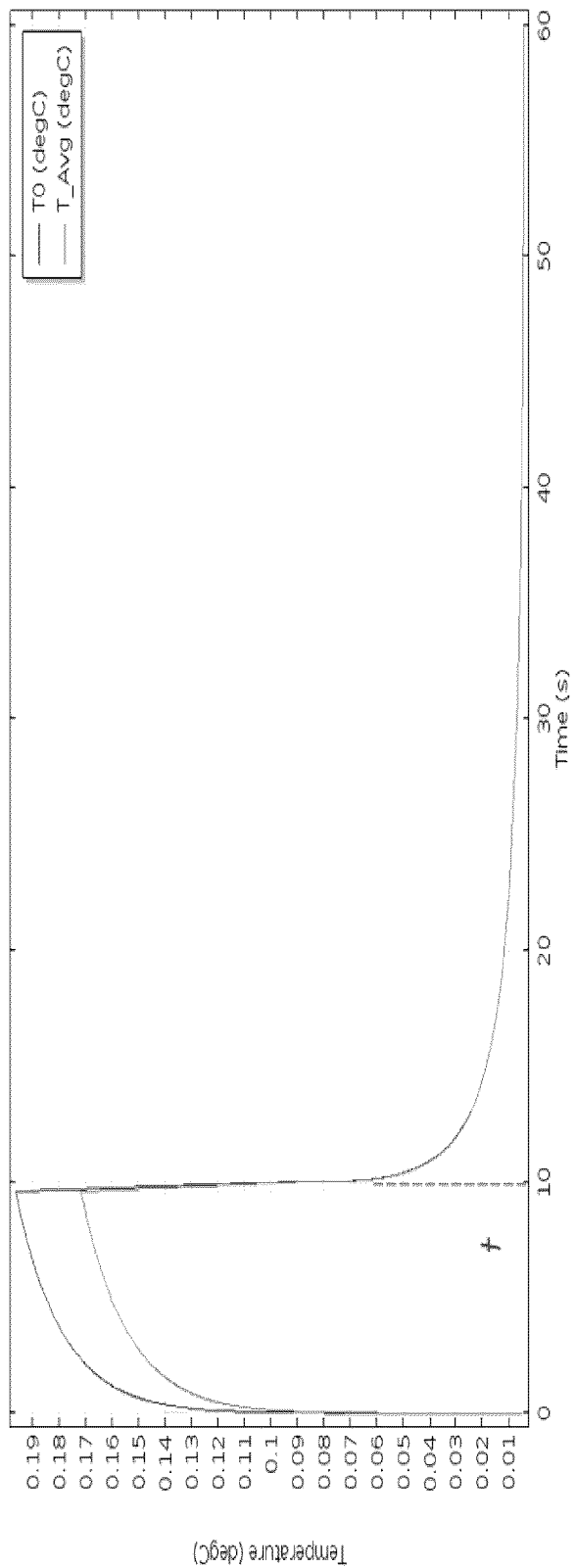
FIG. 27 depicts a graph of temperature increase and decay over time.

Although the temperature measurements are described as being performed during the heating of the sample, or samples, it is possible to measure the temperature during a temperature decay period, i.e. after the heating current is switched off while the sample is cooling. FIG. 27 depicts a graph of temperature increase and decay for heating and cooling of a material. For the heating portion, for example from time 0 to time t1, the equations as provided govern and in general a temperature function T(t)=f(t) is a certain function f(t) for t≤t1. For the cooling period, the temperature after time t1 may be described by T(t>t1)=f(t)−f(t−t1).

Various specific details have been described above. While certain features or functionality may be described in particular detail with regard to one device or component, it will be appreciated that the functionality or features may be applied to other devices or components. Further, although various embodiments of the devices, equipment, functionality, etc. are described herein, the description is intended to provide an understanding of the systems, methods and devices and as such certain aspects may not be described, or not described in as much detail as other aspects. The described systems, methods and devices are not the sole possible implementations, and the various descriptions, systems, methods and devices herein will enable one of ordinary skill in the art to apply the teachings to other equivalent implementations without exercising any inventive ingenuity.

What is claimed is:

1. A sensor for use in determining thermal characteristics of a material sample, the sensor comprising:
a heating patch comprising a closely spaced spiral electrical trace with adjacent spiral sections spaced apart by less than 75 µm which when heated act as a circular heat source; and
a pair of electrical connections connected to the heating patch capable of supplying current to the heating patch to heat a first size of the heating patch when determining the thermal characteristics of the material sample based on at least a voltage across the pair of electrical connections.

2. The sensor of claim 1, wherein the electrical trace has a known temperature coefficient of resistivity (TCR) to allow a temperature of the electrical trace to be determined by measuring its resistance.

3. The sensor of claim 1, wherein the closely spaced spiral electrical trace is arranged in one of a continuous single spiral and a double spiral.

4. The sensor of claim 1, further comprising additional electrical connections connected to the heating patch capable of supplying current to the heating patch to heat different sizes of the heating patch.

5. The sensor of claim 1, wherein the electrical connections are used to measure a voltage across the heating patch.

6. The sensor of claim 1, further comprising voltage measurement connections connected to the heating patch.

7. A measurement system for determining thermal characteristics of a material sample, the measurement system comprising:
a sensor comprising:
a heating patch comprising a closely spaced spiral electrical trace with adjacent spiral sections closely spaced apart which when heated act as a circular heat source; and
a pair of electrical connections connected to the heating patch capable of supplying current to the heating patch to heat a first size of the heating patch when determining the thermal characteristics of the material sample;
a processor; and
a memory storing instructions, which when executed by the processor configure the measurement system to:
heat the material sample by applying a current to heat an area of the heating patch through the pair of electrical connections;
measure a voltage across the pair of electrical connections connected to the heating patch;
determine an average temperature of the heated area using the measured voltage; and
determine the thermal characteristics of the material sample using the average temperature.

8. The system of claim 7, wherein the material is a bulk isotropic material and the executed instructions configure the system to determine the thermal characteristics of the bulk isotropic material using a single sided measurement process wherein the average temperature is, given by:

$$T_{0Av}(z=0, t) = -\frac{2q}{\pi} \int_0^\infty \left[ \int_{b_2}^\infty \frac{e^{-\sigma t}}{\sigma} \frac{\sqrt{\alpha_1} k_1 \sqrt{\sigma - b_1} [\alpha_2 + k_2^2 R_2^2(\sigma - b_2)] + \sqrt{\alpha_2} k_2 \sqrt{\sigma - b_2} [\alpha_1 + k_1^2 R_1^2(\sigma - b_1)]}{k_1^2 k_2^2 (\sigma - b_1)(\sigma - b_2)(R_1 + R_2)^2 + \left(\sqrt{\alpha_1} k_2 \sqrt{\sigma - b_2} + \sqrt{\alpha_2} k_1 \sqrt{\sigma - b_1}\right)^2} d\sigma \right] J_1^2(\lambda a) \frac{a\lambda}{\lambda} - \frac{2q}{\pi} \int_0^\infty \left[ \int_{b_1}^{b_2} \frac{e^{-\sigma t}}{\sigma} \frac{\sqrt{\alpha_1} k_1 \sqrt{\sigma - b_1} \left(\sqrt{\alpha_2} + k_2 R_2 \sqrt{b_2 - \sigma}\right)^2}{\alpha_1 k_2^2 (b_2 - \sigma) + \left[k_1 k_2 R_1 \sqrt{\sigma - b_1} \sqrt{b_2 - \sigma} + k_1 \sqrt{\sigma - b_1} \left(\sqrt{\alpha_2} + k_2 R_2 \sqrt{b_2 - \sigma}\right)\right]^2} d\sigma \right] J_1^2(\lambda a) \frac{d\lambda}{\lambda} + 2q \int_0^\infty \left[ \frac{(1 + k_1 R_1 \lambda)(1 + k_2 R_2 \lambda)}{k_2(1 + k_1 R_1 \lambda) + k_1(1 + k_2 R_2 \lambda)} \right] J_1^2(\lambda a) \frac{d\lambda}{\lambda^2}.$$

9. The system of claim 7, wherein the material is a slab orthotropic material and the executed instructions configure the system to determine the thermal characteristics of the slab orthotropic material using a double sided measurement process wherein the average temperature is given by:

$$T_{Av}(t) = \frac{q}{k_z} \int_0^\infty \left\{ (1 - e^{-\alpha_r \lambda^2 t}) \frac{1}{\frac{\alpha_r}{\alpha_z} \lambda^2 l} + 2l \sum_{n=1}^\infty \frac{1 - e^{-(\alpha_r \lambda^2 l^2 + \alpha_z n^2 \pi^2)\frac{t}{l^2}}}{\left(\frac{\alpha_r}{\alpha_z} \lambda^2 l^2 + n^2 \pi^2\right)} \right\} [J_1(\lambda a)]^2 \frac{d\lambda}{\lambda};$$

$$n = 1, 2, \ldots.$$

10. The measurement system of claim 7, wherein the electrical trace of the sensor has a known temperature coefficient of resistivity (TCR) to allow a temperature of the electrical trace to be determined by measuring its resistance.

11. The measurement system of claim 7, wherein the closely spaced spiral electrical trace of the sensor is arranged in one of a continuous single spiral and a double spiral.

12. The measurement system of claim 7, wherein the sensor further comprises additional electrical connections connected to the heating patch capable of supplying current to the heating patch to heat different sizes of the heating patch.

13. The system of claim 9, wherein the material is a bulk anisotropic material and the instructions when executed by the processor further configure the system to:
   heat a first portion of the sensor smaller than a total size of the sensor and measure a first temperature during a first time period;
   heat a second portion of the sensor larger than the first portion and measure a second temperature during a second time period longer than the first time period; and
   determine in-plane and off-plane thermal properties of the bulk anisotropic material using the first and second measurements.

14. The system of claim 7, wherein the material is a bulk isotropic material and the executed instructions configure the system to determine the thermal characteristics of the bulk isotropic material using a double sided measurement process wherein the average temperature is given by:

$$T_{Av}(z=0,\ t) = \frac{q}{k}\int_0^\infty \left[\text{erf}(\lambda\sqrt{\alpha t})\right]J_1^2(\lambda a)\frac{a\lambda}{\lambda^2}.$$

15. The system of claim 9, wherein the material is a thin film material and the executed instructions configure the system to determine the thermal characteristics of the thin film material using a double sided measurement process with a sample material of known characteristics wherein the average temperature is given by:

$$T_{0Av}(z=0,\ t) = -\frac{2q\sqrt{\alpha}}{\pi k}$$

$$\int_0^\infty \left[\int_b^\infty \frac{e^{-\sigma t}}{\sigma}\frac{[2\alpha+k^2(\sigma-b)(R_1^2+R_2^2)]}{\sqrt{\sigma-b}\,[4\alpha+k^2(\sigma-b)^2(R_1+R_2)^2]}d\sigma\right]J_1^2(\lambda a)\frac{d\lambda}{\lambda} +$$

$$\frac{2q}{k}\int_0^\infty\left[\frac{(1+kR_1\lambda)(1+kR_2\lambda)}{2+k\lambda(R_1+R_2)}\right]J_1^2(\lambda a)\frac{d\lambda}{\lambda^2}.$$

16. The system of claim 7, wherein the material is a slab isotropic material and the executed instructions configure the system to determine the thermal characteristics of the slab isotropic material using a double sided measurement process wherein the average temperature is given by:

$$T_{0Av}(t) =$$

$$\frac{2q}{k}\int_0^\infty \frac{[\cosh(\lambda l)+k\lambda R_1\sinh(\lambda l)]}{[2\cosh(\lambda l)+k\lambda(R_1+R_2)\sinh(\lambda l)]}\frac{[\cosh(\lambda l)+k\lambda R_2\sinh(\lambda l)]}{\sinh(\lambda l)}J_1^2(\lambda a)$$

$$\frac{d\lambda}{\lambda^2} - \frac{2q}{k}\int_0^\infty\left\{\frac{e^{-\lambda^2\alpha t}}{2\lambda^2 l}+l\sum_{n=1}^\infty \frac{e^{-\left(\lambda^2+\frac{n^2\pi^2}{l^2}\right)\alpha t}}{(\lambda^2 l^2+n^2\pi^2)}\right\}J_1^2(\lambda a)\frac{d\lambda}{\lambda} - \frac{2q}{k}$$

-continued $$\int_0^\infty \sum_{m=0}^\infty \frac{e^{-\left(\lambda^2+\frac{\beta_m^2}{l^2}\right)\alpha t}[l\cos(\beta_m)-kR_1\beta_m\sin(\beta_m)]}{(\lambda^2 l^2+\beta_m^2)\sin(\beta_m)}J_1^2(\lambda a)\frac{a\lambda}{\lambda}\cdot$$
$$\left[l\sin(\beta_m)\frac{k(R_1+R_2)}{2}[\sin(\beta_m)+\beta_m\cos(\beta_m)]\right]$$

17. The measurement system of claim 7, wherein the executed instructions configure the measurement system to provide different operating modes including:
   a double sided material mode for use in measuring the thermal characteristics of the sample material using two equivalent samples of the material;
   a single sided material mode for use in measuring the thermal characteristics of the sample material using a single sample of the material; and
   a thin-film material mode for use in measuring the thermal characteristics of the sample material when the sample material is a thin-film material.

18. The system of claim 17, wherein the double side material mode further comprises:
   a double sided bulk material mode for use in measuring the thermal characteristics of the sample material when the two samples of the material are thick; and
   a double sided slab material mode for use in measuring the thermal characteristics of the sample material when the two samples of the material are thin.

19. The system of claim 9, wherein the material is a bulk orthotropic material and the executed instructions configure the system to determine the thermal characteristics of the bulk orthotropic material using a double sided measurement process wherein the average temperature is given by:

$$T_{0Av}(t) = \frac{2q}{E_z}\int_0^\infty\left\{\frac{1}{[4-E_z^2(R_1+R_2)^2\alpha_r\lambda^2]}\left[\frac{2\text{erf}\left[+\lambda\sqrt{\alpha_r t}\right]}{\sqrt{\alpha_r}} - \right.\right.$$

$$\lambda E_z(R_1+R_2)+\lambda E_z(R_1+R_2)e^{\left[\frac{4t}{E_z^2(R_1+R_2)^2}-\alpha_r\lambda^2 t\right]}.$$

$$\left.\text{erfc}\left[\frac{2\sqrt{t}}{E_z(R_1+R_2)}\right]\right\}[J_1(\lambda a)]^2\frac{d\lambda}{\lambda^2} +$$

$$2q(R_1+R_2)\int_0^\infty\left\{\frac{1}{[4-E_z^2(R_1+R_2)^2\alpha_r\lambda^2]}\right.$$

$$[2-E_z(R_1+R_2)\lambda\sqrt{\alpha_r}\,\text{erf}\left[+\lambda\sqrt{\alpha_r t}\right]-$$

$$\left.2e^{\left[\frac{4t}{E_z^2(R_1+R_2)^2}-\alpha_r\lambda^2 t\right]}\cdot\text{erfc}\left[\frac{2\sqrt{t}}{E_z(R_1+R_2)}\right]\right\}[J_1(\lambda a)]^2\frac{d\lambda}{\lambda} +$$

$$\frac{2qR_1R_2}{(R_1+R_2)}\int_0^\infty\left\{\frac{1}{[4-E_z^2(R_1+R_2)^2\alpha_r\lambda^2]}\right.$$

$$[2E_z(R_1+R_2)\lambda\sqrt{\alpha_r}\cdot\text{erf}\left[+\lambda\sqrt{\alpha_r t}\right]-$$

$$E_z^2(R_1+R_2)^2\alpha_r\lambda^2+4e^{\left[\frac{4t}{E_z^2(R_1+R_2)^2}-\alpha_r\lambda^2 t\right]}.$$

$$\left.\text{erfc}\left[\frac{2\sqrt{t}}{E_z(R_1+R_2)}\right]\right\}[J_1(\lambda a)]^2\frac{d\lambda}{\lambda};\ z=0.$$

20. The system of claim 19, wherein the sensor has different sized heating areas and the executed instructions configure the system, to make a first 3 dimensional measurement and a second 1 dimensional measurement, and determine individual radial and axial conductivities of the material using:

$$T(t) = \frac{2qFc}{E_Z} \sum_{n=0}^{\infty} \left[ \text{ierfc} \frac{2nh}{2\sqrt{\alpha_z t}} + \frac{2(n+1)h}{2\sqrt{\alpha_z t}} \right].$$

* * * * *